United States Patent
Koller et al.

(10) Patent No.: US 12,505,549 B1
(45) Date of Patent: Dec. 23, 2025

(54) MICROSCOPY IMAGE ANALYSES FOR DISEASE MODELING

(71) Applicant: Insitro, Inc., South San Francisco, CA (US)

(72) Inventors: Daphne Koller, Portola Valley, CA (US); Ajamete Kaykas, San Francisco, CA (US); Eilon Sharon, Menlo Park, CA (US); Cecilia Giovanna Silvia Cotta-Ramusino, Cambridge, MA (US); Peter Franklin Palmedo, Jr., San Francisco, CA (US); Mohammad Muneeb Sultan, San Francisco, CA (US); Panagiotis Dimitrios Stanitsas, Palo Alto, CA (US); Francesco Paolo Casale, San Francisco, CA (US); Adam Joseph Riesselman, Brisbane, CA (US); Lorn Kategaya, Oakland, CA (US); Max R. Salick, South San Francisco, CA (US)

(73) Assignee: Insitro, Inc., South San Francisco, CA (US)

( * ) Notice: Subject to any disclaimer, the term of this patent is extended or adjusted under 35 U.S.C. 154(b) by 0 days.

(21) Appl. No.: 19/050,572

(22) Filed: Feb. 11, 2025

Related U.S. Application Data

(63) Continuation of application No. 17/350,761, filed on Jun. 17, 2021, which is a continuation of application No. PCT/US2021/033702, filed on May 21, 2021.
(Continued)

(51) Int. Cl.
*G06T 7/00* (2017.01)
*G16H 30/40* (2018.01)
*G16H 50/50* (2018.01)

(52) U.S. Cl.
CPC .......... *G06T 7/0012* (2013.01); *G16H 30/40* (2018.01); *G16H 50/50* (2018.01);
(Continued)

(58) Field of Classification Search
CPC ......... G06T 7/0012; G06T 2207/10061; G06T 2207/20081; G06T 2207/20084; G06T 2207/30024; G16H 30/40; G16H 50/50
See application file for complete search history.

(56) References Cited

U.S. PATENT DOCUMENTS

| 4,683,195 A | 7/1987 | Mullis et al. |
| 4,683,202 A | 7/1987 | Mullis |

(Continued)

FOREIGN PATENT DOCUMENTS

| EP | 320308 A2 | 6/1989 |
| EP | 329822 A2 | 8/1989 |

(Continued)

OTHER PUBLICATIONS

Anders et al., "Differential Expression Analysis for Sequence Count Data," Genome Biology, 2010, 11:R106, 12 pages.
(Continued)

*Primary Examiner* — Jennifer Mehmood
*Assistant Examiner* — Jose M Torres
(74) *Attorney, Agent, or Firm* — Goodwin Procter LLP

(57) ABSTRACT

Embodiments of the disclosure include systems and non-transitory computer readable media for analyzing microscopy images for developing machine learning models for disease modeling. Microscopy images are captured from cells of one or more exposure response phenotypes (ERPs) and further used to train machine learning models. Thus, trained machine learning models can distinguish between microscopy images captured from healthy and diseased samples.

21 Claims, 64 Drawing Sheets

Related U.S. Application Data

(60) Provisional application No. 63/029,038, filed on May 22, 2020.

(52) U.S. Cl.
CPC ............... *G06T 2207/10061* (2013.01); *G06T 2207/20081* (2013.01); *G06T 2207/20084* (2013.01); *G06T 2207/30024* (2013.01)

(56) References Cited

U.S. PATENT DOCUMENTS

| | | | |
|---|---|---|---|
| 4,800,159 | A | 1/1989 | Mullis et al. |
| 5,882,864 | A | 3/1999 | An et al. |
| 7,888,121 | B2 | 2/2011 | Urnov et al. |
| 7,919,313 | B2 | 4/2011 | Collingwood et al. |
| 7,951,925 | B2 | 5/2011 | Ando et al. |
| 8,110,379 | B2 | 2/2012 | DeKelver et al. |
| 8,409,861 | B2 | 4/2013 | Guschin et al. |
| 8,440,431 | B2 | 5/2013 | Voytas et al. |
| 8,440,432 | B2 | 5/2013 | Voytas et al. |
| 8,450,471 | B2 | 5/2013 | Voytas et al. |
| 8,586,363 | B2 | 11/2013 | Voytas et al. |
| 8,697,359 | B1 | 4/2014 | Zhang |
| 8,697,853 | B2 | 4/2014 | Voytas et al. |
| 8,771,945 | B1 | 7/2014 | Zhang |
| 8,795,965 | B2 | 8/2014 | Zhang |
| 8,865,406 | B2 | 10/2014 | Zhang et al. |
| 8,871,445 | B2 | 10/2014 | Cong et al. |
| 8,889,356 | B2 | 11/2014 | Zhang |
| 8,895,308 | B1 | 11/2014 | Zhang et al. |
| 8,906,616 | B2 | 12/2014 | Zhang et al. |
| 8,932,814 | B2 | 1/2015 | Cong et al. |
| 8,945,839 | B2 | 2/2015 | Zhang |
| 8,993,233 | B2 | 3/2015 | Zhang et al. |
| 8,999,641 | B2 | 4/2015 | Zhang et al. |
| 9,353,378 | B2 | 5/2016 | Bonas et al. |
| 9,758,775 | B2 | 9/2017 | Voytas et al. |
| 9,932,561 | B2 | 4/2018 | Thatava et al. |
| 11,514,289 | B1 * | 11/2022 | Otte .................. C12N 15/1089 |
| 2004/0143401 | A1 * | 7/2004 | Elling .................. G01N 33/502 435/6.12 |
| 2012/0207723 | A1 | 8/2012 | He et al. |
| 2013/0259836 | A1 | 10/2013 | Lee et al. |
| 2013/0266541 | A1 | 10/2013 | Zambidis et al. |
| 2013/0345268 | A1 | 12/2013 | Ratner et al. |
| 2014/0093486 | A1 | 4/2014 | Chiou et al. |
| 2017/0204407 | A1 | 7/2017 | Gilbert et al. |
| 2018/0179496 | A1 | 6/2018 | Rajesh et al. |
| 2018/0365372 | A1 | 12/2018 | Araya et al. |
| 2019/0012521 | A1 * | 1/2019 | Cohen .................... G16B 40/20 |
| 2019/0341123 | A1 | 11/2019 | Vaske et al. |
| 2020/0115682 | A1 | 4/2020 | Greene Nguyen et al. |
| 2023/0170050 | A1 * | 6/2023 | Cooper .................. G16B 40/20 706/21 |

FOREIGN PATENT DOCUMENTS

| | | | |
|---|---|---|---|
| EP | 364255 | A2 | 4/1990 |
| GB | 2202328 | A | 9/1988 |
| JP | 2020-052865 | A | 4/2020 |
| WO | 1987/006270 | A1 | 10/1987 |
| WO | 1988/010315 | A1 | 12/1988 |
| WO | 1989/006700 | A1 | 7/1989 |
| WO | 1989/009284 | A1 | 10/1989 |
| WO | 1990/007641 | A1 | 7/1990 |
| WO | 2009/144008 | A1 | 12/2009 |
| WO | 2010/099539 | A1 | 9/2010 |
| WO | 2014/093595 | A1 | 6/2014 |
| WO | 2014/093712 | A1 | 6/2014 |
| WO | 2019/113499 | A1 | 6/2019 |
| WO | 2019/120046 | A1 | 6/2019 |
| WO | 2019/133714 | A1 | 7/2019 |
| WO | WO-2020008192 | A2 * | 1/2020 .............. G16H 15/00 |

OTHER PUBLICATIONS

Caicedo et al., "Data-Analysis Strategies for Image-Based Cell Profiling," Nature Methods, vol. 14, No. 9, Sep. 2017, pp. 849-863.
Hardcastle et al., "baySeq: Empirical Bayesian Methods for Identifying Differential Expression in Sequence Count Data," BMC Bioinformatics, 2010, 11:422, 14 pages.
Hormozdiari et al., "Imputing Phenotypes for Genome-Wide Association Studies," The American Journal of Human Genetics, 99, pp. 89-103, Jul. 7, 2016.
Law et al., "Voom: Precision Weights Unlock Linear Model Analysis Tools for RNA-seq Read Counts," Genome Biology, 15, R29, 32 pages, Year: 2014.
Leng et al., "EBSeq: An Empirical Bayes Hierarchical Model for Interference in RNA-Seq Experiments," BioInformatics, vol. 29, No. 8, 2013, pp. 1035-1043.
Li et al., "Normalization, Testing, and False Discovery Rate Estimation for RNA-Sequencing Data," Biostatistics, 2012, 13, 3, pp. 523-538.
Li et al., "Finding Consistent Patterns: A Nonparametric Approach for Identifying Differential Expression in RNA-Seq Data," Stat Methods Med Res. Oct. 2013, 22(5), pp. 519-536.
Love et al., "Moderated Estimation of Fold Charnge and Dispersion for RNA-Seq Data with DESeq2," Genome Biology, 2014, 15:550, 21 pages.
Nishida-Aoki et al., "Emerging Approaches to Study Cell-Cell Interactions in Tumor Microenvironment," Oncotarget, 2019, vol. 10, No. 7, pp. 785-797.
Robinson et al., "edgeR: A Bioconductor Package for Differential Expression Analysis of Digital Gene Expression Data," vol. 26, No. 1, 2010, pp. 139-140.
Simon et al., "Tissue Microarrays," Biotechniques, 36, pp. 908-105, Jan. 2004.
Smyth et al., "Linear Models and Empirical Bayes Methods for Assessing Differential Expression in Microarray Experiments," Statistical Applications in Genetics and Molecular Biology, 3, 2004, No. 1, Article 3, 26 pages.
Storey, "The Optimal Discovery Procedure: A New Approach to Simultaneous Significance Testing," J.R. Statist. Soc. B, 2007, 69, Part 3, pp. 347-368.
Van De Wiel et al., "Bayesian Analysis of RNA Sequencing Data by Estimating Multiple Shrinkage Priors," Biostatistics, 2013, 14, 1, pp. 113-128.
Vorm et al., "Improved Mass Accuracy in Matrix-Assisted Laser Desorption/Ionization Time-of-Flight Mass Spectrometry of Peptides," American Society of Mass Spectrometry, 1994, pp. 955-958.
Walker et al., "Strand Displacement Amplification—An Isothermal, in vitro DNA Amplication Technique," Nucleic Acids Research, vol. 20, No. 7, pp. 1691-1696, Year: 1992.
Notification of Transmittal of the International Search Report and the Written Opinion of the International Searching Authority, or the Declaration, Int'l Application No. PCT/US2021/033702, Oct. 5, 2021, 28 pages.
Tiscornia et al., "Diseases in a Dish: Modeling Human Genetic Disorders Using Induced Pluripotent Cells," Nature Medicine, vol. 17, No. 12, Dec. 2011, pp. 1570-1576.
Kandasamy et al., "Prediction of Drug-Induced Nephrotoxicity and Injury Mechanisms with Human Induced Pluripotent Stem Cell-Derived Cells and Machine Learning Methods," Scientific Reports, 5:12337, pp. 1-15, 2015.
Xu et al., In vitro models of TGF-β-induced fibrosis suitable for high-throughput screening of antifibrotic agents, 2007, Am J Physiol Renal Physiol 293, p. F631-F640 (Year: 2007).
Kim et al., Cancer classification of single-cell gene expression data by neural network, 2020, Bioinformatics, 36(5), p. 1360-1366 (Year: 2019).
Monzel, Machine learning assisted neurotoxicity prediction in human midbrain organoids, 2019, bioRxiv preprint, p. 1-21 (Year; 2019).
Sundarakrishnan et al., Engineered cell and tissue models of pulmonary fibrosis, 2018, Advanced Drug Delivery Reviews, 129, p. 78-94 (Year: 2018).
M. Alves-Bezerra, et al., "Using CRISPR/Cas9 to model human liver disease", 2019, JHEP Reports, 1, p. 392-402.

(56) References Cited

OTHER PUBLICATIONS

Rampasek, L., et al., "Dr. Vae: improving drug response prediction via modeling of drug perturbation effects", Bioinformatics, 35(19), 2019, 3743-3751.
Lotfollahi, M., et al., "scGen predicts single-cell perturbation responses", Nature Methods, Nature Publishing Group US, New York, vol. 16, No. 8, Jul. 29, 2019, pp. 715-721.
Extended European Search Report for Application No. 21808731.0, dated Mar. 27, 2024, 11 pages.
Dincer, A., et al., "Adversarial Deconfounding Autoencoder for Learning Robust Gene Expression Embeddings", Gene Expression, Apr. 2020, p. 1-9.
Cano-Gamez, E., et al., "Form GWAS to Function: Using Functional Genomics to Identify the Mechanisms Underlying Complex Diseases", Frontiers in Genetics, May 2020, vol. 11, Article 424, p. 1-21.
Slotta, C., et al., CRISPR/Cas9-mediated knockout of c-REL in HeLa cells results in profound defects of the cell cycle, PLOS ONE, 2017, vol. 12, Issue 8, e0182373.

\* cited by examiner

Training Data 350

| Cell | Genetics | Perturbants | Phenotypic Assay Data | Clinical Phenotype |
|---|---|---|---|---|
| 1 | Causal Elements 1 | Hypoxia | Image 1 | Disease (1) |
| 2 | Causal Elements 2 | Free fatty acid | Image 2 | Disease (1) |
| 3 | Causal Elements 3 | Lipids | Image 3 | Healthy (0) |
| 4 | Causal Elements 4 | Therapeutic | Image 4 | Healthy (0) |

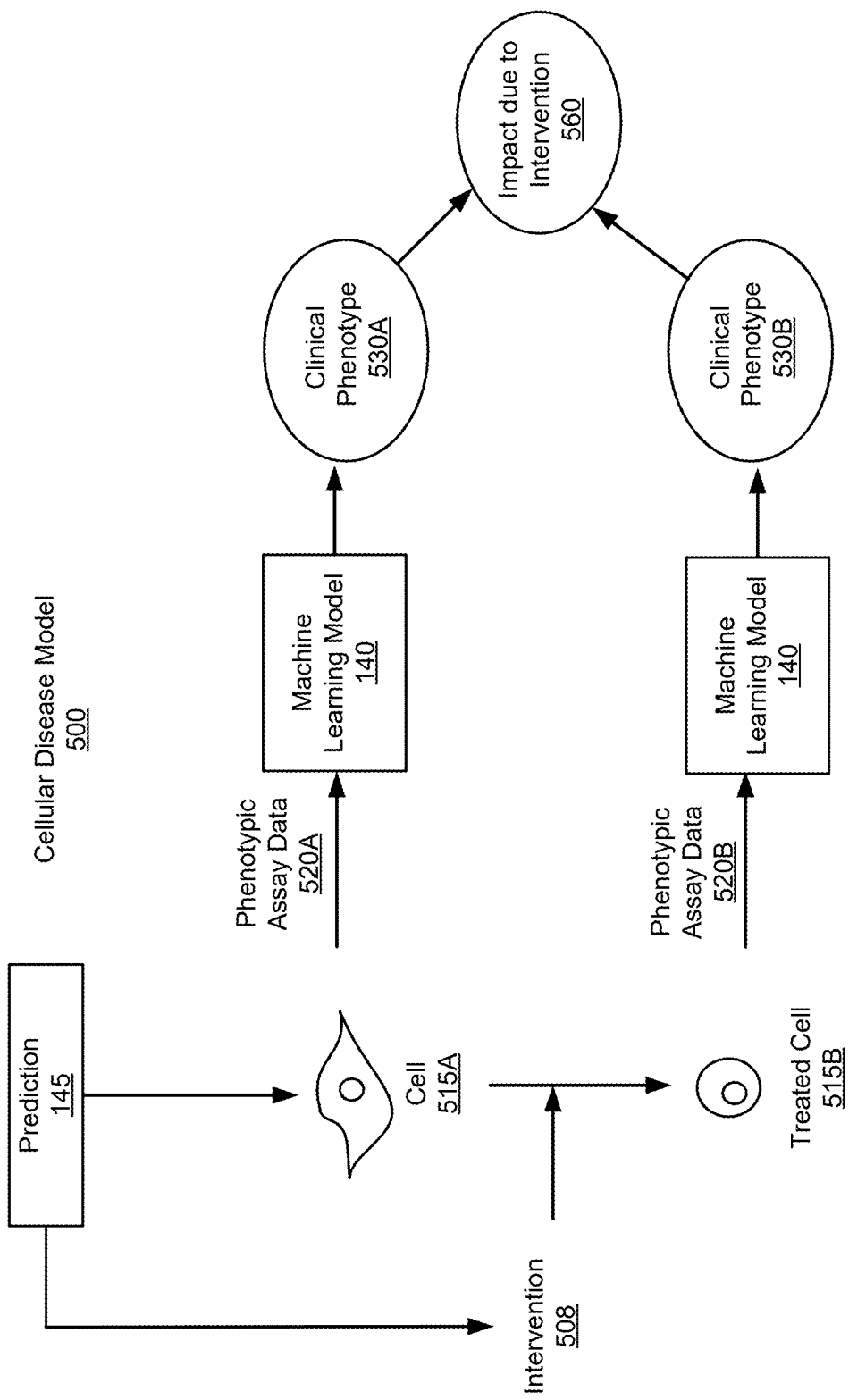

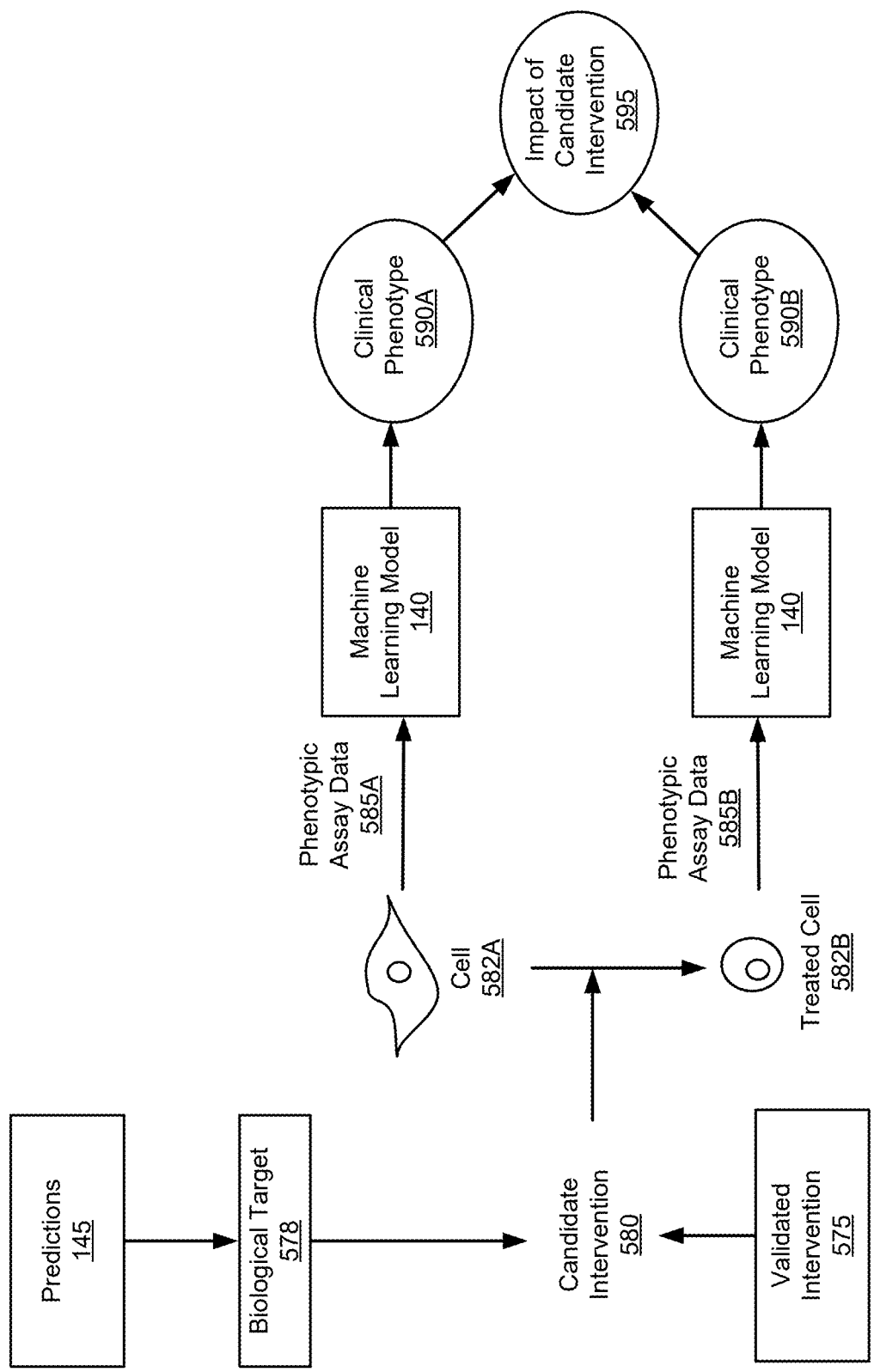

| Name | Class | Magnitude (# DE Genes ↑ / ↓) | Clinical relevance (enrichments, FDR<5%) | Response similarity |
|---|---|---|---|---|
| TGFβ | Growth Factor | 869 / 924 | ↑ progression ↓ regression | |
| TGFβR1 antagonist (R.268712) | others | 2369 / 1969 | ↑ regression ↓ progression | ↑ similar to Lipoic acid ↑; ↓ similar to TNFα / IL1β ↑ |
| TNFα | cytokines / GFs | 1725 / 1871 | ↑ progression ↓ regression | Similar to IL1β |
| FeSO4.7H2O | metal ion salts | 693 / 521 | ↑ progression | ↑ similar to TNFα / IL1β ↑ |
| ZnSO4.7H2O | metal ion salts | 59 / 25 | ↑ regression | Similar to CoCl2 |

FIG. 14F

MICROSCOPY IMAGE ANALYSES FOR DISEASE MODELING

CROSS-REFERENCE TO RELATED APPLICATIONS

This application is a continuation of co-pending U.S. application Ser. No. 17/350,761, filed Jun. 17, 2021, which is a continuation of PCT/US2021/033702, filed May 21, 2021, which claims the benefit of and priority to U.S. Provisional Patent Application Ser. No. 63/029,038, filed on May 22, 2020, the contents of which are herein incorporated in its entirety by reference.

BACKGROUND OF THE INVENTION

Currently, the effectiveness of conventional patient treatments as well as the costs associated with discovering new effective treatments remain barriers to optimal patient outcomes. Understanding the genetic basis for certain diseases is important, but often insufficient to predict whether or when a disease is likely to develop in a given subject and what additional factors are likely to trigger disease onset in subjects having genetic risk for that disease. Consequently, identifying targets for therapeutic intervention and developing regimens for treating disease is typically slow and serendipitous. Additionally, promising interventions frequently do not demonstrate a consistent safety or efficacy profile in human subjects during clinical trials. Many therapeutic regimens show varying levels of safety or efficacy for different subjects, for reasons that are difficult to anticipate and are either determined only in hindsight or never fully understood. The resources needed to identify and develop new therapeutics that would be effective for different patient populations remains difficult and expensive, thereby leaving many patients with significant unmet needs.

SUMMARY

Disclosed herein is the implementation of machine-learning (ML)-enabled cellular disease models for performing screens, examples of which include validating an intervention (e.g., drug, gene, or combination intervention) for use against a disease, identifying patient populations that are likely to respond to an intervention, searching through a library of interventions (e.g., drug, gene, or combination intervention) to identify a candidate that is likely to be efficacious, identifying candidate molecular therapeutics using a structure-activity molecule screen developed using the cellular disease model, and identifying biological targets (e.g., genes) that, if perturbed, can modulate the disease. Put another way, cellular disease models are useful for conducting clinical trials in a dish.

ML-enabled cellular disease models can perform screens for one or more patients (e.g., a patient cohort) through proxies without need for actual testing of the one or more patients (or samples derived from the one or more patients). For example, cellular disease models can be used to screen therapies against cellular avatars which serve as proxies for the one or more patients that are yet to be encountered. Therefore, cellular disease models are useful tools for evaluating individual patients and/or larger patient cohorts across various diseases, without having to have encountered such patients.

Cellular disease models include machine learning models that are trained to uncover phenotypic traces that differ between cells. For example, machine learning models can be trained to distinguish between cellular phenotypes of healthy cells and non-healthy cells (e.g., phenotypes of diseased cells or phenotypes of cells exposed to a toxic intervention). Diseased cells are developed in vitro to model factors (e.g., genetic, environmental, cellular factors) that drive the development or progression of the disease. Therefore, these cells represent in vitro models of the in vivo disease. Of note, these cells representing in vitro models of disease can, but need not exactly emulate the in vivo disease; rather, the in vitro models can be designed such that when analyzed by machine learning models, the in vitro models are predictive of in vivo disease phenotypes, including various phases of disease progression. Therefore, in some embodiments, aspects of the in vitro models are the same as aspects of the in vivo disease. In some embodiments, in vitro cellular phenotypes may be similar mechanistically to in vivo cellular phenotypes or even unrelated to in vivo cellular phenotypes.

The cellular disease models are developed using machine learned analysis of training datasets that include experimentally generated phenotypic cell data captured from a range of healthy and disease-prone cells, which enables identification of phenotypic features associated with diseases, their initiation and their progression. Cellular disease models enable the identification of diverse interventions, such as genetic interventions, drug interventions, or combinations thereof for use in treating diseases. Using the cellular disease model, these interventions can be screened (e.g., in vitro screening) and their effects are interpreted using the machine learned models, so as to provide further insight into targets or drugs for modulating disease activity.

More specifically, embodiments described herein employ machine learning models for predicting human clinical outcomes (e.g., clinical phenotypes) using phenotypic assay data (e.g., biomolecular data obtained from one or more cells). The machine learning models are trained using large sets of training data (e.g., biomolecular data) that are generated experimentally at tremendous breadth and scale. Such large, experimentally derived data sets are created from phenotypic assays of cell variants, collected or engineered to express a range of healthy and diseased states from one or more genetic backgrounds.

In various embodiments, the training data is collected from diseased cells that have been engineered to serve as in vitro models of the disease. The disease-prone cells are generated using an understanding of an unraveled set of factors (e.g., genetic, environmental, cellular factors) that have been determined to influence onset or progression of the disease. For example, these diseased cells are genetically engineered to have genetic or epigenetic changes that align with a genetic architecture of the disease and may be further modified and perturbed to model the progression of the disease. Thus, the phenotypic assay data collected from these populations of cells is informative for broad aspects of the disease. The genetics of cells, the modifications and perturbations applied to the cells, and the collected phenotypic assay data represent the training data that is then used to train the machine learning model.

When deployed, the cellular disease model can be widely applied for different purposes, including running clinical trials in a dish. Examples of implementing cellular disease models including validating an intervention for use against a disease, identifying patient populations that are likely to respond to an intervention, searching through a library of therapeutics to identify a candidate that is likely to be efficacious, optimizing or identifying therapeutics using a structure-activity molecule screen developed using the cellular disease model, and identifying biological targets (e.g., genes) whose perturbation may modulate the disease. Altogether, the application of cellular disease models enables the screening of therapies and development of new drugs at a faster pace and lower cost.

Embodiments disclosed herein include a method for developing a machine learning model for use in a ML-enabled cellular disease model that predicts clinical outcomes, comprising: obtaining or having obtained a cell aligned with a genetic architecture of disease; modifying the cell to promote a diseased cellular state within the cell; capturing phenotypic assay data from the cell; and analyzing, through a machine learning (ML) implemented method, the phenotypic assay data of the cell to train the machine learning model useful for the cellular disease model, the machine learning model comprising at least in part a relationship between the captured phenotypic assay data and a clinical phenotype.

In various embodiments, the training of the machine learning model comprises analyzing, through the ML implemented method, phenotypic assay data of one or more exposure response phenotypes (ERPs) that serve as proxy labels of health and disease in in vitro models. In various embodiments, the ERP is validated by comparing previously generated phenotypic assay data of the ERP to corresponding phenotypic assay data captured from cells known to have or not have the disease. In various embodiments, phenotypic assay data of an ERP is captured from a plurality of cells exposed to a perturbagen. In various embodiments, the plurality of cells are exposed to different concentrations of the perturbagen. In various embodiments, the plurality of cells comprise a plurality of genetic backgrounds. In various embodiments, the one or more ERPs comprise at least two, at least three, at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty ERPs. In various embodiments, the one or more ERPs comprise at least five ERPs.

In various embodiments, the genetic architecture of the disease is determined by: identifying genetic loci associated with the disease; and identifying causal elements of the disease from the identified genetic loci associated with the disease, the causal elements representing drivers of disease development or progression. In various embodiments, identifying genetic loci associated with the disease comprises performing one of whole genome sequencing, whole exome sequencing, whole transcriptome sequencing, or targeted panel sequencing. In various embodiments, identifying causal elements of the disease comprises: obtaining genetic associations; and co-localizing the genetic associations with the identified genetic loci associated with the disease. In various embodiments, the genetic architecture of the disease is determined by: performing a GWAS association test between genetic data of one or more samples and labels of the clinical phenotype for the one or more samples. In various embodiments, the labels of the clinical phenotype for the one or more samples are determined by implementing a predictive model trained to distinguish between phenotypic assay data derived from healthy and diseased samples.

In various embodiments, the clinical phenotype is one of a disease phenotype, a presence or absence of disease, disease severity, disease pathology, disease risk, disease progression, a likelihood of a clinical phenotype in response to a therapeutic treatment, or disease-relevant clinical phenotypes observable through clinical methods. In various embodiments, the clinical phenotype corresponds to one of nonalcoholic steatohepatitis, Parkinson's Disease, Amytrophic Lateral Sclerosis (ALS), or Tuberous Sclerosis Complex (TSC).

In various embodiments, the cell is a differentiated cell. In various embodiments, the cell is differentiated from an induced pluripotent stem cell. In various embodiments, the cell harbors genetic markers that are aligned with the genetic architecture of disease. In various embodiments, the genetic markers in the cell are engineered using a cDNA construct, CRISPR, TALENS, Zinc finger nucleases, or other genetic editing techniques. In various embodiments, modifying the cell comprises one or more of differentiating the cell to a diseased-related cell type, modulating gene expression of the cell, and providing an agent or environmental condition that promotes the cell into the diseased cellular state. In various embodiments, the disease-related cell type is selected based on one or more identified causal elements of the disease that are active in the disease-related cell type.

In various embodiments, the agent is any one of any of CTGF/CCN2, FGF1, IFGγ, IGF1, IL1β, AdipoRon, PDGF-D, TGFβ, TNFα, HLD, LDL, VLDL, fructose, lipoic acid, sodium citrate, ACCli (Firsocostat), ASKli (Selonsertib), FXRa (obeticholic acid), PPAR agonist (elafibranor), $CuCl_2$, $FeSO_4$ $7H_2O$, $ZnSO_4$ $7H_2O$, LPS, TGFβ antagonist, and ursodeoxycholic acid. In various embodiments, the agent is one of a chemical agent, a molecular intervention, or a gene editing agent for introducing one or more genetic variants. In various embodiments, the environmental condition is $O_2$ tension, $CO_2$ tension, hydrostatic pressure, osmotic pressure, pH balance, ultraviolet exposure, temperature exposure or other physico-chemical manipulations.

In various embodiments, the phenotypic assay data of the cell comprises one or more of cell sequencing data, protein expression data, gene expression data, image data, cell metabolic data, cell morphology data, or cell interaction data. In various embodiments, the image data comprises one of high-resolution microscopy data, nucleic acid-based stains used for in situ hybridization (e.g., chromosome paints), or immunohistochemistry data. In various embodiments, the cell is included in a population of cells, and wherein modifying the cell diversifies the cell in relation to other cells in the population of cells. In various embodiments, the cell is included in a population of cells, and wherein modifying the cell results in at least two cell subpopulations that are in at least two different stages in disease progression. In various embodiments, the cell is included in a population of cells, and wherein modifying the cell results in at least two cell subpopulations that are in at least two different stages of maturation. In various embodiments, the cell is obtained from one of in vivo, in vitro 2D culture, in vitro 3D culture, or in vitro organoid or organ-on-chip systems.

In various embodiments, analyzing the phenotypic assay data of the cell to train the machine learning model comprises: encoding the phenotypic assay data as a numerical vector; and inputting the numerical vector into the machine learning model. In various embodiments, analyzing the phenotypic assay data of the cell to train the machine learning model comprises: providing the phenotypic assay data of the cell, genetics of the cell, and modifications applied to the cell as input to the machine learning model.

Additional embodiments disclosed herein include a method for validating an intervention, the method comprising: applying a ML-enabled cellular disease model using at least a prediction generated from the machine learning model developed using embodiments of the method for developing the machine learning model described above. In various embodiments, applying the ML-enabled cellular disease model comprises: obtaining phenotypic assay data captured from treated cells corresponding to the one or more cellular avatars, the treated cells treated with the intervention; and using the machine learning model, determining the prediction of a clinical phenotype based on the obtained phenotypic assay data captured from treated cells.

In various embodiments, the method further comprises obtaining phenotypic assay data captured from cells, wherein the treated cells are derived from the cells following treatment with the intervention; and determining a prediction of a second clinical phenotype based on the obtained phenotypic assay data captured from the cells, wherein validating the intervention further comprising validating based on the prediction of the second clinical phenotype.

In various embodiments, determining the prediction of the clinical phenotype comprises applying the machine learning model to the obtained phenotypic assay data captured from the treated cells, and wherein determining the prediction of the second clinical phenotype comprises applying the machine learning model to the obtained phenotypic assay data captured from the cells. In various embodiments, applying the machine learning model to the phenotypic assay data captured from the treated cells further comprises applying the machine learning model to genetics of the treated cells and modifications applied to the treated cells, wherein the modifications applied to the treated cells includes the intervention. In various embodiments, applying the machine learning model to the phenotypic assay data captured from the cells further comprises applying the machine learning model to genetics of the cells and modifications applied to the cells, wherein the modifications applied to the cells does not include the intervention. In various embodiments, validating the intervention comprises comparing the prediction of the clinical phenotype corresponding to the treated cells to the second clinical phenotype corresponding to cells. In various embodiments, validating the intervention comprises determining whether the intervention is efficacious or non-toxic.

Additional embodiments disclosed herein involve a method for identifying a patient population as responders to an intervention, the method comprising: selecting a plurality of cellular avatars representing the patient population; applying a ML-enabled cellular disease model to the intervention for one of the plurality of cellular avatars to determine whether the cellular avatar is a responder or non-responder to the intervention, wherein application of the ML-enabled cellular disease model comprises using at least a prediction generated from the machine learning model developed using embodiments of the method for developing the machine learning model described above to select the intervention.

In various embodiments, the method further comprises: obtaining subject features from patients of the patient population; applying the ML-enabled cellular disease model to each of other cellular avatars in the plurality of cellular avatars to determine whether each of the other cellular avatars is a responder or non-responder to the intervention; and generating a relationship between subject features of patients of the patient population and responder or non-responder determinations of the plurality of cellular avatars that represent the patient population. In various embodiments, the subject features comprise one or more of medical history of a subject, gene products of a subject, mutated gene products of a subject, and expression or differential expression of genes of a subject. In various embodiments, applying the ML-enabled cellular disease model comprises: obtaining phenotypic assay data captured from cells corresponding to the cellular avatar, the cells aligned with a genetic architecture of disease; using the machine learning model, determining a prediction of a clinical phenotype based on the obtained phenotypic assay data captured from the cells; obtaining phenotypic assay data captured from treated cells, the treated cells derived from the cells following treatment with the intervention; determining a prediction of a second clinical phenotype based on the obtained phenotypic assay data captured from treated cells; and comparing the prediction of the clinical phenotype and the second clinical phenotype to determine whether the cellular avatar is a responder or non-responder.

In various embodiments, determining the prediction of the clinical phenotype comprises applying the machine learning model to the obtained phenotypic assay data captured from the cells, and wherein determining the prediction of the second clinical phenotype comprises applying the machine learning model to the obtained phenotypic assay data captured from treated cells. In various embodiments, the intervention comprises a combination therapy comprises two or more therapeutics.

Additional embodiments disclosed herein involve a method for developing a structure-activity relationship (SAR) screen, the method comprising: for each of one or more therapeutics, obtaining a predicted impact of the therapeutic on a disease, the predicted impact determined by applying a ML-enabled cellular disease model using at least a prediction generated from the machine learning model developed using embodiments of the method for developing the machine learning model described above; and using the predicted impact of the therapeutics, generating a mapping between features of therapeutics and a corresponding predicted impact of therapeutics. In various embodiments, the prediction generated from the machine learning model comprises therapeutics that are clustered according to their therapeutic effect against a target.

In various embodiments, the predicted impact of the therapeutic on the disease is determined by: obtaining phenotypic assay data captured from cells aligned with a genetic architecture of disease; using the machine learning model, determining a prediction of a clinical phenotype based on the obtained phenotypic assay data captured from the cells; obtaining phenotypic assay data captured from treated cells, the treated cells derived from the cells following treatment with an intervention; determining a prediction of a second clinical phenotype based on the obtained phenotypic assay data captured from treated cells; and comparing the prediction of the clinical phenotype and the second clinical phenotype to determine the predicted impact of the therapeutic. In various embodiments, wherein the predicted impact of the therapeutic is one of therapeutic efficacy or lack of therapeutic toxicity. Additionally disclosed herein is a method comprising: applying a ML-enabled cellular disease model, wherein application of the ML-enabled cellular disease model comprises using at least a prediction generated from the machine learning model developed using embodiments of the methods disclosed herein, wherein the prediction is generated from phenotypic assay data across a plurality of cells that have been treated with a perturbation; identifying a genetic modification associated with cellular phenotypes indicative of disease based on the prediction generated from the machine learning model; and selecting the genetic modification as the biological target. In various embodiments, the phenotypic assay data are derived from cells treated with a perturbation that induces a diseased state. In various embodiments, identifying the genetic modification based on the prediction comprises determining that presence of the genetic modification in a cell correlates with the diseased state induced by the perturbation. In various embodiments, the prediction generated from the machine learning model comprises a machine-learned embedding.

In various embodiments, the ML implemented method is a combination of weak supervision and partial supervision approaches. In various embodiments, the ML implemented method is any one or more of linear regression, logistic regression, decision tree, support vector machine classification, Naïve Bayes classification, K-Nearest Neighbor classification, random forest, deep learning, gradient boosting, generative adversarial networking learning, reinforcement learning, Bayesian optimization, matrix factorization, and dimensionality reduction techniques such as manifold learning, principal component analysis, factor analysis, autoencoder regularization, and independent component analysis, or combinations thereof.

Additionally disclosed herein is a non-transitory computer readable medium a machine learning model for use in a ML-enabled cellular disease model, the non-transitory computer readable medium comprising instructions that, when executed by a processor, cause the processor to perform the steps comprising: obtaining phenotypic assay data derived from a cell, wherein the cell is aligned with a genetic architecture of disease and modified to promote a diseased cellular state within the cell; and analyzing, through a machine learning (ML) implemented method, the phenotypic assay data of the cell to train the machine learning model useful for the ML-enabled cellular disease model, the machine learning model comprising at least in part a relationship between the captured phenotypic assay data and a clinical phenotype.

In various embodiments, the training of the machine learning model comprises analyzing, through the ML implemented method, phenotypic assay data of one or more exposure response phenotypes (ERPs) that serve as proxy labels of health and disease in in vitro models. In various embodiments, the ERP is validated by comparing previously generated phenotypic assay data of the ERP to corresponding phenotypic assay data captured from cells known to have or not have the disease. In various embodiments, phenotypic assay data of an ERP is captured from a plurality of cells exposed to a perturbagen. In various embodiments, the plurality of cells are exposed to different concentrations of the perturbagen. In various embodiments, the plurality of cells comprise a plurality of genetic backgrounds. In various embodiments, the one or more ERPs comprise at least two, at least three, at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty ERPs. In various embodiments, the one or more ERPs comprise at least five ERPs.

In various embodiments, the genetic architecture of the disease is determined by: identifying genetic loci associated with the disease; and identifying causal elements of the disease from the identified genetic loci associated with the disease, the causal elements representing drivers of disease development or progression. In various embodiments, identifying genetic loci associated with the disease comprises having performed one of whole genome sequencing, whole exome sequencing, whole transcriptome sequencing, or targeted panel sequencing. In various embodiments, identifying causal elements of the disease comprises: obtaining genome annotations; and co-localizing the genome annotations with the identified genetic loci associated with the disease. In various embodiments, the genetic architecture of the disease is determined by: performing a GWAS association test between genetic data of one or more samples and labels of the clinical phenotype for the one or more samples. In various embodiments, the labels of the clinical phenotype for the one or more samples are determined by implementing a predictive model trained to distinguish between phenotypic assay data derived from healthy and diseased samples.

In various embodiments, the clinical phenotype is one of a disease phenotype, a presence or absence of disease, disease severity, disease pathology, disease risk, disease progression, a likelihood of a clinical phenotype in response to a therapeutic treatment, or disease-relevant clinical phenotypes observable through clinical methods. In various embodiments, the clinical phenotype corresponds to one of nonalcoholic steatohepatitis, Parkinson's Disease, Amytrophic Lateral Sclerosis (ALS), or Tuberous Sclerosis Complex (TSC).

In various embodiments, the cell is a differentiated cell. In various embodiments, the cell is differentiated from an induced pluripotent stem cell. In various embodiments, the cell harbors genetic changes that are aligned with the genetic architecture of disease. In various embodiments, the genetic changes in the cell are engineered using a cDNA construct, CRISPR, TALENS, Zinc finger nucleases, or other genetic editing techniques. In various embodiments, the modification of the cell comprises one or more of differentiating the cell to a diseased-related cell type, modulating gene expression of the cell, and providing an agent or environmental condition that spurs the cell into the diseased cellular state. In various embodiments, the disease-related cell type is selected based on one or more identified causal elements of the disease that are active in the disease-related cell type.

In various embodiments, the agent is any one of any of CTGF/CCN2, FGF1, IFGγ, IGF1, IL1β, AdipoRon, PDGF-D, TGFβ, TNFα, HLD, LDL, VLDL, fructose, lipoic acid, sodium citrate, ACCli (Firsocostat), ASKli (Selonsertib), FXRa (obeticholic acid), PPAR agonist (elafibranor), $CuCl_2$, $FeSO_4$ $7H_2O$, $ZnSO_4$ $7H_2O$, LPS, TGFβ antagonist, and ursodeoxycholic acid. In various embodiments, the agent is one of a chemical agent, a molecular intervention, or a gene editing agent for introducing one or more genetic variants. In various embodiments, the environmental condition is $O_2$ tension, $CO_2$ tension, hydrostatic pressure, osmotic pressure, pH balance, ultraviolet exposure, temperature exposure or other physico-chemical manipulations. In various embodiments, the phenotypic assay data of the cell comprises one or more of cell sequencing data, protein expression data, gene expression data, image data, cell metabolic data, cell morphology data, or cell interaction data. In various embodiments, the image data comprises one of high-resolution microscopy data or immunohistochemistry data.

In various embodiments, the cell is included in a population of cells, and wherein modifying the cell diversifies the cell in relation to other cells in the population of cells. In various embodiments, the cell is included in a population of cells, and wherein modifying the cell results in at least two cell subpopulations that are in at least two different stages in disease progression. In various embodiments, the cell is included in a population of cells, and wherein modifying the cell results in at least two cell subpopulations that are in at least two different stages of maturation. In various embodiments, the cell is obtained from one of in vivo, in vitro 2D culture, in vitro 3D culture, or in vitro organoid or organ-on-chip systems.

In various embodiments, the instructions that cause the processor to perform the step of analyzing the phenotypic assay data of the cell to train the machine learning model further comprises instructions that, when executed by the processor, cause the processor to perform steps comprising: encoding the phenotypic assay data as a numerical vector; and inputting the numerical vector into the machine learning model. In various embodiments, the instructions that cause the processor to perform the step of analyzing the phenotypic assay data of the cell to train the machine learning model further comprises instructions that, when executed by the processor, cause the processor to perform steps comprising: providing the phenotypic assay data of the cell, genetics of the cell, and modifications applied to the cell as input to the machine learning model.

Additional embodiments disclosed herein involve a non-transitory computer readable medium for validating an intervention, the non-transitory computer readable medium comprising instructions that, when executed by a processor, cause the processor to perform steps comprising: applying a ML-enabled cellular disease model using at least a prediction generated from the machine learning model developed using embodiments of the method for developing the machine learning model described above.

In various embodiments, applying the ML-enabled cellular disease model comprises: obtaining phenotypic assay data captured from treated cells corresponding to the one or more cellular avatars, the treated cells treated with the intervention; and using the machine learning model, determining the prediction of a clinical phenotype based on the obtained phenotypic assay data captured from treated cells. In various embodiments, the non-transitory computer readable medium further comprises instructions that, when executed by the processor, cause the processor to perform steps comprising: obtaining phenotypic assay data captured from cells, wherein the treated cells are derived from the cells following treatment with the intervention; and determining a prediction of a second clinical phenotype based on the obtained phenotypic assay data captured from the cells, wherein validating the intervention further comprising validating based on the prediction of the second clinical phenotype.

In various embodiments, determining the prediction of the clinical phenotype comprises applying the machine learning model to the obtained phenotypic assay data captured from the treated cells, and wherein determining the prediction of the second clinical phenotype comprises applying the machine learning model to the obtained phenotypic assay data captured from the cells. In various embodiments, applying the machine learning model to the phenotypic assay data captured from the treated cells further comprises applying the machine learning model to genetics of the treated cells and modifications applied to the treated cells, wherein the modifications applied to the treated cells includes the intervention. In various embodiments, applying the machine learning model to the phenotypic assay data captured from the cells further comprises applying the machine learning model to genetics of the cells and modifications applied to the cells, wherein the modifications applied to the cells does not include the intervention. In various embodiments, wherein validating the intervention comprises comparing the prediction of the clinical phenotype corresponding to the cells to the second clinical phenotype corresponding to treated cells. In various embodiments, wherein validating the intervention comprises determining whether the intervention is efficacious or non-toxic.

Additional embodiments disclosed herein involve a non-transitory computer readable medium for identifying a patient population as responders to an intervention, the non-transitory computer readable medium comprising instructions that, when executed by a processor, cause the processor to perform steps comprising: selecting a plurality of cellular avatars representing the patient population; applying a ML-enabled cellular disease model to the intervention for one of the plurality of cellular avatars to determine whether the cellular avatar is a responder or non-responder to the intervention, wherein application of the ML-enabled cellular disease model comprises using at least a prediction generated from the machine learning model developed using embodiments of the method for developing the machine learning model described above to select the intervention.

In various embodiments, the non-transitory computer readable medium further comprises instructions that, when executed by the processor, cause the processor to perform steps comprising: obtaining subject features from patients of the patient population; applying the ML-enabled cellular disease model to each of other cellular avatars in the plurality of cellular avatars to determine whether each of the other cellular avatars is a responder or non-responder to the intervention; and generating a relationship between subject features of patients of the patient population and responder or non-responder determinations of the plurality of cellular avatars that represent the patient population.

In various embodiments, the subject features comprise one or more of medical history of a subject, gene products of a subject, mutated gene products of a subject, and expression or differential expression of genes of a subject. In various embodiments, the instructions that cause the processor to perform the step of applying the ML-enabled cellular disease model further comprises instructions that, when executed by the processor, cause the processor to perform steps comprising: obtaining phenotypic assay data captured from cells corresponding to the cellular avatar, the cells aligned with a genetic architecture of disease; using the machine learning model, determining a prediction of a clinical phenotype based on the obtained phenotypic assay data captured from the cells; obtaining phenotypic assay data captured from treated cells, the treated cells derived from the cells following treatment with the intervention; determining a prediction of a second clinical phenotype based on the obtained phenotypic assay data captured from treated cells; and comparing the prediction of the clinical phenotype and the second clinical phenotype to determine whether the cellular avatar is a responder or non-responder.

In various embodiments, determining the prediction of the clinical phenotype comprises applying the machine learning model to the obtained phenotypic assay data captured from the cells, and wherein determining the prediction of the second clinical phenotype comprises applying the machine learning model to the obtained phenotypic assay data captured from treated cells. In various embodiments, the intervention comprises a combination therapy comprises two or more therapeutics.

Additionally disclosed herein is a non-transitory computer readable medium for developing a structure-activity relationship (SAR) screen, the non-transitory computer readable medium comprising instructions that, when executed by a processor, cause the processor to perform steps comprising: for each of one or more therapeutics, obtaining a predicted impact of the therapeutic on a disease, the predicted impact determined by applying a ML-enabled cellular disease model using at least a prediction generated from the machine learning model developed using embodiments of the method for developing the machine learning model described above; and using the predicted impact of the therapeutics, generating a mapping between features of therapeutics and a corresponding predicted impact of therapeutics. In various embodiments, the prediction generated from the machine learning model comprises therapeutics that are clustered according to their therapeutic effect against a target.

In various embodiments, the predicted impact of the therapeutic on the disease is determined by: obtaining phenotypic assay data captured from cells aligned with a genetic architecture of disease; using the machine learning model, determining a prediction of a clinical phenotype based on the obtained phenotypic assay data captured from the cells; obtaining phenotypic assay data captured from treated cells, the treated cells derived from the cells following treatment with the intervention; determining a prediction of a second clinical phenotype based on the obtained phenotypic assay data captured from treated cells; and comparing the prediction of the clinical phenotype and the second clinical phenotype to determine the predicted impact of the therapeutic. In various embodiments, the predicted impact of the therapeutic is one of therapeutic efficacy or lack of therapeutic toxicity. Additionally disclosed herein is a non-transitory computer readable medium for identifying a biological target for modulating a disease, the non-transitory computer readable medium comprising instructions that, when executed by a processor, cause the processor to perform steps comprising: applying a ML-enabled cellular disease model, wherein application of the ML-enabled cellular disease model comprises using at least a prediction generated from the machine learning model developed using embodiments of the non-transitory computer readable medium disclosed herein, wherein the prediction is generated from phenotypic assay data across a plurality of cells that have been treated with a perturbation; identifying a genetic modification associated with cellular phenotypes indicative of disease based on the prediction generated from the machine learning model; and selecting the genetic modification as the biological target. In various embodiments, the phenotypic assay data are derived from cells treated with a perturbation that induces a diseased state. In various embodiments, identifying the genetic modification based on the prediction comprises determining that presence of the genetic modification in a cell correlates with the diseased state induced by the perturbation.

In various embodiments, the prediction generated from the machine learning model comprises a machine-learned embedding.

In various embodiments, the ML implemented method is a combination of weak supervision and partial supervision approaches. In various embodiments, the ML implemented method is any one or more of linear regression, logistic regression, decision tree, support vector machine classification, Naïve Bayes classification, K-Nearest Neighbor classification, random forest, deep learning, gradient boosting, generative adversarial networking learning, reinforcement learning, Bayesian optimization, matrix factorization, and dimensionality reduction techniques such as manifold learning, principal component analysis, factor analysis, autoencoder regularization, and independent component analysis, or combinations thereof.

Additionally disclosed herein is a computer system for developing a machine learning model for use in a ML-enabled cellular disease model, the computer system comprising: a storage memory for storing phenotypic assay data derived from a cell, wherein the cell is aligned with a genetic architecture of disease and modified to promote a diseased cellular state within the cell; and a processor communicatively coupled to the storage memory for analyzing, through a ML implemented method, the phenotypic assay data of the cell to train the machine learning model useful for the ML-enabled cellular disease model, the machine learning model comprising at least in part a relationship between the captured phenotypic assay data and a clinical phenotype.

In various embodiments, the training of the machine learning model comprises analyzing, through the ML implemented method, phenotypic assay data of one or more exposure response phenotypes (ERPs) that serve as proxy labels of health and disease in in vitro models. In various embodiments, the ERP is validated by comparing previously generated phenotypic assay data of the ERP to corresponding phenotypic assay data captured from cells known to have or not have the disease. In various embodiments, phenotypic assay data of an ERP is captured from a plurality of cells exposed to a perturbagen. In various embodiments, the plurality of cells are exposed to different concentrations of the perturbagen. In various embodiments, the plurality of cells comprise a plurality of genetic backgrounds. In various embodiments, the one or more ERPs comprise at least two, at least three, at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty ERPs. In various embodiments, the one or more ERPs comprise at least five ERPs.

In various embodiments, the genetic architecture of the disease is determined by: identifying genetic loci associated with the disease; and identifying causal elements of the disease from the identified genetic loci associated with the disease, the causal elements representing drivers of disease development or progression. In various embodiments, identifying genetic loci associated with the disease comprises having performed one of whole genome sequencing, whole exome sequencing, whole transcriptome sequencing, or targeted panel sequencing. In various embodiments, identifying causal elements of the disease comprises obtaining genome annotations, and co-localizing the genome annotations with the identified genetic loci associated with the disease. In various embodiments, the genetic architecture of the disease is determined by: performing a GWAS association test between genetic data of one or more samples and labels of the clinical phenotype for the one or more samples. In various embodiments, the labels of the clinical phenotype for the one or more samples are determined by implementing a predictive model trained to distinguish between phenotypic assay data derived from healthy and diseased samples.

In various embodiments, the clinical phenotype is one of a disease phenotype, a presence or absence of disease, disease severity, disease pathology, disease risk, disease progression, a likelihood of a clinical phenotype in response to a therapeutic treatment, or disease-relevant clinical phenotypes observable through clinical methods. In various embodiments, the clinical phenotype corresponds to one of nonalcoholic steatohepatitis, Parkinson's Disease, Amytrophic Lateral Sclerosis (ALS), or Tuberous Sclerosis Complex (TSC).

In various embodiments, the cell is a differentiated cell. In various embodiments, the cell is differentiated from an induced pluripotent stem cell. In various embodiments, the cell harbors genetic changes that are aligned with the genetic architecture of disease. In various embodiments, wherein the genetic changes in the cell are engineered using a cDNA construct, CRISPR, TALENS, Zinc finger nucleases, or other genetic editing techniques. In various embodiments, the modification of the cell comprises one or more of differentiating the cell to a diseased-related cell type, modulating gene expression of the cell, and providing an agent or environmental condition that spurs the cell into the diseased cellular state. In various embodiments, the disease-related cell type is selected based on one or more identified causal elements of the disease that are active in the disease-related cell type.

In various embodiments, the agent is any one of any of CTGF/CCN2, FGF1, IFGγ, IGF1, IL1β, AdipoRon, PDGF-D, TGFβ, TNFα, HLD, LDL, VLDL, fructose, lipoic acid, sodium citrate, ACCli (Firsocostat), ASKli (Selonsertib), FXRa (obeticholic acid), PPAR agonist (elafibranor), $CuCl_2$, $FeSO_4$ $7H_2O$, $ZnSO_4$ $7H_2O$, LPS, TGFβ antagonist, and ursodeoxycholic acid. In various embodiments, the agent is one of a chemical agent, a molecular intervention, or a gene editing agent for introducing one or more genetic variants. In various embodiments, the environmental condition is $O_2$ tension, $CO_2$ tension, hydrostatic pressure, osmotic pressure, pH balance, ultraviolet exposure, temperature exposure or other physico-chemical manipulations.

In various embodiments, the phenotypic assay data of the cell comprises one or more of cell sequencing data, protein expression data, gene expression data, image data, cell metabolic data, cell morphology data, or cell interaction data. In various embodiments, the image data comprises one of high-resolution microscopy data or immunohistochemistry data.

In various embodiments, the cell is included in a population of cells, and wherein modifying the cell diversifies the cell in relation to other cells in the population of cells. In various embodiments, the cell is included in a population of cells, and wherein the population of cells comprises cell subpopulations that are in at least two different stages in disease progression. In various embodiments, the cell is included in a population of cells, and wherein the population of cells comprises cell subpopulations that are in at least two different stages of maturation. In various embodiments, the cell is obtained from one of in vivo, in vitro 2D culture, in vitro 3D culture, or in vitro organoid or organ-on-chip systems.

In various embodiments, analyzing the phenotypic assay data of the cell to train the machine learning model comprises: encoding the phenotypic assay data as a numerical vector; and inputting the numerical vector into the machine learning model. In various embodiments, analyzing the phenotypic assay data of the cell to train the machine learning model comprises: providing the phenotypic assay data of the cell, genetics of the cell, and modifications applied to the cell as input to the machine learning model.

Additionally disclosed herein is a computer system for validating an intervention, the computer system comprising: a storage memory for storing phenotypic assay data captured from cells corresponding to one or more cellular avatars, the cells aligned with a genetic architecture of disease; and a processor communicatively coupled to the storage memory for applying a ML-enabled cellular disease model using at least a prediction generated from the machine learning model developed using embodiments of the method for developing the machine learning model described above. In various embodiments, applying the ML-enabled cellular disease model comprises: obtaining phenotypic assay data captured from treated cells corresponding to the one or more cellular avatars, the treated cells treated with the intervention; and using the machine learning model, determining the prediction of a clinical phenotype based on the obtained phenotypic assay data captured from treated cells. In various embodiments, the processor is communicatively coupled to the storage for further performing steps of: obtaining phenotypic assay data captured from cells, wherein the treated cells are derived from the cells following treatment with the intervention; and determining a prediction of a second clinical phenotype based on the obtained phenotypic assay data captured from the cells, wherein validating the intervention further comprising validating based on the prediction of the second clinical phenotype.

In various embodiments, determining the prediction of the clinical phenotype comprises applying the machine learning model to the obtained phenotypic assay data captured from the treated cells, and wherein determining the prediction of the second clinical phenotype comprises applying the machine learning model to the obtained phenotypic assay data captured from the cells. In various embodiments, applying the machine learning model to the phenotypic assay data captured from the treated cells further comprises applying the machine learning model to genetics of the treated cells and modifications applied to the treated cells, wherein the modifications applied to the treated cells includes the intervention. In various embodiments, applying the machine learning model to the phenotypic assay data captured from the cells further comprises applying the machine learning model to genetics of the cells and modifications applied to the cells, wherein the modifications applied to the cells does not include the intervention. In various embodiments, validating the intervention comprises comparing the prediction of the clinical phenotype corresponding to the cells to the second clinical phenotype corresponding to treated cells. In various embodiments, validating the intervention comprises determining whether the intervention is efficacious or non-toxic.

Additionally disclosed herein is a computer system for identifying a candidate patient population to receive a treatment, the computer system comprising: a storage memory; and a processor communicatively coupled to the storage memory for performing steps of: selecting a plurality of cellular avatars representing the patient population; applying a ML-enabled cellular disease model to the intervention for one of the plurality of cellular avatars to determine whether the cellular avatar is a responder or non-responder to the intervention, wherein application of the ML-enabled cellular disease model comprises using at least a prediction generated from the machine learning model developed using embodiments of the method for developing the machine learning model described above to select the intervention.

In various embodiments, the processor further performs the steps of: obtaining or having obtained subject features from patients of the patient population; applying the ML-enabled cellular disease model to each of other cellular avatars in the plurality of cellular avatars to determine whether each of the other cellular avatars is a responder or non-responder to the intervention; and generating a relationship between subject features of patients of the patient population and responder or non-responder determinations of the plurality of cellular avatars that represent the patient population.

In various embodiments, the subject features comprise one or more of medical history of a subject, gene products of a subject, mutated gene products of a subject, and expression or differential expression of genes of a subject. In various embodiments applying the ML-enabled cellular disease model comprises: obtaining or having obtained phenotypic assay data captured from cells corresponding to the cellular avatar, the cells aligned with a genetic architecture of disease; using the machine learning model, determining a prediction of a clinical phenotype based on the obtained phenotypic assay data captured from the cells; obtaining or having obtained phenotypic assay data captured from treated cells, the treated cells derived from the cells following treatment with the intervention; determining a prediction of a second clinical phenotype based on the obtained phenotypic assay data captured from treated cells; and comparing the prediction of the clinical phenotype and the second clinical phenotype to determine whether the cellular avatar is a responder or non-responder.

In various embodiments determining the prediction of the clinical phenotype comprises applying the machine learning model to the obtained phenotypic assay data captured from the cells, and wherein determining the prediction of the second clinical phenotype comprises applying the machine learning model to the obtained phenotypic assay data captured from treated cells. In various embodiments, the intervention comprises a combination therapy comprises two or more therapeutics.

Additionally disclosed herein is a computer system for developing a structure-activity relationship (SAR) screen, the computer system comprising: a processor communicatively coupled to a storage memory for performing steps of: for each of one or more therapeutics, obtaining a predicted impact of the therapeutic on a disease, the predicted impact determined by applying a ML-enabled cellular disease model using at least a prediction generated from the machine learning model developed using embodiments of the method for developing the machine learning model described above; and using the predicted impact of the therapeutics, generating a mapping between features of therapeutics and a corresponding predicted impact of therapeutics. In various embodiments, the prediction generated from the machine learning model comprises therapeutics that are clustered according to their therapeutic effect against a target.

In various embodiments, the predicted impact of the therapeutic on the disease is determined by: obtaining or having obtained phenotypic assay data captured from cells aligned with a genetic architecture of disease; using the machine learning model, determining a prediction of a clinical phenotype based on the obtained phenotypic assay data captured from the cells; obtaining or having obtained phenotypic assay data captured from treated cells, the treated cells derived from the cells following treatment with the intervention; determining a prediction of a second clinical phenotype based on the obtained phenotypic assay data captured from treated cells; and comparing the prediction of the clinical phenotype and the second clinical phenotype to determine the predicted impact of the therapeutic. In various embodiments, the predicted impact of the therapeutic is one of therapeutic efficacy or lack of therapeutic toxicity.

Additionally disclosed herein is a computer system for identifying a biological target for modulating a disease, the method comprising: applying a ML-enabled cellular disease model, wherein application of the ML-enabled cellular disease model comprises using at least a prediction generated from the machine learning model developed using embodiments of the computer system disclosed herein, wherein the prediction is generated from phenotypic assay data across a plurality of cells that have been treated with a perturbation; identifying a genetic modification associated with cellular phenotypes indicative of disease based on the prediction generated from the machine learning model; and selecting the genetic modification as the biological target. In various embodiments, the phenotypic assay data are derived from cells treated with a perturbation that induces a diseased state. In various embodiments, identifying the genetic modification based on the prediction comprises determining that presence of the genetic modification in a cell correlates with the diseased state induced by the perturbation. In various embodiments, the prediction generated from the machine learning model comprises a machine-learned embedding.

In various embodiments, the ML implemented method is a combination of weak supervision and partial supervision approaches. In various embodiments, the ML implemented method is any one or more of linear regression, logistic regression, decision tree, support vector machine classification, Naïve Bayes classification, K-nearest neighbor classification, random forest, deep learning, gradient boosting, generative adversarial networking learning, reinforcement learning, Bayesian optimization, matrix factorization, and dimensionality reduction techniques such as manifold learning, principal component analysis, factor analysis, autoencoder regularization, and independent component analysis, or a combination thereof.

BRIEF DESCRIPTION OF THE DRAWINGS

These and other features, aspects, and advantages of the present invention will become better understood with regard to the following description and accompanying drawings. It is noted that wherever practicable similar or like reference numbers may be used in the figures and may indicate similar or like functionality. For example, a letter after a reference numeral, such as "third party entity 702A," indicates that the text refers specifically to the element having that particular reference numeral. A reference numeral in the text without a following letter, such as "third party entity 702," refers to any or all of the elements in the figures bearing that reference numeral (e.g. "third party entity 702" in the text refers to reference numerals "third party entity 702A" and/or "third party entity 702B" in the figures).

FIG. 3A depicts example training data for training a machine learning model to generate a cellular disease model, in accordance with an embodiment.

FIGS. 5A-5E illustrate diagrammatic implementations of cellular disease models, in accordance with several embodiments.

FIGS. 14E and 14F depict results of an exposome analysis and the identification of 5 candidate exposures.

DETAILED DESCRIPTION OF THE INVENTION

Definitions

Figure 1A:
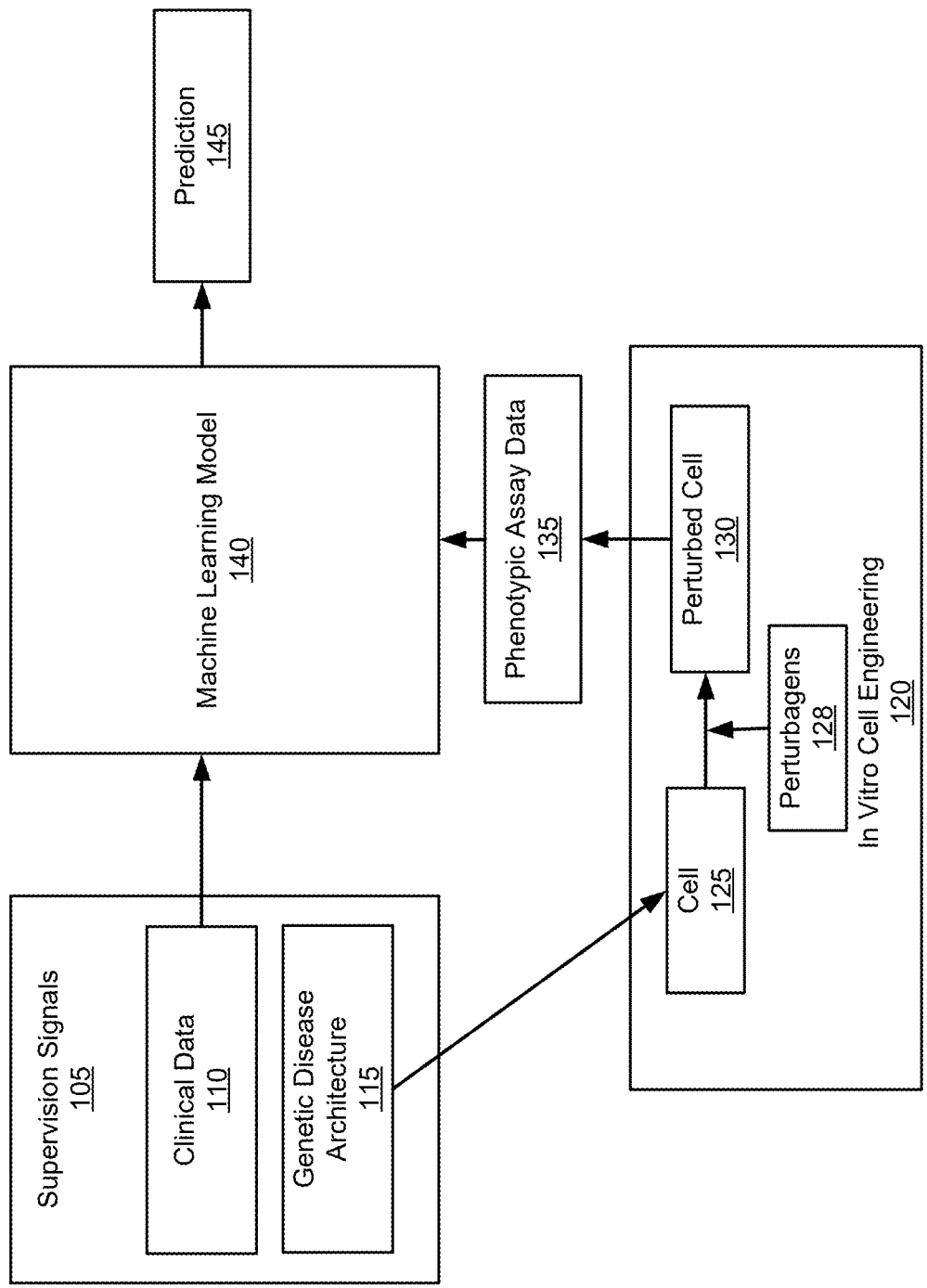
FIG. 1A depicts the training of a machine learning model that outputs a prediction, such as a clinical phenotype, based on phenotypic assay data, in accordance with an embodiment.

Terms used in the claims and specification are defined as set forth below unless otherwise specified.

The term "subject" or "patient" are used interchangeably and encompass a cell, tissue, organism, human or non-human, mammal or non-mammal, male or female, whether in vivo, ex vivo, or in vitro.

The terms "marker," "markers," "biomarker," and "biomarkers" are used interchangeably and encompass, without limitation, lipids, lipoproteins, proteins, cytokines, chemokines, growth factors, peptides, nucleic acids, genes, and oligonucleotides, together with their related complexes, metabolites, mutations, variants, polymorphisms, modifications, fragments, subunits, degradation products, elements, and other analytes or sample-derived measures. A marker can also include mutated proteins, mutated nucleic acids, structural variants including copy number variations, inversions, and/or transcript variants, in circumstances in which such mutations or structural variants are useful for developing a model (e.g., a machine learning model or a cellular disease model), or are useful in predictive models developed using related markers (e.g., non-mutated versions of the proteins or nucleic acids, alternative transcripts, etc.).

The term "sample" or "test sample" can include a single cell or multiple cells or fragments of cells or an aliquot of body fluid, such as a blood sample, taken from a subject, by means including venipuncture, excretion, ejaculation, massage, biopsy, needle aspirate, lavage sample, scraping, surgical incision, or intervention or other means known in the art.

The phrase "phenotypic assay data" includes any data that provides information about a cell phenotype, such as, e.g., cell sequencing data (e.g., RNA sequencing data, sequencing data related to epigenetics such as methylation state), protein expression data, gene expression data, image data (e.g., high-resolution microscopy data or immunohistochemistry data), cell metabolic data, cell morphology data, and cell interaction data. In various embodiments, phenotypic assay data includes functional data, such as electrophysiological functional data for cardiac cells and electroencephalogram (EEG) or electrocorticography (ECoG) for brain cells.

The term "obtaining phenotypic assay data" encompasses obtaining any of a cell, cell population, cell culture, or organoid and capturing phenotypic assay data from any of the cell, cell population, cell culture, or organoid. The phrase also encompasses receiving a set of phenotypic assay data, e.g., from a third party that has captured the phenotypic assay data from a cell, cell population, cell culture, or organoid.

The phrase "subject data" includes phenotypic assay data determined from one or more cells that are obtained from a subject. The subject data can, in some circumstances, further include clinical data (e.g., clinical history, age, lifestyle factors, etc.) of the subject. The subject data also can, in some circumstances, include genomic and gene sequence data of the subject.

The phrase "clinical phenotype" refers to any of a disease phenotype, a presence or absence of disease, disease severity, disease pathology, disease risk, disease progression, or a likelihood of a clinical phenotype in response to a therapeutic treatment. In various embodiments, clinical phenotypes include disease-relevant clinical phenotypes that can be observed through clinical methods such as through magnetic resonance imaging (e.g., brain MRI for neurodegenerative diseases or histopathological tissue slices for liver diseases). In various embodiments, clinical phenotypes include endophenotypes, which are characteristics of a disease that are not directly observable. Examples of measurements or surrogate datapoints for endophenotypes include a blood test for HbA1C levels and/or brain volume for neurological diseases. A clinical phenotype can, in some embodiments, be represented as a binary value (e.g., 0 and 1 indicating the presence or absence of disease). In some embodiments, a clinical phenotype can be represented as a continuous value (e.g., a continuous value that represents a risk associated with the disease).

The phrase "genetic disease architecture" or "genetic architecture of disease" refers to the underlying genetics of a disease, such as genetic drivers of the disease. In various embodiments, the genetic disease architecture of a disease can be unraveled by combining human genetic cohort data, from the literature, and from general-purpose cellular or tissue-level genomic data. Examples of the genetic disease architecture include genetic loci that are associated or implicated in the disease as well as specific genes, variants, or other causal elements that are responsible for driving the progression or development of the disease.

The phrase "cell harbors genetic changes that are aligned with the genetic architecture of disease" refer to one or more genetic changes in a cell corresponding to the underlying genetics in the genetic architecture of disease. Therefore, in various embodiments, the cell is a diseased cell that exhibits cellular phenotypes of the disease. For example, genetic changes that align with the genetic architecture of disease can be genetic drivers of the disease, genetic loci associated or implicated in the disease, and/or causal elements responsible for driving the progression or development of the disease.

The phrase "cellular avatar" refers to a cell that can serve as a surrogate for a human individual. A cellular avatar is defined by its underlying genetics. In various embodiments, a cellular avatar is further defined by perturbations provided to such a cell. In various embodiments, a machine learning model is trained to predict clinical phenotypes given the characterization of one or more "cellular avatars." In some embodiments, cellular avatars are representative of a patient or a population of patients (e.g., cells of the cellular avatar have similar genetic backgrounds as the patients). Thus, cellular avatars can be used as a surrogate for patients when performing screens using the cellular disease model.

The phrase "exposure response phenotypes" or "ERP" refers to an in vitro model for a clinical endpoint of interest that serves as a proxy label of health or disease. In various embodiments, ERPs enable the in vitro modeling of the disease based on the use of a perturbagen that induces the cell to exhibit phenotypic features that are indicative of the disease. In various embodiments, an ERP refers to phenotypic assay data collected from cells (e.g., cells or cellular avatars of various genetic backgrounds) that have been exposed to the perturbagen, thereby inducing the cells into a diseased state. Thus, the phenotypic assay data of the ERP can be used to train a machine learning model to recognize phenotypic traces of disease.

The phrase "phenotypic traces of disease" or "diseased phenotypic traces" refer to phenotypic features presented in assay data that a machine learning model uses to differentiate between diseased cells and less diseased (e.g., healthy) cells. In various embodiments, these phenotypic traces of disease are actual disease signatures (e.g., signatures indicating risk of, or actual, disease development or progression). In some embodiments, phenotypic traces of disease need not be actual disease signatures and instead, can be any feature present in the phenotypic assay data that enables the machine learning model to differentiate between diseased cells and less diseased cells (e.g., healthy cells).

The phrase "machine learning implemented method" or "ML implemented method" refers to the implementation of a machine learning algorithm, such as, e.g., any of linear regression, logistic regression, decision tree, support vector machine classification, Naïve Bayes classification, K-nearest neighbor classification, random forest, deep learning, gradient boosting, generative adversarial networking learning, reinforcement learning, Bayesian optimization, matrix factorization, and dimensionality reduction techniques such as manifold learning, principal component analysis, factor analysis, autoencoder regularization, and independent component analysis, or a combination thereof.

The phrase "cellular disease model" generally refers to a model that can be implemented for conducting clinical trials in a dish. Generally, a cellular disease model is a machine-learning enabled cellular disease model. For example, when deployed to perform a screen, the cellular disease model produces predictions outputted by a trained machine learning model (e.g., uses the predictions to guide the selection of an intervention). In various embodiments, the cellular disease model is a hybrid model that involves both an in vitro cellular assay component and in silico component. For example, the in vitro cellular assay component can involve testing an intervention against in vitro cells and measuring the phenotypic outputs, and the in silico component can involve interpreting the phenotypic outputs of the in vitro cells.

The phrase "therapeutic" refers to any treatment that can modify the progression or development of a disease. A therapeutic can be a small molecule drug, a biologic, an immunotherapy, a genetic therapy, or a combination thereof.

The phrase "pharmaceutical composition" refers to a mixture containing a specified amount of a therapeutic, e.g., a therapeutically effective amount, of a therapeutic compound in a pharmaceutically acceptable carrier to be administered to a mammal, e.g., a human, in order to treat a disease.

The phrase "pharmaceutically acceptable carrier" means buffers, carriers, and excipients suitable for use in contact with the tissues of human beings and animals without excessive toxicity, irritation, allergic response, or other problem or complication, commensurate with a reasonable benefit/risk ratio.

It must be noted that, as used in the specification and the appended claims, the singular forms "a," "an" and "the" include plural referents unless the context clearly dictates otherwise.

Overview of the Development and Use of Cellular Disease Models

To develop a cellular disease model for a particular disease, data is combined from human genetic cohorts, from the literature, and from general-purpose cellular or tissue-level genomic data to unravel the set of factors (e.g., genetic, environmental, cellular factors) that give rise to the disease. Cells are engineered and perturbed using the understanding of the set of factors such that the cells represent in vitro models of the disease. Additionally, the in vitro cells represent cellular avatars, or in other words, serve as surrogates for human individuals (e.g., a cell has the same underlying genetics as a human individual) such that in vitro results obtained for a cellular avatar can represent likely results for the human individual represented by the cellular avatar and other human individuals with similar background characteristics.

High level, phenotypic assay data representing cellular phenotypes (e.g., high-dimensional images) are captured from the different cells which are used to train a machine learning model to distinguish between the different cellular phenotypes (e.g., diseased phenotype or toxic phenotype v. less diseased phenotype). The machine learning model is trained to predict clinical phenotypes for particular cellular avatars based on the cellular phenotype data. These predictions of the machine learning model serve as the basis of the cellular disease model that is used to perform screens.

In various embodiments, the cellular disease model includes two main components: 1) the machine learning model and 2) an in vitro component that involves the screening of an intervention against in vitro engineered cells. The predictions of the machine learning model can be used to guide the selection of the intervention (e.g., an intervention likely to be effective for treating the disease) and the in vitro component is used to validate the predictions (and may be used to validate the machine learning model). To provide an example, predictions can suggest that an intervention is likely to be effective for a disease and the in vitro component confirms that, by providing the intervention, diseased cells expressing a diseased phenotype are reverted back into a healthier state that express a healthier phenotype.

Figure 1B:
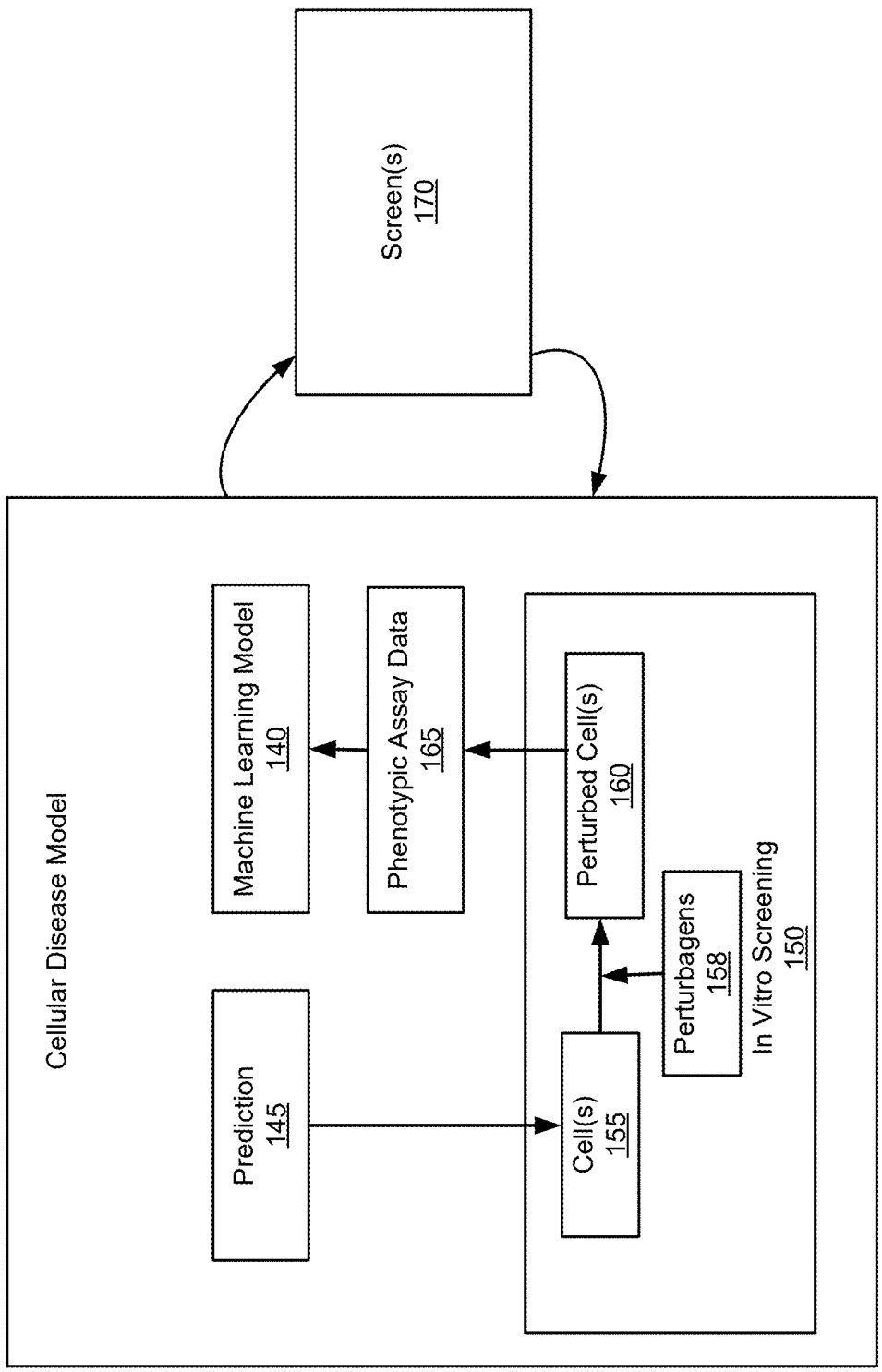
FIG. 1B depicts the deployment of a cellular disease model, in accordance with an embodiment.

Reference is now made to FIGS. 1A and 1B which describe the training and deployment phases, respectively, for the cellular disease model. FIG. 1A depicts the training of a machine learning model that outputs a prediction, such as a clinical phenotype, based on phenotypic assay data, in accordance with an embodiment. Generally, the machine learning model 140 is configured using supervision signals 105 and/or data derived from supervision signals 105. As shown in FIG. 1A, the supervision signals 105 can include clinical data 110 (e.g., data identifying whether individuals have a particular clinical phenotype). The clinical data 110 can be obtained from a cohort of individuals that are associated with the disease of interest. The clinical data 110 can serve as reference ground truth data for training the machine learning model 140.

The supervision signals 105 can further include a genetic disease architecture 115 which includes identification of the underlying genetics that cause development or progression of the disease. The determination of the genetic disease architecture 115 is discussed in further detail below in reference to FIG. 2B. The genetic disease architecture 115 is used to guide the engineering of cells to derive training data, shown in FIG. 1A as phenotypic assay data 135, that is used to train the machine learning model 140.

In particular, the genetic disease architecture 115 guides the in vitro cell engineering 120 process. For example, cell 125 is generated that aligns with the genetic disease architecture 115 (e.g., cell is engineered to have particular causal elements that drive disease development or progression). Perturbagens 128, an example of which includes environmental factors that contribute to the development of the disease, are provided to modify the cell 125 into a perturbed cell 130. For example, a perturbagen 128 may cause the cell 125 to differentiate or to enter into a diseased state. Furthermore, providing the perturbagens 128 enables the understanding of differential effects on cells of different genetic backgrounds.

In various embodiments, although FIG. 1A depicts the in vitro engineering 120 process as applied to a single cell 125, the in vitro engineering 120 process can be applied for a plurality of cells. Each cell represents a "cellular avatar" which is defined by the genetics of the cell (e.g., genetics including the genetic background of disease), and, in certain embodiments, perturbants applied to the cell. Therefore, the in vitro engineering 120 process generates cells for a wide range of cellular avatars, that can each serve as a substitute or surrogate for a subject. Additionally, the in vitro engineering 120 process can further generate cells across varying stages of disease, varying stages of maturation, and/or varying diseased states. The in vitro engineering 120 process enables the generation of training data (e.g., phenotypic assay data 135) which captures wide-ranging aspects of the disease for different cellular avatars at unprecedented scale and breadth.

Phenotypic assay data 135, which generally includes high-dimensional data such as image data, are captured from the perturbed cells 130. In various embodiments, phenotypic assay data 135 are high dimensional data representing the cellular phenotype of the perturbed cells 130. In one embodiment, the perturbed cells 130 are healthy cells and the captured phenotypic assay data 135 represents the cellular phenotype of healthy cells. In one embodiment, the perturbed cells 130 are diseased cells and the captured phenotypic assay data 135 represents the cellular phenotype of diseased cells. The phenotypic assay data 135 is analyzed using machine learning techniques to train the machine learning model 140. Therefore, the machine learning model 140 can uncover phenotypic traces of diseases by distinguishing between cellular phenotypes of diseased cells and healthy cells. Of note, the machine learning model 140 may also detect phenotypic traces of disease in otherwise healthy cells indicating risk of disease onset.

The machine learning model 140 generates, as output, a prediction 145 representing clinical phenotypes corresponding to the phenotypic assay data. In a preferred embodiment, the machine learning model 140 is a deep neural network, that, in addition to predictions, generates embeddings that represent organized, lower dimensional representations of higher dimensional datasets. These embeddings enable richer methods of making predictions, examples of which are targets or biomarkers that are relevant for the disease. Additionally, the embeddings are useful for identifying therapeutics that can modulate the target or biomarkers relevant for the disease. Additionally, such embeddings enable richer associations between cellular phenotypes represented in the machine learning model 140, which enable the identification of potential clinical cohorts at finer levels of resolution.

FIG. 1B depicts the deployment of a cellular disease model, in accordance with an embodiment. Generally, the cellular disease model is deployed to perform screens 170, examples of which include validating an intervention (e.g., drug, gene, or combination intervention) for use against a disease, identifying patient populations that are likely to respond to an intervention, searching through a library of interventions (e.g., drug, gene, or combination intervention) to identify a candidate that is likely to be efficacious, optimizing or identifying candidate molecular therapeutics using a structure-activity molecule screen developed using the cellular disease model, and identifying biological targets (e.g., genes) that, if perturbed, can modulate the disease. In various embodiments, the cellular disease model performs screens for one or more cellular avatars. The results of the screens for particular cellular avatars is relevant for patient (s) or patient populations that are represented by those cellular avatars, either directly or through association via similar background characteristics.

During deployment of the cellular disease model, the prediction 145 (previously described as the prediction of the machine learning model 140 shown in FIG. 1A) is generated for one or more cellular avatars and therefore, the prediction 145 guides the in vitro screening 150 for performing the screen. For example, the in vitro screening 150 process involves selecting or regenerating cell(s) 155 of a particular cell type and/or particular genetic background from among the previously identified cellular avatars, and can further involve providing perturbagens 158 corresponding to the cellular avatars. In a preferred embodiment, the predictions of the machine learning model 140 are embeddings, which provide a richer set of associations between cellular avatars and their relationship to a predicted clinical phenotype.

As shown in FIG. 1B, the cell(s) 155 are exposed to perturbagens 158, thereby driving them to perturbed cell(s) 160. In various embodiments, the perturbagens 158 can include an intervention, such as a small molecule drug, a biologic intervention, a genetic intervention, or a combination thereof. Therefore, the in vitro screening 150 process enables the in vitro validation of the effects of the intervention. Phenotypic assay data 165, such as high dimensional data representing the cellular phenotype of the perturbed cells (e.g., image data), is captured from the cells and analyzed to determine the impact of the intervention. In one embodiment, the phenotypic assay data 165 is analyzed using a machine learning model, such as machine learning model 140. Here, the machine learning model predicts a clinical phenotype according to the phenotypic assay data 165, the clinical phenotypic reflective of the impact of the intervention. In one embodiment, a machine learning model need not be applied to analyze the phenotypic assay data 165. For example, the phenotypic assay data 165 may be informative for the clinical phenotype without needing to implement a machine learning model.

In various embodiments, the 1) predictions 145, 2) phenotypic assay data 165, and 3) cells 155 (e.g., genetics and cellular phenotypes) makeup the "cellular disease model." The cellular disease model can then be used for both scoping and executing screens for therapeutic validation, building structure activity relationship screens, and performing patient segmentation. Further details for performing screens for therapeutic validation, SAR, patient segmentation, and identification of biological targets are described below in reference to FIGS. 5A-5E.

Clinical Phenotype System

Figure 2A:
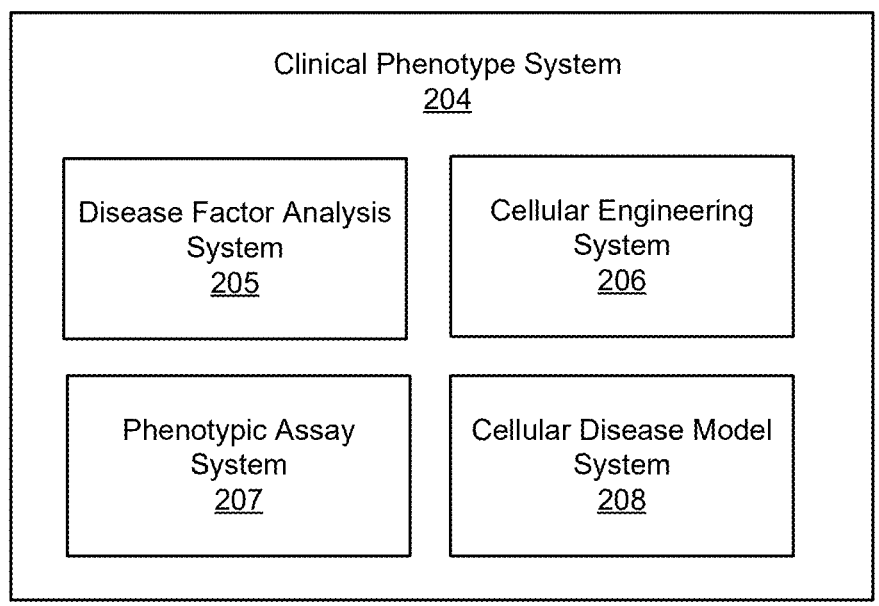
FIG. 2A depicts a block diagram of a clinical phenotype system, in accordance with an embodiment.

FIG. 2A depicts a block diagram of the clinical phenotype system 204, in accordance with an embodiment. Generally, the clinical phenotype system 204 trains machine learning models that predict clinical phenotypes based on phenotypic assay data, and further deploys cellular disease models to perform screens (e.g., therapeutic validation screen, patient segmentation screen). The clinical phenotype system 204 performs the processes described above in reference to FIGS. 1A and 1B.

As shown in FIG. 2A, the clinical phenotype system 204 includes a disease factor analysis system 205 for determining a genetic disease architecture and other relevant information useful for generating in vitro models of disease, a cellular engineering system 206 for generating and maintaining in vitro cells that serve as models of disease, as well as a phenotypic assay system 207 for capturing phenotypic assay data (e.g., training data for training the cellular disease model) from the in vitro cells. The clinical phenotype system 204 further includes a cellular disease model system 208, which trains machine learning models and deploys cellular disease models. In some embodiments, the clinical phenotype system 204 generates training data at unprecedented scale and breadth that can be used to train the machine learning models. Such training data includes phenotypic assay data obtained from cells that are engineered to recapitulate cellular phenotypes of a disease or cellular phenotypes predictive of a disease.

Although FIG. 2A depicts the clinical phenotype system 204 as including each of the sub-systems including the disease factor analysis system 205, cellular engineering system 206, phenotypic assay system 207, and cellular disease model system 208, the sub-systems can be differently arranged in alternative embodiments. For example, the methods and procedures performed by the disease factor analysis system 205, cellular engineering system 206, and/or the phenotypic assay system 207 can be performed by one or more third party entities. In such embodiments, the third party entities conduct genetic analysis of individuals, engineers and maintains the cells representing in vitro models of disease, and perform the phenotypic assays to capture the phenotypic assay data from the in vitro cells. The third party entities provide the captured phenotypic assay data to the clinical phenotype system 204 which trains the machine learning model that is used to generate the cellular disease model.

Disease Factor Analysis

Figure 2B:
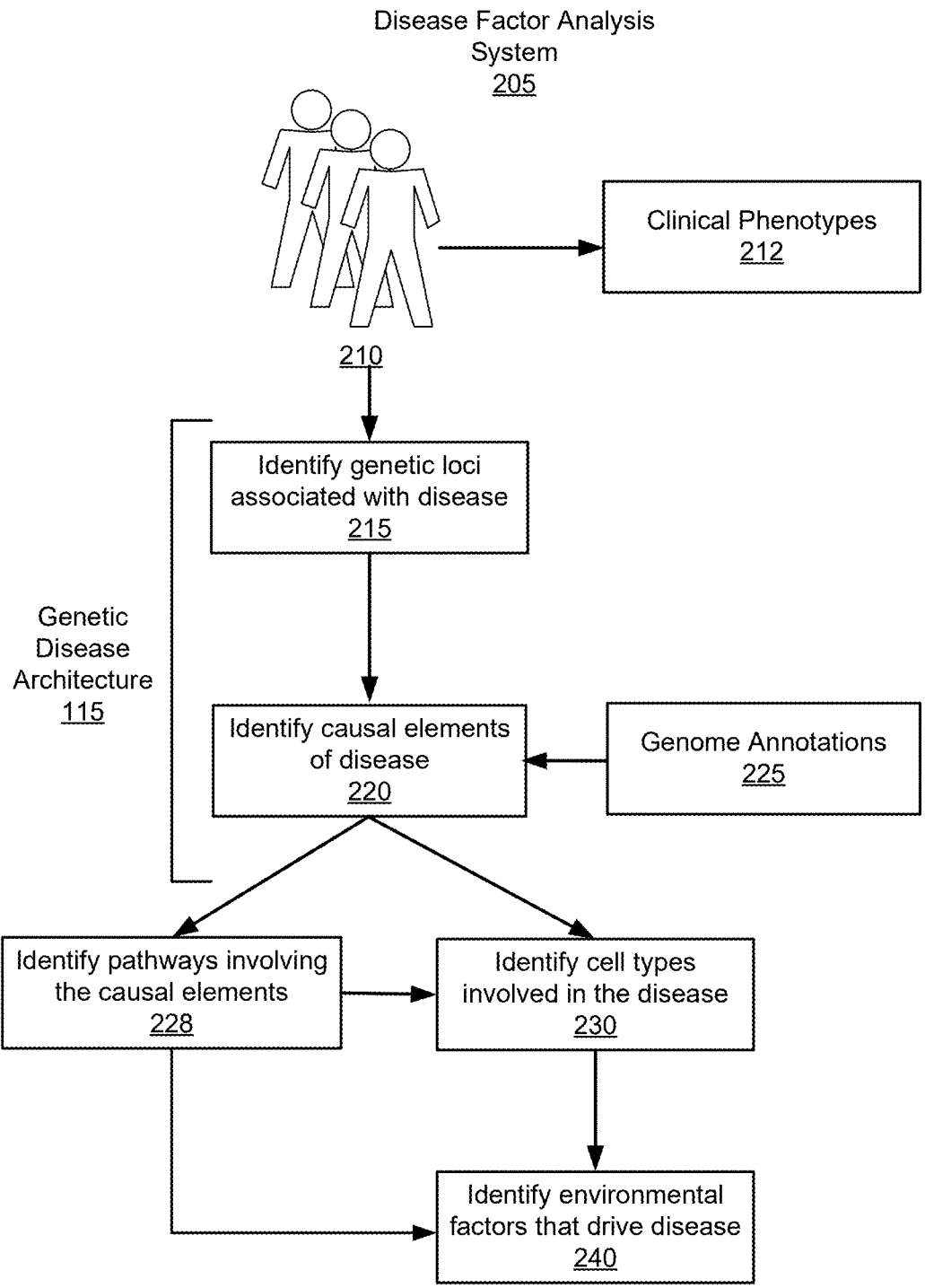
FIG. 2B depicts steps performed by a disease factor analysis system, in accordance with an embodiment.

Reference is now made to FIG. 2B, which depicts steps performed by the disease factor analysis system 205 of FIG. 2A, in accordance with an embodiment. Generally, the disease factor analysis system 205 performs an analysis to unravel the set of factors, such as genetic, cellular, and environmental factors, that give rise to a given disease. In various embodiments, the disease is a liver disease. In various embodiments, the liver disease is non-alcoholic fatty liver disease (NAFLD). In various embodiments, the liver disease is non-alcoholic steatohepatitis (NASH). In various embodiments, the disease is a neuronal disease. In various embodiments, the neuronal disease is Parkinson's Disease (PD). In various embodiments, the neuronal disease is Amytrophic Lateral Sclerosis (ALS). In various embodiments, the neuronal disease is Tuberous Sclerosis Complex (TSC).

Examples of genetic factors, also referred to as the genetic disease architecture 115, include the underlying genetics that play a role in the disease, such as genetic loci associated with the disease and causal elements of the disease. Examples of cellular factors include the cell types that are either directly involved in manifestation of the disease, a cell type that assists in the development/progression of the disease, or a cell type that can be predictive when analyzed by the machine learning model (e.g., not necessarily a cell type of the disease). Examples of environmental factors include environmental elements or environmental mimics that are known or suspected to contribute to the development or progression of the disease.

In various embodiments, the disease factor analysis system 205 receives or performs a genetic analysis on tissue samples obtained from individuals, such as individuals 210 that have the particular disease. The genetic analysis yields a genetic disease architecture 115 including genetic loci associated with the disease (e.g., step 215) as well as a narrowed list of causal elements that are more responsible for driving the development and/or progression of the disease (e.g., step 220). Having identified the genetic disease architecture 115, the disease factor analysis system 205 identifies cell types that are involved in the disease (e.g., step 230) and further identifies environmental factors that drive the disease development and/or progression (e.g., step 240).

Altogether, the genetic disease architecture 115 is informative for generating cells that align with the genetic disease architecture and therefore, support developing predictive in vitro models for the disease, as is described in further detail below. For example, the cells can be engineered to express the identified genetic loci associated with disease and/or the causal elements. Additionally, the cells can be of an identified cell type that is involved in the disease (as identified at step 230). Furthermore, the cells can be perturbed and/or exposed to environmental factors (as identified at step 240) that further direct the cells into a diseased state that can subsequently be analyzed to generate training data.

In various embodiments, as shown in FIG. 2B, the disease factor analysis system 205 determines clinical phenotypes 212 of individuals 210, such as individuals of a human cohort. In various embodiments, the individuals 210 are known to be associated with a disease (e.g., previously diagnosed with a disease) and therefore, exhibit clinical phenotypes associated with the disease. Constructing clinical phenotypes 212 of the disease enables the use of the clinical phenotypes 212 as reference ground truths for the training data that is used to train the machine learning model, as is described in further detail below.

As an example, clinical phenotypes 212 can include ascertained phenotypes such as presence or absence of disease, a disease state, or disease progression. These may be clinically defined phenotypes (e.g., by a physician or defined by the clinical community). In some embodiments, clinical phenotypes 212 are measurements or surrogate datapoints. For example, clinical phenotypes can be endophenotypes, which are characteristics of a disease that may not be directly observable. Examples of measurements or surrogate datapoints include a blood test for HbA1C levels and/or brain volume for neurological diseases. In various embodiments, clinical phenotypes 212 can include newly defined machine-learned phenotypes. For example, supervised, semi-supervised, or unsupervised machine learning can be implemented on measured phenotypes to identify and classify new, ML-generated phenotypes. One example includes performing image analysis on high dimensional imaging data (e.g., histopathology or radiology images) to determine new ML-generated phenotypes. Another example includes imputing disease state from relevant biomarkers in a test sample (e.g., blood, serum, or urine test sample).

As shown in FIG. 2B, the disease factor analysis system 205 performs a genetic analysis to identify 215 genetic loci associated with disease. Genetic loci can involve genetic changes, such as mutations (e.g., polymorphisms, single nucleotide polymorphisms (SNPs), single nucleotide variants (SNVs)), insertions, deletions, knock-ins, knock-outs, and the presence or absence of particular genomic units (e.g., enhancers, promoters, silencers) that may be associated with the disease. As a particular example, a genetic locus associated with disease can involve a highly penetrant variant that is implicated in the disease. To identify genetic loci, the disease factor analysis system 205 may analyze genetic data from samples obtained from individuals 210. The genetic data can be sequencing data derived from cells or populations of cells from individuals 210. Such cells can be different from one another, for example, different types of somatic cells or pluripotent cells, and therefore, can include differing genetic data at different loci in the cell genome.

In various embodiments, to identify genetic loci associated with disease, the disease factor analysis system 205 performs a nucleic acid sequencing technique, including performing one or more of whole genome sequencing, whole exome sequencing, or targeted panel sequencing. Following sequencing, the disease factor analysis system 205 can align the sequence reads to a reference sequence to determine the presence of genetic changes in the sequence. In various embodiments, the disease factor analysis system 205 performs an analysis on data obtained using a nucleic acid array, such as a DNA microarray or genotyping array to identify genetic changes of the individuals 210.

Step 215 can involve analyzing the genetics across the different samples to identify genetic signals that correlate with the disease. For example, the disease factor analysis system 205 can perform one or more of the following:
  i) Calculate the predicted relevance of different coding or non-coding changes (e.g., protein-truncating variants, missense variants, splice variants, variants likely to affect transcription binding sites, etc.)
  ii) Perform a single- or multi-variant genetic association analysis;
  iii) Perform a rare variant analysis, e.g., using Burden Testing
  iv) Perform a multi-trait analysis for related traits to increase statistical power
  v) Perform a meta-analysis of GWAS The disease factor analysis system 205 uses additional data sources to narrow down the identified genetic loci associated with disease to a group of causal elements that are responsible for driving the development or progression of the disease. The causal elements are a subset of the identified loci associated with disease. In various embodiments, the disease factor analysis system 205 maps multiple identified genetic loci to a single causal element (e.g., seemingly distant genetic loci may be associated with each other through an insulated neighborhood).

In some embodiments, causal elements also refer to elements that may be individually weakly associated to the disease, but together, a set of the weak causal elements may be strongly associated with development or progression of the disease. For example, a genome-wide polygenic risk score (PRS) can be calculated that accounts for the set of weak causal elements. In various embodiments, the genome-wide PRS is calculated based on variations at a multitude of genetic loci across the genome. For example, PRS can be the weighted sum scores of risk alleles, where the weights are assigned to alleles based on effect sizes of genome-wide associated studies. Here, weak causal elements may be a subset of the multitude of genetic loci, but when the genome-wide PRS is calculated, the total effect of the weak causal elements are considered and in some scenarios, the set of weak causal elements results in a high PRS. Thus, disease factor analysis system 205 may identify these weak causal elements as causal elements that drive development or progression of the disease.

In various embodiments, as shown in FIG. 2B, the disease factor analysis system 205 uses additional data sources such as genome annotations 225 to identify the group of causal elements. In various embodiments, the genome annotations 225 can be curated from known databases, including real time engine for expression Quantitative Trait Loci (eQTL), Genetic Association Database (GAD), DisGeNET, and the like. In various embodiments, the genome annotations 225 can be sequencing data e.g., ATACseq or Chip-seq. In various embodiments, the genome annotations 225 can be 3D genome data (e.g., chromatin contact maps) or linkage disequilibrium (LD) blocks. As one example, the disease factor analysis system 205 identifies causal elements by co-localizing the genome annotations 225 with the identified loci associated with disease (e.g., co-localization of identified loci with eQTL or ATACseq peaks). Co-localized regions indicate activity at the genetic loci that likely drives or is responsible for the disease.

In some embodiments, genome annotations 225 refer to information identifying whether the identified loci are expressed in a relevant tissue of a disease, whether the identified loci are differentially expressed in disease, whether the identified loci are implicated in other diseases, and whether the identified loci have a corresponding phenotype in an animal model.

As examples, the disease factor analysis system 205 may analyze one or more of the following information to narrow down the identified loci to a group of causal elements:
a) The predicted relevance of the different variants, as described above in Step 215
b) Signals such as colocalization with eQTL, ATACseq, Chip-seq, transcriptome wide association studies (TWAS), 3D genome data (such as chromatin contact maps), linkage-equilibrium blocks to nominate functional variants and link them to causal elements.
c) Depletion for coding changes in human genotypes (ExAC, gnomAD)
d) Whether the gene is expressed in relevant tissue
e) Whether the gene expression changed in disease state
f) Whether the gene is implicated in any (related) disease
g) Whether the gene has a phenotype in an animal model At step 228, the disease factor analysis system 205 identifies pathways in which the causal elements are involved. In various embodiments, causal elements that are active in particular molecular pathways and cell types can be identified using databases such as the KEGG pathway database, Reactome Pathway Database, BioCyc Pathway, MetaCyc, and PathBank. Example methods conducted by the disease factor analysis system 205 to identify pathways involving the causal elements include using various tools (e.g., MAGMA) for identifying molecular pathways, biological processes, or other gene sets that are enriched for causal elements, such as causal genes.

At step 230, the disease factor analysis system 205 identifies cell types involved in the disease based on the causal elements identified at step 220. In various embodiments, the disease factor analysis system identifies cell types involved in the disease based on molecular pathways and processes identified at step 228. In various embodiments, the disease factor analysis system 205 identifies cell types directly involved in the disease based on the causal elements identified at step 220.

Example methods conducted by the disease factor analysis system 205 to identify cell types associated with the causal elements include:
a) Identify cell types that are involved in certain molecular pathways which can be accessed from publicly available databases
b) Use single cell data (RNAseq, ATACseq) to determine cell types that have active causal elements
c) Test whether the causal elements are differentially expressed in a given cell type in a way that correlates with disease state (e.g., different expression levels between healthy and disease)

At step 240, the disease factor analysis system 205 identifies environmental factors that drive or stimulate disease processes. In one embodiment, the disease factor analysis system 205 identifies environmental factors based on the identified cell types (identified in step 230). In some embodiments, the disease factor analysis system 205 identifies environmental factors based on identified pathways (identified in step 228).

In various embodiments, environmental factors that stimulate disease processes include $O_2$ tension, $CO_2$ tension, hydrostatic pressure, osmotic pressure, pH balance, ultraviolet exposure, temperature exposure or other physicochemical manipulations. In various embodiments, environmental factors that stimulate disease processes into biological molecules such as cytokines, carbohydrates, proteins, nucleic acids, metabolites, or ions. For example, these biological molecules may be differentially expressed in diseased state and therefore, may cause the development or progression of the disease.

Exemplary methods conducted by the disease factor analysis system 205 for identifying environmental factors include:
a) Analyzing literature for factors that cause the disease (e.g., free fatty acids in NASH, or rotenone in Parkinson's Disease)
b) Identifying molecules that are differentially presented in healthy and disease samples involving the identified cell type (e.g., cytokines, or amyloid-beta, or metabolites). Molecules can be identified through sequencing (e.g., single cell sequencing data) or quantitative assays (e.g., ELISA) of healthy/diseased cells to determine differentially expressed transcripts and/or differentially expressed molecules
c) Identifying molecules that are produced or utilized in pathways that are implicated in the disease, such as pathways involving the causal elements identified at step 228.

Further Methods for Determining Genetic Disease Architecture

In various embodiments, the disease factor analysis system 205 may determine genetic disease architecture by refining the understanding of a previously determined genetic disease architecture (e.g., genetic disease architecture 115). As one example, further refinement of the genetic disease architecture 115 involves identifying additional genetic loci associated with the disease and/or identifying additional causal elements of the disease, and further including these additional genetic loci and causal elements as part of a refined genetic disease architecture. As another example, further refinement of the genetic disease architecture 115 involves removing or replacing a subset of genetic loci associated with the disease or removing or replacing a subset of causal elements of the disease. The refined genetic disease architecture is useful for generating improved in vitro models of disease, which enables the training of improved machine learning models and development of better cellular disease models.

In various embodiments, the disease factor analysis system 205 refines the understanding of the genetic disease architecture by analyzing a dataset, such as a dataset obtained from a third party. The dataset may, in various embodiments, include subject data (e.g., genetic data, clinical data, biomarker data, and/or phenotypic assay data) pertaining to patients associated with the disease. Therefore, by analyzing additional datasets including subject data of additional patients associated with the disease, the disease factor analysis system 205 may identify additional genetic elements that supplement the understanding of the genetic disease architecture 115.

In various embodiments, the patients in the dataset may have been clinically diagnosed with the disease. In various embodiments, the patients in the dataset may have been clinically diagnosed with a subtype or phenotype of the disease. For example, for the disease of non-alcoholic fatty liver disease (NAFLD), an example phenotype of the disease is the presence of fibrosis. In various embodiments, the patients in the dataset are not clinically diagnosed (e.g., non-diagnosed) with the disease, but have genetics, symptoms, or biomarkers that are suggestive of them having some form of the disease. These patients may have been under- or misdiagnosed but otherwise show signs of having the disease or significant risk for developing the disease. In various embodiments, the dataset includes subject data pertaining to any combination of these aforementioned patients (e.g., clinically diagnosed patients and/or non-diagnosed patients).

In various embodiments, the disease factor analysis system 205 generates one or more synthetic cohorts from the dataset that distinguishes patients in the dataset based on their subject data. A synthetic cohort may include patients who have a presence of the disease, are exhibiting a phenotype associated with the disease, or are at high risk of developing the disease. Again, returning to the example of non-alcoholic fatty liver disease (NAFLD), the disease factor analysis system 205 can generate a synthetic cohort including patients who have NAFLD or including patients who are exhibiting fibrosis, e.g., a phenotype of NAFLD. Further description of generating a synthetic cohort including individuals exhibiting a particular imputed phenotype is found in Hormozdiari, F. et al. Imputing Phenotypes for Genome-wide Association Studies, The American Journal of Human Genetics, 2016, 99 (1), 89-103, which is hereby incorporated by reference in its entirety.

In some embodiments, the goal of a synthetic cohort is to include patients that may not have been previously analyzed such that the subsequent genetic analysis can identify genetic loci or causal elements of the disease that were not previously identified in the genetic disease architecture 115. For example, patients in the synthetic cohorts can be different from individuals 210, described above in reference to FIG. 2B, who were initially analyzed to determine the initial genetic disease architecture 115. For example, if the individuals 210 were clinically diagnosed with the disease, the synthetic cohort can include patients that are at high-risk and not yet clinically diagnosed with disease. As another example, the synthetic cohort can include patients expressing a phenotype or subtype of the disease that was not adequately observed in previously analyzed individuals 210. Therefore, an understanding of the underlying genetics of the patients in the synthetic cohorts can be genetics connected with the previously not observed phenotype or subtype of the disease. These genetics can be used to further refine the genetic disease architecture 115 to more fully capture genetic elements connected to various phenotypes and/or subtypes of the disease that were not previously captured.

To generate the one or more synthetic cohorts, the disease factor analysis system 205 may use the initial understanding of the genetic disease architecture 115 developed above in reference to FIG. 2B. For example, the disease factor analysis system 205 can filter through the dataset to select candidate patients, the candidate patients having subject data that align in part with the genetic disease architecture 115. The disease factor analysis system 205 selects patients having the genetic loci or causal elements of the genetic disease architecture 115. Thus, in addition to candidate patients that have the disease (and possibly have already been clinically diagnosed for the disease), the disease factor analysis system 205 also selects candidate patients that have been under- or misdiagnosed for the disease and are potentially at high risk for the disease because their subject data (e.g., underlying genetics) align in part with the genetic disease architecture 115.

In various embodiments, the disease factor analysis system 205 generates a synthetic cohort of patients that includes a subset of the candidate patients by imputing labels to the candidate patients based on the patients' subject data. This distinguishes candidate patients from one another and enables the generation of a synthetic cohort of patients with a particular label. As an example, a first set of candidate patients can be labeled as having the disease, whereas a second set of candidate patients can be labeled as being at high risk of developing the disease. In the context of NAFLD, the first set of candidate patients are labeled as having NAFLD, whereas the second set of candidate patients can be labeled as high-risk NAFLD for expressing a fibrosis phenotype often seen in NAFLD.

In various embodiments, imputing labels to the different candidate patients can involve distinguishing the candidate patients based on their subject data, an example of which includes distinguishing patients based on their expression of biomarkers that are associated with one of the labels. In various embodiments, the imputing of labels to the candidate patients involves applying one or more trained predictive models that have been previously trained to distinguish between the two labels based on biomarker data. For example, a predictive model may be a classifier that analyzes, as input, biomarker data of a patient, and then outputs a prediction as to the label. The predictive model may analyze one or more biomarkers, such as a panel of biomarkers, for determining a prediction of the label.

Given a synthetic cohort, the disease factor analysis system 205 conducts genetic analysis to determine the underlying genetics associated with patients of the synthetic cohort. In various embodiments, the disease factor analysis system 205 conducts a genetic analysis that is similar to the process described above in reference to step 215 (e.g., identifying genetic loci) and step 220 (identifying causal elements of disease) in reference to FIG. 2B. In an exemplary embodiment, the disease factor analysis system 205 conducts a genome-wide association study (GWAS) analysis on the patients in the synthetic cohort to identify genetic loci associated with disease and performs a post-GWAS analysis by colocalizing transcriptome-wide association study (TWAS) and expression quantitative trait loci (eQTL) signatures to identify causal elements. In various embodiments, the step of identifying causal elements of the disease can further rely upon the existing understanding of the genetic disease architecture 115. For example, the post-GWAS analysis involves fine-mapping variants in the genetic loci to traits. The post-GWAS analysis can use a range of different datasets (e.g., genome annotations 225 described in FIG. 2B), including the understanding of the genetic disease architecture 115.

Altogether, the genetic loci and causal elements identified through this genetics analysis for the synthetic cohort can be used to supplement the genetic disease architecture 115 that was previously generated. This enables the generation of additional training data for training machine learning models which, in turn, enables the generation of more robust cellular models of disease for performing screens.

In various embodiments, the methods for determining genetic disease architecture can involve performing a GWAS association testing. For example, the association testing can reveal genetic loci and causal elements associated with disease based on their presence in diseased samples. In various embodiments, the method for genetic architecture involves determining the genetics of a sample, and further determining a label (e.g., diseased or not diseased label) for the sample. In various embodiments, the label can be determined by implementing a predictive model that is trained to distinguish between diseased samples and healthy samples. Thus, the predictive model can assign the diseased label or healthy label to each sample. In various embodiments, the predictive model is trained to analyze phenotypic assay data (e.g., images captured from the samples) and differentiate between samples that are diseased and healthy according to the phenotypic assay data. For example, phenotypic assay data can be an immunohistochemistry image of the sample and thus, the predictive model can perform an image analysis and label the sample as diseased or healthy.

The association testing can reveal presence of genetic changes (e.g., variants, single nucleotide variants (SNVs)), insertions, deletions, knock-ins, knock-outs, and/or the presence or absence of particular genomic units) or causal elements that are highly associated with a positive disease label (e.g., indicative of disease). Thus, genetic loci with these genetic changes that are highly associated with a positive disease label can, in various embodiments, be identified as causal elements for inclusion in the genetic disease architecture.

Phenotypic Assay Data

Figure 2C:
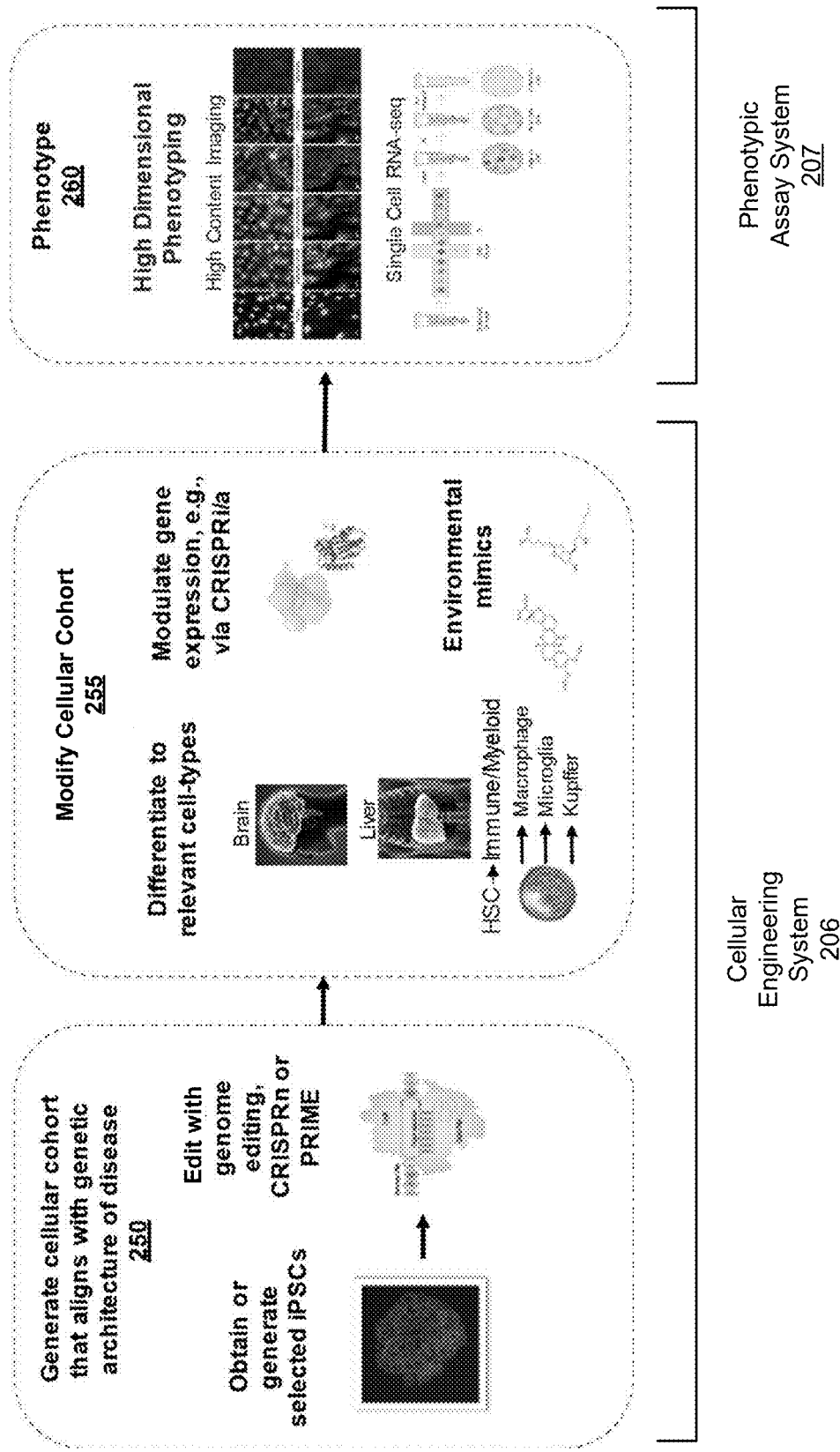
FIG. 2C depicts steps performed by each of a cellular engineering system and phenotypic assay system for generating training data, in accordance with an embodiment.

Reference is now made to FIG. 2C, which depicts steps performed by the cellular engineering system 206 and phenotypic assay system 207 for generating training data that is subsequently used to train the machine learning model. Generally, the cellular engineering system 206 performs the steps of generating 250 a cellular cohort that aligns with a genetic architecture of disease and modifying 255 the cellular cohort to a desired cell phenotype. A cellular cohort can be composed of one cell or a plurality of cells (e.g., a population of cells). The phenotypic assay system 207 performs one or more phenotypic assays to generate training data. Although FIG. 2C depicts these steps (e.g., steps 250 and 255) as a flow process, in some embodiments, the cellular cohort may be modified (e.g., step 255) prior to certain modifications performed in step 250. The phenotypic assay system 207 performs one or more phenotypic assays on the cells to generate phenotypic assay data derived from the cells.

Altogether, the cellular engineering system 206 and the phenotypic assay system 207 may be implemented through an automated infrastructure that enables end-to-end automated workflows for cell-line maintenance, cell screening, cell dosing (e.g., for cell modification or differentiation), and performance of phenotypic assays (examples of which include cell staining and imaging). An automated infrastructure enables large scale generation of training data that the cellular disease model system 208 can use to train machine learning models. More specifically, in an embodiment deploying an automated infrastructure, step 250 involves high-throughput cell generation and management. Capabilities of the cellular engineering system 206 for high-throughput cell generation and management include high-capacity plate storage, multiple liquid handling options, overnight operations, high capacity $CO_2$ incubation, media chillers and storage. Thus, the supported workflows include cell passaging, cell monitoring, media changing, and cell banking. In various embodiments, the cellular engineering system 206 can handle a large number of plates (e.g., greater than 200 plates) and further includes, e.g., 20+ reagent filling stations.

In various embodiments, at step 250, the cellular engineering system 206 generates and maintains cell(s) (e.g., single cell, population of cells, multiple populations of cells). Cells can vary in regards to the type of cells (single cell type, mixture of cell types), cell lineage (e.g., cells in differing stages of maturation or differing stages of disease progression), cell culture (e.g., in vivo, in vitro 2D culture, in vitro 3D culture, or in vitro organoid or organ-on-chip systems). In various embodiments, the cellular engineering system 206 generates and maintains cells of a cell type in which the particular disease is active. In various embodiments, the cellular engineering system 206 generates and maintains cells that serve as a proxy cell for a cell type in which the particular disease is active. Here, the proxy cell can be easier to manage (e.g., easier to culture, more easily manipulated) in comparison to the specific cell type in which the disease is active. The particular cell type that the cellular system 206 generates and maintains can be the cell type identified in Step 230, as described above in reference to FIG. 2B.

In various embodiments, the cellular engineering system 206 generates and/or maintains induced pluripotent stem cells (iPSCs). An iPSC can be generated through a variety of methods including reprogramming somatic cells using reprogramming factors Oct4, Sox2, Klf4, and Myc. Reprogramming of somatic cells can occur through viral or episomal reprogramming techniques. Examples methods for generating iPSCs are further described in PCT/US2018/067679, PCT/EP2009/003735, U.S. application Ser. No. 13/059,951, U.S. application Ser. No. 13/369,997, U.S. application Ser. No. 14/043,096, and U.S. application Ser. No. 13/441,328, each of which is hereby incorporated by reference in its entirety.

In various embodiments, the cellular engineering system 206 generates and/or maintains somatic cells. In various embodiments, the cellular engineering system 206 generates and/or maintains differentiated cells. In various embodiments, the cellular engineering system 206 generates and/or maintains cells differentiated from a primary cell (e.g., transdifferentiated). In various embodiments, the cellular engineering system 206 generates and/or maintains cells that are differentiated from stem cells. In various embodiments, the cells are differentiated from iPSCs, such as iPSCs that the cellular engineering system 206 had previously generated.

In various embodiments, the cellular engineering system 206 generates and/or maintains iPSCs that have genetics that are likely to span a diverse spectrum of genetic variability. In various embodiments, the diverse spectrum of genetic variability is in relation to the causal elements described above in relation to FIG. 2B. In one embodiment, different populations of iPSCs that express different causal elements can be selected. Therefore, the impact of varying expression of the causal elements can be recapitulated across the iPSC populations. In one embodiment, different populations of iPSCs that have different polygenic risk scores (PRS) can be generated.

In various embodiments, step 250 involves a sub step where the cellular engineering system 206 further edits the cells to ensure that the cells align with a genetic architecture of the disease. In one embodiment, the cellular engineering system 206 edits the cells by introducing genetic changes in the cells. In some embodiments, such genetic changes are introduced to mimic the genetic disease architecture that is determined from patients, such as the genetic disease architecture 115 described above in relation to FIG. 2B. In particular embodiments, the one or more genetic changes expressed by the cell replicate the genetic architecture of the disease. For example, the one or more genetic changes replicate the effects of causal elements of the genetic architecture of the disease, in a transient or constitutive manner.

Examples of one or more genetic changes include mutations (e.g., polymorphisms, single nucleotide polymorphisms (SNPs), single nucleotide variants (SNVs)), insertions, deletions, knock-ins, and knock-outs. Additional examples of the genetic changes include genetic changes that cause changes in expression (e.g., gene silencing/activation) or genetic changes that cause a change in epigenetic state (e.g., histone binding, DNA methylation).

In various embodiments, the one or more genetic changes expressed by the cell can be engineered. The genetic changes can be engineered to increase the genetic diversity across different cells and/or to introduce highly penetrant variants. In various embodiments, the one or more genetic changes expressed by the cell are a result of overexpression of a particular cDNA. For example, a cDNA construct of a gene can be provided to the cell through a transfection method (e.g., lipofectamine) to introduce the one or more genetic changes. In various embodiments, the one or more genetic changes expressed by the cell are engineered using Clustered Regularly Interspaced Short Palindromic Repeats (CRISPR). For example, a CRISPR system for generating one or more genetic changes in a cell can include a CRISPR complex (with a CRISPR enzyme), one or more guide sequences for hybridizing with a target sequence to direct sequence-specific binding of the CRISPR complex to the target sequence. Gene editing using CRISPR systems is further described in U.S. Pat. Nos. 8,697,359, 8,697,359; 8,771,945; 8,795,965; 8,865,406; 8,871,445; 8,889,356; 8,895,308; 8,906,616; 8,932,814; 8,945,839; 8,993,233; 8,999,641, PCT/US2013/074611, and PCT/US2013/074819 each of which is hereby incorporated by reference in its entirety. In various embodiments, the one or more genetic changes expressed by the cell are engineered using Transcription Activator-like Effector Nuclease (TALENs). Gene editing using TALENs is further described in U.S. Pat. Nos. 9,353,378; 8,440,431; 8,440,432; 8,450,471; 8,586,363; 8,697,853; and 9,758,775, each of which is hereby incorporated by reference in its entirety. In various embodiments, one or more genetic changes expressed by the cell are engineered using Zinc finger nucleases. Gene editing using Zinc finger nucleases is further described in U.S. Pat. Nos. 7,888,121, 8,409,861, 7,951,925, 8,110,379, and 7,919,313, each of which is hereby incorporated by reference in its entirety.

Example methods that the cellular engineering system 206 can perform to introduce these genetic changes include, but are not limited to:
 i) Create a loss-of-function genetic variant using CRISPR nuclease (CRISPRn) or CRISPR inhibition (CRISPRi)
 ii) Create a gain-of-function genetic variant using CRISPR activation (CRISPRa)
 iii) Create specific allelic changes using CRISPR prime editing, homology directed repair (HDR),
 iv) Generate copy number variations (CNVs) using Cas3 or other tools
 v) Generate constitutive or inducible expression of a protein such as dCas9 variants, or Prime-editor
 vi) Generate constitutive or inducible expression of a differentiation factor such as NGN2

Step 255 involves modifying the cellular cohort. In various embodiments, step 255 involves performing an exposome. For example, the cellular cohort is exposed to one or more perturbagens. In various embodiments, a perturbagen can induce a less diseased state in the cell, thereby causing the cell to exhibit fewer phenotypic traces of disease. In various embodiments, a perturbagen can induce a diseased state in the cell, thereby causing the cell to exhibit phenotypic traces of disease. In various embodiments, a perturbagen can play a role or cause a disease, and therefore, the phenotypic traces of disease induced by the perturbagen can be informative as an anchor phenotype for a particular clinical endpoint. For example, for a clinical endpoint of fibrosis progression, a TGFβ perturbagen induces the diseased state of fibrosis. Thus, the anchor phenotype is represented by the phenotypic traces of disease resulting from exposure of a cell to TGFβ.

In various embodiments, perturbagens are selected according to their ability to (i) mimic metabolic or dietary risk/protective factors, (ii) engage candidate biological pathways or (iii) capture the effector function(s) of a cell type capable of influencing the cellular microenvironment. In various embodiments, selecting a perturbagen for an exposome involves evaluating and identifying candidate genes that emerge from a genetic analysis via pathways that are enriched in the genetics. Thus, a selected perturbagen can be one that interacts with the candidate gene (or a product of the candidate gene). In various embodiments, selecting a perturbagen for an exposome involves analyzing samples from human data to identify exposures (e.g., cytokines, carbohydrates, proteins, nucleic acids, metabolites, or ions) that are differentially present (e.g., enriched or reduced) in disease vs healthy. Here, exposures that are differentially present in disease versus healthy samples can be selected as a perturbagen. In various embodiments, selecting a perturbagen for an exposome involves identifying and analyzing factors known from prior literature studies (e.g., epidemiological studies).

In various embodiments, additional perturbagens can be selected for the exposome based on a first selected perturbagen. For example, if the first selected perturbagen modulates a candidate biological pathway or candidate gene that is identified as a putative driver of the disease, other perturbagens that are similar or related to the first selected perturbagen can also be selected. For example, the identification of an adipokine as a first selected perturbagen can lead to the selection of other adipokines as part of the initial exposure set. As another example, additional perturbagens can be perturbagens that target a signaling receptor or a secondary messenger involved in a biological pathway targeted by the first selected perturbagen.

In various embodiments, step 255 involves exposing different cellular cohorts 250 to different perturbagens. In various embodiments, step 255 involves exposing cellular cohorts to at least two perturbagens. In various embodiments, step 255 involves exposing cellular cohorts to at least three, at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty perturbagens. Altogether, performing exposomes on cellular cohorts enables the subsequent capturing of wide ranging phenotypic assay data (e.g., captured at step 260) across various cellular cohorts. Such phenotypic assay data can make up exposure response phenotypes (ERPs) which are used to train machine learning models.

In various embodiments, to perform step 255, the cellular engineering system 206 may include capabilities such as nanoliter dispensing of a wide range of liquid types and cell types that ensure non-contact dispensing of samples. As such, the modification of various different cells can occur in parallel in a high-throughput manner. Example features for modifying the cells include bulk reagent dispensers, plate sealing/desealing, full process containment (e.g., HEPA filtered/negative pressure enclosure). In various embodiments, the cellular engineering system 206 includes high-throughput virus preparation and high-throughput molecular biology.

At step 255, the cellular engineering system 206 modifies the cells that are aligned with the genetic architecture of disease. In various embodiments, in modifying the cells, the cellular engineering system 206 performs any one or more of differentiating the cells, modulating the gene expression of the cells, and/or providing environmental conditions that spur the cell into a diseased cellular state. In various embodiments, modifying the cells at step 255 involves diversifying the cellular cohort such that the cells express a wide range of cellular phenotypes of the disease. Examples of a diseased cellular state include a cell type that is involved in the disease, differential expression of one or more gene products (e.g., mRNA, protein, or biomarker), expression of mutated gene products (e.g., variant mRNA, variant protein, or variant biomarker), differential expression of genes, and altered signaling pathways.

In various embodiments, the cellular engineering system 206 performs one or more of the following steps: (1) differentiating iPSCs into one or more relevant cellular lineages, either in isolation, in co-culture, or in a multicellular system such as an organoid, (2) modulating expression of a subset of genes through a perturbant (e.g., activation or repression using CRISPRi/a), and (3) introducing an environmental mimic through a single step or multi-step protocol that can drive disease process. In preferred embodiments, the cellular engineering system 206 implements high-throughput cell line management capabilities (e.g., high capacity incubators, plates, reagent filling stations, plate storage, liquid handling options), thereby enabling an automated cellular differentiation workflow that can rapidly diversify a large number of cellular cohorts in parallel. However, in some embodiments, the cellular engineering system 206 can also implement low-throughput methods to describe the steps below.

In one embodiment, the cellular engineering system 206 differentiates the cells into relevant cell-types (e.g., cell types that are relevant for the disease). The particular relevant cell-type can be the cell type expressing causal elements that was identified in Step 230, as described above in reference to FIG. 2B. For example, the cells may be iPSCs and therefore, the cellular engineering system 206 programs the iPSCs to a particular fate (e.g., into somatic cells related to a disease, including for example neurons (e.g., inhibitory interneurons, dopaminergic neurons, cortical neurons), astrocytes, hepatocytes, stellate cells, macrophages, microglia, Kupffer cells, and hematopoietic stem cells). iPSCs can be cultured and/or exposed to nutrients, cytokines, and/or environmental conditions to induce the iPSCs to differentiate into a particular somatic cell. For example, to differentiate iPSCs to Stellate cells, the iPSCs can be treated with a combination of BMP4, FGF1, FGF3, Retinol, and Palmitic Acid. Example methods for differentiating iPSCs into different somatic cells are described in PCT/US2010/025776, U.S. application Ser. No. 13/619,893, U.S. application Ser. No. 15/725,931, and U.S. Pat. No. 9,932,561, each of which is hereby incorporated by reference in its entirety.

In one embodiment, the cellular engineering system 206 modifies multiple cells such that the different cells represent different stages of maturation or development. The cellular engineering system 206 may modify different iPSCs, differentiated cells, or both. For example, a first cell may represent an earlier version of a second cell. As an example, the first cell may be a newly differentiated somatic cell (e.g., a younger somatic cell), whereas the second cell may be a somatic cell that has been passaged more than once (e.g., an older somatic cell). Therefore, the behavior of the somatic cell over time can be represented across these two cells.

In various embodiments, the cellular engineering system 206 modifies multiple cells such that the different cells represent different stages of disease progression. The cellular engineering system 206 may modify different iPSCs, differentiated cells, or both. In one embodiment, the cellular engineering system 206 may modify the multiple cells such that a first cell represents a diseased cell that is earlier in disease progression in comparison to a second cell. In one embodiment, the cellular engineering system 206 may modify multiple cells such that the cells undergo either accelerated or decelerated disease progression, thereby emulating relevant in vivo disease expression states. Therefore, the progression of a disease over time can be represented across these two cells.

In some embodiments, the cellular engineering system 206 modifies the cell by perturbing the cell, which promotes a cellular state in the cell that is associated with a disease. Examples of diseased cellular states can include: a state where the cell exhibits differential gene expression, a state where the cell exhibits dysregulated behavior (e.g., abnormal cell cycle regulation, cell division, enzymatic function), a state where the cell expresses diseased proteins (e.g., proteopathies), and hypoxia, hyperoxia, hypocapnia, or hypercapnia induced states.

As an example of a perturbation, the cellular engineering system 206 can administer an agent to the cell. Examples of an agent include a chemical agent, a molecular intervention, an environmental mimic or a gene editing agent. Examples of a gene editing agent include CRISPRi and CRISPRa that serve to downregulate or overexpress certain genes, respectively. Further details regarding CRISPRi and CRISPRa and methods for transcriptional modulation using CRISPRi/a is described in U.S. application Ser. No. 15/326,428 and PCT/CN2018/117643, both which are hereby incorporated by reference in their entirety. Examples of chemical agent or a molecular intervention include genetic elements (e.g., RNA such as siRNA, shRNA, or mRNA, double or single stranded antisense oligonucleotides) as well as clinical candidates, peptides, antibodies, lipoproteins, cytokines, dietary perturbagens, metal ion salts, cholesterol crystals, free fatty acids, or A-beta aggregates. Examples of chemical agents or molecular interventions include any of CTGF/CCN2, FGF1, IFGγ, IGF1, ILIB, AdipoRon, PDGF-D, TGFβ, TNFα, HLD, LDL, VLDL, fructose, lipoic acid, sodium citrate, ACCli (Firsocostat), ASKli (Selonsertib), FXRa (obeticholic acid), PPAR agonist (elafibranor), $CuCl_2$, $FeSO_4$ $7H_2O$, $ZnSO_4$ $7H_2O$, LPS, TGFβ antagonist, and ursodeoxycholic acid.

In various embodiments, the environmental mimic can be provided as a perturbant, or in addition to a perturbant that modulates gene expression. Examples of an environmental mimic include $O_2$ tension, $CO_2$ tension, hydrostatic pressure, osmotic pressure, PH balance, ultraviolet exposure, temperature exposure or other physico-chemical manipulations. In various embodiments, the environmental mimic is an environmental factor determined at step 240, as described above in relation to FIG. 2B.

In various embodiments, the perturbation of cells is performed in an array format. For example, cells are individually plated (e.g., in separate wells) and individually perturbed. In some embodiments, the perturbation of cells is performed in a pooled format. For example, cells are pooled together and perturbed. In one embodiment, the pooled cells are exposed to the same perturbation. In one embodiment, the cells in the pool are individually exposed to individual perturbations.

In various embodiments, the cellular engineering system 206 perturbs cells by selecting for cell culture conditions that are predictive for disease conditions in vivo. In one embodiment, the cell culture conditions are selected to emulate disease conditions in vivo. In some embodiments, the cell culture conditions are predictive of disease conditions in vivo (e.g., need not be the exact same conditions in vivo). Selecting for cell culture conditions can be useful when generating cells for modeling disease progression. For example, as a disease progresses in vivo, a subject's immune response system and other biological functions (such as autophagy) may be impacted (e.g., increased or decreased activity levels and molecular outputs). Cellular conditions can be selected that are predictive for or that emulate the in vivo conditions. For example, culture conditions and formulations may be selected to (1) slow or accelerate disease progression in vitro agnostic to corresponding physiological states around the disease in vivo, or (2) to mimic known physiological states in vitro, specifically to understand how those states impact disease progression.

After step 255, the cellular engineering system 206 has generated various cellular cohorts (e.g., cells that differentially express genes, cell that are of one or more cell types, and cells that have been exposed to environmental mimics) such that the various cellular cohorts serve as in vitro models for a wide range of cellular phenotypes associated with disease.

At step 260, the phenotypic assay system 207 performs one or more phenotypic assays on the various populations of cells to obtain phenotypic assay data at unprecedented breadth and scale (given the wide-ranging cell populations). Generally, cells exhibit cellular phenotypes that are captured by performing one or more phenotypic assays on the cells and the data captured by the one or more phenotypic assays are hereafter referred to as phenotypic assay data. In various embodiments, the phenotypic assay data represents high-dimensional data that, without machine learning implemented methods, may be difficult to predict likely clinical phenotypes associated with the phenotypic behavior of the cell. In various embodiments, the phenotypic assay system 207 performs phenotypic assays across different cell populations.

In various embodiments, the phenotypic assay system 207 performs phenotypic assays across a single cell population at different timepoints (e.g., to capture phenotypic assay data as the single cell population progresses/develops). Capturing phenotypic assay data from cells at different timepoints can be helpful for understanding how the in vitro development of cells or progression of a disease compares to the analogous in vivo processes. For example, disease progression in vitro may occur much faster than the disease progression in vivo. In some scenarios, capturing phenotypic assay data at different timepoints, which represents the taking of snapshots at different stages of cell development of disease progression in vitro, will allow a better understanding of which stage of in vitro cell development or disease progression corresponds to a particular in vivo state. In turn, the in vitro cellular phenotypic assay data at a particular stage will help identify biological targets that are relevant for disease progression at a finer level of resolution than similar investigative studies conducted in vivo. In some scenarios, the captured phenotypic assay data from in vitro cells at different timepoints need not align with in vivo states; rather, the captured phenotypic assay data at different timepoints merely needs to be predictive of the different in vivo states. Therefore, captured phenotypic assay data from in vitro cells are predictive of in vivo disease states and enable understanding of the in vivo disease progression without having to recapitulate the exact states in vitro.

As an example, high-dimensional phenotypic assay data may include image data e.g., high-resolution microscopy data or immunohistochemistry image data captured of the cell or population of cells. Additional examples of phenotypic assay data include cell sequencing data, protein expression data, gene expression data, cell metabolic data, cell morphology data, or cell interaction data. Further examples of phenotypic assay data include functional data, such as electrophysiological functional data for cardiac cells and electroencephalogram (EEG) or electrocorticography (ECoG) for brain cells. As shown in FIG. 2C, examples of phenotypic assays include high content imaging (e.g., cellular microscopy) as well as single cell RNA-sequencing. Additional phenotypic assays include ATACseq, assays for measuring protein expression levels, RNA-FISH, and other disease-specific assays. Additional phenotypic assays are described in further detail below.

In various embodiments, the phenotypic assay system 207 performs phenotypic assays in a high-throughput manner as another step in the automated infrastructure. For example, the phenotypic assay system 207 can perform high-throughput compound plate preparation (in some cases with dynamic plate batch scheduling and/or overnight operations). The phenotypic assay system 207 can handle a high capacity of plates (e.g., greater than 300 plates) and further includes a high capacity $CO_2$ incubator, on and off plate chilling, as well as hardware for performing phenotypic assays (e.g., immunohistochemistry staining, microscopes, flow cytometer). In various embodiments, the phenotypic assay system 207 enables various workflows such as pooled optical screening, imaged based cytometry, high-content image assays (e.g., cell paint), and live cell imaging.

Altogether, the steps illustrated in FIG. 2C results in the capturing of phenotypic assay data from a wide range of cellular avatars for a disease. Each cellular avatar represents a cell and is defined by the underlying genetics of the cell as well as perturbations provided to the cell. The phenotypic assay data can be used to train a machine learning model to make clinical phenotype predictions for cellular avatars.

Methods for Implementing a Machine Learning Model for Generating a Cellular Disease Model Generally, the cellular disease model system 208 trains machine learning models that predict a clinical phenotype based on phenotypic assay data captured from one or more cells. The machine learning model outputs predictions that serve as the basis for the cellular disease model. The cellular disease model system 208 deploys the cellular disease models to perform screens.

Disclosed herein are methods for implementing machine learning models and cellular disease models to validate an intervention (e.g., drug, gene, or combination intervention) for use against a disease. Additionally disclosed herein are methods for implementing machine learning models and cellular disease models to identify patient populations that are likely to respond to an intervention. Additionally disclosed herein are methods for implementing machine learning models and cellular disease models to explore therapeutics (e.g., a drug or gene therapy) in a large therapeutic library for use as a therapeutic intervention. Selected therapeutics are likely to exhibit efficacy or are unlikely to result in toxic effect. Additionally disclosed herein are methods for implementing machine learning models and cellular disease models to develop a structure-activity relationship (SAR) screen. Additionally disclosed herein are methods for implementing machine learning models and cellular disease models to identify biological targets (e.g., genes) whose perturbation may modulate the disease.

Generating Training Data

Described herein are methods for generating training data to be used to train a machine learning model. As described above, the training data is generated at unprecedented breadth and scale given the wide-ranging engineered cells, which serve as in vitro models of the disease, are used to generate the training data. Once trained, the machine learning model can predict clinical phenotypes based on phenotypic assay data with improved predictive power.

In various embodiments, the training data can be derived from a combination of any of cell(s) (e.g., single cell, population of cells, multiple populations of cells), types of cells (single cell type, mixture of cell types), cell lineage (e.g., cells in differing stages of maturation or differing stages of disease progression), cell culture (e.g., in vivo, in vitro 2D culture, in vitro 3D culture, or in vitro organoid or organ-on-chip systems), genetic markers (e.g., a range of genotypes), and external perturbations (e.g., environmental conditions or agents). Altogether, the training data can be a comprehensive data set that reflects the behavior of different cells across a variety of different conditions and situations.

In various embodiments, the training data is derived from a cell. In various embodiments, the training data is derived from a population of cells. In various embodiments, the training data is derived from multiple populations of cells. In various embodiments, the population of cells can be one of an in vivo, in vitro 2D culture, in vitro 3D culture, or in vitro organoid or organ-on-chip systems. In some embodiments, the population of cells may be of a single cell type. In some embodiments, the population of cells may include a mixture of cell types. For example, the population of cells may be obtained from a tissue biopsy and contain more than one type of cell. In various embodiments, the cell is a somatic cell. In various embodiments, the cell is a differentiated cell. In various embodiments, the cell is differentiated from a primary cell (e.g., transdifferentiated). In various embodiments, the cell is differentiated from a stem cell. In various embodiments, the cell is differentiated from an induced pluripotent stem cell (iPSCs). In various embodiments, the cell is associated with a disease. In particular embodiments, the cell is a neuronal cell. In particular embodiments, the cell is a microglia. In particular embodiments, the cell is an astrocyte. In particular embodiments, the cell is an oligodendrocyte. In particular embodiments, the cell is a hepatocyte cell. In particular embodiments, the cell is a hepatic stellate cell (HSC).

The cells are assayed to generate phenotypic assay data. This phenotypic assay data represents training data that is used to train a machine learning model to generate a relationship at least between phenotypic assay data and a predicted clinical phenotype. In various embodiments, phenotypic assay data may be classified using machine learning before being deployed to train a machine learning model. For example, the phenotypic assay data may be classified as being associated with a diseased or non-diseased state.

In preferred embodiments, the phenotypic assay data includes high-dimensional data, such as an image. In such embodiments, performing phenotypic assays include preparing cells for imaging such that relevant healthy or diseased indicators can be captured in images. In various embodiments, the preparation of cells can include staining the cells.

As one example, for fluorescent imaging, the cells can be stained using fluorescently tagged antibodies (e.g., primary antibody and secondary antibody with a fluorescent tag). In particular embodiments, the cells can be stained such that different cellular components can be readily distinguished in the subsequently captured images. For example, cellular component specific stains can be used (e.g., DAPI or Hoechst for nuclear stains, Phalloidin for actin cytoskeleton, wheat germ agglutinin (WGA) for Golgi/plasma membrane, MitoFISH for mitochondria, and BODIPY for lipid droplets). In various embodiments, fluorescent dyes may be programmable such that the presence of the fluorescence indicates the presence of a particular phenotype. For example, in vitro cells may be treated with a fluorescent reporter (e.g., green fluorescent protein reporter) such that the presence of the phenotype corresponds to the expression of the fluorescent reporter. Here, a plasmid encoding for the fluorescent reporter may be delivered to the cells to stably transfect the cells and serve as a measure of gene expression. Therefore, observance of the fluorescent reporter protein indicates expression of the gene, which can correspond to a particular phenotype of a disease. For example, overexpression or under expression of a protein product corresponding to the gene can indicate the presence of a disease. In various embodiments, multiple cellular stains can be used together with limited interference across channels, thereby enabling the visualization of several different cellular components in one image. For example, preparation of cells can involve the use of Cell Painting, which is a morphological profiling assay that multiplexes six fluorescent dyes that can be imaged across five channels for identifying eight cellular components. Different versions of Cell Painting can be developed and used depending on the type of cells that are to be imaged. For example, for brain cells, a custom version of CellPaint, hereafter termed NeuroPaint, can be employed to image for various cellular components of brain cells. Images can be captured using any suitable fluorescent imaging including confocal imaging and two-photon microscopy.

As another example, for immunohistochemistry imaging, cells can be stained using hematoxylin/eosin stains. Images can be captured using any suitable microscopy including bright field microscopy and phase contrast microscopy.

Exposure Response Phenotypes

As described herein, training data can include data across one or more exposure response phenotypes (ERPs). An ERP serves as a proxy label of health and disease in an in vitro model of the clinical endpoint of interest (e.g., fibrosis progression, steatosis, hepatocyte ballooning, or lobular inflammation). Generally, ERPs are useful because they enable the in vitro modeling of the disease. In various embodiments, an ERP enables the in vitro modeling of the disease using a perturbagen (e.g., environmental factors, agents such as any of a chemical agent, a molecular intervention, or a gene editing agent), that induces the cell to exhibit phenotypic features that are indicative of the disease. This enables control over the in vitro disease process. For example, providing higher concentrations of perturbagen can induce a more severe disease state whereas lower concentrations of perturbagen can induce a less severe disease state. Furthermore, ERPs represent models for cells of various genetic backgrounds (e.g., cellular avatars). In other words, ERPs can represent in vitro models of disease across human individuals of various genetic backgrounds. The particular disease state of a cell can be interrogated via phenotypic assay data captured from the cell. Therefore, there may exist learnable relationships from the phenotypic assay data to the disease phenotype.

Generally, different ERPs are constructed for different clinical endpoints of interest for different diseases. In various embodiments, validating an ERP can involve comparing phenotypic assay data of the ERP (e.g., cellular phenotypes from images, human gene expression data e.g., RNA-seq) to corresponding phenotypic assay data captured from cells known to have or not have the disease. For example, a validated ERP includes phenotypic assay data that more closely aligns with phenotypic assay data captured from cells that are known to have the disease and less closely aligns with phenotypic assay data captured from cells that are known to not have the disease. Thus, each ERP, once validated, accurately provides an in vitro model for the different clinical endpoints of interest for the different diseases. A validated ERP may be different depending on the complexity of the disease. For example, for a first disease, a particular genetic change can be the main driver of the disease. Therefore, a validated ERP for the first disease, by including the particular genetic change, can accurately model the disease. As another example, a second disease may be induced due to a confluence of perturbagens (e.g., combinations of genetic changes, environmental factors, etc.). Thus, validation of an ERP for the second disease may be more complex to verify that the ERP for the second disease accurately provides an in vitro model of the second disease. In various embodiments, a complex validation of an ERP (e.g., an ERP for the second disease) can involve analyzing and understanding the relative contributions of the different perturbagens (e.g., genetic changes, environmental factors etc.) to the disease state. Thus, given the relative contributions of the different perturbations to the disease state, the perturbations can be adjusted (e.g., addition, removal, increased concentration, or reduced concentration) to further improve the in vitro modeling accuracy of the ERP. In various embodiments, a complex validation of an ERP (e.g., an ERP for the second disease) can involve gathering additional evidence that the perturbagens are truly inducing a disease relevant state. For example, this can involve analyzing clinical transcriptional signatures of the disease state (e.g., transcriptional signatures from cells that are known to have the disease or be in the disease state) to confirm that signatures of the ERP are enriched in the clinical transcriptional signatures.

Given a validated ERP, it can be leveraged to identify other cellular processes that may be involved in the disease. For example, a machine learning model is trained on an ERP such that the model can distinguish between phenotypic traces of the disease. Therefore, if modulating a particular cellular process induces the cell to exhibit phenotypic traces of the disease (even without use of the perturbagen), then the cellular process is also likely to be involved in the disease. Thus, the cellular process can be targeted for modulation which can slow, halt, or even reverse the disease progression. For example, if presence of a genetic variant induces a cell to exhibit phenotypic traces of the disease (as recognized by the machine learning model trained on the ERP), then the genetic variant can be identified as a possible biological target for treating the disease.

In various embodiments, an ERP comprises phenotypic assay data captured from various cells that were perturbed using a particular perturbation. In various embodiments, the particular perturbation refers to a perturbation that induces the cell into a state of disease relevant for the clinical endpoint of interest. In this state of disease, a cell can exhibit a diseased cellular phenotype.

In various embodiments, a perturbagen plays a role in the disease, and therefore, the phenotypic traces of disease induced by the perturbagen can be informative as an anchor phenotype for a particular clinical endpoint. For example, for a clinical endpoint of fibrosis progression, a TGFβ perturbagen may play a role in inducing the diseased state of fibrosis. Thus, the anchor phenotype is represented by the phenotypic traces of disease resulting from exposure of a cell to TGFβ. In various embodiments, the anchor phenotype serves as a positive control for developing additional ERPs corresponding to other perturbagens.

In various embodiments, the cells are of different genetic backgrounds. For example, the cells correspond to different cellular avatars and therefore, the differing genetic backgrounds of the cells may contribute towards their different cellular phenotypes. In various embodiments, the ERP includes phenotypic assay data derived from different cells that are perturbed using various concentrations of the perturbation. A concentration of the perturbation can be, e.g., any of 0.1 ng/mL, 0.2 ng/ml, 0.3 ng/ml, 0.4 ng/ml, 0.5 ng/ml, 0.6 ng/mL, 0.7 ng/ml, 0.8 ng/mL, 0.9 ng/mL, 1 ng/mL, 2 ng/mL, 3 ng/mL, 4 ng/ml, 5 ng/ml, 6 ng/mL, 7 ng/mL, 8 ng/mL, 9 ng/mL, 10 ng/mL, 15 ng/mL, 20 ng/mL, 25 ng/ml, 30 ng/mL, 35 ng/mL, 40 ng/mL, 45 ng/mL, 50 ng/mL, 60 ng/mL, 70 ng/mL, 75 ng/ml, 80 ng/ml, 90 ng/mL, 100 ng/mL, 150 ng/mL, 200 ng/mL, 250 ng/ml, 300 ng/ml, 350 ng/mL, 400 ng/mL, 450 ng/mL, 500 ng/mL, 600 ng/mL, 700 ng/mL, 800 ng/mL, 900 ng/mL, 1 g/mL, 2 μg/mL, 3 μg/mL, 4 μg/mL, 5 μg/mL, 6 μg/mL, 7 g/mL, 8 μg/mL, 9 μg/mL, 10 μg/mL, 15 μg/mL, 20 μg/mL, 30 μg/mL, 40 μg/mL, 50 μg/mL, 60 μg/mL, 70 μg/mL, 80 μg/mL, 90 μg/mL, 100 μg/mL, 150 μg/mL, 200 μg/mL, 250 μg/mL, 300 μg/mL, 350 μg/mL, 400 μg/mL, 450 μg/mL, 500 μg/mL, 550 μg/mL, 600 μg/mL, 700 μg/mL, 800 μg/mL, 900 μg/mL, or 1 mg/mL. In particular embodiments, the concentration of the perturbation is 0.1 ng/ml. In particular embodiments, the concentration of the perturbation is 5 ng/mL. In particular embodiments, the concentration of the perturbation is 10 ng/mL.

In particular embodiments, an ERP contains vast amount of phenotypic assay data derived from cells of different genetic backgrounds that have been treated using different concentrations of a perturbation. Altogether, a machine learning model trained using training data of an ERP can distinguish cellular phenotypic differences arising from different combinations of at least 1) different genetic backgrounds and 2) different concentrations of the perturbation. In other words, the machine learning model learns patterns in the phenotypic assay that arise from combinations of different genetics of the cells and different concentrations of the perturbation. In various embodiments, a machine learning model is trained using training data across multiple ERPs. Thus, such a machine learning model can distinguish cellular phenotypic differences arising from at least 1) different genetic backgrounds and 2) different concentrations of different perturbations.

As a specific example, given the clinical endpoint of NASH fibrosis progression, an ERP can be generated by generating phenotypic assay data from cells that have been exposed to TGFβ, which is a perturbation that causes hepatic stellate cell (HSC) activation. Here, different concentrations of TGFβ can induce the cells to exhibit different cellular phenotypes. Thus, an ERP for TGFβ includes phenotypic assay data captured from the cells (e.g., different cell morphologies captured through images or different cell transcriptional profiles captured through scRNA-seq). Thus, a machine learning model trained on an ERP for TGFβ can generate predictions or embeddings that distinguish between cellular phenotypes that are evident in the phenotypic assay data. Such a machine learning model can differentiate between cells of a diseased state (e.g., diseased state of fibrosis progression as evidenced by HSC activation due to TGFβ treatment) and cells of a healthier state (e.g., healthy state corresponding to non TGFβ treated cells). Here, predictions or embeddings of the machine learning model can be used to visually identify patterns in the phenotypic assay data. For example, the embeddings can be useful for identifying therapeutics that revert a cell from a diseased state (located at a particular position in the embedding) towards a less diseased state (located at a different position in the embedding)

Training Machine Learning Models for Generation of Cellular Disease Models

Generally, a machine learning model, such as machine learning model 140 described above in reference to FIG. 1A, is trained to generate predictions that are used when deploying the cellular disease model. In various embodiments, the machine learning model is any one of a regression model (e.g., linear regression, logistic regression, or polynomial regression), decision tree, random forest, support vector machine, Naïve Bayes model, k-means cluster, or neural network (e.g., feed-forward networks, convolutional neural networks (CNN), deep neural networks (DNN), autoencoder neural networks, generative adversarial networks, or recurrent networks (e.g., long short-term memory networks (LSTM), bi-directional recurrent networks, deep bi-directional recurrent networks).

The machine learning model can be trained using a machine learning implemented method, such as any one of a linear regression algorithm, logistic regression algorithm, decision tree algorithm, support vector machine classification, Naïve Bayes classification, K-Nearest Neighbor classification, random forest algorithm, deep learning algorithm, gradient boosting algorithm, and dimensionality reduction techniques such as manifold learning, principal component analysis, factor analysis, autoencoder regularization, and independent component analysis, or combinations thereof. In various embodiments, the machine learning model is trained using supervised learning algorithms, unsupervised learning algorithms, semi-supervised learning algorithms (e.g., partial supervision), weak supervision, transfer, multi-task learning, or any combination thereof.

In various embodiments, the machine learning model has one or more parameters, such as hyperparameters or model parameters. Hyperparameters are generally established prior to training. Examples of hyperparameters include the learning rate, depth or leaves of a decision tree, number of hidden layers in a deep neural network, number of clusters in a k-means cluster, penalty in a regression model, and a regularization parameter associated with a cost function. Model parameters are generally adjusted during training. Examples of model parameters include weights associated with nodes in layers of neural network, support vectors in a support vector machine, and coefficients in a regression model. The model parameters of the machine learning model are trained (e.g., adjusted) using the training data to improve the predictive power of the machine learning model.

In various embodiments, the machine learning model is trained using training data across one or more exposure response phenotypes (ERPs) that have been developed for a clinical endpoint. As described in further detail herein, ERPs are specific for individual perturbations (e.g., exposure) and therefore, serve as proxy labels of health and disease in an in vitro model of the clinical endpoint of interest. In various embodiments, an ERP can comprise phenotypic assay data from cells expressing an anchor phenotype, which is a cellular phenotype including validated phenotypic traces of disease that were induced by exposing a cell to a particular perturbation. For example, for a clinical endpoint of fibrosis progression, a TGFβ perturbagen induces the diseased state of fibrosis. Thus, the anchor phenotype is represented by the phenotypic traces of disease resulting from exposure of a cell to TGFβ.

In various embodiments, the machine learning model is trained using training data across at least one, at least two, at least three, at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty ERPs. In particular embodiments, the machine learning model is trained using training data across five ERPs (and hence, five different exposures). In particular embodiments, the machine learning model is trained using training data across ten ERPs (and hence, ten different exposures). In particular embodiments, the machine learning model is trained using training data across twenty ERPs (and hence, twenty different exposures). In particular embodiments, the machine learning model is trained using training data across fifty ERPs (and hence, fifty different exposures). In particular embodiments, the machine learning model is trained using training data across one hundred ERPs (and hence, one hundred different exposures).

In various embodiments, the phenotypic assay data is provided as input to the machine learning model. For example, in an embodiment where the machine learning model is a neural network, the phenotypic assay data can be provided as input to the neural network, which then identifies features of the phenotypic assay data that are most relevant for distinguishing clinical phenotypes. In various embodiments, the types of phenotypic assay data serve as features for the machine learning model. Thus, the features for the machine learning model can include cell sequencing data, protein expression data, gene expression data, image data (e.g., high-resolution microscopy data or immunohistochemistry data), cell metabolic data, cell morphology data, or cell interaction data. In various embodiments, the machine learning model can include additional features. For example, additional features can include one or more perturbants provided to the cell (e.g., an agent or environmental condition). Further additional features can include clinical data (e.g., clinical history, age, lifestyle factors, etc.) from one or more subjects (e.g., subjects from whom the cells were obtained from), or subjects having genetic backgrounds or clinical histories similar to those subjects from whom the cells were obtained.

In various embodiments, the phenotypic assay data is processed prior to being provided as input to the machine learning model. In one embodiment, the phenotypic assay is an image and can be prepared for the machine learning model. For example, the image can be sectioned into tiles and/or elements in the images can be labeled (e.g., labeled cell types, labeled boundaries of cells, etc.) prior to inputting into the machine learning model. In some embodiments, the phenotypic assay data can be encoded into a numerical representation (e.g., a numerical vector) that is then provided as input to the machine learning model. In various embodiments, a numerical vector includes values for features such that machine learning model can be trained according to the values for the features in the numerical vector. In various embodiments, encoding the phenotypic assay data into the numerical representation involves any one of organizing, normalizing, transforming (e.g., applying a logarithmic function), or combining phenotypic assay data into a numerical vector.

In various embodiments, the training data used to train the machine learning model includes the genetics of the cells that the phenotypic assay data was derived from (e.g., gene edits to align the cells with the genetic architecture of disease 115 at step 250). In various embodiments, the training data includes identifications of perturbations and/or modifications that were performed on the cells that the phenotypic assay data was derived from (e.g., performed modifications to modify the cellular cohort at step 255). In particular embodiments, the training data used to train the machine learning model includes each of the genetics of the cells, the perturbations and/or modifications performed on the cells, and the phenotypic assay data collected from the cells.

An example of an input vector in these embodiments is as follows:

$$[\text{Input vector}] = \begin{bmatrix} \text{Genetics} \\ \text{Perturbation} \\ \text{Phenotypic Assay Data} \end{bmatrix}$$

In one embodiment, the model parameters of the machine learning model are trained using supervised learning. As an example, model parameters of the machine learning model can be adjusted to minimize an error representing the difference between a prediction of the machine learning model and a reference ground truth of the training data.

In various embodiments, the reference ground truth of the training data can be represented by known outcomes obtained from a human outcome dataset. The human outcome dataset may include a label for each patient that serves as the reference ground truth. For example, for each patient identified in the human outcome dataset, the patient can be identified as healthy or having the disease. In various embodiments, the patient can be assigned a binary value differentiating between healthy and diseased (e.g., 0=healthy, 1=disease). In some embodiments, the human outcome dataset may identify a disease status of the patient as a continuous value (e.g., between 0 and 1). The continuous value may represent a level of disease such as a severity of the disease or a likelihood of developing the disease. In various embodiments, the reference ground truth of the training data can be derived from diseased patients, such as individuals 210 described above in reference to FIG. 2B. For example, individuals 210 can be healthy or clinically diagnosed as having the disease and the reference ground truth reflects the healthy/diseased state of the individual 210.

In various embodiments, the reference ground truth can be a continuous value representing a level of risk for developing the disease based on a genetic risk. For example, the genetic risk can be a polygenic risk score for a disease that is dependent on the presence or absence of high risk variants that are associated with the disease. In various embodiments, the high risk variants are highly penetrant variants.

In one embodiment, the machine learning model is trained through alignment of generated data with validated training data, such as reference ground truth data. For example, this approach can be used when each cellular avatar represents a human for whom one or more clinical phenotypes (e.g., reference ground truths) are available. Here, the machine learning model can be trained using any standard ML implemented method. In various embodiments, each training example is a set of ($\lambda_i$, $y_i$) pairs, where $x_i$ is a vector incorporating at least information corresponding to a cellular avatar (e.g., genetics of the cellular avatar, perturbations applied, captured phenotypic assay data from a cell of the cellular avatar), and y is a vector characterizing the reference ground truth (e.g., a clinical phenotype).

In one embodiment, the machine learning model is trained using genetically defined risk as a reference ground truth. Here, the genetically defined risk from a gene sequence (risk (g)) can be correlated with disease burden, which is measured from the underlying genetics. Disease burden can represent any one of disease risk, disease severity, rate or disease progression, age of onset, and more. The quantification of risk can be based on multiple alleles with small effects (e.g., a polygenic risk score), a small number of alleles with large effects (e.g., one or more Mendelian disease variants), or any combination thereof. In this case, a machine learning model can be trained using any standard ML implemented method. In various embodiments, each training example is a set of ($x_i$, $y_i$) pairs, w where $x_i$ is a vector incorporating at least information corresponding to a cellular avatar (e.g., genetics of the cellular avatar, perturbations applied, captured phenotypic assay data from a cell of the cellular avatar), and y is a vector characterizing the reference ground truth, which is the risk for each cellular avatar a (e.g., risk ($g_{\{a_i\}}$)). In some embodiments, risk ($g_{\{a_i\}}$) is a scalar value defining a single risk factor. In other embodiments, risk ($g_{\{a_i\}}$) is a vector that defines the risks for multiple related phenotypes.

In one embodiment, the machine learning model is trained using a cellular phenotype that is causal for a clinical phenotype, also referred to as a "cellular outcome marker." Examples of cellular outcome markers include neuronal cell death in the context of neurodegenerative diseases, collagen accumulation in the context of fibrotic diseases, and arrhythmias in the context of cardiac disease. The machine learning model can be trained using any standard ML implemented method. In various embodiments, each training example is a set of ($x_i$, $y_i$) pairs, w where $x_i$ is a vector incorporating at least information corresponding to a cellular avatar (e.g., genetics of the cellular avatar, perturbations applied, captured phenotypic assay data from a cell of the cellular avatar), and y is a vector characterizing the reference ground truth, which is the cellular outcome marker for each cellular avatar a (e.g., marker$_{\{a_i\}}$). Here, the information in $x_i$ cannot include marker$_{\{a_i\}}$ as the machine learning model would be trained to recognize the direct correlation between those values. For example, in the context of neuronal cell death, the phenotypic assay data in $x_i$ cannot include phenotypic assay data representing neuronal cell death. In various embodiments, the phenotypic assay data can be captured from the neuron at a time that precedes eventual cell death. In some embodiments, the phenotypic assay data is considerably more detailed than marker$_{\{a_i\}}$, which enables the identification of additional disease-relevant structures.

In one embodiment, the machine learning model may be trained to predict for a clinical phenotype represented by a stage of disease progression. A machine learning model that can predict in vivo stage of disease progression can be useful for purposes such as determining when to provide an intervention and when such interventions are preventative and when such interventions are curative. For example, a state of disease progression that is detectable in vitro may (1) be predictable based on knowledge of precursor conditions, or (2) may provide intervention possibilities before full disease onset (i.e., preventative interventions). Furthermore, understanding any unique biomarkers associated with the precursor conditions of (1), or associated with the in vitro-detectable cellular phenotypes of (2), may enable stronger insights into a broader range of possibilities for impacting the disease or making predictions about other clinical outcomes.

In some embodiments, each stage of in vitro development of a cell is assigned a correspondence value to a different stage of disease progression in vivo. The machine learning model analyzes the phenotypic assay data and maps the correspondence value of disease progression in the in vitro cell to disease progression measured in vivo. The measured in vivo disease progression data may derive from either (1) front end model inputs e.g., clinical subject data used as input data to the machine learning model, or (2) model application to screening data, e.g., candidate subject data provided to the cellular model of disease for screening and making predictions of clinical outcomes. Thus, these mappings between the in vitro phenotypic assay data and the in vivo disease progression stages can inform the subsequent screens performed by applying the cellular disease model.

In preferred embodiments, the machine learning is a deep learning neural network that can classify phenotypic assay data, such as high-dimensional images (e.g., fluorescent images or immunohistochemistry images), based on the clinical outcomes such as the presence or absence of disease. To train the deep learning neural network, each of the high-dimensional images are labeled with a clinical phenotype (e.g., healthy or diseased) and the deep learning neural network is trained to improve its clinical phenotype prediction. In various embodiments, a loss function is employed, the loss representing a penalty that is the difference between the prediction of the deep learning neural network and the clinical phenotype label of each image. Therefore, the loss can be back-propagated and the weights and biases of the neural network are adjusted to minimize the loss. In various embodiments, the deep learning neural network can incorporate any of the leading deep learning platforms such as TensorFlow, Keras, Pytorch, Torch, Theano and Caffe. Therefore, the trained machine learning model includes a relationship that aligns the high-dimensional data of the phenotypic assay data (e.g., an image) to the lower dimensional output (e.g., predicted clinical phenotype).

Altogether, the machine learning model can differentiate clinical phenotypes (e.g., healthy v. diseased) based on the cellular phenotypes that are observable in the images. As one example, the images may be fluorescent images such as where different cellular components are distinguishable. In one embodiment, the neural network can identify signatures of the disease, such as the disease-relevant cellular components that are involved in the disease. In one embodiment, the neural network can reveal underlying genetic changes that were introduced that are associated with the expression of disease-relevant cellular phenotypes. For example, the neural network can reveal that a disease-relevant cellular phenotype is evident across images in which the imaged cells were modified with a particular genetic change. Therefore, the genetic change itself may be a signature of the disease expression that can be subsequently targeted (e.g., using a genetic intervention) for treatment of the disease.

Reference is made to FIG. 3A, which depicts example training data for training a machine learning model to generate a cellular disease model, in accordance with an embodiment. In this particular embodiment, the training data represents training data of a cellular avatar, which is characterized by each of the genetics of a cell, perturbants applied to the cell, and the phenotypic assay data captured from the cell. As shown in FIG. 3A, each row includes a training example corresponding to a cell (e.g., cell 1, cell 2, cell 3, cell 4, and so on). Each cell has a corresponding genetics that aligns with a genetic architecture of disease e.g., with causal elements 1, causal elements 2, causal elements 3, and causal elements 4. Additionally, example perturbants applied to the different cells include hypoxic conditions, free fatty acids, lipids, and a therapeutic. Example phenotypic assay data included in the training data of FIG. 3A include microscopy data, as denoted by Image 1, Image 2, Image 3, and Image 4. Furthermore, the training data for each cell includes a reference ground truth (e.g., clinical phenotype) that indicates whether the cell derives from a subject that is diseased (e.g., indicated as binary value of "1") or from a healthy subject (e.g., indicated as binary value of "0"). The ground truth can be a previously determined clinical phenotype associated with the cell of the training example. An example of a clinical phenotype can be clinical phenotype 212 for an individual 210 (see FIG. 2B) for whom the cell is representative of. The training data of a cell (e.g., training data in a row of FIG. 3A) or an encoded numerical representation of the training data of a cell can be provided as input to the machine learning model to adjust the parameters of the machine learning model. Therefore, across multiple iterations (e.g., across the multiple training data in rows of FIG. 3A), the machine learning model is trained to more accurately output a predicted clinical phenotype, such as a prediction of the presence or absence of disease.

In various embodiments, the quality of the predictions of the machine learning model can be used to further identify experimental parameters, such that more training data focused on those experimental parameters can be generated to further train the machine learning model. Examples of experimental parameters include cell type, environmental conditions, cell culture conditions (e.g., 2D v. 3D culture, concentration of oxygen and/or carbon dioxide), differentiation cell protocol (e.g., days to maturation, seeding density, days to change media). Thus, additional training data focused on these identified experimental parameters can be generated to further train the machine learning model to increase the predictive power of the machine learning model.

In various embodiments, different machine learning models can be generated, each cellular disease model being of a particular class. A particular class of a machine learning model can refer to a particular cell type, an environmental mimic used to promote the diseased state, particular types of measurements that are taken (e.g., which channels are measured via microscopy), particular time points at which phenotypic assay data are captured, a type of machine learning model, and key hyperparameters that characterize the machine learning model (e.g., number of layers in the neural network, dropout rate, types of specific units, etc.). For example, a first class of machine learning models can be used to analyze data of cellular avatars that correspond to hepatocytes whereas a second class of machine learning models can be used to analyze data of cellular avatars that correspond to neurons. By implementing different classes of machine learning models, models of each class can more accurately perform screens when analyzing data pertaining to that class.

In some embodiments, different machine learning models can have overlapping components. This is useful when machine learning models are implemented to assess safety or toxicity, which leverages a broad scope of data across different classes. In some embodiments, different machine learning models can be combined (e.g., models involving different cell types, conditions, phenotyping assays) with the goal of making predictions for a single disease indication.

Flow Process for Training a Machine Learning Model

Figure 3B:
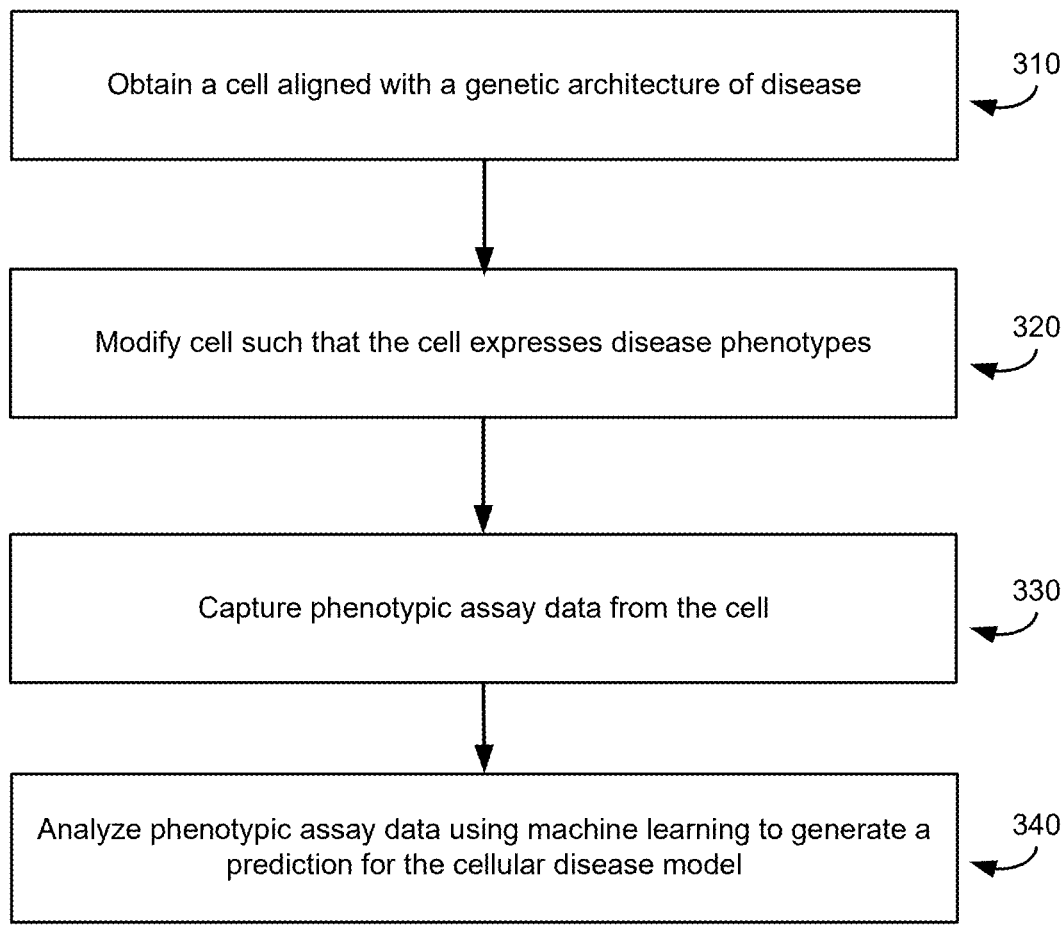
FIG. 3B depicts a flow diagram for training a machine learning model, in accordance with an embodiment.

Reference is made to FIG. 3B, which depicts a flow diagram for training a machine learning model, in accordance with an embodiment. Step 310 involves obtaining a cell associated with a disease. In various embodiments, the cell can be derived from an iPSC and is aligned with a genetic architecture of disease, as is described above. Step 320 involves modifying the cell such that the cell expresses diseased cellular phenotypes. In various embodiments, modifying the population of cells involves exposing the cell to an agent or environmental condition. Step 330 involves capturing phenotypic assay data from the cell. Step 340 involves analyzing the phenotypic assay data to generate a prediction (e.g., a prediction of the machine learning model) that can be subsequently used for the cellular disease model.

Example Predictions of the Machine Learning Model

Generally, the predictions of the machine learning model involve predictions of clinical phenotypes based on at least cellular phenotypic assay data. As described above in FIG. 1B, the predictions serve as a part of the cellular disease model and therefore, are employed when the cellular disease model is deployed to perform a screen, such as a therapeutic validation screen.

In various embodiments, the predictions of the machine learning model may suggest previously unrealized features of the disease, such as genetic associations for certain manifestations of the disease, a biological target implicated in a clinical phenotype of the disease, or an intervention that can be therapeutically effective against the disease. Such an intervention can be subsequently validated by implementing the cellular disease model. For example, to identify previously unrealized features of the disease, the machine learning model can be analyzed to determine what disease features were important in distinguishing between different clinical phenotypes (e.g., healthy v. diseased phenotype). In other words, the features that the machine learning model focused its "attention" on can, in some circumstances, be important features of the disease. These features of the disease can be useful for identifying possible interventions. For example, interventions selected for screening can be interventions that modulate genes or proteins that are in the same pathways as those important features of the disease identified by the machine learning model.

In particular embodiments, the prediction of the machine learning model is represented as embeddings on a phenotypic manifold. Here, the embeddings include arrangements of clinical phenotype predictions organized in a low dimensional space that is reduced from the high-dimensional space of the phenotypic assay data. The organization of the clinical phenotype predictions are, in some scenarios, predictive of patient cohorts or biomarkers detected in groups of phenotypic assays. For example, clinical phenotype predictions that are more similar to one another (e.g., the underlying phenotypic assay data is more similar to one another) are located proximal to one another. In contrast, dissimilar clinical phenotype predictions are located more distal to one another. Therefore, an investigation of phenotypic assay data corresponding to proximally located clinical phenotype predictions can reveal common phenotypic features that resulted in those similar clinical phenotype predictions.

In various embodiments, the embeddings are useful for identifying a therapeutic that may be useful for treating a disease. For example, treating cells using the therapeutic may result in their location in the manifold embeddings that is closer in proximity to healthy clusters. In other words, untreated cells may be located at a first location within the phenotypic manifold that is indicative of a diseased state. Following treatment using the therapeutic, the cellular phenotype is pushed towards a different location in the manifold that is indicative of a less diseased state. Thus, the therapeutic can be selected, given that it is predicted to impact the cellular phenotype by causing the cell to change its cellular phenotype towards a less diseased state.

Figure 3C:
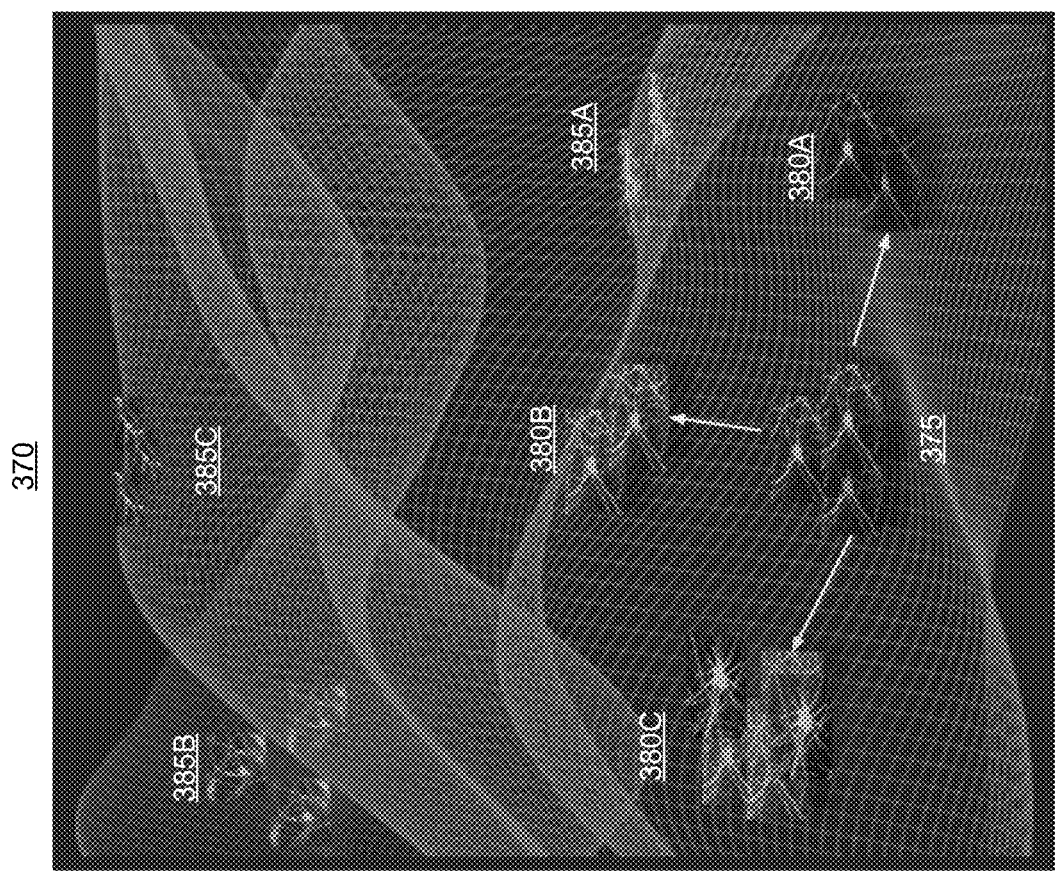
FIGS. 3C and 3D each depict example predictions embodied in the form of embeddings, in accordance with an embodiment.
Figure 3D:
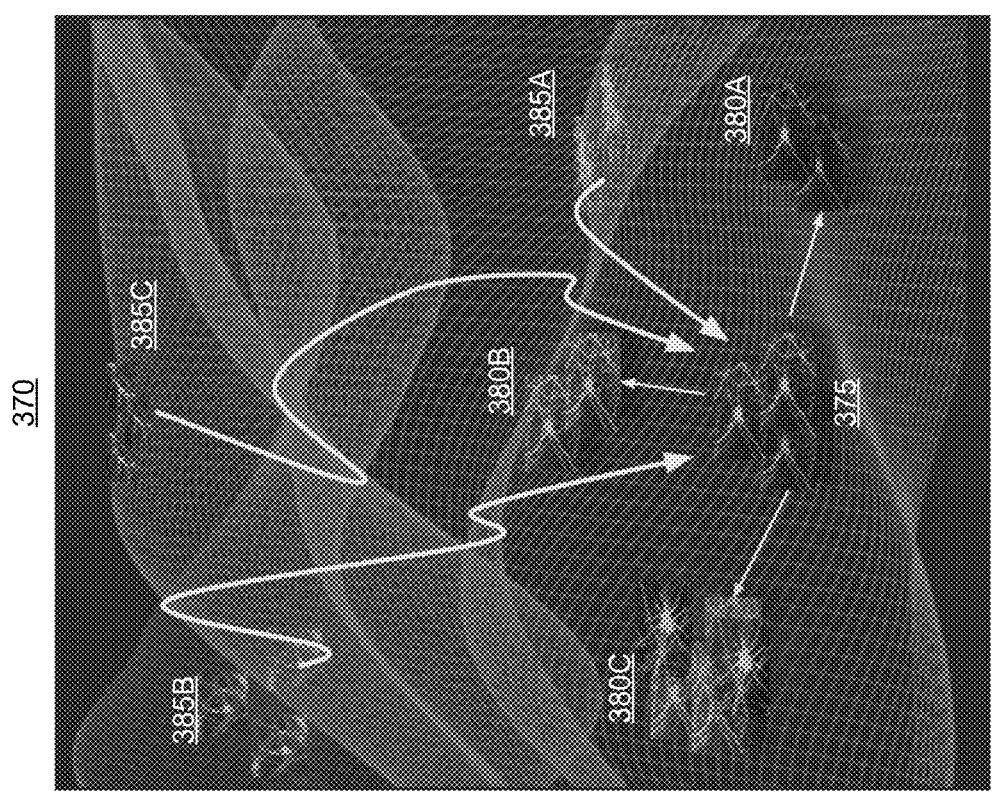

FIGS. 3C and 3D each depict example predictions embodied in the form of embeddings on a phenotypic manifold 370, in accordance with an embodiment. On the phenotypic manifold, predictions are organized according to their similarities (e.g., clusters of similar data are organized closer together in the phenotypic manifold). For example, FIG. 3C depicts different clusters of predictions according to recognized similarities in their corresponding phenotypic assay data. Cluster 375 may be a cluster of predictions corresponding to healthy phenotype expressing cells, whereas clusters 380A, 380B, and 380C refer to predictions corresponding to healthy cells that were exposed to a modification or perturbation that then caused phenotypic differences. Thus, the machine learning model can tease out these phenotypic differences between the clusters 380A, 380B, and 380C, and organize them separately in the phenotypic manifold. Additionally, clusters 385A, 385B, and 385C may represent diseased cells that exhibit diseased phenotypic traces.

As shown in FIG. 3C, the clusters 380A, 380B, and 380C are located proximal to the cluster 375 representing healthy cells due to phenotypic similarities shared between the healthy cells of cluster 375 and cells of clusters 380A, 380B, and 380C. The diseased clusters 385A, 385B, and 385C are located further on the phenotypic manifold from the healthy cluster 375 due to more phenotypic differences between the cells of the healthy cluster 375 and the diseased cells of the diseased cluster 385A, 385B, and 385C.

The organization of the predictions enables the identification of particular targets (e.g., gene targets, biologic targets) or biomarkers that, if effectively targeted, can cause phenotypic changes that indicate the transition of the cell from one state to another state. Referring to FIG. 3D, the organization of the predictions enables identification of targets that, once modulated, can revert a diseased cell back to a healthy cell. More specifically, the diseased cells of the diseased clusters 385A, 385B, and 385C that express phenotypic traces of disease can revert back to expressing healthy or healthier phenotypic qualities observed in cells of the healthy cluster 375. In various embodiments, modulation of identified targets slows or halt progression of the disease in diseased clusters 385A, 385B, and 385C rather than reverting them to a healthy cluster 375.

In various embodiments, targets can be identified from the phenotypic manifold based on phenotypic features that the machine learning model has used to distinguish healthy cells from diseased cells. For example, features that are important for distinguishing healthy cells and diseased cells may have been assigned large weights by the machine learning model. In some embodiments, the phenotypic assay data corresponding to each of the clusters in the phenotypic manifold can be analyzed for phenotypic features that differentiate between healthy cells and diseased cells. To provide a specific example, in the context of NASH, the machine learning model identifies the location of lipid droplets relative to the cell nucleus as an important phenotypic feature. Cells with a high concentration of lipid droplets located proximal to the cell nucleus are classified as diseased cells, whereas cells with a low or no concentration of lipid droplets located proximal to the cell nucleus are classified as non-diseased cells. Therefore, lipid droplets near cell nuclei can be a target for reverting NASH diseased cells back to a healthy state or interrupting disease progression.

In various embodiments, the targets or biomarkers identified through the predictions can be subsequently targeted when performing in vitro screens of cells. Put more generally, the predictions can be used to guide the in vitro screening process.

Evaluating the Machine Learning Model

In various embodiments, the trained machine learning model can be evaluated for its ability to predict clinical phenotypes. Evaluating the machine learning model ensures that the machine learning model exhibits sufficient predictive power such that when the cellular disease model is deployed for performing screens, the results of the screens are accurate.

In various embodiments, evaluating the machine learning model involves validating the ability of the machine learning model to accurately predict clinical phenotypes on the test cohort. The test cohort can be a cohort that the machine learning model was not previously exposed to. For example, the test cohort may be a previously held out portion. Additionally, the test cohort can include known clinical phenotypes such that the predictions of the machine learning model can be evaluated against the known clinical phenotypes of the test cohort.

In various embodiments, the test cohort can involve cells derived from or obtained from individuals for whom their clinical phenotypes are known. For example, such cells can be iPSCs derived from cells obtained from genetically diverse individuals. In various embodiments, the test cohort can involve cells derived from or obtained from individuals that have been treated with an intervention (e.g., from a clinical trial). Here, the clinical phenotypes of the individuals in response to the intervention are known.

In various embodiments, the machine learning model is evaluated by comparing the predictions of clinical phenotypes outputted by the machine learning model to the known clinical phenotypes of the test cohort. In various embodiments, the predictive power of the machine learning model can be determined using a scoring function that calculates a validation metric across all the comparisons of the predicted clinical phenotypes and the known clinical phenotypes. Such a validation metric can represent a measure of the quality of the machine learning model.

In one embodiment, the machine learning model can be evaluated through multiple rounds of cross-validation. For example, samples in the test cohort can be divided into partitions and the machine learning model is evaluated for its ability to predict clinical phenotypes for individual partitions. The results of each partition can then be combined (e.g., averaged) to obtain a measure of the machine learning model's predictive power. The use of cross-validation enables a more rigorous statistical validation of the machine learning model's predictive power.

In various embodiments, experimental and/or computational aspects of the cellular disease model can be optimized according to the cellular disease model's ability to predict clinical phenotypes of the test cohort. This represents a joint optimization process of identifying key experimental and/or computational aspects that can be used to develop more predictive machine learning models. More specifically, the identification of key experimental and computational aspects enables the generation of additional training data (e.g., phenotypic assay data) according to the key experimental aspects and the training of additional machine learning models using the key computational aspects. Therefore, these additional machine learning models exhibit even further improved predictive power for predicting clinical phenotypes.

Experimental aspects refer to experimental parameters of the cellular disease model that were used to generate training data for training the machine learning model. Examples of experimental aspects include cell types used to generate training data used for training the machine learning model, environmental mimics provided to cells, phenotypic assay setting (e.g., a particular fluorescent channel or microscopy setting e.g., brightness/contrast), time point in which phenotypic assay data was captured from, cell passage number during which experiments were conducted, in vitro cellular conditions used, and the like. Computational aspects refer to in silico characteristics for training the machine learning model, such as the parameters of the machine learning model or the hyperparameters (e.g., number of layers in the neural network, dropout rate, types of specific units, and the like) that are set prior to training the model.

In various embodiments, optimizing experimental and computational aspects of the cellular disease model includes selecting for the experimental and computational aspects that lead to well-performing machine learning models that can predict clinical phenotypes of the test cohort. A well-performing machine learning model can be identified based on a scoring function and/or a validation metric, which represents the quality of the machine learning model. For example, a machine learning model that is trained according to the selected experimental and computational aspects exhibits better predictive power when applied to the test cohort than the predictive power of a different machine learning model that is trained according to other experimental and computational aspects.

In various embodiments, the optimization of experimental and computational aspects of cellular disease models can be an iterative process to develop additionally improved cellular disease models. For example, as a first step, cellular disease models can be evaluated to determine a broad set of key experimental and computational aspects. Next, additional cellular disease models can be trained according to key computational aspects and using training data developed according to key experimental aspects. These additional cellular disease models can undergo evaluation again to select a narrower set of key experimental and computational aspects. Thus, further additional cellular disease models can be trained according to the narrower set of key experimental and computational aspects.

Embodiments for Deploying a Cellular Disease Model

Flow Process for Deploying a Cellular Model

Figure 4:
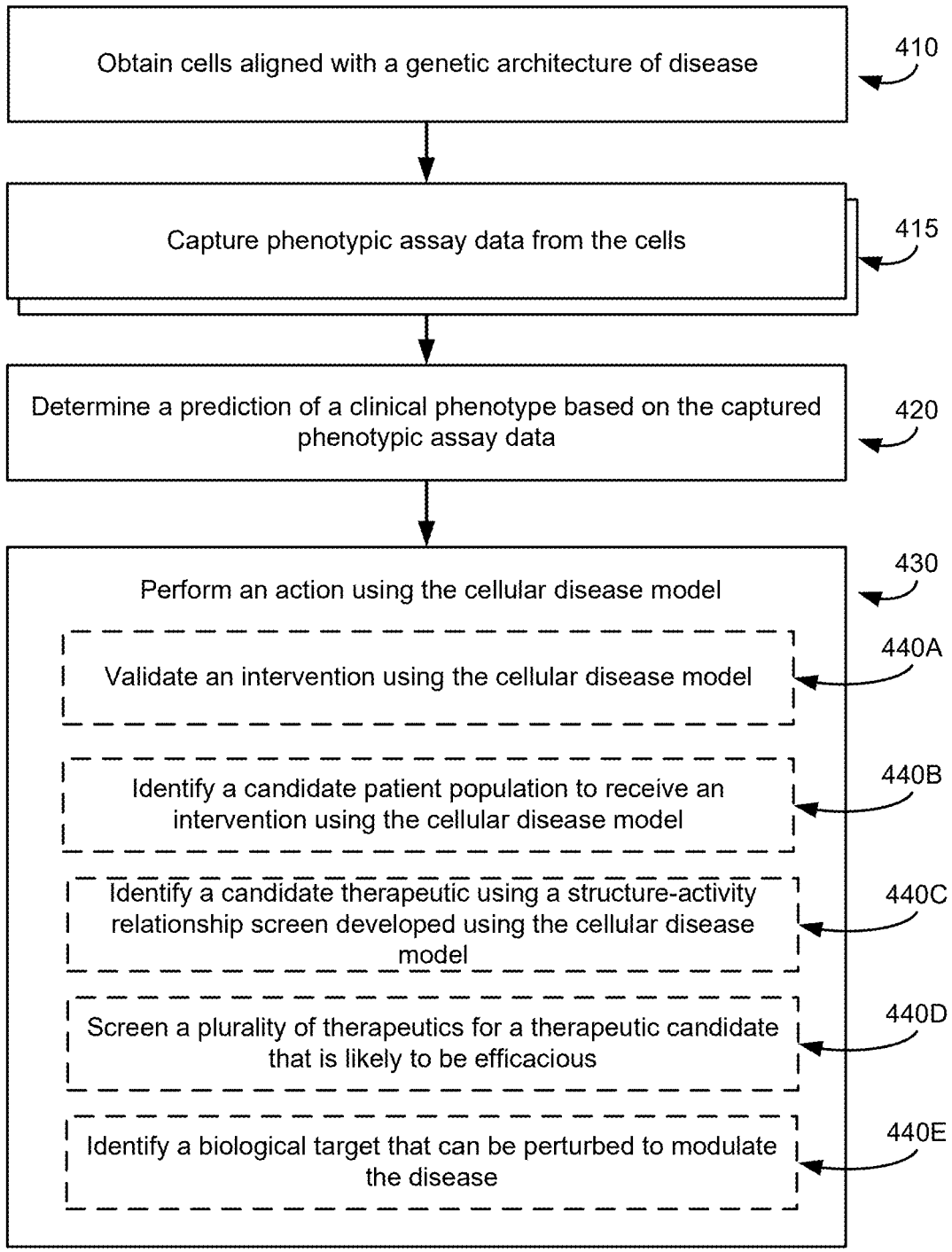
FIG. 4 depicts a flow diagram of the deployment of a cellular disease model, in accordance with several embodiments.

Reference is made to FIG. 4, which depicts a flow diagram for the deployment of a cellular disease model, in accordance with several embodiments. Step 410 involves obtaining cells aligned with a genetic architecture of disease. Obtaining cells aligned with a genetic architecture of disease can correspond to step 250 described above in reference to FIG. 2C. The cells can be iPSCs that have been genetically engineered to align with the genetic architecture of disease. In various embodiments, the cells correspond to cellular avatars that are representative of human individuals.

At step 415, phenotypic assay data is captured from the cells. In various embodiments, step 415 can be performed multiple times on the cells at different timepoints. For example, a first set of phenotypic assay data can be captured from the cells at a first timepoint, followed by capturing of a second set of phenotypic assay data from the cells at a second timepoint. In some embodiments, an intervention is provided to the cells between the first timepoint and the second timepoint. Thus, the difference between the phenotypic assay data captured from the first and second timepoints can represent the impact of the intervention. If the intervention is a therapeutic, then the difference between the phenotypic assay data of the two timepoints represents the impact of the therapeutic on the cellular phenotype. If the intervention is a disease-causing environmental perturbation, then the difference between the phenotypic assay data of the two timepoints represents the impact of the perturbation on the cellular phenotype.

At step 420 the phenotypic assay data is analyzed to determine a prediction of a clinical phenotype. In various embodiments, the phenotypic assay data is directly informative of the clinical phenotype. In various embodiments, a machine learning model, such as machine learning model 140 described above in FIG. 1A, is applied to the phenotypic assay data to predict the clinical phenotype.

Step 430 involves performing an action using the cellular disease model. As a first example, as shown at step 440A, the action can involve validating an intervention using the cellular disease model. As a second example, as shown at step 440B, the action can involve identifying a candidate patient population to receive a treatment using the cellular disease model. Here, the patient population can be classified as responders to the treatment. As a third example, as shown at step 440C, the action can involve optimizing or identifying a candidate therapeutic using a structure-activity molecule screen developed using the cellular disease model. As a fourth example, as shown at step 440D, the action can involve screening a plurality of therapeutics to identify a therapeutic candidate that is likely to be efficacious. As a fifth example, as shown at step 440E, the action can involve identifying a biological target (e.g., a gene) that can be perturbed to modulate the disease.

Although the flow diagram in FIG. 4 depicts each of the steps 410, 415, 420, and 430, in various embodiments, steps 410, 415, and 420 are steps included within step 430. In other words, the deployment of the cellular disease model can further include the steps of obtaining cells (e.g., step 410), capturing phenotypic assay data from the cells (e.g., step 415), and determining a prediction (e.g., step 420).

Validating an Intervention

Reference is made to FIG. 5A, which depicts a process flow diagram for validating an intervention using a cellular disease model 500, in accordance with an embodiment. In particular, FIG. 5A depicts, in further detail, the process described above in reference to FIG. 1B for deploying a cellular disease model.

The prediction 145 (which in various embodiments, utilizes embeddings) guides the selection of an intervention type for screening. In one embodiment, the prediction 145 guides the selection of an intervention that is predicted to revert a cell expressing a diseased phenotype into a cell expressing a less diseased (e.g., healthy) phenotype. For example in the context of NASH, the prediction guides the identification that a NASH-related phenotype involves the size and location of lipid globules. Thus, a successful intervention would be one that reverts that phenotype and returns the lipid droplets to a more diffuse state. This can be used to prioritize the selection of interventions for screening, such as genes or proteins that are in the same pathways as those identified as phenotypically relevant (e.g., those implicated in lipid droplet formation). To provide an example, the prediction may be an embedding location within a manifold generated by a machine learned model in which different embedding locations within the manifold correspond to different states (e.g., diseased state, less diseased state, healthy state, etc). Thus, if the cell is currently predicted to be in a diseased state, the embedding location can be used to identify a therapeutic that is predicted to push the cell from a diseased state location in the manifold to a less diseased state location or a healthy state location in the manifold. In one embodiment, the prediction 145 guides the selection of an intervention that is predicted to have a minimal or no adverse phenotypic impact in a healthy cell. In such embodiments, the prediction 145 guides the selection of a non-toxic intervention.

In various embodiments, the prediction 145 is used to select one or a range of cellular avatars for screening. For example, the prediction 145 may be specific for a range of cellular avatars, given that the machine learning model 140 that outputted the prediction 145 was trained on data obtained from cells that represented the cellular avatars. The range of cellular avatars may represent a spectrum of the disease (e.g., spectrum of healthy cells up to increasingly diseased cells). A cell (e.g., shown as cell 515A) for each of the previously engineered cellular avatars is generated in vitro. In various embodiments, cell 515A is a diseased cell and therefore, the validation of the intervention involves determining whether the intervention can revert a diseased phenotype of the diseased cell back to a healthier phenotype. In various embodiments, cell 515A is a healthy cell. Here, the validation of the intervention can involve determining toxicity of the intervention through evaluation of whether the intervention causes particular cellular phenotypes (e.g., non-healthy cellular phenotypes). The cell 515A shares the same genetics and is exposed to perturbants that define the cellular avatar. Although FIG. 5A depicts one cell 515A, which corresponds to a single cellular avatar, the subsequent description also applies to multiple cells 515A, thereby embodying a range of cellular avatars, which can represent a spectrum of the disease.

As shown in FIG. 5A, phenotypic assays are performed on the cell 515A to obtain phenotypic assay data 520A. Here, the phenotypic assay data 520A describes cellular phenotypes of the cell in a state (e.g., in a diseased or healthy state). The cell 515A is exposed to an intervention 508 to transform the cell 515A to treated cell 515B. Intervention 508 can be one or more therapeutics such as a small molecule drug, a biologic, a gene therapeutic (e.g., CRISPR) or any combination thereof. The intervention 508 may cause changes in the phenotype of the cell 515A. For example, as shown in FIG. 5A, the treated cell 515B may exhibit a different cellular shape in comparison to the cellular shape exhibited by the cell 515A. In some scenarios, the intervention may cause the cell 515A to revert to a healthy phenotype exhibited by the treated cell 515B or the intervention may halt or slow further progression of the disease in the cell 515A. In some scenarios, the intervention 508 may cause an adverse phenotypic outcome in the treated cell 515B, and which can be a measure of the toxicity of the intervention 508.

Phenotypic assays are performed on the treated cell 515B to obtain phenotypic assay data 520B. Here, the phenotypic assay data 520B captures phenotypes of the treated cell 515B that, in some scenarios, differ from the phenotypes of the cell 515A. The differences between the phenotypic assay data 520A and the phenotypic assay data from the treated cell 520B represent the measurable change of cellular phenotypes that is caused by the intervention 508.

In various embodiments, different concentrations of the intervention are provided to different populations of the cell 515A and phenotypic assays are performed on the corresponding populations of treated cell 515B. Therefore, the phenotypic assay data captured from the different populations of treated cells 515B represent phenotypes of the cells in response to a dose-dependent treatment of the intervention 508.

The phenotypic assay 520A and the phenotypic assay 520B are evaluated to determine clinical phenotypes 530A and 530B, respectively. For example, the clinical phenotype can refer to whether the phenotypic data indicates that the corresponding cells are diseased or healthy. In various embodiments, the phenotypic assay data from the cells 520A and phenotypic assay data from the treated cells 520B are directly indicative of the respective clinical phenotypes 530A and 530B. For example, in the context of NASH, the phenotypic assay data of the cells 520A and phenotypic assay data of the treated cells 520 including the presence of lipid globule output can be directly indicative of a clinical phenotype of the presence of NASH disease. In various embodiments, a machine learning model is applied to each of the phenotypic assay data from cells 520A and phenotypic assay data from treated cells 520B to determine the corresponding clinical phenotype 530A and 530B. As shown in FIG. 5A, the machine learning model is machine learning model 140 described above in reference to FIG. 1A. Machine learning model 140 can readily distinguish between phenotypic traces between cells (e.g., cell 515A) and other cells (e.g., treated cells 515B) and therefore, the application of machine learning model 140 results in the prediction of a clinical phenotype.

In various embodiments, the machine learning model receives, in addition to the phenotypic assay data as input, the genetics of the cells and any modifications/perturbations provided to the cells. For example, in the context of FIG. 5A, to determine clinical phenotype 530A, a machine learning model analyzes 1) phenotypic assay data 520A, 2) genetics of the cells, and 3) perturbations applied to the cells. To determine clinical phenotype 530B, a machine learning model analyzes 1) phenotypic assay data 520B, 2) genetics of the treated cells, and 3) perturbations applied to the treated cells.

The clinical phenotypes 530A and 530B are compared to determine an impact due to the intervention 560, which represents the effectiveness of the intervention. The impact due to the intervention 560 can be a predicted clinical impact of the intervention. In various embodiments, the comparison of the clinical phenotypes 530A and 530B involves determining a difference between the clinical phenotypes 530A and 530B to measure the impact of the intervention. For example, returning to the context of NASH, the difference in lipid globule output in the phenotypic assay data of the cells 520A and phenotypic assay data of the treated cells 520 is a measure of the impact due to intervention 560. In other words, the amount of reduction of lipid globule output in the treated cells as compared to the diseased cells is a measure of the effectiveness of the intervention. In some embodiments, both healthy cells and diseased cells are exposed to the intervention 508, to evaluate differential effects of the intervention, including any adverse phenotypic outcomes for healthy cells. After a healthy cell undergoes the steps depicted in FIG. 5A and described above, the additional resulting clinical phenotype can be evaluated along with clinical phenotype 530A and clinical phenotype 530B to help determine the impact due to intervention 560.

In various embodiments, the intervention is validated based on the impact due to the intervention 560. In one embodiment, if the impact due to the intervention 560 is above a threshold number, such as a threshold percentage difference in the predicted presence of disease, then the therapeutic is considered validated as an intervention for the disease. In various embodiments, the threshold number is 10%, 20%, 30%, 40%, 50%, 60%, 70%, 75%, 80%, 81%, 82%, 83%, 84%, 85%, 86%, 87%, 88%, 89%, 90%, 91%, 92%, 93%, 94%, 95%, 96%, 97%, 98%, 99%, or 100%. In various embodiments, the threshold number is between 50% and 100%, 50% and 90%, 50% and 80%, 50% and 70%, 50% and 60%, 60% and 100%, 60% and 90%, 60% and 80%, 60% and 70%, 70% and 100%, 70% and 90%, 70% and 80%, 80% and 100%, 80% and 90%, or 90% and 100%.

In various embodiments, the impact due to the intervention 560 (e.g., a predicted clinical impact of the intervention 560) can be generated for different concentrations of the intervention 508. In such embodiments, a dose-response curve can be generated which reflects the changing impact of the therapeutic on the predicted clinical phenotype as the concentration of the therapeutic is increased or decreased. Such a dose-response curve is useful for identifying optimal concentrations of the therapeutic for use in treating the disease.

In various embodiments, the impact due to the intervention 560 can be further used to validate the machine learning model 140. For example, the impact due to the intervention 560 may indicate that the intervention is highly effective, thereby aligning with the prediction 145. In such scenarios, the prediction 145 of the machine learning model 140 can be accepted with higher confidence. As another example, if the results of the in vitro screen shows that the intervention is non-effective (e.g., impact due to intervention 560 indicates that the intervention is non-effective), this may indicate that the prediction 145 of the machine learning model 140 is faulty and does a poor job of predicting an intervention. Therefore, the weights and biases behind the machine learning model 140 may be further tuned and/or undergo further retraining. As yet another example, the impact due to the intervention 560 is used to validate the machine learning model 140 based on interventions that are already understood to impart a known effect. For example, the intervention may be a successful drug known to revert a diseased cellular phenotype, but the prediction 145 of the machine learning model 140 fails to identify the successful drug as an intervention. Therefore, the weights and biases of the machine learning model 140 can be tuned and/or retrained accordingly, using a loss function or other model adjustment methods known in the art.

Figure 5B:
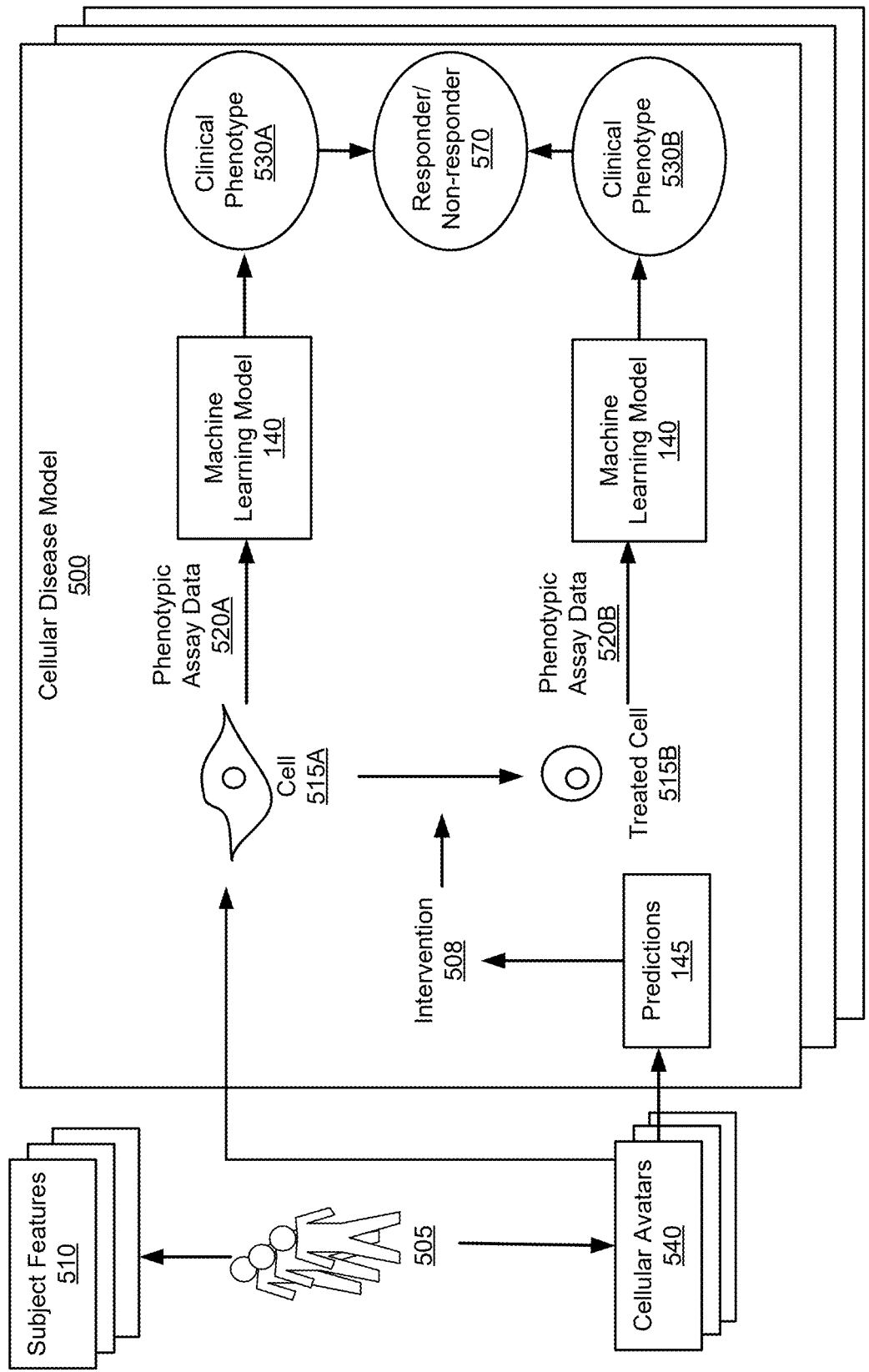

The above description referring to FIGS. 5A and 5B generally refers to validating an intervention 508, which can involve a therapeutic. In various embodiments, an intervention 508 includes multiple therapeutics (e.g., a gene therapy e.g., a CRISPR Cas9 gene editing tool, in combination with a drug therapeutic) such that the deployment of the cellular disease model is used to validate multiple therapies (e.g., combination therapies). For example, the deployment of the cellular disease model can reveal combinations of therapies that are synergistic (as evidenced by impacts due to therapeutics 560 that are larger in magnitude). Thus, the cellular disease model serves as a useful platform tool for identifying effective combination therapies.

Patient Segmentation and Screening

FIG. 5B depicts the deployment of the cellular disease model for segmenting patient populations as responders or non-responders, in accordance with an embodiment. In various embodiments, the patient segmentation enables the classification of subjects as responders or non-responders based on subject features that can be easily measurable in a clinical setting. A responder to an intervention refers to a subject who responds positively to the intervention (e.g., the intervention exhibits efficacy and/or limited to no toxicity). A non-responder to an intervention refers to a subject who does not respond positively to the intervention (e.g., the intervention exhibits limited to no efficacy and/or toxicity). Patient segmentation can be conducted on a set of subjects 505 (e.g., a single patient or a patient population). In various embodiments, the subjects 505 have not yet been clinically diagnosed with a disease. In these embodiments, the deployment of the cellular disease model can predict a likely presence or absence of a disease in the subjects 505. In other embodiments, the subjects 505 are clinically diagnosed with a disease. In these embodiments, the deployment of the cellular disease model can predict a likely progression of the disease in the subjects 505.

In various embodiments, subject features 510 data are collected for the subjects 505. Generally, subject features 510 represent patient characteristics that can be readily measured or obtained in a clinical setting. Subject features 510 can include, for example, medical history of the subject (e.g., clinical history, age, lifestyle factors) as well as the subject's gene products (e.g., mRNA, protein, or biomarker), mutated gene products (e.g., variant mRNA, variant protein, or variant biomarker), or expression or differential expression of one or more genes. In particular embodiments, the subject features 510 include biomarkers expressed by subjects 505 which can subsequently be used to screen patient populations. In various embodiments, the subject features 510 can be determined by obtaining test samples from the subjects 505 and performing assays on the test samples. Example assays include assays for cell sequencing data (as is described below in reference to phenotypic assays) which include nucleic acid sequencing (e.g., DNA or RNA-seq) as well as protein detection assays (e.g., ELISA).

A set of cellular avatars 540 are selected, the cellular avatars 540 representing the subjects 505. For example, each of the selected cellular avatars 540 correspond to a cell that has a genetic background that represents the genetic background of at least one of the subjects 505. In various embodiments, the cellular avatars 540 correspond to cells that were previously engineered and perturbed (e.g., cells 125 described in the in vitro cell engineering 120 process in FIG. 1A). Therefore, these cellular avatars 540 need not be derived from or generated anew for the subjects 505. Rather, in such embodiments, the cellular avatars 540 are selected as representing the subjects 505 based on having similar backgrounds, such as similar genetic backgrounds. In other embodiments, the cellular avatars 540 are newly generated for the subjects. To do so, referring to FIG. 1A, the in vitro cell engineering 120 process is performed using cells with a genetic background that align with the genetic backgrounds of the subjects 505 or using cells derived from the subjects 505.

The cellular disease model 500 is applied to each cellular avatar 540 to determine a likely effect of an intervention 508 for that cellular avatar 540. In other words, as shown in FIG. 5B, multiple applications of the cellular disease model 500 across the multiple cellular avatars 540 reveals whether each cellular avatar 540 is a responder or a non-responder to the intervention 508. In various embodiments, the application of the cellular disease model 500 to screen for responders or non-responders is the same process as the application of the cellular disease model 500 to validate an intervention, as described above in relation to FIG. 5A.

In various embodiments, each cellular avatar 540 corresponds to a prediction 145 of the machine learning model 140. Namely, the machine learning model 140, which outputted the prediction 145, was trained on phenotypic assay data captured from a cell corresponding to the cellular avatar 540. The prediction 145 guides the choice of the intervention. In one embodiment, the prediction 145 guides the selection of an intervention that is predicted to revert a cell expressing a diseased phenotype into a cell expressing a less diseased (e.g., healthy) phenotype. In one embodiment, the prediction 145 guides the selection of an intervention that is predicted to have a minimal or no adverse phenotypic impact in a healthy cell.

A cell (e.g., shown as cell 515A) is generated in vitro for the cellular avatar 540. In various embodiments, cell 515A is a diseased cell. In other embodiments, cell 515A is a healthy cell. The cell 515A shares the same genetics and is exposed to perturbants that define the cellular avatar 540. Phenotypic assays are performed on the cell 515A to obtain phenotypic assay data 520A. Here, the phenotypic assay data 520A describes cellular phenotypes of the cell in a diseased state. The cell 515A is exposed to an intervention 508 to transform the cell 515A to treated cell 515B. Phenotypic assays are performed on the treated cell 515B to obtain phenotypic assay data 520B. Here, the phenotypic assay data 520B captures phenotypes of the treated cell 515B that, in some scenarios, differ from the phenotypes of the cell 515A. The differences between the phenotypic assay data from cell 520A and the phenotypic assay data from the treated cell 520B represent the measurable change of cellular phenotypes that is caused by the intervention 508.

The phenotypic assay data from cell 520A and the phenotypic assay data from treated cells 520B are evaluated to determine clinical phenotypes 530A and 530B, respectively. In various embodiments, the phenotypic assay data 520A and phenotypic assay data 520B are directly indicative of the respective clinical phenotypes 530A and 530B. For example, in the context of NASH, the phenotypic assay data 520A and phenotypic assay data 520B can identify the presence of lipid globule output and are therefore directly indicative of a clinical phenotype of the presence of NASH disease.

In various embodiments, a machine learning model is applied to each of the phenotypic assay data 520A and phenotypic assay data 520B to determine the corresponding clinical phenotype 530A and 530B. In one embodiment, a classifier trained to distinguish between phenotypic assay data of cells and phenotypic assay data of treated cells is applied to determine corresponding clinical phenotypes. In one embodiment, the machine learning model is machine learning model 140 described above in reference to FIG. 1A. Machine learning model 140 can readily distinguish between phenotypic traces between cells (e.g., cell 515A) and other cells (e.g., treated cells 515B) and therefore, the application of machine learning model 140 results in the prediction of a clinical phenotype.

The clinical phenotypes 530A and 530B are compared to determine whether the cellular avatar 540 is a responder or a non-responder to the intervention 508. In various embodiments, the comparison of the clinical phenotypes 530A and 530B involves determining a difference between the clinical phenotypes 530A and 530B. For example, returning to the context of NASH, the difference in lipid globule output in the phenotypic assay data 520A and phenotypic assay data 520B is a measure of how responsive the cellular avatar 540 is to the intervention 508. In other words, the amount of reduction of lipid globule output in the treated cells as compared to the diseased cells is a measure of the responsiveness to the intervention 508.

In various embodiments, the cellular avatar 540 is classified as a responder or non-responder based on the comparison between the clinical phenotypes 530A and 530B. In one embodiment, difference between the clinical phenotypes 530A and 530B is above a threshold number, such as a threshold percentage difference in the predicted presence of disease, then the cellular avatar 540 is classified as a responder. In various embodiments, the threshold number is 10%, 20%, 30%, 40%, 50%, 60%, 70%, 75%, 80%, 81%, 82%, 83%, 84%, 85%, 86%, 87%, 88%, 89%, 90%, 91%, 92%, 93%, 94%, 95%, 96%, 97%, 98%, 99%, or 100%. In various embodiments, the threshold number is between 50% and 100%, 50% and 90%, 50% and 80%, 50% and 70%, 50% and 60%, 60% and 100%, 60% and 90%, 60% and 80%, 60% and 70%, 70% and 100%, 70% and 90%, 70% and 80%, 80% and 100%, 80% and 90%, or 90% and 100%.

Figure 5C:
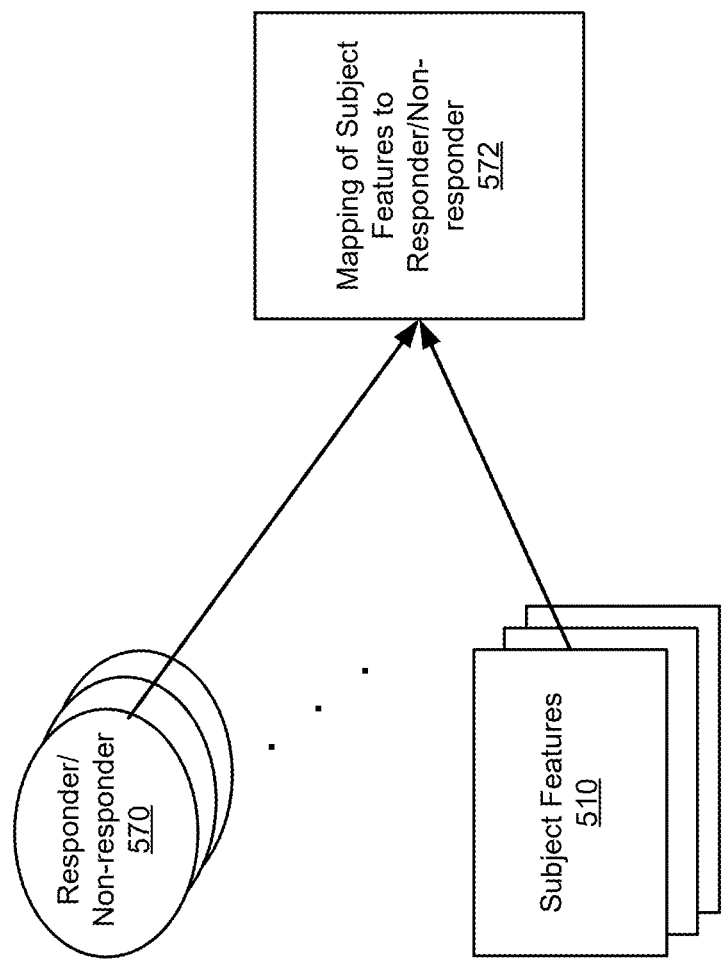

FIG. 5C depicts a process flow diagram for developing a predictive relationship between subject features and a classification of the subject as a responder or non-responder, in accordance with an embodiment. Given the intervention 508 and the responder/non-responder 570 classification that was determined for each cellular avatar 540 (described in reference to FIG. 5B), a mapping 572 can be generated. Here, the mapping 572 describes a relationship between subject features 510 of subjects 505 (FIG. 5B) and the classification of a responder or non-responder across cellular avatars 540 (which represent the subjects 505). The mapping 572 enables the prediction of likely responders or non-responders to a therapy based on rapidly measurable subject features without needing to generate cells (e.g., iPSCs) for each new subject.

In various embodiment, the mapping 572 is any one of a regression model (e.g., linear regression, logistic regression, or polynomial regression), decision tree, random forest, support vector machine, Naïve Bayes model, k-means cluster, or neural network (e.g., feed-forward networks, convolutional neural network (CNN), deep neural network (DNN), autoencoder neural network, generative adversarial network, or recurrent network (e.g., long short-term memory network (LSTM), bi-directional recurrent network, or deep bi-directional recurrent network). Any number of machine learning algorithms can be implemented to train the machine learned model including linear regression, logistic regression, decision tree, support vector machine classification, Naïve Bayes classification, K-Nearest Neighbor classification, random forest, deep learning, gradient boosting, generative adversarial networking learning, reinforcement learning, Bayesian optimization, matrix factorization, and dimensionality reduction techniques such as principal component analysis, factor analysis, nonlinear dimensionality reduction, autoencoder regularization, and independent component analysis, or combinations thereof.

Structure-Activity Relationship Screen

Figure 5D:
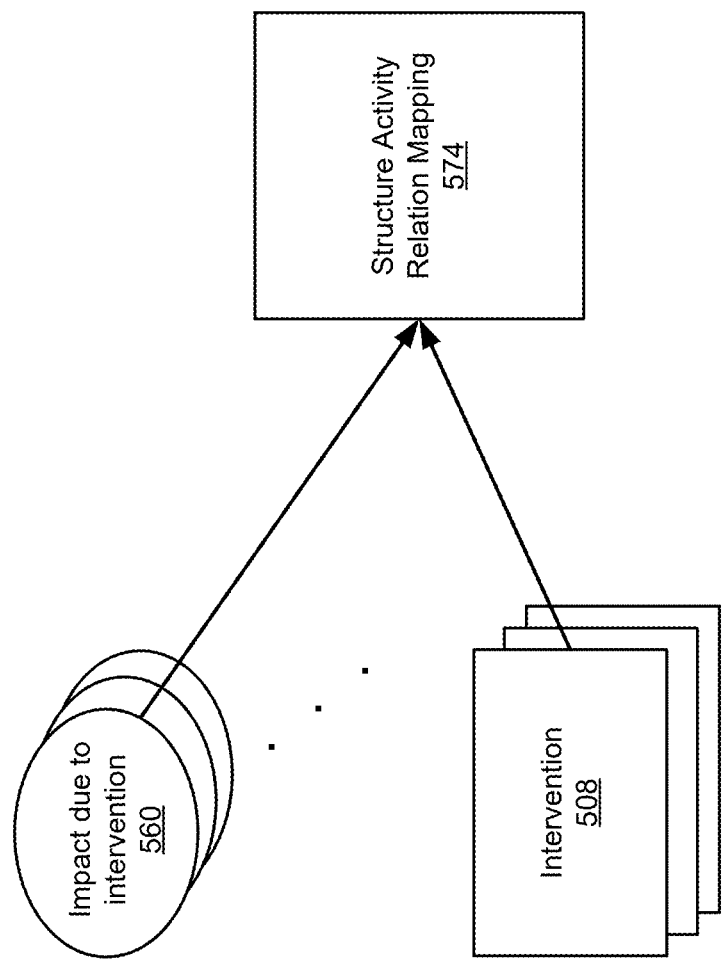

Reference is made to FIG. 5D which depicts a process flow diagram for developing a structure-activity relationship (SAR) screen, in accordance with an embodiment. In various embodiments, the SAR screen is a SAR mapping 574 that is developed by iterating the process of applying the cellular disease model 500 described above in relation to FIG. 5A across different interventions 508. More specifically, applying the cellular disease model 500 across multiple interventions 508 yields a predicted impact due to the intervention 560 for each intervention.

Given the intervention 508 and impact due to intervention 560 pairings, a SAR mapping 574 can be generated. Generally, the SAR mapping 574 is able to map features of the intervention to a predicted benefit of the intervention. Such a SAR mapping 574 can subsequently serve as a SAR screen for identifying whether a different intervention (e.g., a new compound) would likely lead to a clinical benefit if used to treat the disease.

In various embodiments, the SAR mapping is a machine-learned model that predicts the clinical benefit of a therapeutic if used to treat a disease. In various embodiments, the SAR mapping is any one of a regression model (e.g., linear regression, logistic regression, or polynomial regression), decision tree, random forest, support vector machine, Naïve Bayes model, k-means cluster, or neural network (e.g., feed-forward networks, convolutional neural network (CNN), deep neural network (DNN), autoencoder neural network, generative adversarial network, or recurrent network (e.g., long short-term memory network (LSTM), bi-directional recurrent network, or deep bi-directional recurrent network). Any number of machine learning algorithms can be implemented to train the SAR machine learned model including linear regression, logistic regression, decision tree, support vector machine classification, Naïve Bayes classification, K-Nearest Neighbor classification, random forest, deep learning, gradient boosting, generative adversarial networking learning, reinforcement learning, Bayesian optimization, matrix factorization, and dimensionality reduction techniques such as principal component analysis, factor analysis, nonlinear dimensionality reduction, autoencoder regularization, and independent component analysis, or combinations thereof.

In such embodiments where the SAR mapping 574 is a machine-learned model, the training data for training the SAR mapping 574 includes the multiple interventions 508 and corresponding impact due to the intervention 560 generated by implementing the cellular disease model as described above in reference to FIG. 5A. In various embodiments, features of the interventions 508 can be extracted, including chemical groups, physicochemical characteristics, molecular weight, molecular geometry, pharmacophoric features, presence/location of binding groups, presence/location of electrostatic groups, presence/location of hydrophobic/hydrophilic groups, arrangement of atoms, type and orientation of bonds of the therapeutic, and the like. The features of the interventions 508 can be provided as input to the SAR machine-learned model such that the model can predict the likely clinical benefit of a therapeutic according to the features of the intervention.

Altogether, the SAR mapping 574 is a useful in silico tool that can be used to screen interventions for their likely clinical benefit against a disease. In various embodiments, such a SAR mapping 574 can be used to discover new drugs that are likely to exhibit clinical benefit against the disease.

In yet further embodiments, the SAR mapping 574 is useful for exploring large therapeutic libraries. Examples of therapeutic libraries include publicly available databases such as DrugBank, Zinc, ChemSpider, ChEMBL, KEGG, and PubChem. The SAR mapping 574 can be implemented to rapidly screen, in silico, therapeutics in a large therapeutic library to identify one or more candidate therapies that are likely to exhibit clinical benefit if used to treat a disease.

In yet further embodiments, the SAR mapping 574 can be a machine learned model trained to predict clinical impact of interventions involving more than one therapeutic, such as a combination of a chemical therapeutic and a gene therapeutic. In these embodiments, referring to FIG. 5C, the intervention 508 can include a combination of therapies and the corresponding impact due to intervention 560 refers to the impact of the combination of therapies. Thus, the SAR mapping 574 can be trained to predict clinical benefit using features extracted from the multiple therapeutics. Therefore, the SAR mapping 574 serves as an in silico screen for identifying combinations of therapeutics that are likely to result in clinical benefit if used to treat the disease.

Identify New Biological Targets and Candidate Interventions

Reference is made to FIG. 5E which depicts a process flow diagram for identifying new biological targets and candidate interventions for treating a disease, in accordance with an embodiment. In various embodiments, a biological target can include any of lipids, lipoproteins, proteins, mutated proteins, cytokines, chemokines, growth factors, peptides, nucleic acids, genes, and oligonucleotides, together with their related complexes, metabolites, mutated nucleic acids (e.g., mutations, variants), structural variants including copy number variations, inversions, and/or transcript variants polymorphisms, modifications, fragments, subunits, degradation products, elements, and other analytes or sample-derived measures. In particular embodiments, a biological target is a gene. In particular embodiments, a biological target is a gene product, such as a nucleic acid (e.g., messenger RNA) transcribed from the gene, or a protein translated from a mRNA of the gene.

As shown in FIG. 5E, the predictions 145 of the machine learning model can be used to identify a biological target. Here, a biological target 578 may be uncovered as a genetic modification that is predicted to be influential in the disease. For example, the predictions 145 may be an embedding developed from phenotypic assay data across a plurality of cells that have been treated with perturbations. Thus, the phenotypic assay data may be exposure response phenotypes representing in vitro models of the disease. Here, presence of a genetic modification can be associated with cellular phenotypes that are more indicative of disease. For example, the presence of the genetic modification correlates with the diseased state that is induced by the perturbation, thereby indicating that the genetic modification likely plays a role in the disease. Thus, such a genetic modification can represent a biological target 578. The modulation of the biological target 578 can slow or reverse the disease progression.

In various embodiments, a candidate intervention 580 is an intervention that is known to modulate the biological target 578. In some embodiments, the candidate intervention 580 can be identified via a previously validated intervention 575. For example, based on the validation process conducted according to FIG. 5A, validated intervention 575 is now known to be effective in treating the disease. In various embodiments, validated intervention 575 and candidate intervention 580 can have similar or the same mechanism of action. In various embodiments, validated intervention 575 and candidate intervention 580 can be clustered in proximity to one another in an embedding, thereby indicating the similarity between the two interventions. Thus, the candidate intervention 580 is selected and can undergo further validation. In various embodiments, multiple candidate interventions can be selected and each selected candidate intervention can undergo further validation. Therefore, these multiple candidate interventions can be screened to identify a therapeutic candidate that is likely to be efficacious if used to treat the disease.

In one embodiment, the candidate intervention 580 can be evaluated using an in vitro screening process against cells. For example, an in vitro screening can be performed where diseased cells can be plated in vitro and the candidate intervention 580 can be added to the diseased cells to generally observe whether the diseased cells revert to a more healthy state. In one embodiment, the diseased cells used for the in vitro screening can be generated as described above in reference to steps 250 and 255. Thus, the diseased cells align with the genetic architecture of the disease. In one embodiment, the diseased cells used for the screening are diseased cells obtained from patients and therefore, the results of the screening can be clinically relevant as they directly result from screens on patient-derived cells.

In some embodiments, the candidate intervention 580 can be evaluated using the in vitro screening process of the cellular disease model shown in FIG. 5A. Here, FIG. 5A and FIG. 5E differ in that FIG. 5A employs the use of the prediction of the machine learning model to guide the selection of the intervention. In FIG. 5E, the selection of the candidate intervention 580 is guided by the identified biological target 578, as described above. Generally, the in vitro screening process of evaluating the impact of the intervention can be similar or the same in FIGS. 5A and 5E.

As shown in FIG. 5E, a cell 582A can be generated. Cell 582A can, in some embodiments, be a healthy cell. In some embodiments, cell 582A is a diseased cell. The cell 582A can represent a cellular avatar, such as the cellular avatar that the validated intervention 575 was shown to be effective for treating the disease. Phenotypic assay data 585A is captured from the diseased cell. The cell 582A undergoes in vitro treatment using the candidate intervention 580, thereby resulting in a treated cell 582B. Phenotypic assay data 585B is captured from the treated cell 582B. Each of the phenotypic assay data 585A and phenotypic assay data 585B are analyzed to determine clinical phenotype 590A and clinical phenotype 590B respectively. As shown in FIG. 5E, the analysis of phenotypic assay data 585A and 585B involves applying the trained machine learning model 140 that analyzes phenotypic assay data and can distinguish between phenotypic traces of disease. The clinical phenotypes 590A and 590B can be compared to one another to determine the impact of the candidate intervention 595. For example, the difference between clinical phenotype 590A and clinical phenotype 590B can represent the effectiveness of the candidate intervention 595. In some embodiments, both healthy cells and diseased cells are exposed to the intervention 580, to evaluate differential effects of the intervention, including any adverse phenotypic outcomes for healthy cells. After a healthy cell undergoes the steps depicted in FIG. 5E and described above, the additional resulting clinical phenotype can be evaluated along with clinical phenotype 590A and clinical phenotype 590B to help determine the impact of candidate intervention 595.

Altogether, this process enables the identification of additional candidate interventions that can be effective for treating the disease given a biological target whose modulation by a validated intervention has been established to be effective in treating the disease.

In some embodiments, a validated intervention can be used to establish that a biological target (e.g., biological target 578) modulated by the intervention is a suitable target for treating the disease. In other words, the application of the cellular disease model 500 shown in FIG. 5A identifies a biological target that can serve as the basis for discovering additional therapies that can be effective for treating the disease. As an example, the validated intervention can be a genetic intervention that modulates the expression of a gene. Here, the gene and/or products of the gene such as nucleic acids (e.g., mRNA) or proteins are biological targets that can now serve as suitable targets for modulation. In various embodiments, the gene and/or gene products may not have been previously known or not previously known to be implicated in the disease. Therefore, additional candidate interventions (e.g., drug intervention, gene intervention, or combination thereof) that can target and modulate the gene and/or gene products can be evaluated for their therapeutic impact on the disease. In various embodiments, the additional candidate interventions can be selected based on their ability to produce a complementary effect or an opposite metabolic/phenotypic effect, depending on the positive or adverse nature of the additional candidate interventions in progressing or regressing a disease state in the cell.

Phenotypic Assays

Assays for Cell Sequencing Data

One type of phenotypic assay data is cell sequencing data. Examples of cell sequencing data include DNA sequencing data or RNA sequencing data e.g., transcript-level sequencing data. In various embodiments, the cell sequencing data is expressed as a FASTA format file, BAM file, or a BLAST output file. The cell sequencing data obtained from a cell may include one or more differences in comparison to a reference sequence (e.g., a control sequence, a wild-type sequence, or a sequence of healthy individuals). Differences may include variants, mutations, polymorphisms, insertions, deletions, knock-ins, and knock-outs of one or more nucleotide bases. In various embodiments, the differences in the cell sequencing data correspond to high risk alleles that are informative for determining a genetic risk of a disease. In various embodiments, the high risk alleles are highly penetrant alleles.

In various embodiments, the differences between the cell sequencing data and the reference sequence can serve as features for the machine learning model. In various embodiments, one or more sequences of the cell sequencing data, frequency of a nucleotide base or a mutated nucleotide base at a particular position of the cell sequencing data, insertions/deletions/duplications, copy number variations, or a sequence of the sequencing data can serve as features for the machine learning model.

Amplification of Nucleic Acids

Since many nucleic acids are present in relatively low abundance, nucleic acid amplification greatly enhances the ability to assess expression. The general concept is that nucleic acids can be amplified using paired primers flanking the region of interest. The term "primer," as used herein, is meant to encompass any nucleic acid that is capable of priming the synthesis of a nascent nucleic acid in a template-dependent process. Typically, primers are oligonucleotides from ten to twenty and/or thirty base pairs in length, but longer sequences can be employed. Primers may be provided in double-stranded and/or single-stranded form.

Pairs of primers designed to selectively hybridize to nucleic acids corresponding to selected genes are contacted with the template nucleic acid under conditions that permit selective hybridization. Depending upon the desired application, high stringency hybridization conditions may be selected that will only allow hybridization to sequences that are completely complementary to the primers. In other embodiments, hybridization may occur under reduced stringency to allow for amplification of nucleic acids containing one or more mismatches with the primer sequences. Once hybridized, the template-primer complex is contacted with one or more enzymes that facilitate template-dependent nucleic acid synthesis. Multiple rounds of amplification, also referred to as "cycles," are conducted until a sufficient amount of amplification product is produced.

The amplification product may be detected or quantified. In certain applications, the detection may be performed by visual means. Alternatively, the detection may involve indirect identification of the product via chemiluminescence, radioactive scintigraphy of incorporated radiolabel or fluorescent label or even via a system using electrical and/or thermal impulse signals.

A number of template dependent processes are available to amplify the oligonucleotide sequences present in a given template sample. One of the known amplification methods is the polymerase chain reaction (referred to as PCR™) which is described in detail in U.S. Pat. Nos. 4,683,195, 4,683,202 and 4,800,159, and in Innis et al., 1988, each of which is incorporated herein by reference in their entirety.

A reverse transcriptase PCR™ amplification procedure may be performed to quantify the amount of mRNA amplified. Methods of reverse transcribing RNA into cDNA are well known (see Sambrook et al., 1989). Alternative methods for reverse transcription utilize thermostable DNA polymerases. These methods are described in WO 90/07641. Polymerase chain reaction methodologies are well known in the art. Representative methods of RT-PCR are described in U.S. Pat. No. 5,882,864.

Whereas standard PCR usually uses one pair of primers to amplify a specific sequence, multiplex-PCR (MPCR) uses multiple pairs of primers to amplify many sequences simultaneously. The presence of many PCR primers in a single tube could cause many problems, such as the increased formation of misprimed PCR products and "primer dimers," the amplification discrimination of longer DNA fragment and so on. Normally, MPCR buffers contain a Taq Polymerase additive, which decreases the competition among amplicons and the amplification discrimination of longer DNA fragment during MPCR. MPCR products can further be hybridized with gene-specific probe for verification. Theoretically, one should be able to use as many as primers as necessary. However, due to side effects (primer dimers, misprimed PCR products, etc.) caused during MPCR, there is a limit (less than 20) to the number of primers that can be used in a MPCR reaction. See also European Application No. 0 364 255 and Mueller and Wold (1989).

Another method for amplification is ligase chain reaction ("LCR"), disclosed in European Application No. 320 308, incorporated herein by reference in its entirety. U.S. Pat. No. 4,883,750 describes a method similar to LCR for binding probe pairs to a target sequence. A method based on PCR™ and oligonucleotide ligase assay (OLA), disclosed in U.S. Pat. No. 5,912,148, may also be used.

Alternative methods for amplification of target nucleic acid sequences that may be used are disclosed in U.S. Pat. Nos. 5,843,650, 5,846,709, 5,846,783, 5,849,546, 5,849,497, 5,849,547, 5,858,652, 5,866,366, 5,916,776, 5,922,574, 5,928,905, 5,928,906, 5,932,451, 5,935,825, 5,939,291 and 5,942,391, GB Application No. 2 202 328, and in PCT Application No. PCT/US89/01025, each of which are incorporated herein by reference in its entirety.

Qbeta Replicase, described in PCT Application No. PCT/US87/00880, may also be used as an amplification method. In this method, a replicative sequence of RNA that has a region complementary to that of a target is added to a sample in the presence of an RNA polymerase. The polymerase will copy the replicative sequence which may then be detected.

An isothermal amplification method, in which restriction endonucleases and ligases are used to achieve the amplification of target molecules that contain nucleotide 5'-[alpha-thio]-triphosphates in one strand of a restriction site, may also be useful in the amplification of nucleic acids (Walker et al., 1992). Strand Displacement Amplification (SDA), disclosed in U.S. Pat. No. 5,916,779, is another method of carrying out isothermal amplification of nucleic acids which involves multiple rounds of strand displacement and synthesis, i.e., nick translation.

Other nucleic acid amplification procedures include transcription-based amplification systems (TAS), including nucleic acid sequence based amplification (NASBA) and 3SR (Kwoh et al., 1989; Gingeras et al., PCT Application WO 88/10315, incorporated herein by reference in their entirety). European Application No. 329 822 disclose a nucleic acid amplification process involving cyclically synthesizing single-stranded RNA ("ssRNA"), ssDNA, and double-stranded DNA (dsDNA).

PCT Application WO 89/06700 (incorporated herein by reference in its entirety) discloses a nucleic acid sequence amplification scheme based on the hybridization of a promoter region/primer sequence to a target single-stranded DNA ("ssDNA") followed by transcription of many RNA copies of the sequence. This scheme is not cyclic, i.e., new templates are not produced from the resultant RNA transcripts. Other amplification methods include "race" and "one-sided PCR" (Frohman, 1990; Ohara et al., 1989).

Detection of Nucleic Acids

Following any amplification, it may be desirable to separate the amplification product from the template and/or the excess primer. In one embodiment, amplification products are separated by agarose, agarose-acrylamide or polyacrylamide gel electrophoresis using standard methods (Sambrook et al., 1989). Separated amplification products may be cut out and eluted from the gel for further manipulation. Using low melting point agarose gels, the separated band may be removed by heating the gel, followed by extraction of the nucleic acid.

Separation of nucleic acids may also be effected by chromatographic techniques known in art. There are many kinds of chromatography which may be used in the practice of the present invention, including adsorption, partition, ion-exchange, hydroxylapatite, molecular sieve, reverse-phase, column, paper, thin-layer, and gas chromatography as well as HPLC.

In certain embodiments, the amplification products are visualized. A typical visualization method involves staining of a gel with ethidium bromide and visualization of bands under UV light. Alternatively, if the amplification products are integrally labeled with radio- or fluorometrically-labeled nucleotides, the separated amplification products can be exposed to x-ray film or visualized under the appropriate excitatory spectra.

In one embodiment, following separation of amplification products, a labeled nucleic acid probe is brought into contact with the amplified marker sequence. The probe preferably is conjugated to a chromophore but may be radiolabeled. In another embodiment, the probe is conjugated to a binding partner, such as an antibody or biotin, or another binding partner carrying a detectable moiety.

In particular embodiments, detection is by Southern blotting and hybridization with a labeled probe. The techniques involved in Southern blotting are well known to those of skill in the art (see Sambrook et al., 2001). One example of the foregoing is described in U.S. Pat. No. 5,279,721, incorporated by reference herein, which discloses an apparatus and method for the automated electrophoresis and transfer of nucleic acids. The apparatus permits electrophoresis and blotting without external manipulation of the gel and is ideally suited to carrying out methods according to the present invention.

Hybridization assays are additionally described in U.S. Pat. No. 5,124,246, which is hereby incorporated by reference in its entirety. In Northern blots, mRNA is separated electrophoretically and contacted with a probe. A probe is detected as hybridizing to an mRNA species of a particular size. The amount of hybridization can be quantitated to determine relative amounts of expression, for example under a particular condition. Probes are used for in situ hybridization to cells to detect expression. Probes can also be used in vivo for diagnostic detection of hybridizing sequences. Probes are typically labeled with a radioactive isotope. Other types of detectable labels can be used such as chromophores, fluorophores, and enzymes. Use of northern blots for determining differential gene expression is further described in US Patent Application No. U.S. Ser. No. 09/930,213, which is hereby incorporated by reference in its entirety.

Other methods of nucleic acid detection that may be used in the practice of the instant invention are disclosed in U.S. Pat. Nos. 5,840,873, 5,843,640, 5,843,651, 5,846,708, 5,846,717, 5,846,726, 5,846,729, 5,849,487, 5,853,990, 5,853,992, 5,853,993, 5,856,092, 5,861,244, 5,863,732, 5,863,753, 5,866,331, 5,905,024, 5,910,407, 5,912,124, 5,912,145, 5,919,630, 5,925,517, 5,928,862, 5,928,869, 5,929,227, 5,932,413 and 5,935,791, each of which is incorporated herein by reference.

Nucleic Acid Arrays

Microarrays comprise a plurality of polymeric molecules spatially distributed over, and stably associated with, the surface of a substantially planar substrate, e.g., biochips. Microarrays of polynucleotides have been developed and find use in a variety of applications, such as screening, detection of single nucleotide polymorphisms and other mutations, and DNA sequencing. One area in particular in which microarrays find use is in gene expression analysis.

In gene expression analysis with microarrays, an array of "probe" oligonucleotides is contacted with a nucleic acid sample of interest, i.e., target, such as polyA mRNA from a particular tissue type. Contact is carried out under hybridization conditions and unbound nucleic acid is then removed. The resultant pattern of hybridized nucleic acid provides information regarding the genetic profile of the sample tested. Methodologies of gene expression analysis on microarrays are capable of providing both qualitative and quantitative information. One example of a microarray is a single nucleotide polymorphism (SNP)-Chip array, which is a DNA microarray that enables detection of polymorphisms in DNA.

A variety of different arrays which may be used are known in the art. The probe molecules of the arrays which are capable of sequence specific hybridization with target nucleic acid may be polynucleotides or hybridizing analogues or mimetics thereof, including: nucleic acids in which the phosphodiester linkage has been replaced with a substitute linkage, such as phophorothioate, methylimino, methylphosphonate, phosphoramidate, guanidine and the like; nucleic acids in which the ribose subunit has been substituted, e.g., hexose phosphodiester; peptide nucleic acids; and the like. The length of the probes will generally range from 10 to 1000 nts, where in some embodiments the probes will be oligonucleotides and usually range from 15 to 150 nts and more usually from 15 to 100 nts in length, and in other embodiments the probes will be longer, usually ranging in length from 150 to 1000 nts, where the polynucleotide probes may be single- or double-stranded, usually single-stranded, and may be PCR fragments amplified from cDNA.

The probe molecules on the surface of the substrates will correspond to selected genes being analyzed and be positioned on the array at a known location so that positive hybridization events may be correlated to expression of a particular gene in the physiological source from which the target nucleic acid sample is derived. The substrates with which the probe molecules are stably associated may be fabricated from a variety of materials, including plastics, ceramics, metals, gels, membranes, glasses, and the like. The arrays may be produced according to any convenient methodology, such as preforming the probes and then stably associating them with the surface of the support or growing the probes directly on the support. A number of different array configurations and methods for their production are known to those of skill in the art and disclosed in U.S. Pat. Nos. 5,445,934, 5,532,128, 5,556,752, 5,242,974, 5,384, 261, 5,405,783, 5,412,087, 5,424, 186, 5,429,807, 5,436, 327, 5,472,672, 5,527,681, 5,529,756, 5,545,531, 5,554,501, 5,561,071, 5,571,639, 5,593,839, 5,599,695, 5,624,711, 5,658,734, 5,700,637, and 6,004,755.

Following hybridization, where non-hybridized labeled nucleic acid is capable of emitting a signal during the detection step, a washing step is employed where unhybridized labeled nucleic acid is removed from the support surface, generating a pattern of hybridized nucleic acid on the substrate surface. A variety of wash solutions and protocols for their use are known to those of skill in the art and may be used.

Where the label on the target nucleic acid is not directly detectable, one then contacts the array, now comprising bound target, with the other member(s) of the signal producing system that is being employed. For example, where the label on the target is biotin, one then contacts the array with streptavidin-fluorescer conjugate under conditions sufficient for binding between the specific binding member pairs to occur. Following contact, any unbound members of the signal producing system will then be removed, e.g., by washing. The specific wash conditions employed will necessarily depend on the specific nature of the signal producing system that is employed, and will be known to those of skill in the art familiar with the particular signal producing system employed.

The resultant hybridization pattern(s) of labeled nucleic acids may be visualized or detected in a variety of ways, with the particular manner of detection being chosen based on the particular label of the nucleic acid, where representative detection means include scintillation counting, autoradiography, fluorescence measurement, calorimetric measurement, light emission measurement and the like.

Prior to detection or visualization, where one desires to reduce the potential for a mismatch hybridization event to generate a false positive signal on the pattern, the array of hybridized target/probe complexes may be treated with an endonuclease under conditions sufficient such that the endonuclease degrades single stranded, but not double stranded DNA. A variety of different endonucleases are known and may be used, where such nucleases include: mung bean nuclease, SI nuclease, and the like. Where such treatment is employed in an assay in which the target nucleic acids are not labeled with a directly detectable label, e.g., in an assay with biotinylated target nucleic acids, the endonuclease treatment will generally be performed prior to contact of the array with the other member(s) of the signal producing system, e.g., fluorescent-streptavidin conjugate. Endonuclease treatment, as described above, ensures that only end-labeled target/probe complexes having a substantially complete hybridization at 3' end of the probe are detected in the hybridization pattern.

Following hybridization and any washing step(s) and/or subsequent treatments, as described above, the resultant hybridization pattern is detected. In detecting or visualizing the hybridization pattern, the intensity or signal value of the label will be not only be detected but quantified, by which is meant that the signal from each spot of the hybridization will be measured and compared to a unit value corresponding the signal emitted by known number of end-labeled target nucleic acids to obtain a count or absolute value of the copy number of each end-labeled target that is hybridized to a particular spot on the array in the hybridization pattern.

Nucleic Acid Sequencing

Various different sequencing methods can be implemented for sequencing nucleic acids (either DNA or RNA). For example, for DNA sequencing any one of whole genome sequencing, whole exome sequencing, or a targeted panel sequencing can be conducted. Whole genome sequencing refers to the sequencing of the entire genome, whole exome sequencing refers to the sequencing of all expressed genes of a genome, and targeted panel sequencing refers to the sequencing of a particular subset of genes in the genome.

For RNA, RNA-seq (RNA Sequencing), also called Whole Transcriptome Shotgun Sequencing (WTSS), is a technology that utilizes the capabilities of next-generation sequencing to reveal a snapshot of RNA presence and quantity from a genome at a given moment in time. An example of a RNA-seq technique is Perturb-seq.

The transcriptome of a cell is dynamic; it continually changes as opposed to a static genome. The recent developments of Next-Generation Sequencing (NGS) allow for increased base coverage of a DNA sequence, as well as higher sample throughput. This facilitates sequencing of the RNA transcripts in a cell, providing the ability to look at alternative gene spliced transcripts, post-transcriptional changes, gene fusion, mutations/SNPs and changes in gene expression. In addition to mRNA transcripts, RNA-Seq can look at different populations of RNA to include total RNA, small RNA, such as miRNA, tRNA, and ribosomal profiling. RNA-Seq can also be used to determine exon/intron boundaries and verify or amend previously annotated 5' and 3' gene boundaries, Ongoing RNA-Seq research includes observing cellular pathway alterations during infection, and gene expression level changes in cancer studies. Prior to NGS, transcriptomics and gene expression studies were previously done with expression microarrays, which contain thousands of DNA sequences that probe for a match in the target sequence, making available a profile of all transcripts being expressed. This was later done with Serial Analysis of Gene Expression (SAGE).

Read Assembly

Two different assembly methods can be used to analyze the raw sequence reads: de-novo and genome-guided.

The first approach does not rely on the presence of a reference genome in order to reconstruct the nucleotide sequence. Due to the small size of the short reads de novo assembly may be difficult though some software does exist (Velvet (algorithm), Oases, and Trinity to mention a few), as there cannot be large overlaps between each read needed to easily reconstruct the original sequences. The deep coverage also makes the computing power to track all the possible alignments prohibitive. This deficit can be improved by using longer sequences obtained from the same sample using other techniques such as Sanger sequencing, and using larger reads as a "skeleton" or a "template" to help assemble reads in difficult regions (e.g., regions with repetitive sequences).

An "easier" and relatively computationally cheaper approach is that of aligning the millions of reads to a "reference genome." There are many tools available for aligning genomic reads to a reference genome (sequence alignment tools), however, special attention is needed when alignment of a transcriptome to a genome, mainly when dealing with genes having intronic regions. Several software packages exist for short read alignment, and recently specialized algorithms for transcriptome alignment have been developed, e.g. Bowtie for RNA-seq short read alignment, TopHat for aligning reads to a reference genome to discover splice sites, Cufflinks to assemble the transcripts and compare/merge them with others, or FANSe. Additional available algorithms for aligning sequences reads to a reference sequence include basic local alignment search tool (BLAST) and FASTA. These tools can also be combined to form a comprehensive system.

The assembled sequence reads can be used for a variety of purposes including generating a transcriptome and/or identifying mutations, polymorphisms, insertions/deletions, knockins/knockouts and like in the sequence reads.

Assays for Protein Expression

A second type of phenotypic assay data is protein expression data. In various embodiments, the protein expression data can include detected protein levels expressed by cells, a ratio of the levels of two associated proteins (e.g., ratio of levels of a first protein and an inhibitor of the first protein, or ratio of levels of a wild-type protein and a mutated form of the protein), or a ratio of the level of a protein in relation to a reference value (e.g., a reference protein level in healthy individuals). In various embodiments, these examples of protein expression data can serve as features of the machine learning model.

One approach for measuring protein expression levels is to perform protein identification with the use of antibodies. As used herein, the term "antibody" is intended to refer broadly to any immunologic binding agent such as IgG, IgM, IgA, IgD and IgE. Generally, IgG and/or IgM are the most common antibodies in the physiological situation and are most easily made in a laboratory setting. The term "antibody" also refers to any antibody-like molecule that has an antigen binding region, and includes antibody fragments such as Fab', Fab, F(ab')$_2$, single domain antibodies (DABs), Fv, scFv (single chain Fv), and the like. The techniques for preparing and using various antibody-based constructs and fragments are well known in the art. Means for preparing and characterizing antibodies, both polyclonal and monoclonal, are also well known in the art (see, e.g., Antibodies: A Laboratory Manual, Cold Spring Harbor Laboratory, 1988; incorporated herein by reference). In particular, antibodies to calcyclin, calpactin I light chain, astrocytic phosphoprotein PEA-15 and tubulin-specific chaperone A are contemplated.

Immunodetection methods can be employed to detect levels of protein expression. Some immunodetection methods include enzyme linked immunosorbent assay (ELISA), radioimmunoassay (RIA), immunoradiometric assay, fluoroimmunoassay, chemiluminescent assay, bioluminescent assay, and Western blot to mention a few. The steps of various useful immunodetection methods have been described in the scientific literature, such as, e.g., Doolittle and Ben-Zeev O, 1999; Gulbis and Galand, 1993; De Jager et al., 1993; and Nakamura et al., 1987, each incorporated herein by reference.

In general, the immunobinding methods include obtaining a sample suspected of containing a relevant polypeptide, and contacting the sample with a first antibody under conditions effective to allow the formation of immunocomplexes. In terms of antigen detection, the biological sample analyzed may be any sample that is suspected of containing an antigen, such as, for example, a tissue section or specimen, a homogenized tissue extract, a cell, or even a biological fluid.

Contacting the chosen biological sample with the antibody under effective conditions and for a period of time sufficient to allow the formation of immune complexes (primary immune complexes) is generally a matter of simply adding the antibody composition to the sample and incubating the mixture for a period of time long enough for the antibodies to form immune complexes with, i.e., to bind to, any antigens present. After this time, the sample-antibody composition, such as a tissue section, ELISA plate, dot blot or western blot, will generally be washed to remove any non-specifically bound antibody species, allowing only those antibodies specifically bound within the primary immune complexes to be detected.

In general, the detection of immunocomplex formation may be achieved through the application of numerous approaches. These methods are generally based upon the detection of a label or marker, such as any of those radioactive, fluorescent, biological and enzymatic tags. Patents concerning the use of such labels include U.S. Pat. Nos. 3,817,837; 3,850,752; 3,939,350; 3,996,345; 4,277,437; 4,275,149 and 4,366,241, each incorporated herein by reference. Of course, one may find additional advantages through the use of a secondary binding ligand such as a second antibody and/or a biotin/avidin ligand binding arrangement, as is known in the art.

The antibody employed in the detection may itself be linked to a detectable label, wherein one would then simply detect this label, thereby allowing the amount of the primary immune complexes in the composition to be determined. Alternatively, the first antibody that becomes bound within the primary immune complexes may be detected by means of a second binding ligand that has binding affinity for the antibody. In these cases, the second binding ligand may be linked to a detectable label. The second binding ligand is itself often an antibody, which may thus be termed a "secondary" antibody. The primary immune complexes are contacted with the labeled, secondary binding ligand, or antibody, under effective conditions and for a period of time sufficient to allow the formation of secondary immune complexes. The secondary immune complexes are then generally washed to remove any non-specifically bound labeled secondary antibodies or ligands, and the remaining label in the secondary immune complexes is then detected.

Further methods include the detection of primary immune complexes by a two-step approach. A second binding ligand, such as an antibody, that has binding affinity for the antibody is used to form secondary immune complexes, as described above. After washing, the secondary immune complexes are contacted with a third binding ligand or antibody that has binding affinity for the second antibody, again under effective conditions and for a period of time sufficient to allow the formation of immune complexes (tertiary immune complexes). The third ligand or antibody is linked to a detectable label, allowing detection of the tertiary immune complexes thus formed. This system may provide for signal amplification if this is desired.

One method of immunodetection uses two different antibodies. A first step biotinylated, monoclonal or polyclonal antibody is used to detect the target antigen(s), and a second step antibody is then used to detect the biotin attached to the complexed biotin. In that method the sample to be tested is first incubated in a solution containing the first step antibody. If the target antigen is present, some of the antibody binds to the antigen to form a biotinylated antibody/antigen complex. The antibody/antigen complex is then amplified by incubation in successive solutions of streptavidin (or avidin), biotinylated DNA, and/or complementary biotinylated DNA, with each step adding additional biotin sites to the antibody/antigen complex. The amplification steps are repeated until a suitable level of amplification is achieved, at which point the sample is incubated in a solution containing the second step antibody against biotin. This second step antibody is labeled, as for example with an enzyme that can be used to detect the presence of the antibody/antigen complex by histoenzymology using a chromogen substrate. With suitable amplification, a conjugate can be produced which is macroscopically visible.

Another known method of immunodetection takes advantage of the immuno-PCR (Polymerase Chain Reaction) methodology. The PCR method is similar to the Cantor method up to the incubation with biotinylated DNA, however, instead of using multiple rounds of streptavidin and biotinylated DNA incubation, the DNA/biotin/streptavidin/antibody complex is washed out with a low pH or high salt buffer that releases the antibody. The resulting wash solution is then used to carry out a PCR reaction with suitable primers with appropriate controls. At least in theory, the enormous amplification capability and specificity of PCR can be utilized to detect a single antigen molecule.

As detailed above, immunoassays are in essence binding assays. Certain immunoassays are the various types of enzyme linked immunosorbent assays (ELISAs) and radioimmunoassays (RIA) known in the art. However, it will be readily appreciated that detection is not limited to such techniques, and Western blotting, dot blotting, FACS analyses, and the like may also be used.

In one example ELISA, the antibodies of the invention are immobilized onto a selected surface exhibiting protein affinity, such as a well in a polystyrene microtiter plate. Then, a test composition suspected of containing the antigen, such as a clinical sample, is added to the wells. After binding and washing to remove non-specifically bound immune complexes, the bound antigen may be detected. Detection is generally achieved by the addition of another antibody that is linked to a detectable label. This type of ELISA is a simple "sandwich ELISA." Detection may also be achieved by the addition of a second antibody, followed by the addition of a third antibody that has binding affinity for the second antibody, with the third antibody being linked to a detectable label.

In another exemplary ELISA, the samples suspected of containing the antigen are immobilized onto the well surface and then contacted with the anti-ORF message and anti-ORF translated product antibodies of the invention. After binding and washing to remove non-specifically bound immune complexes, the bound anti-ORF message and anti-ORF translated product antibodies are detected. Where the initial anti-ORF message and anti-ORF translated product antibodies are linked to a detectable label, the immune complexes may be detected directly. Again, the immune complexes may be detected using a second antibody that has binding affinity for the first anti-ORF message and anti-ORF translated product antibody, with the second antibody being linked to a detectable label.

Another ELISA in which the antigens are immobilized, involves the use of antibody competition in the detection. In this ELISA, labeled antibodies against an antigen are added to the wells, allowed to bind, and detected by means of their label. The amount of an antigen in an unknown sample is then determined by mixing the sample with the labeled antibodies against the antigen during incubation with coated wells. The presence of an antigen in the sample acts to reduce the amount of antibody against the antigen available for binding to the well and thus reduces the ultimate signal. This is also appropriate for detecting antibodies against an antigen in an unknown sample, where the unlabeled antibodies bind to the antigen-coated wells and also reduces the amount of antigen available to bind the labeled antibodies.

Assays for Gene Expression

A third type of phenotypic assay data is gene expression data. In various embodiments, the gene expression data includes quantitative levels of expression for one or more genes, an indication of whether one or more genes are differentially expressed (e.g., higher or lower expression), a ratio of the expression level of a gene in relation to a reference value (e.g., a reference gene expression level in healthy individuals). In various embodiments, these examples of gene expression data can serve as features of the machine learning model. In various embodiments, the expression levels of genes in a previously identified panel of genes can serve as features of the machine learning model. For example, genes in the panel can be previously identified as disease-associated genes when they are differentially expressed.

In various embodiments, the gene expression data can be determined using the cell sequencing data and/or protein expression data. For example, the cell sequencing data may be transcript level sequencing data (e.g., mRNA sequencing data or RNA-seq data). Therefore, the abundance of particular mRNA transcripts can be indicative of the expression level of a corresponding gene that the mRNA transcripts are transcribed from. Differential expression analysis based on mRNA transcription levels can be performed using available tools such as baySeq (Hardcastle, T. et al. baySeq: Empirical Bayesian methods for identifying differential expression in sequence count data. BMC bioinformatics, 11, 1-14 (2010)), DESeq (Anders, S. et al. Differential expression analysis for sequence count data. Genome biology, 11, R106, (2010)), EBSeq (Leng, N. et al. EBSeq: an empirical Bayes hierarchical model for inference in RNA-seq experiments. Bioinformatics, 29, 1035-1043, 2013), edgeR (Robinson, M. D. et al. edgeR: a Bioconductor package for differential expression analysis of digital gene expression data. Bioinformatics, 26, 139-140, (2010)), NBPSeq (Di, Y., et al., The NBP Negative Binomial Model for Assessing Differential Gene Expression from RNA-Seq. Statistical applications in genetics and molecular biology, 10, 1-28 (2011)), SAMseq (Li, J. et al. Finding consistent patterns: a nonparametric approach for identifying differential expression in RNA-Seq data. Statistical methods in medical research, 22, 519-536, (2013)), ShrinkSeq (Van De Wiel, M. A. et al. Bayesian analysis of RNA sequencing data by estimating multiple shrinkage priors. Biostatistics, 14, 113-128 (2013)), TSPM (Auer, P. L. et al. A Two-Stage Poisson Model for Testing RNA-Seq Data. Statistical applications in genetics and molecular biology, 10 (2011), voom (Law, C. W. et al. voom: Precision weights unlock linear model analysis tools for RNA-seq read counts. Genome biology, 15, R29 (2014)), limma (Smyth, G. K. Linear models and empirical bayes methods for assessing differential expression in microarray experiments. Statistical applications in genetics and molecular biology, 3, Article 3 (2004)), PoissonSeq (Li, J. et al. Normalization, testing, and false discovery rate estimation for RNA-sequencing data. Biostatistics, 13, 523-538 (2012)), DESeq2 (Love, M. I. et al. Moderated estimation of fold change and dispersion for RNA-seq data with DESeq2. Genome biology, 15, 550 (2014)), and ODP (Storey, J. D. The optimal discovery procedure: a new approach to simultaneous significance testing. Journal of the Royal Statistical Society: Series B (Statistical Methodology), 69, 347-368 (2007)), each of which is hereby incorporated in its entirety.

As another example, the protein expression data may also serve as a readout for levels of gene expression. Expression levels of a protein may correspond to levels of mRNA transcripts from which the protein is translated from. Again, the levels of mRNA transcripts can be indicative of the expression level of a corresponding gene. In some embodiments, both cell sequencing data and protein expression data is used to determine gene expression data, given that there are post-transcriptional modifications and post-translational modifications that can result in differing levels of mRNA and protein.

Assays for Imaging and Immunohistochemistry

A fourth type of phenotypic assay data includes microscopy data, such as high-resolution microscopy data and/or immunohistochemistry imaging data. Microscopy data can be captured using a variety of different imaging modalities including confocal microscopy, super-high-resolution microscopy, in vivo two photon microscopy, electron microscopy (e.g., scanning electron microscopy or transmission electron microscopy), atomic force microscopy, bright field microscopy, and phase contrast microscopy. In various embodiments, microscopy data captured from microscopy images can serve as features for the machine learning model. Examples of imaging analysis tools for analyzing microscopy data include CellPAINT (e.g., including cell-specific Paint assays such as NeuroPAINT), pooled optical screening (POSH), and CellProfiler. In various embodiments, the microscopy data represent high dimensional data that, without machine learning implemented analysis, would be difficult to relate to diseased or normal cell phenotypes. Examples of microscopy data can include microscopy images, antibody staining for specific markers, imaging of ions (e.g., sodium, potassium, calcium), division rate of cells, number of cells, environmental surroundings of a cell, and presence or absence of diseased markers (e.g., in immunohistochemistry images, markers of inflammation, degeneration, cellular swelling/shriveling, fibrosis, macrophage recruitment, immune cells).

In some scenarios, in vitro cells are plated in wells and then stained e.g., using primary/secondary antibodies that are fluorescently tagged. In some embodiments, the in vitro cells are fixed prior to imaging. In some embodiments, the in vitro cells can undergo live cell imaging to observe changes in the cellular phenotypes over time.

For confocal microscopy, tissues or tissue organoids are embedded in optimal tissue cutting compound and frozen at −20° C. Once frozen, tissues are sliced using a microtome (e.g., 5-50 microns in thickness). Tissue slices are mounted on glass slides. Tissue slices are stained and fixed to prepare them for imaging. In some embodiments, tissues are treated using blocking buffer to block for non-specific staining between a primary antibody and the tissue. Example blocking buffer can include 1% horse serum in phosphate buffered saline. Primary antibodies are diluted to appropriate dilutions and applied to the tissue sections. Tissue slices are washed, then incubated with a secondary antibody specific for the primary antibody. In some embodiments, the primary antibody and/or secondary antibody are fluorescently tagged. Tissue slices are washed and prepared for imaging. Tissue slices can then be imaged using fluorescent (e.g., confocal) microscopy.

For immunohistochemistry, tissues are fixed, paraffin embedded, and cut. Generally, tissues are fixed using a formaldehyde fixation solution. Tissues are dehydrated by immersing them consecutively in increasing concentrations of ethanol (e.g., 70%, 90%, 100% ethanol) and then immersed in xylene. Tissues are embedded in paraffin and then cut into tissue sections (e.g., 5-15 microns in thickness). This can be accomplished using a microtome. Tissue sections are mounted onto histological slides, and then dried.

Paraffin embedded sections can then be stained for particular targets (e.g., proteins, biomarkers) of interest. Sections are rehydrated (e.g., in decreasing concentrations of ethanol—100%, 95%, 70%, and 50% ethanol) and then rinsed with deionized $H_2O$. If needed, tissues are treated using blocking buffer to block for non-specific staining between a primary antibody and the tissue. Example blocking buffer can include 1% horse serum in phosphate buffered saline. Primary antibodies are diluted to appropriate dilutions and applied to the tissue sections. Tissue slices are washed, then incubated with a secondary antibody specific for the primary antibody. Tissue slices are washed, and then mounted. Tissue slices can then be imaged using microscopy (e.g., bright field microscopy, phase contrast microscopy, or fluorescence microscopy). Additional methods for performing immunohistochemistry are described in further detail in Simon et al, BioTechniques, 36 (1): 98 (2004) and Haedicke et al., BioTechniques, 35 (1): 164 (2003), each of which is hereby incorporated by reference in its entirety. In various embodiments, immunohistochemistry can be automated using commercially available instruments, such as the Benchmark ULTRA system available from the Roche Group.

Assays for Metabolic Data

A fifth type of phenotypic assay data includes metabolic data. Generally, the metabolic data provide a view of the physiology of a cell at a particular time, such as the levels of metabolites in the cell or produced by the cell at the particular time. Metabolic data may be represented as a metabolome e.g., as a complete set of metabolites. In various embodiments, the metabolic data may include levels of metabolites in the cell or produced by the cell in response to a perturbant. Examples of metabolic data include detected metabolite levels expressed by cells, a ratio of the levels of two associated metabolites (e.g., ratio of levels of a first metabolite and a second metabolite, the first metabolite being a precursor of the second metabolite), or a ratio of the level of a metabolite in relation to a reference value (e.g., a reference metabolite level in healthy individuals). In various embodiments, these example metabolite data can serve as features of the machine learning model.

In various embodiments, a metabolite is less than 1.5 kDa in size. Examples of metabolites include oxygen, carbon dioxide, glucose, insulin, lactate, glutamine, glutamate, lipoproteins, albumin, fatty acids, ATP, and NADH associated molecules (e.g., NAD, NADP, NADPH). Additional example metabolites can be found in publicly available databases such as METLIN or the Human Metabolome Database (HMDB).

In various embodiments, detection of example metabolites can use commercially available kits that are designed to facilitate the determination of quantitative levels of different metabolites. Examples of commercially available kits include ABCAM assays for measuring oxygen consumption, glycolysis, fatty acid metabolism, ATP, NADH, and associated molecules, PROMEGA assays for NAD, NADP, NADH, and NADPH assays, Metabolite assays (glucose, lactate, glutamine, glutamate), and Thermo Fisher Scientific assays such as ATP determination kit, Amplex™ assay kits, ThioTracker™ assays, or Vybrant™ Cell Metabolic Assay kit.

Generally, the kits involve adding one or more reagents to a sample including metabolites, the one or more reagents able to bind or interact with a target metabolite. The interaction between a reagent and a target metabolite can be detected using a variety of detection methods including flow cytometry, fluorescence microscopy, microplate (e.g., bioluminescence, chemiluminescence, or fluorescence reader), or a spectrometer. In various embodiments, the detected intensity level is a direct or indirect readout for the concentration of the target metabolite in the sample.

In various embodiments, metabolites can be detected using metabolite detection techniques such as nuclear magnetic resonance (NMR), mass spectrometry (MS), or Infrared spectroscopy (IS). Generally, such methods involve the use of isotopes for detecting a metabolite. Methods for detecting target metabolites using isotopes are described in U.S. Pat. No. 6,849,396, which is hereby incorporated by reference in its entirety.

For mass spectrometry, analysis of the following different classes of metabolites can be found in: (1) lipids (see, e.g., Fenselau. C., "Mass Spectrometry for Characterization of Microorganisms", *ACS Symp. Ser.*, 541:1-7 (1994); (2) volatile metabolite (see, e.g., Lauritsen, F. R. and Lloyd, D., "Direct Detection of Volatile Metabolites Produced by Microorganisms." *ACS Sympl Ser.*, 541:91-106 (1994)): (3) carbohydrates (see, e.g., Fox, A. and Black, G. E., "Identification and Detection of Carbohydrate Markers for Bacteria", *ACS Symp. Ser.* 541:107-131 (1994): (4) nucleic acids (see, e.g., Edmonds, C. O., et al., "Ribonucleic acid modifications in microorganisms", *ACS Symp. Ser.*, 541:147-158 (1994); and (5) proteins (see, e.g., Vorm, O. et al., "Improved Resolution and Very High Sensitivity in MALDI TOF of Matrix Surfaces made by Fast Evaporation," Anal. Chem. 66:3281-3287 (1994); and Vorm, O. and Mann, M., "Improved Mass Accuracy in Matrix-Assisted Laser Desorption/Ionization Time-of-Flight Mass Spectrometry of Peptides", *J. Am. Soc. Mass. Spectrom.* 5:955-958 (1994)). Each of these are hereby incorporated by reference in their entirety. Furthermore, IR and NMR methods for conducting isotopic analyses are discussed, for example, in U.S. Pat. No. 5,317,156; Klein, P. et al., *J. Pediatric Gastroenterology and Nutrition* 4:9-19 (1985); Klein, P., et al., Analytical Chemistry Symposium Series 11:347-352 (1982), each of which is hereby incorporated by reference in its entirety.

In various embodiments, metabolites are detected from purified/separated samples, thereby removing other components (e.g., cellular debris) that may impact the sensitivity and/or specificity of the detection. For example, samples may be purified using electrophoresis or high performance liquid chromatography. Therefore, the purified samples can be analyzed using NMR, MS, or IS to detect metabolite concentrations.

Assays for Cell Morphology Data

A sixth type of phenotypic assay data is cell morphology data. Cell morphology data refers to the appearance of one or more cells (or compartments/organelles of a cell). In various embodiments, the cell morphology data represent high dimensional data that, without machine learning implemented analysis, would be difficult to relate to diseased or normal cell phenotypes. Examples of cell morphology data include size, geometric shape, texture, intensity (e.g., intensity of a fluorescent stain) of a cell or individual cellular compartment/organelle. Additional examples of cell morphology data can include environmental or contextual characteristics around a cell such as a spatial relationship between the cell and another cell within a field of view, a morphology of the cell in relation to another cell within a field of view, or a position of a cell in relation to a cell colony. Other examples include cell length, number of branches, soma size, nucleus diameter, nucleus area, major, axis length, minimum axis length, stain intensity, std stain intensity, minimum intensity, maximum intensity, median intensity, zernlike intensity magnitude, number of neighbors, percent touching neighbors, first closest, distance to neighbor, second closest distance, to neighbor, angle between neighbors, texture, variance, texture entropy, and image contrast. In various embodiments, these examples of cell morphology data can serve as features for the machine learning model.

In various embodiments, methods for determining cell morphology data includes imaging a cell including using any one of confocal microscopy, super-high-resolution microscopy, in vivo two photon microscopy, electron microscopy (e.g., scanning electron microscopy or transmission electron microscopy), atomic force microscopy, bright field microscopy, and phase contrast microscopy. Generally, imaging the cell allows for observation of the general morphology of the cell (and other cells). An example of a software analysis tool for determining cell morphology data includes CellProfiler.

In particular embodiments, determining cell morphology data includes staining the cell for fluorescent proteins such that the imaging of the fluorescent proteins enables the visualization of the morphology of the cell. Examples of such fluorescent proteins include DAPI (4',6-diamidino-2-phenylindole) and TAP-4PH. The fluorescent proteins (and corresponding morphology of the cell) can be captured through fluorescent imaging. In some embodiments, no cell staining is needed to visualize the morphology of the cell. For example, bright field microscopy and/or phase contrast microscopy enables the capturing of an image of a cell that enables direct visualization of the morphology of the cell.

Further description of generating image-based morphological cell profiles can be found in Caicedo et al., Data-analysis strategies for image-based cell profiling, Nature Methods, 14, 849-863 (2017), which is hereby incorporated by reference in its entirety.

Assays for Cell Interaction Data

A seventh type of phenotypic assay data is cell interaction data. Cell interaction data can be informative for predicting whether particular cells are associated with a disease. In various embodiments, the cell interaction data represent high dimensional data that, without machine learning implemented analysis, would be difficult to relate to diseased or normal cell phenotypes. In various embodiments, cell interaction data can include physical interactions (e.g., protein-protein interaction, receptor-receptor interactions, ligand-ligand interactions, extracellular matrix-extracellular matrix (ECM) interactions, receptor-ligand interactions, receptor-ECM interactions, or ligand-ECM interactions), or interactions via secreted factors (e.g., growth factors, proteins, cytokines). In addition to a type of interaction, additional examples of cell interaction data can include a total number of interactions between two cells, or a total number of additional cells that a cell is interacting with.

Cell interaction data can be obtained from in vitro specimen, ex vivo tissue sections, or in vitro cultures of cells. Example techniques for obtaining cell interaction data include imaging based techniques, such as atomic force microscopy-based single-cell force spectroscopy, immunohistochemistry staining, fluorescent imaging, or live cell imaging. Additional techniques for obtaining cell interaction data include performing molecular analysis on individual cells (which requires disassociation of specimen or tissue sections). Molecular analysis includes performing fluorescence activated cell sorting, microfluidic sorting/partitioning of cells, sequencing the individual cell, or other single cell 'omics' technologies. Further additional techniques include coupled molecular profiling approaches including imaging-coupled transcriptional profiling, imaging-based mass spectrometry, Raman microscopy, and Cyclic immunofluorescence. A review of available techniques for determining cell interaction data is described in Nishida-Aoki et al., Emerging approaches to study cell-cell interactions in tumor microenvironment, Oncotarget, 10 (7): 785-797 (2019), which is hereby incorporated by reference in its entirety.

Assays for Functional Cell Data

An eighth type of phenotypic assay data is functional cell data. Functional cell data represent data describing the behavior or activity of cells and can be informative for predicting whether particular cells are associated with a disease. Such behavior or activity may include how a cell divides, responds to signals, transcribes or repairs its DNA, or carries out some other process. In various embodiments, the cell interaction data are represented by high dimensional data that, without machine learning implemented analysis, would be difficult to relate to diseased or normal cell phenotypes. In various embodiments, functional cell data can include electrophysiological signals captured from the cells and cell regulation of ions (e.g., cell action potentials). Example electrophysiological signals include electrical activity obtained through an electrophysiology study of the heart or electrical activity of the brain obtained through electrocorticography (ECoG) or electroencephalography (EEG). Features of functional cell data can include various characteristics of the electrophysiological signals such as maximum/minimum values, average values, oscillations, a duration (e.g., duration of a QRS complex).

Therapeutics

As described above, the disclosed methods can involve selecting and validating an intervention, which can include a therapeutic. In various embodiments, the intervention includes a pharmaceutical composition including the therapeutic. The pharmaceutical composition and/or the therapeutic is validated using the cellular disease model for one or more cellular avatars. This suggests that subjects represented by the one or more avatars can likely benefit from treatment using the validated therapeutic.

Pharmaceutical Compositions

In various embodiments, the pharmaceutical compound includes an acceptable pharmaceutically acceptable carrier. The carrier(s) should be "acceptable" in the sense of being compatible with the other ingredients of the formulations and not deleterious to the subject. Pharmaceutically acceptable carriers include buffers, solvents, dispersion media, coatings, isotonic and absorption delaying agents, and the like, that are compatible with pharmaceutical administration. In one embodiment the pharmaceutical composition is administered orally and includes an enteric coating suitable for regulating the site of absorption of the encapsulated substances within the digestive system or gut.

Pharmaceutical compositions containing a therapeutic, such as those disclosed herein, can be presented in a dosage unit form and can be prepared by any suitable method. A pharmaceutical composition should be formulated to be compatible with its intended route of administration. Useful formulations can be prepared by methods well known in the pharmaceutical art. For example, see Remington's Pharmaceutical Sciences, 18th ed. (Mack Publishing Company, 1990).

Pharmaceutical formulations, in some embodiments, are sterile. Sterilization can be accomplished, for example, by filtration through sterile filtration membranes. Where the composition is lyophilized, filter sterilization can be conducted prior to or following lyophilization and reconstitution.

Small Molecule Drugs

Small molecule drug therapeutics generally refer to therapeutics of low molecular weight (e.g., below 1 kDa) that modulate cellular behavior to treat a disease. Such small molecule drugs bind one or more biological targets of a target cell, thereby causing a change in the activity or function of the biological target of the target cell. Given their size, small molecule drug therapeutics are able to penetrate cellular membranes, thereby enabling them to bind or affect biological targets located within cells.

In various embodiments, small molecule drug therapeutics are inhibitors that serve to inhibit a biologic target that is involved in a disease. For example, small molecule drug therapeutics may be kinase inhibitors, proteasome inhibitors, proteinase inhibitors, or protein inhibitors. Additionally, small molecule drug therapeutics can be chemotherapeutics that prevent cell replication such as alkylating agents, anti-microtubule agents, topoisomerase inhibitors, DNA intercalators, and the like.

More comprehensive lists of small molecule drug therapeutics are found in publicly available databases such as DrugBank, ChemSpider, ChEMBL, KEGG, and PubChem.

Biologics

Biologics generally refer to therapeutics that are manufactured from biologic sources (e.g., produced in cells). Biologics are larger than small molecule drugs and often times more complex in structure and molecular makeup. In various embodiments, biologics are synthesized through manufacturing methods that include 1) inserting a DNA sequence encoding for the biologic or a portion of the biologic into a living cell, 2) having the cell produce transcribe/translate the DNA sequence into a protein, 3) isolating the protein from the cells, where the protein serves as the biologic or a component of the biologic. Example of biologics include antibodies (e.g., monoclonal or polyclonal antibodies), cytokines, growth factors, enzymes, immunomodulators, recombinant proteins, vaccines, allergenics, blood components, hormones, therapeutic cells (e.g., stem cells), tissues, carbohydrates, and nucleic acids.

Immunotherapies

Immunotherapies are therapeutics that modulate (e.g., activate or suppress) the immune system in order to treat a disease. For example, immunotherapies have been explored for the treatment of cancers by activating the immune system to identify and target cancerous cells. Immunotherapies are useful for treating various other diseases.

Examples of immunotherapies include immune checkpoint molecules as well as inhibitors of immune checkpoint molecules. Examples of immune checkpoint molecules include Programmed Death 1 (PD-1), PD-L1, PD-L2, Cytotoxic T-Lymphocyte Antigen 4 (CTLA-4), TIM-3, CEACAM (e.g., CEACAM-1, CEACAM-3 and/or CEACAM-5), LAG-3, VISTA, BTLA, TIGIT, LAIR1, CD160, 2B4, CD80, CD86, B7-H1, B7-H3 (CD276), B7-H4 (VTCN1), HVEM (TNFRSF14 or CD270), KIR, A2aR, MHC class I, MHC class II, GAL9, adenosine, TGFR (e.g., TGFR β). Examples of inhibitors of an immune checkpoint molecule include an inhibitor of PD-1, PD-L1, LAG-3, TIM-3, OX40, CEACAM (e.g., CEACAM-1, -3 and/or -5) or CTLA-4. In some embodiments, the PD-1 inhibitor is an anti-PD-1 antibody such as Nivolumab, Pembrolizumab, or Pidilizumab.

Gene Therapies

Gene therapies include therapeutics that deliver a payload (e.g., nucleic acid payload) into a target cell to treat a disease. For example, gene therapies deliver DNA into a target cell such that the target cell transcribes and translates the delivered DNA into proteins that treat the disease.

In various embodiments, gene therapies utilize viruses as a delivery vehicle that, when arriving at a target cell, injects the payload into the target cell. Examples of viral gene vectors include retroviruses, adenoviruses, adeno-associated viruses, herpes simplex virus, and replication-competent viruses. In various embodiments, gene therapies involve non-viral methods which larger scale production and reduced host immunogenicity in comparison to their viral vector counterparts. Examples of non-viral delivery vehicles include nanomaterials, such as lipids and polymeric materials, dendrimers, and inorganic nanoparticles. Lipids can be cationic, anionic, or neutral. The materials can be synthetic or naturally derived, and in some instances biodegradable. Lipids can include fats, cholesterol, phospholipids, lipid conjugates including, but not limited to, polyethyleneglycol (PEG) conjugates (PEGylated lipids), waxes, oils, glycerides, and fat soluble vitamins.

Additional methods can be implemented to facilitate delivery of gene therapies, including physical or chemical methods that enhance the amount of payload that is delivered to a target cell. Examples of physical methods include electroporation, sonoporation, magnetofection, and hydrodynamic delivery. Chemical methods include modifying the surface of the virus or nanomaterial vectors that improve cellular binding and uptake. For example, cationic lipids can enhance the stability of lipid nanoparticles carrying DNA payloads while also increasing cellular binding to the target cell. An additional example includes modifying the surface to include cell-penetrating peptides, thereby increasing delivery to the cell.

Gene therapies further include nucleic acids that modulate cell behavior to treat a disease. Examples include double stranded DNA, single stranded DNsiRNA, shRNA, RNAi, oligonucleotides (e.g., antisense oligonucleotides), and miRNA. Gene therapies further include technologies that for editing genes of the target cell. Gene editing therapies include cDNA constructs, CRISPR (e.g., CRISPRn), TALENS, Zinc finger nucleases, or other genetic editing techniques.

Non-Transitory Computer Readable Medium

Also provided herein is a computer readable medium comprising computer executable instructions configured to implement any of the methods described herein. In various embodiments, the computer readable medium is a non-transitory computer readable medium. In some embodiments, the computer readable medium is a part of a computer system (e.g., a memory of a computer system). The computer readable medium can comprise computer executable instructions for implementing a machine learning model for the purposes of predicting a clinical phenotype.

Computing Device

The methods described above, including the methods of training and deploying a cellular disease model, are, in some embodiments, performed on a computing device. Examples of a computing device can include a personal computer, desktop computer laptop, server computer, a computing node within a cluster, message processors, hand-held devices, multi-processor systems, microprocessor-based or programmable consumer electronics, network PCs, minicomputers, mainframe computers, mobile telephones, PDAs, tablets, pagers, routers, switches, and the like.

Figure 6:
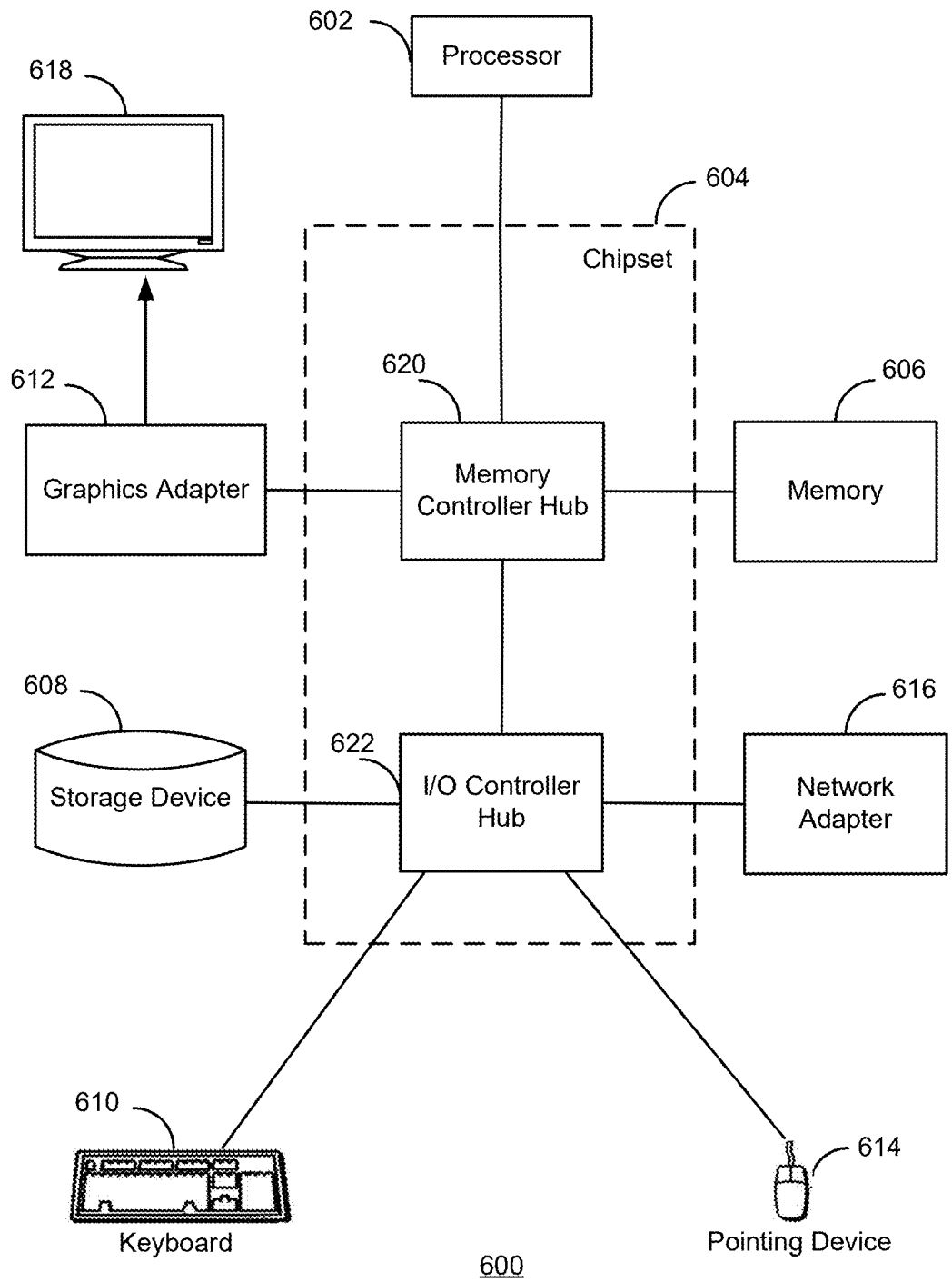
FIG. 6 illustrates an example computing device for implementing system and methods described in FIGS. 2A, 2B, 3A, 3B, 4, and 5A-5E.

FIG. 6 illustrates an example computing device 600 for implementing system and methods described in FIGS. 2A, 2B, 3, 4, and 5A-5D. In some embodiments, the computing device 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input interface 614, and network adapter 616 are coupled to the I/O controller hub 622. Other embodiments of the computing device 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input interface 614 is a touch-screen interface, a mouse, track ball, or other type of input interface, a keyboard, or some combination thereof, and is used to input data into the computing device 600. In some embodiments, the computing device 600 may be configured to receive input (e.g., commands) from the input interface 614 via gestures from the user. The graphics adapter 612 displays images and other information on the display 618. For example, the display 618 can show an indication of a treatment, such as a treatment validated by applying the cellular disease model. As another example, the display 618 can show an indication of a common chemical structure group likely contributes toward an outcome (e.g., favorable outcome or adverse outcome). As another example, the display 618 can show a candidate patient population that, through implementation of the cellular disease model, has been predicted to respond favorably to an intervention. The network adapter 616 couples the computing device 600 to one or more computer networks.

The computing device 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computing devices 600 can vary from the embodiments described herein. For example, the computing device 600 can lack some of the components described above, such as graphics adapters 612, input interface 614, and displays 618. In some embodiments, a computing device 600 can include a processor 602 for executing instructions stored on a memory 606.

Figure 7A:
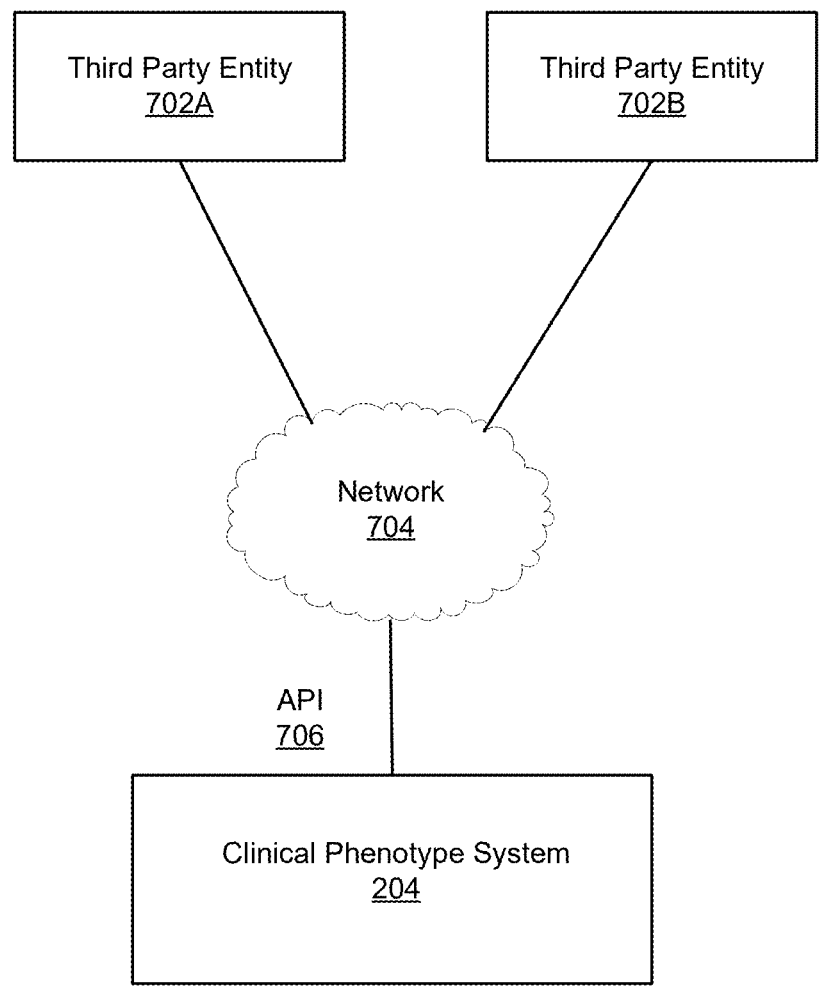
FIG. 7A depicts an overall system environment for developing and deploying cellular disease models, in accordance with an embodiment.
Figure 7B:
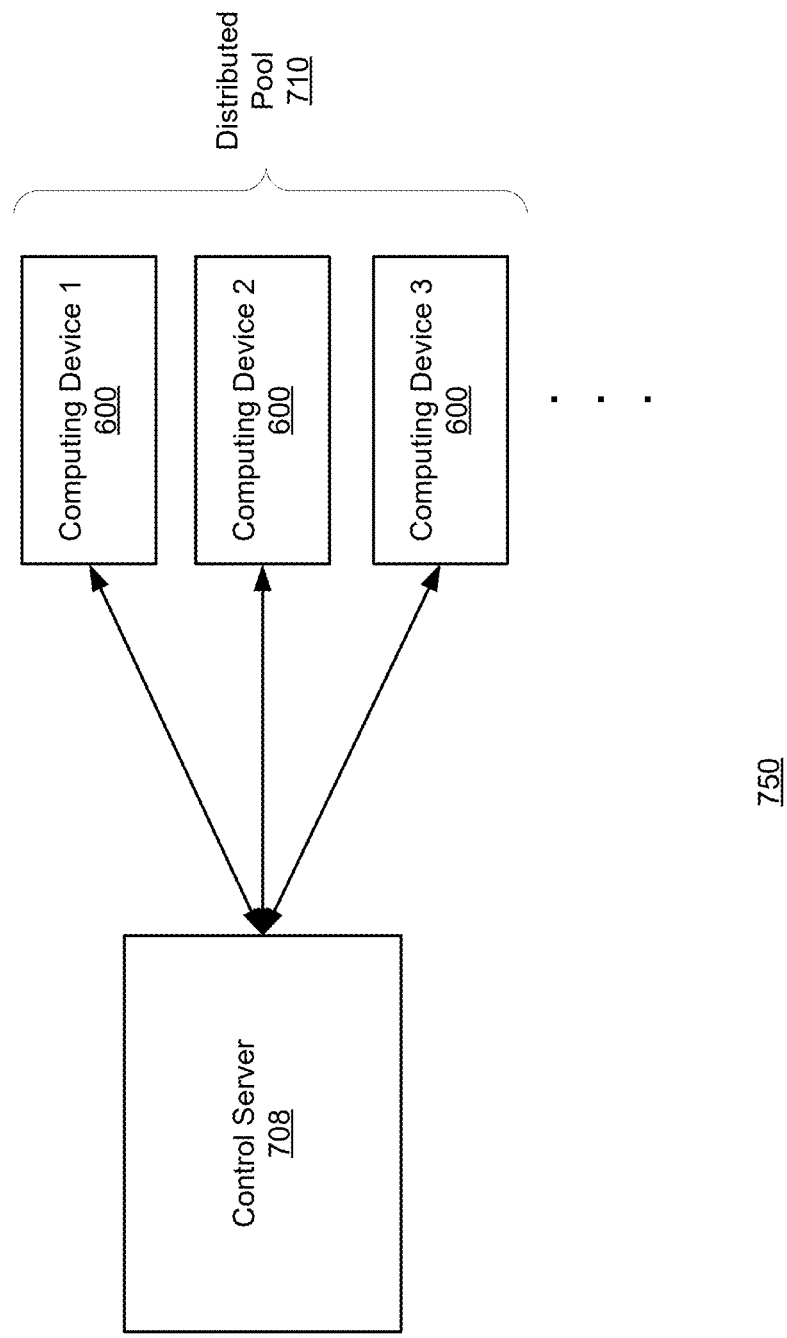
FIG. 7B is an example depiction of a distributed computing system environment for implementing the system environment of FIG. 7A and methods described above, such as the methods described in FIGS. 2A, 2B, 3A, 3B, 4, and 5A-5E.

In various embodiments, the different entities depicted in FIGS. 7A and/or FIG. 7B may implement one or more computing devices to perform the methods described above, including the methods of training a machine learning model and deploying a cellular disease model. For example, the clinical phenotype system 204, third party entity 702A, and third party entity 702B may each employ one or more computing devices. As another example, one or more of the sub-systems of the clinical phenotype system 204 (e.g., disease factor analysis system 205, cellular engineering system 206, phenotypic assay system 207, and cellular disease model analysis system 208) may employ one or more computing devices to perform the methods described above.

The training and deployment of a machine learning model and/or a cellular disease model can be implemented in hardware or software, or a combination of both. In one embodiment, a non-transitory machine-readable storage medium, such as one described above, is provided, the medium comprising a data storage material encoded with machine readable data which, when using a machine programmed with instructions for using said data, is capable of displaying any of the datasets and execution and results of a cellular disease model of this invention. Such data can be used for a variety of purposes, such as patient monitoring, treatment considerations, and the like. Embodiments of the methods described above can be implemented in computer programs executing on programmable computers, comprising a processor, a data storage system (including volatile and non-volatile memory and/or storage elements), a graphics adapter, an input interface, a network adapter, at least one input device, and at least one output device. A display is coupled to the graphics adapter. Program code is applied to input data to perform the functions described above and generate output information. The output information is applied to one or more output devices, in known fashion. The computer can be, for example, a personal computer, microcomputer, or workstation of conventional design.

Each program can be implemented in a high level procedural or object oriented programming language to communicate with a computer system. However, the programs can be implemented in assembly or machine language, if desired. In any case, the language can be a compiled or interpreted language. Each such computer program is preferably stored on a storage media or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

The signature patterns and databases thereof can be provided in a variety of media to facilitate their use. "Media" refers to a manufacture that contains the signature pattern information of the present invention. The databases of the present invention can be recorded on computer readable media, e.g. any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information. "Recorded" refers to a process for storing information on computer readable medium, using any such methods as known in the art. Any convenient data storage structure can be chosen, based on the means used to access the stored information. A variety of data processor programs and formats can be used for storage, e.g. word processing text file, database format, etc.

System Environment

FIG. 7A depicts an overall system environment 700 for developing and deploying cellular disease models, in accordance with an embodiment. The overall system environment 700 includes a clinical phenotype system 204, as described earlier in reference to FIG. 2A, and one or more third party entities 702A and 702B in communication with one another through a network 704. FIG. 7A depicts one embodiment of the overall system environment 700. In other embodiments, additional or fewer third party entities 702 in communication with the clinical phenotype system 204 can be included. Generally, the clinical phenotype system 204 implements machine learning models that make predictions, e.g., predictions of clinical phenotypes, and further deploys cellular disease models using these predictions for performing screens. The third party entities 702 communicate with the clinical phenotype system 204 for purposes associated with implementing the cellular disease models or obtaining predictions or results from the cellular disease models.

In various embodiments, the methods described above as being performed by the clinical phenotype system 204 can be dispersed between the clinical phenotype system 204 and third party entities 702. For example, a third party entity 702A or 702B can generate training data and/or train a machine learning model. The clinical phenotype system 204 can then use predictions of the machine learning model to deploy the cellular disease model.

Third Party Entity

In various embodiments, the third party entity 702 represents a partner entity of the clinical phenotype system 204 that operates either upstream or downstream of the clinical phenotype system 204. As one example, the third party entity 702 operates upstream of the clinical phenotype system 204 and provide information to the clinical phenotype system 204 to enable the development and deployment of the cellular disease model. In this scenario, the clinical phenotype system 204 receives subject data pertaining to healthy subjects, subjects having disease symptoms, or subjects confirmed to be suffering from a disease collected by the third party entity 702. The clinical phenotype system 204 may also receive published genome annotations of the disease and genetic studies generated from machine learning models or other computational analysis of human genomic data pertaining to the disease collected or produced by a third party entity 702. The clinical phenotype system 204 analyzes the received subject data and other data using machine learning models to predict clinical phenotypes. As another example, the third party entity 702 operates downstream of the clinical phenotype system 204. In this scenario, the clinical phenotype system 204 generates a predicted clinical phenotype and provides information relating to the predicted clinical phenotype to the third party entity 702. The third party entity 702 can subsequently use the information relating to the clinical phenotype for their own purposes. For example, the third party entity 702 may be a healthcare provider. Therefore, the healthcare provider can provide appropriate medical attention (e.g., medical advice, a treatment, an intervention, or the like) to the patient according to the predicted clinical phenotype. In another example, the third party entity 702 may be a drug developer. Therefore, the drug developer can use predicted clinical phenotype data in its investigation or selection of candidate therapies or in its selection of patient populations or clinical subject cohorts to receive candidate therapies.

Network

This disclosure contemplates any suitable network 704 that enables connection between the clinical phenotype system 204 and third party entities 702. The network 704 may comprise any combination of local area and/or wide area networks, using both wired and/or wireless communication systems. In one embodiment, the network 704 uses standard communications technologies and/or protocols. For example, the network 704 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 704 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 704 may be represented using any suitable format, such as hypertext markup language (HTML) or extensible markup language (XML). In some embodiments, all or some of the communication links of the network 704 may be encrypted using any suitable technique or techniques.

Application Programming Interface (API)

In various embodiments, the clinical phenotype system 204 communicates with third party entities 702A or 702B through one or more application programming interfaces (API) 706. The API 706 may define the data fields, calling protocols and functionality exchanges between computing systems maintained by third party entities 702 and the clinical phenotype system 204. The API 706 may be implemented to define or control the parameters for data to be received or provided by a third party entity 702 and data to be received or provided by the clinical phenotype system 204. For instance, the API may be implemented to provide access only to information generated by one of the subsystems comprising the clinical phenotype system 204, such as the disease factor analysis system 205 or the cellular disease model system 208, or combinations or subsets thereof. The API 706 may support implementation of licensing restrictions and tracking mechanisms for information provided by clinical phenotype system 204 to a third party entity 702. Such licensing restrictions and tracking mechanisms supported by API 706 may be implemented using blockchain-based networks, secure ledgers and information management keys. Examples of APIs include remote APIs, web APIs, operating system APIs, or software application APIs.

An API may be provided in the form of a library that includes specifications for routines, data structures, object classes, and variables. In other cases, an API may be provided as a specification of remote calls exposed to the API consumers. An API specification may take many forms, including an international standard such as POSIX, vendor documentation such as the Microsoft Windows API, or the libraries of a programming language, e.g., Standard Template Library in C++ or Java API. In various embodiments, the clinical phenotype system 204 includes a set of custom API that is developed specifically for the clinical phenotype system 204 or the subsystems of the clinical phenotype system 204.

Distributed Computing Environment

In some embodiments, the methods described above, including the methods of training a machine learning model and deploying a cellular disease model, are, performed in distributed computing system environments where local and remote computer systems, which are linked (either by hard-wired data links, wireless data links, or by a combination of hardwired and wireless data links) through a network, both perform tasks. In some embodiments, one or more processors for implementing the methods described above may be located in a single geographic location (e.g., within a home environment, an office environment, or a server farm). In various embodiments, one or more processors for implementing the methods described above may be distributed across a number of geographic locations. In a distributed computing system environment, program modules may be located in both local and remote memory storage devices.

FIG. 7B is an example depiction of a distributed computing system environment 750 for implementing the system environment of FIG. 7A and methods described above, such as the methods described in FIGS. 2A, 2B, 3, 4, and 5A-5D. The distributed computing system environment 750 can include a control server 708 connected via communications network with at least one distributed pool 710 of computing resources, such as computing devices 600, examples of which are described above in reference to FIG. 6. In various embodiments, additional distributed pools 710 may exist in conjunction with the control server 708 within the distributed computing system environment 750. Computing resources can be dedicated for the exclusive use in the distributed pool 710 or shared with other pools within the distributed processing system and with other applications outside of the distributed processing system. Furthermore, the computing resources in distributed pool 710 can be allocated dynamically, with computing devices 600 added or removed from the pool 710 as necessary.

In various embodiments, the control server 708 is a software application that provides the control and monitoring of the computing devices 600 in the distributed pool 710. The control server 708 itself may be implemented on a computing device (e.g., computing device 600 described above in reference to FIG. 6). Communications between the control server 708 and computing devices 600 in the distributed pool 710 can be facilitated through an application programming interface (API), such as a Web services API. In some embodiments, the control server 708 provides users with administration and computing resource management functions for controlling the distributed pool 710 (e.g., defining resource availability, submission, monitoring and control of tasks to performed by the computing devices 600, control timing of tasks to be completed, ranking task priorities, or storage/transmission of data resulting from completed tasks).

In various embodiments, the control server 708 identifies a computing task to be executed across the distributed computing system environment 750. The computing task can be divided into multiple work units that can be executed by the different computing devices 600 in the distributed pool 710. By dividing up and executing the computing task across the computing devices 600, the computing task can be effectively executed in parallel. This enables the completion of the task with increased performance (e.g., faster, less consumption of resources) in comparison to a non-distributed computing system environment.

In various embodiments, the computing devices 600 in the distributed pool 710 can be differently configured in order to ensure effective performance for their respective jobs. For example, a first set of computing devices 600 may be dedicated to performing collection and/or analysis of phenotypic assay data. A second set of computing devices 600 may be dedicated to performing the training of machine learning models. The first set of computing devices 600 may have less random access memory (RAM) and/or processors than the second set of second computing devices 600 given the likely need for more resources when training the machine learning models.

The computing devices 600 in the distributed pool 710 can perform, in parallel, each of their jobs and when completed, can store the results in a persistent storage and/or transmit the results back to the control server 708. The control server 105 can compile the results or, if needed, redistribute the results to the respective computing devices 600 to for continued processing.

In some embodiments, the distributed computing system environment 750 is implemented in a cloud computing environment. In this description, "cloud computing" is defined as a model for enabling on-demand network access to a shared set of configurable computing resources. For example, the control server 708 and the computing devices 600 of the distributed pool 710 may communicate through the cloud. Thus, in some embodiments, the control server 708 and computing devices 600 are located in geographically different locations. Cloud computing can be employed to offer on-demand access to the shared set of configurable computing resources. The shared set of configurable computing resources can be rapidly provisioned via virtualization and released with low management effort or service provider interaction, and then scaled accordingly. A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

EXAMPLES

Example 1: Generating Cellular Disease Models

Example 1A: Human Data Analysis to Determine Genetic Disease Architecture

The goal during the human data analysis phase is to combine data from human genetic cohorts, from the literature, and from general-purpose (public or proprietary) cellular or tissue-level genomic data to unravel the set of factors—genetic, cellular, and environmental—that give rise to a given disease. This understanding of the disease will be used in subsequent phases to construct a cellular disease model.

Step 1: Construct a Clinical Description of the disease by identifying or constructing one or more relevant Clinical Phenotypes, such as:
  a) Using ascertained phenotypes such as disease state or disease progression
  b) Using standard approaches for summarizing or processing measured endophenotypes (e.g., HbA1c level, brain volume)
  c) Using supervised, semi-supervised, or unsupervised machine learning on measured endophenotypes to define new, ML-generated phenotypes, e.g.,
    i) Image analysis on histopathology or radiology data
    ii) Imputing disease state from relevant biomarkers (e.g., blood, urine, etc.)
  d) Optionally, using unsupervised machine learning methods to segment the patients into distinct subsets or identify distinct disease processes, which will then be analyzed separately Step 2: Identify the genetic loci associated with the disease (or disease subtypes or disease processes).
  a) Obtain genetic data for each of the patients: genotyping arrays, whole exome sequencing, whole genome sequencing, or others.
  b) Use appropriate genetic analysis approaches to identify the genetic signal driving the disease, including:
    i) Calculating the predicted relevance of different coding or non-coding changes (e.g., protein-truncating variants, missense variants, splice variants, variants likely to affect transcription binding sites, etc.)
    ii) Single- or multi-variant genetic association analysis;
    iii) Rare variant analysis, e.g., using Burden Testing
    iv) Multi-trait analysis for related traits to increase statistical power
    v) Meta-analysis of GWAS Step 3: Use other data sources to further narrow down to specific Causal Elements: Causal Variants, Causal Genes, or other genomic units (e.g., enhancers) within each genetic locus, and the predicted nature of their effect on the disease (or of Disease Subtypes or Disease Processes). Any of the following can be used:
  a) The predicted relevance of the different variants, as described above:
  b) Additional signal, such as colocalization with eQTL, ATACseq, Chip-seq, 3D genome data (such as chromatin contact maps), linkage-equilibrium blocks to nominate functional variants and link them to Causal Elements.
  c) Depletion for coding changes in human genotypes (ExAC, gnomAD)
  d) Is the gene expressed in relevant tissue
  e) Is the gene expression changed in disease state
  f) Is the gene implicated in any (related) disease
  g) Does the gene have a phenotype in an animal model
  In some scenarios, the causal elements are used to define a Polygenic Risk Score that computes a risk for different individuals based on their genetics.

Step 4: Use standard or proprietary techniques to identify associated cell types, pathways, and processes involved in the disease:

a) Use various tools (e.g., MAGMA) for identifying molecular pathways, biological processes, or other gene sets that are enriched for Causal Genes.
b) Use single cell data (RNAseq, ATACseq) to figure out in which cell types are the Causal Elements active
c) Test whether the Causal Genes are differentially expressed in a given cell type in a way that correlates with disease state (e.g., different expression levels between healthy and disease)
d) Define a Cell-Type-Specific Polygenic Risk Score that captures the component of a patient's Polygenic Risk Score that is associated with Causal Elements active within that Cell Type.

Step 5: Identify environmental mimics that drive or stimulate disease state/processes in each cell type:
a) Are there factors suggested in the literature to cause disease (e.g., free fatty acids in NASH, or rotenone in PD)
b) Are there molecules that are differentially present between healthy and disease in Cell Type (e.g., cytokines, or amyloid-beta, or metabolites)

Example 1B: Generating Training Data

To generate training data, a decision is first made on the target cell type, set of cell types in a co-culture, or organoid type to be generated. The outcome of this phase is a set of cellular avatars, each of which is characterized by the genetic and environmental perturbations that were performed on it, and a set of phenotypic assay data (as well as metadata capturing the entire range of conditions measured during the experiment). The phenotypic characterization of a cellular avatar can comprise aggregate measurements over a set of identically treated cells, or measurements taken over a single cell.

Step 1: Creation of iPSC cohort to align with genetic architecture of the disease in a target cell type that is predictive of the disease. In some cases, this will be the cell type in which the disease is active, but in other cases it is a proxy cell type that is easier to work with. Within the cells, the presence of causal genetic factors are established. This is accomplished by one or more combinations of the following approaches:
a) Select iPSCs whose genetics are likely to span a diverse spectrum of genetic variability in causal elements or with effect on the activity of causal elements;
b) Use genome editing to further introduce variants into the iPSCs, including (but not limited to) combinations of the following
  i) Create a loss-of-function genetic variant using CRISPR nuclease or CRISPR inhibition
  ii) Create a gain-of-function genetic variant using CRISPR activation
  iii) Create specific allelic changes using PRIME, HDR,
  iv) Generate copy number variations (CNVs) using Cas3 or other tools iPSCs are further engineered to facilitate downstream steps, example methods of which include:
a) Constitutive or inducible expression of a protein such as dCAS9 variants, or Prime-editor
b) Constitutive or inducible expression of a differentiation factor such as NGN2
c) Introducing a fluorescent marker that can facilitate phenotyping
d) Introducing various types of molecular barcodes that allow for tracking of individual cell lines in a pool.

Step 2: Creating a diverse set of cellular avatars via a combination of the following steps, in some appropriate order:
a) Differentiating each of the above iPSCs into one or more relevant cellular lineages, either in isolation, in co-culture, or in a multicellular system such as an organoid
b) Perturbing expression of some subset of causal genes—activation or repression, e.g., using CRISPRi/a or some other perturbant
c) Introducing an environmental mimic—a single step or multi-step protocol that can drive disease process Step 3: Phenotyping the cellular avatars in one or more modalities, either at a single time point or over time, to capture phenotypic assay data. Examples of phenotypic assays include:
a) Microscopy
  i) Live cell microscopy, e.g., using Brightfield or a number of fluorescent markers
  ii) Fixed cells measured via various microscopic modalities
b) RNAseq: single-cell or bulk
c) ATACseq: single-cell or bulk
d) Protein levels (e.g., via ImmunoSaber, 4i, Cite-seq)
e) RNA-FISH (e.g. seqFISH, merFISH)
f) Disease-specific assays (if appropriate). Examples might include specific stains (such as Bodipy in NASH) or other diverse assays (e.g., electrical potential in neurons).

Measurements are made in an arrayed format, in which each well contains a homogeneous cell population, or in a pooled format, in which a single culture contains multiple genetically diverse cells. Examples of the latter include Perturb-Seq for transcriptional profiling or POSH (Pooled Optical Screening in Human cells) for imaging.

Example 1C: Evaluating a Model

The model M can be evaluated by comparing the predictions of M for clinical phenotypes to the actual measured clinical phenotypes e.g., for an independent test cohort not used for training M. Specifically, assuming a separate cohort of $(x_i, y_i)$ pairs, where $x_i$ is the input to the model M and $y_i$ is the actual measured clinical phenotypes, compute M on the $x_i$ vectors and compare the prediction to the measured $y_i$. In this case, $x_i$ has the form $(g_{\{a_i\}}, \text{pert}_{\{a_i\}}, \text{cell}_{\{a_i\}})$, where $g_{\{a_i\}}$ represents the genetics of the $a_i$, $\text{pert}_{\{a_i\}}$ represents perturbations made on $a_i$, and $\text{cell}_{\{a_i\}}$ represents the phenotypic assay data captured from $a_i$. Additionally, define intervene $(x_i, v)$ to be the vector $(g_{\{a_i\}}, \text{pert}_{\{a_i,v\}}, \text{cell}_{\{a_i,v\}})$ where $(\text{pert}_{\{a_i,v\}})$ is a vector that includes all the perturbations made on $a_i$ plus the additional intervention $v$, and $\text{cell}_{\{a_i,v\}}$ is the phenotypic assay data measured following the intervention with $v$. The goal is to use the model M, applied to intervene $(x_i, v)$, for predicting the clinical outcome of the human $h_i$ following intervention $v$.

A validation cohort for evaluating the model M can take multiple forms, for example:
iPSCs from genetically diverse individuals for which their clinical outcomes are known. In this case, $x_i$ can take the form of $\{g_{\{a_i\}}, \text{cell}_{\{a_i\}}\}$, while $\text{pert}_{\{a_i\}}$ will be empty.
iPSCs from patients who were treated with a particular intervention $v$ (e.g., from a clinical trial), along with their clinical outcome; in this case, $\text{pert}_{\{a_i\}}$ would be empty, and the predictions of M (intervene $(x_i, v)$ are compared to intervene $(\text{clin}_{\{h_i\}}, v)$, the actual clinical phenotype for $h_i$ given the intervention $v$.

Given such a validation cohort, the predictive accuracy of M is measured relative to the clinical phenotype in that cohort.

Given a scoring function for the quality of the model M, use the scoring function to select among a set of candidate model classes. Model classes can vary based both on experimental and on computational aspects. In particular consider models that vary by:

Which cell type is used in the disease model

What environmental mimics are used to generate a disease state

What measurements are taken (e.g., which channels are measured via microscopy)

At what time points are measurements taken

What type of machine learning model is used

Hyperparameters that characterize the machine learning model (e.g., number of layers in the neural network, dropout rate, types of specific units, etc.)

Both experimental and computational aspects are evaluated based on the ability of the machine learning model to predict clinical phenotypes for an unseen cohort. This enables optimizing the experimental aspects (e.g., cells, genetics, environment) and the computational aspects (e.g., training parameters and hyperparameters of the machine learning) to generate the most predictive machine learning model.

Example 2: Validating an Intervention

As defined, the model "M" is used for making predictions as follows: for a given cellular avatar $a_i$ with an associated input vector $x_i$, the machine learning model predicts a Clinical Phenotype M ($x_i$), or a clinically relevant biological process, for $a_i$. The model is deployed to evaluate the outcome of an additional intervention v that was not performed in the corresponding human. In this case, if $x_i$ has the form ($g_{\{a_i\}}$, pert$_{\{a_i\}}$, cell$_{\{a_i\}}$), then define intervene ($x_i$, v) to be the vector ($g_{\{a_i\}}$, pert$_{\{a_i,v\}}$, cell$_{\{a_i,v\}}$ where (pert$_{\{a_i,v\}}$) is a vector that includes all the perturbations made on a; plus the additional intervention v, and cell$_{\{a_i,v\}}$ is the phenotypic assay data measured following the intervention with v. The goal is to use the model M, applied to intervene ($x_i$, v), for predicting the clinical outcome of the human $h_i$ following intervention v.

Here, the model M is used to assess whether a particular intervention v has a clinical impact in patients. Specifically, define cellular avatars that capture a particular patient population. For example, cellular avatars that capture a particular patient population corresponds to a population of cells that share a genetic background with patients in the patient population. Namely, diseased cells are generated that represent the particular patient population. Then, introduce the intervention v into the population of diseased cells, and capture phenotypic assay data of each avatar with and without v. Then use model M to predict clinical outcomes for each cellular avatar before and after the addition of v, and assess whether the intervention improved the disease-related phenotype for each. Most simply, for a model M trained to predict clinical outcome (healthy vs disease), a validated therapeutic is one that results in a significant decrease in the model's estimate of the presence of disease.

Validating a drug d: the intervention v is the drug d, administered in one or more doses; given the multiple doses, test for a dose response curve, where the predicted clinical impact changes as the dose of d changes Target validation: Here, use a genetic intervention such as CRISPRi or CRISPRa to decrease or increase the expression of the given gene g. The genetic intervention can be validated in the same manner.

Combination: Here, the intervention v can be a combination of drugs, targets, or a mix.

The model M can also be used to validate a targeted therapy for a new individual. Given a new individual, generate diseased cells for that patient, and then use the approaches described above for validating a therapy for that specific individual.

Example 3: Structure-Activity Relationship Screen

Using the same process described above in Example 2 for validating a therapeutic, predict the effect of candidate therapeutics (e.g., drugs or gene therapeutics) using M to identify therapeutic interventions that are likely to be effective. Select the therapeutics that are predicted to have the most beneficial effect.

More specifically, iterate across the following steps:

Select one or more interventions

Apply each of those to diseased populations of cells

Apply the model M to assess their predicted clinical benefit

This approach can be used in a variety of contexts, which include a phenotypic structure-activity relationship (SAR). The SAR enables the exploration of a series of chemically related molecules aimed at a particular target, to perform a more rapid search through chemical space. Here, the SAR mapping maps from chemical structures to clinical outcome as predicted via the model M.

The SAR mapping is implemented to explore a large chemical library. The large chemical library includes therapeutics that are characterized using a set of features such as chemical features or the outputs of high-throughput phenotypic assays applied to those therapeutics (e.g., imaging outcomes on one or more cells). The compounds in the library are explored/screened using the SAR mapping.

Additionally, a SAR mapping is developed to identify effective therapeutic combinations including chemical and/or genetic interventions. Each intervention is characterized as a singleton using a range of features, which can also include the high-content assays or the computed ML features measured following these interventions. For some small subset of intervention pairs, learn a mapping from the features of singleton interventions 11 and 12 to the predicted clinical benefit of the corresponding pairwise intervention.

Example 4: Patient Segmentation

The model M is used to identify a patient population that is likely to benefit from a particular intervention v. In other words, the model distinguishes responders and non-responders to the intervention v.

A population of humans $\{h_1, \ldots h_n\}$ are selected that span a set of diverse genetic backgrounds. Next, generate for them the set of corresponding cellular avatars $A=\{a_1, \ldots a_n\}$. Assume that each of the humans is characterized using a set of Patient Selection Biomarkers $b_{\{a_i\}}$ that are readily assayed in a clinical setting. Those Biomarkers can include genetic variants $g(h_i)$, as well as other factors that are easily measured in a patient's baseline state.

Given an intervention v, use the model M, as described above in relation to Example 2, to determine the predicted clinical response to v for each individual in A. Use machine learning, where the training set is defined as follows: the input features are $b_{\{h_i\}}$ and the target output is M (intervene$_{v(x_i)}$), or a binarized version of M (intervene$_{v(x_i)}$)

that distinguishes good responders from poor responders to intervention v. The population of humans can be characterized based on subject features that are easier to measure in a clinical setting. Thus, based on the analysis of the responders/non-responders determined by the model M, the population of humans can be characterized as responders or non-responders according to their subject features without the need to generate iPSCs for each human.

Example 5: Example Machine Learning Model that Differentiates Immunohistochemistry Images of Healthy and Non-Alcoholic Steatohepatitis Diseased Livers This example generally describes the training of a machine learning model (e.g., a neural network) using immunohistochemistry images of liver cells obtained from liver biopsies, the liver cells exhibiting differing phenotypes (e.g., steatosis, lobular inflammation, ballooning, and fibrosis). Although these immunohistochemistry images derive from liver biopsies (and are not derived in vitro cell cultures of genetically engineered cells), the training and use of the machine learning model for distinguishing different cellular phenotypes of liver cells is applicable. When applied to a test group of immunohistochemistry images, the trained machine learning model is able to distinguish between images of each phenotype as well as a trained pathologist. Furthermore, the trained machine learning model are analyzed to identify particular images that were informative for a phenotype. This enables an understanding as to which phenotypes are more similar (e.g., if images are informative for two phenotypes) and which phenotypes are different (e.g., if different images are informative for two phenotypes). Altogether, this example demonstrates the ability to train a machine learning model to distinguish cellular phenotypes using samples obtained from patients, and further using the machine learning model to characterize disease phenotypes that are more similar to one another.

The gold standard for non-alcoholic steatohepatitis (NASH) diagnosis and prognosis are histological scores of NASH activity and fibrosis, determined through the examination of a liver biopsy. For example, gold standard histology scores are assigned to immunohistochemical tissue slices of a liver for evidence of steatosis, lobular inflammation, ballooning, and fibrosis. Here, the goal is to build a machine learning model that can extract quantitative histological traits (that are predictive of gold standard histology scores) from a liver biopsy. These quantitative traits can then be used as end-phenotype for molecular and clinical association analysis of disease state and progression.

Liver biopsies were obtained from patients, liver tissues were sliced, and tissue slices underwent immunohistochemistry staining. Histological slides were individually imaged and used to train a machine learning model.

Figure 8A:
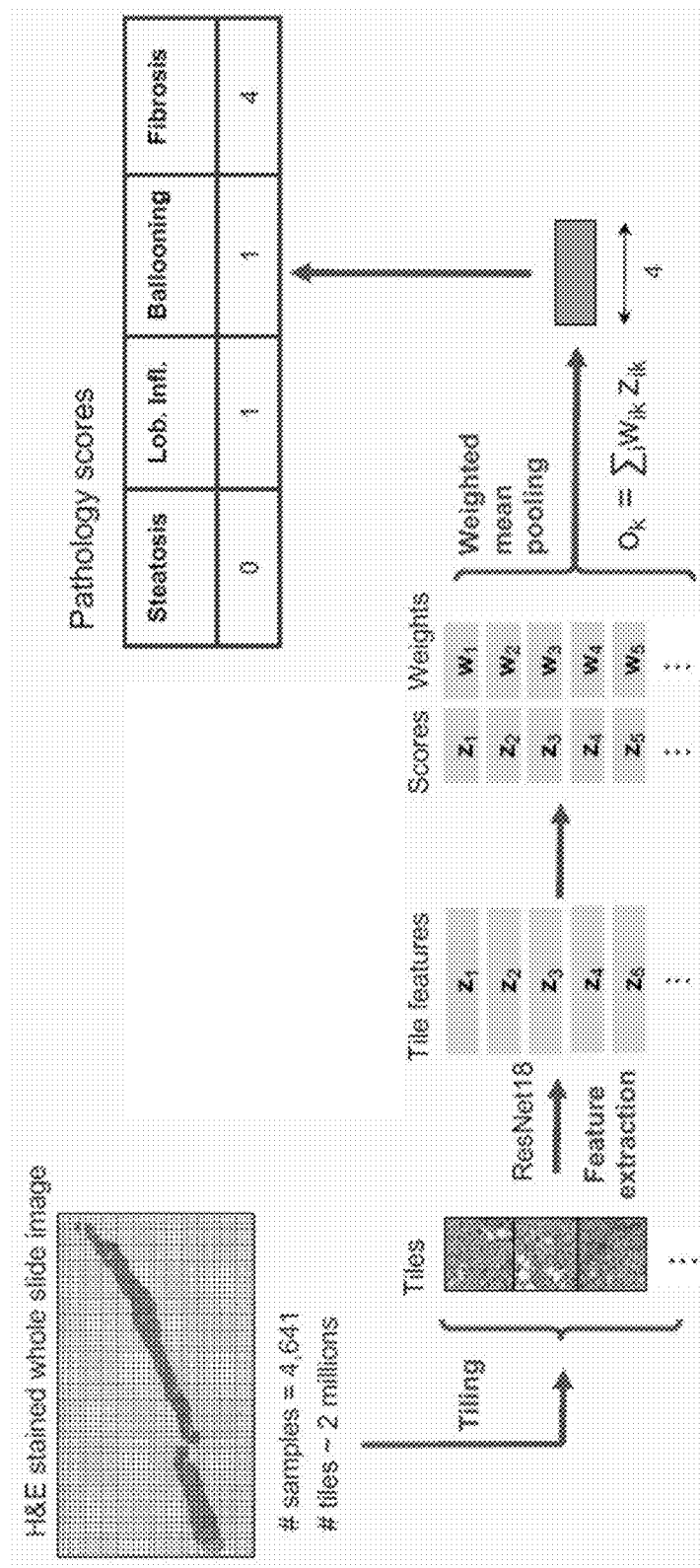
FIGS. 8A-8C depicts the generation of a machine learning model that differentiates between immunohistochemistry images of healthy and non-alcoholic steatohepatitis diseased livers.

FIG. 8A depicts an example process of training a machine learning model that differentiates between immunohistochemistry images of healthy and non-alcoholic steatohepatitis diseased livers using a total of 4,641 image samples. In a preferred embodiment, a convolutional neural network (CNN) is deployed to analyze histological image data. Specifically, the CNN is deployed using a multiple instance learning (MIL) approach, where features from multiple tiles (instances) within a biopsy are combined to predict the pathologist scores. Distinct from more standard approaches that require pixel-level annotation, such MIL approach requires only biopsy-level annotations (e.g., pathologist scores). Each image was sectioned into individual tiles, thereby leading to approximately 2 million individual tiles. To ensure that the machine learning model identifies differing cellular phenotypes as opposed to artifact differences (e.g., brightness/contrast of an image or artifacts associated with a particular imaging channel), data augmentation was applied to the tile to aggressively induce random shifts in hue, brightness and contrast on tiles during training (a procedure that is known as color jittering). This augmentation strategy greatly enhances the heterogeneity in the data and pushes the model to extract features that are independent from color changes between biopsies. In addition to color jittering, tiles also underwent random rotations and horizontal flipping.

Tiles were input into the machine learning model, which in this case is an example convolutional neural network (e.g., ResNet18). Tile features were extracted and propagated through the layers of the neural network. The layers of the neural network includes weights ($w_1, w_2 \ldots w_n$) that differentially weigh the scores (e.g., $z_1, z_2 \ldots z_n$) deriving from the tile features. The weighted scores are pooled to generate a pooled score $o_k$ where $o_k = \Sigma_i w_{ik} z_{ik}$. Based on the pooled score, the model predicts a gold standard histology scores, which is shown in FIG. 8A as any of Steatosis=0, lobular inflammation=1, ballooning=1, and fibrosis=4.

The predicted gold standard histology scores are compared to a reference ground truth to determine the accuracy of the model's prediction. The reference ground truth includes gold standard histology scores assigned by a pathologist. Therefore, the difference between the predicted scores and the reference ground truth is backpropagated to adjust the weights of the model. The training is iterated over additional tiles and additional samples. Importantly, tile-level features are subsequently aggregated in a biopsy-level disease state characterization through attention mechanism that weights the importance of tiles used to predict specific pathologist scores, as shown in FIG. 8A. By using a multivariate attention mechanism in connection with the MIL approach, the model can select different sets of tiles for predicting each component score (e.g., inflammation). Such attention-based strategies permit the identification of informative tiles without explicit tile-level supervision, thus enabling the training of the network solely using whole-slide labels.

Figure 8B:
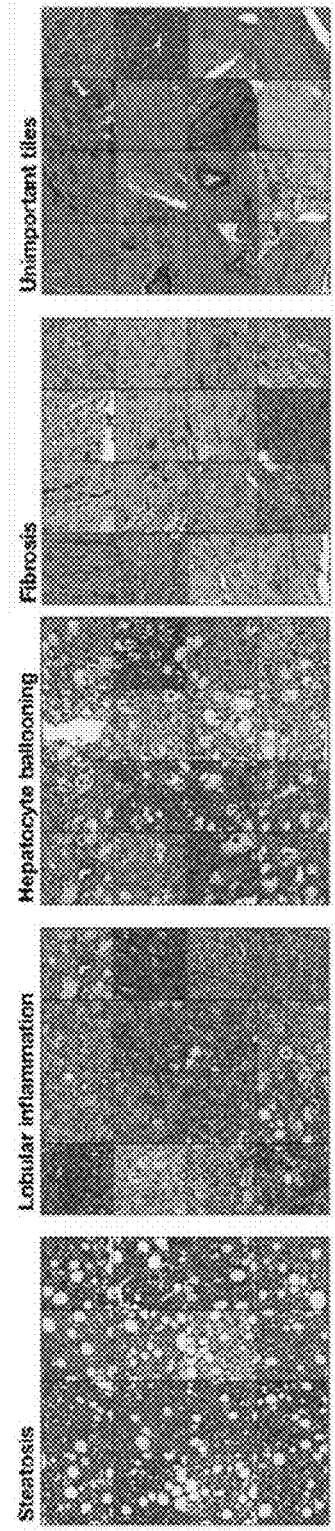

FIG. 8B depicts different tiles that were most heavily weighted for each of the particular phenotypes that are observed in NASH e.g., steatosis, lobular inflammation, hepatocyte ballooning, and fibrosis. Additionally, depicted are tiles that are lowest-weighted for any of the four phenotypes, thereby categorizing the tiles as "unimportant tiles." This indicates that the machine learning model can adequately distinguish between cellular phenotypes (in the form of immunohistochemistry images) that are of a diseased state, as evidenced by the tiles in any of the four recognized NASH phenotypes, and of a non-diseased or less diseased state, as evidenced by the "unimportant tiles."

Figure 8C:
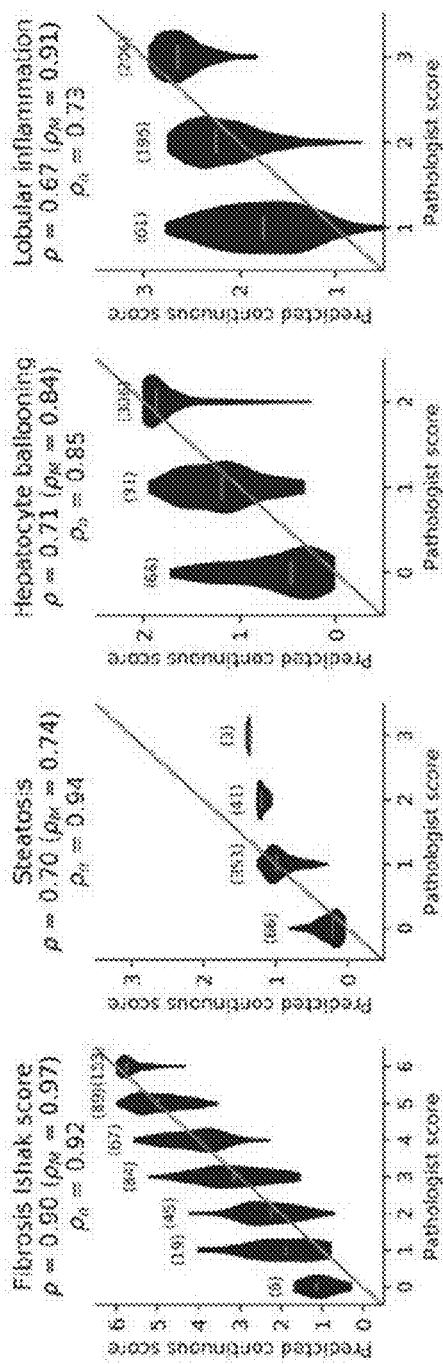

The model was further deployed against a set of liver biopsies that were held out (e.g., not used for training the model). FIG. 8C depicts the correlation between the prediction by the machine learning model for immunohistochemistry images of the held out liver biopsies and a pathologist score assigned by a pathologist who analyzed the same immunohistochemistry images. As shown in FIG. 8C, the machine learning model assigned gold-standard histology scores that largely aligned with the score assigned by a pathologist. Again, this supports the notion that the machine learning model can distinguish between diseased cellular phenotypes (e.g., as evidenced in immunohistochemistry slides) from less diseased or healthy cellular phenotypes.

Figure 8D:
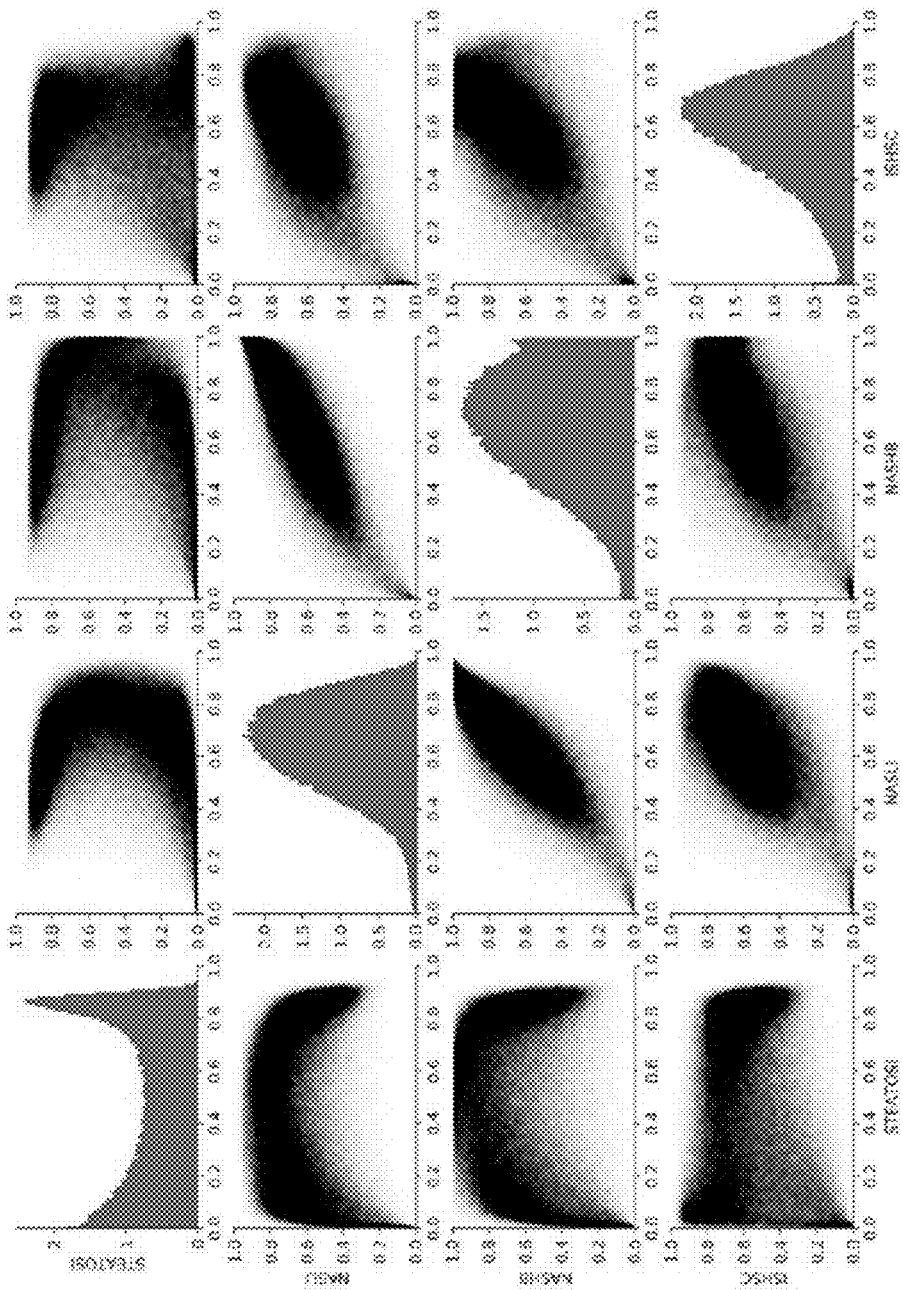
FIG. 8D depicts scatter plots of tile importance weights across the four NASH phenotypes.

As described above and shown in FIG. 8A, the machine learning model was further designed to identify which tiles were heavily weighted and resulted in the machine learning model in classifying those tiles in a particular NASH phenotype. FIG. 8D depicts scatter plots of tile importance weights across the four NASH phenotypes. Here, the NASH phenotypes are labeled in FIG. 8D as follows: Steatosis=STEATOSI, Lobular Inflammation=NASLI, Hepatocyte Ballooning=NASHB, and Fibrosis=ISHSC. Shown along the diagonal (top left to bottom right) are the distribution of importance weights for each NASH phenotype matched against itself. Notably, for steatosis, the distribution of importance weights was bimodal, indicating that a large proportion of tiles either heavily informed the steatosis phenotype or were not informative of the steatosis phenotype. For each of lobular inflammation, hepatocyte ballooning, and fibrosis, the distribution of importance weights was generally unimodal.

Shown off-diagonal are scatter plots of tile weights assigned to each of two NASH phenotypes. In particular, if the same tiles were used by the machine learning model to define two different NASH phenotypes, then highly correlated weights would be observed. This is generally observed for lobular inflammation and hepatocyte ballooning where there is likely a strong correlation (see second graph from the left in the third row). Additionally, tiles that were important for identifying the fibrosis phenotype also showed some correlation with tiles that were important for identifying both the lobular inflammation and hepatocyte ballooning (see second and third graphs on the bottom row), though the correlation is weaker than the correlation between lobular inflammation and hepatocyte ballooning. The tiles that were important for distinguishing the steatosis phenotype were generally different from the tiles that distinguished the other three NASH phenotypes, as is evidenced by the non-correlative scatter plots shown in the first row.

Figure 8E:
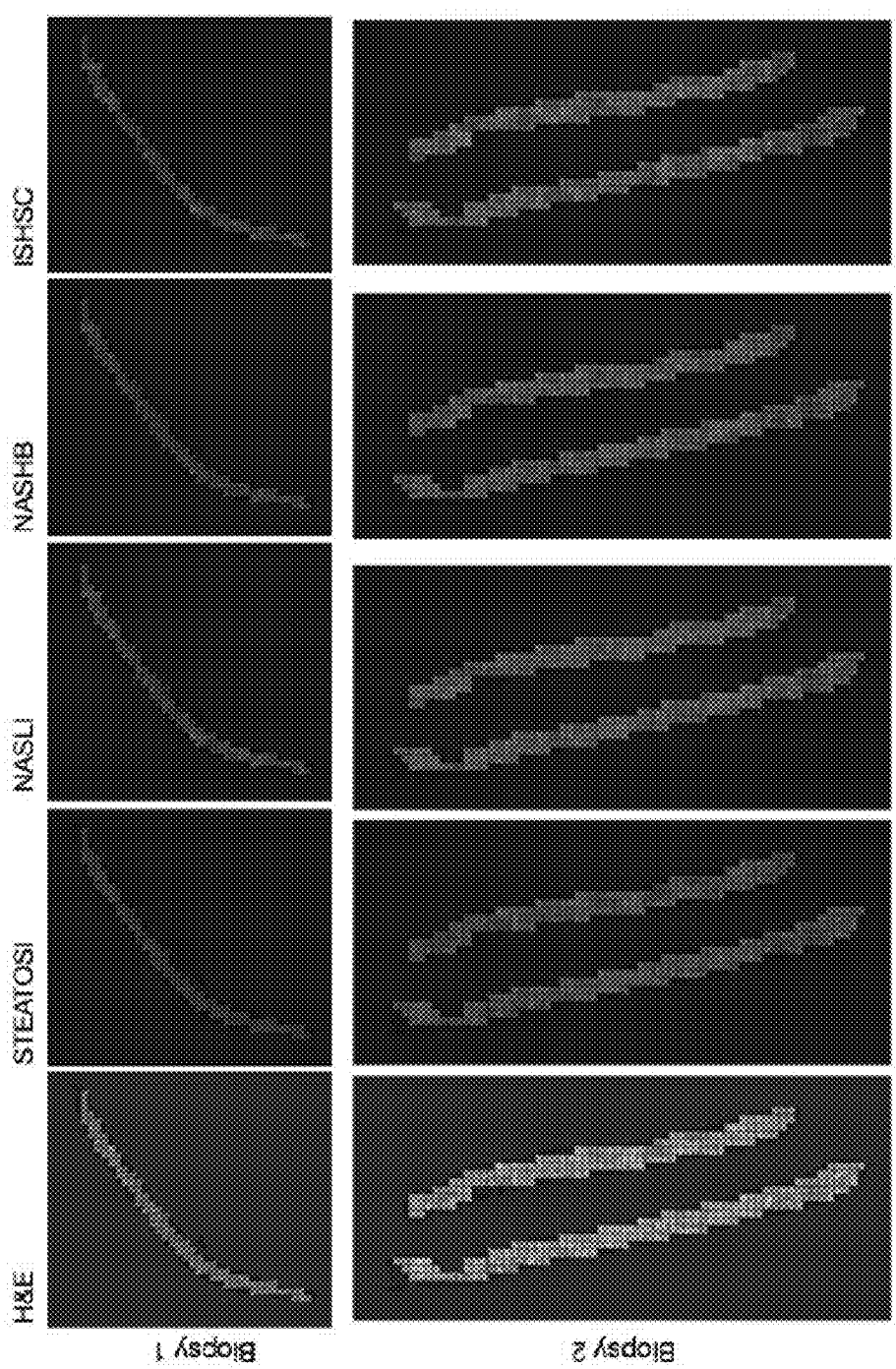
FIG. 8E depicts the importance tile weights assigned to individual tiles of two histological slides from two biopsies across the four different NASH phenotypes.

FIG. 8E depicts the importance of tile weights assigned to individual tiles of two histological slides from two biopsies across the four different NASH phenotypes. The first column in FIG. 8E depicts the liver biopsy slices that are H&E stained, each image of the biopsy slice separated into individual tiles. Across the 4 different NASH phenotypes, the contribution of each tile to the biopsy-level prediction is shown in red, with a darker red indicating a heavier contribution.

Similar to the results described above in reference to FIG. 8D, overlapping tiles contributed towards the lobular inflammation, hepatocyte ballooning, and fibrosis phenotypes. However, very few tiles contributed towards a biopsy level prediction of a steatosis phenotype.

Example 6: Example Machine Learning Model that Differentiates Fluorescent Images of Healthy and Non-Alcoholic Steatohepatitis Diseased Livers Primary liver hepatocytes were cultured in vivo and fluorescently stained. In particular, primary liver hepatocytes were stained for cell nuclei (Hoechst 33342), cellular components such as F-actin cytoskeleton, golgi, and plasma membrane (Phalloidin/WGA), mitochondria (MitoFISH), and lipid droplets (BODIPY). Fluorescently labeled cells imaged using fluorescent microscopy. 80% of samples were used for training the machine learning model and the remaining 20% of samples were used to test/validate the model.

Figure 9A:
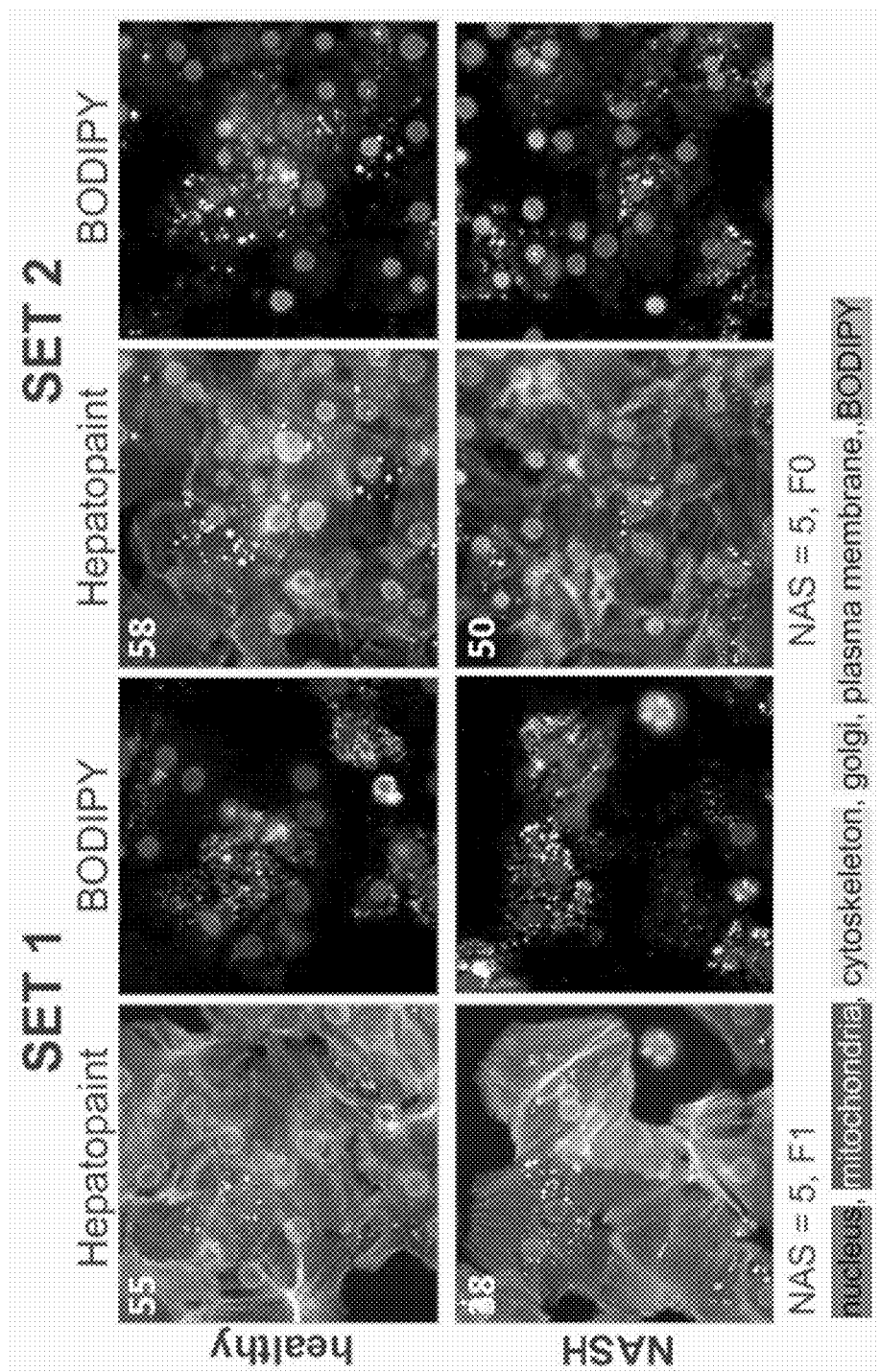
FIGS. 9A-9D depict the example generation of phenotypic manifolds that differentiate between fluorescent images of healthy and non-alcoholic steatohepatitis livers.
Figure 9B:
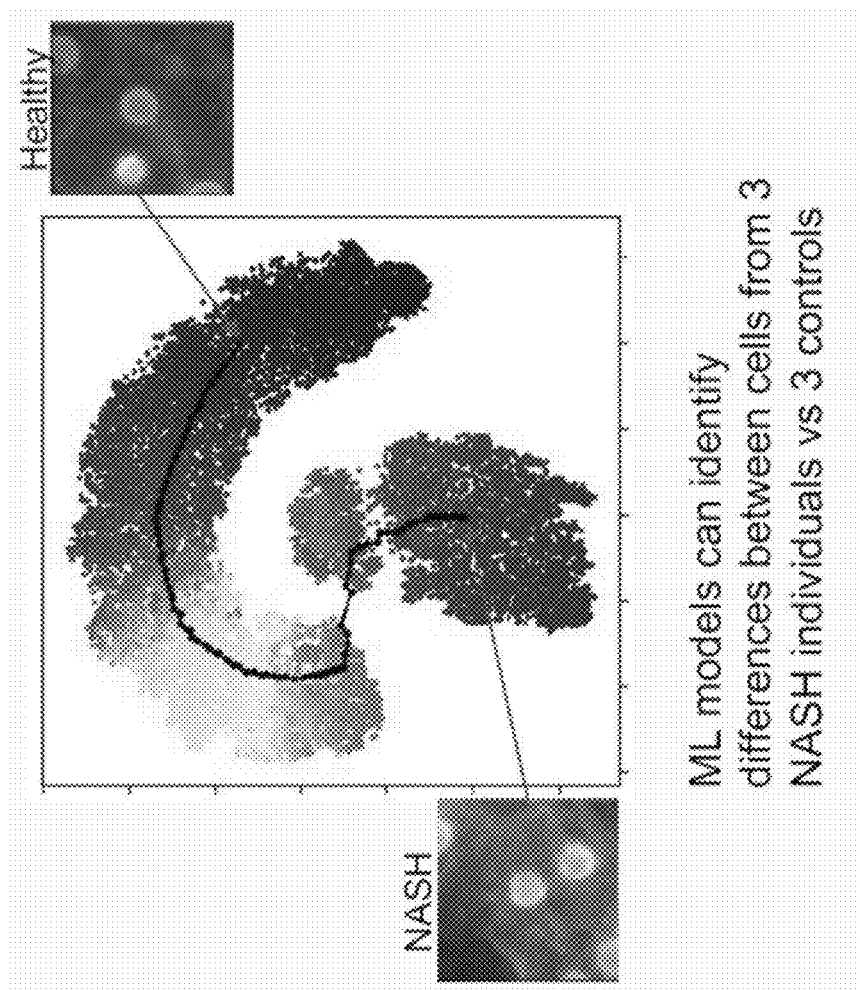

FIG. 9A depicts captured fluorescent images of two sets of primary liver hepatocytes corresponding to healthy hepatocytes (top row) and NASH (bottom row). A first of the NASH samples was assigned a NAFLD Activity Score (NAS) of 5 and a fibrosis score of F1 (minimal fibrosis). The second of the NASH samples was assigned a NAS of 5 and a fibrosis score of F0 (no fibrosis). The "Hepatopaint" fluorescent images refer to images that underwent a cell specific CellPaint analysis that was developed to recognize primary hepatocytes. As shown in FIG. 9A, to the naked eye, the cellular phenotypes of healthy liver cells and NASH liver cells (as evidenced by these fluorescent stains) do not significantly differ. However, the machine learning model was able to distinguish between fluorescent images of NASH liver cells and fluorescent images of healthy liver cells. FIG. 9B depicts the phenotypic manifold distinguishing between cells from three NASH individuals and three healthy controls. Altogether, this data establishes that a machine learning model can be trained to distinguish between diseased and healthy liver cells based on phenotypic assay data (e.g., fluorescent images of the liver cells).

Figure 9C:
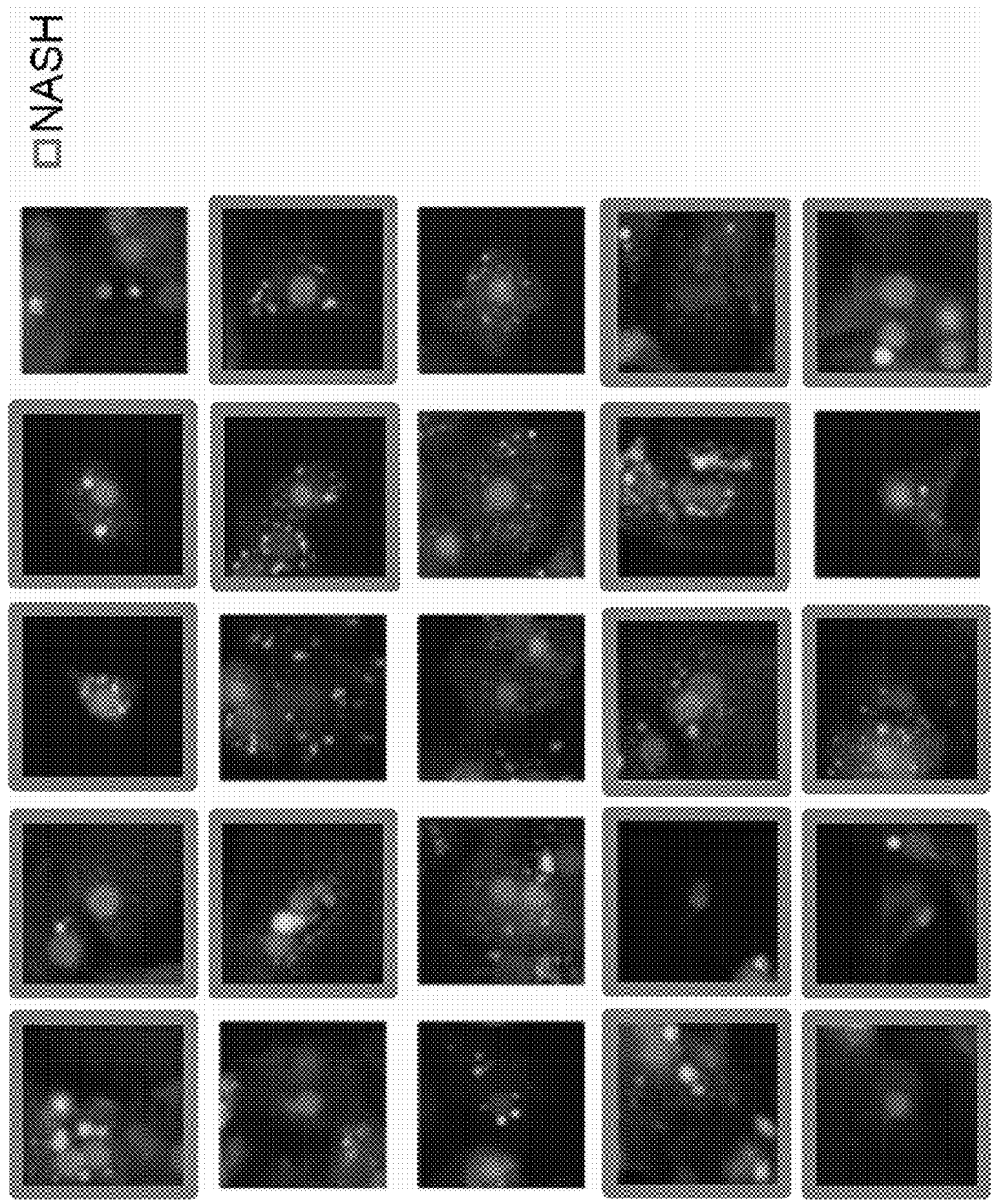

FIG. 9C depicts fluorescently labeled images captured from NASH and healthy liver cells. Of note, the images with a boxed border correspond to NASH cells whereas images without a boxed border correspond to healthy hepatocytes. As evident in FIG. 9C, the phenotypic differences between images corresponding to NASH cells and healthy hepatocytes are not evident to the naked eye.

Figure 9D:
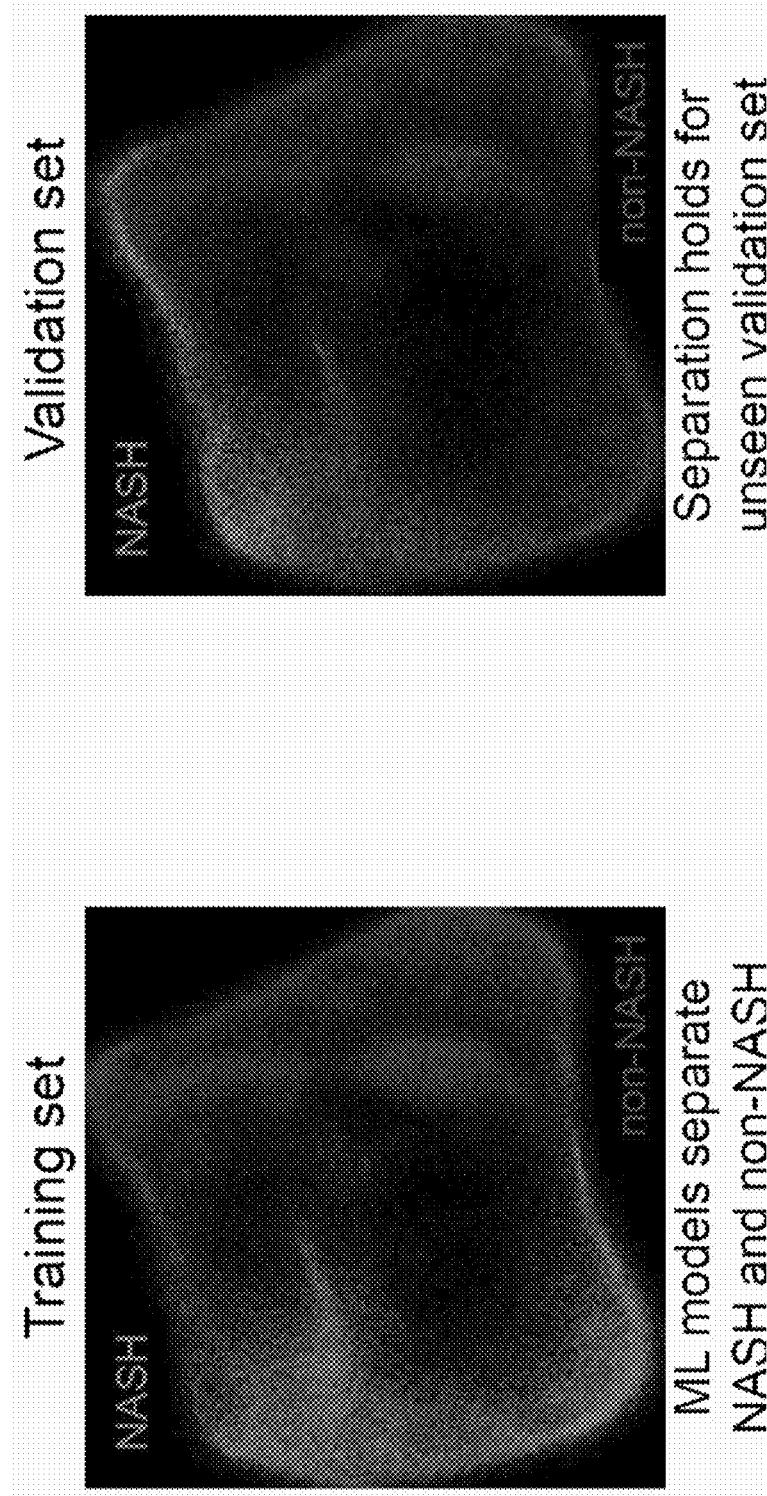

FIG. 9D shows predictions of a machine learning model depicted as embeddings on a phenotypic manifold that differentiate between the NASH cells and the non-NASH cells. Importantly, the machine learning model discovers a variety of phenotypic features that separate NASH cells (generally located on the left side of the manifold) from non-NASH cells (generated located on the right side of the manifold) across the training set, as well as a validation set, as represented in the two phenotypic manifolds shown.

Figure 9E:
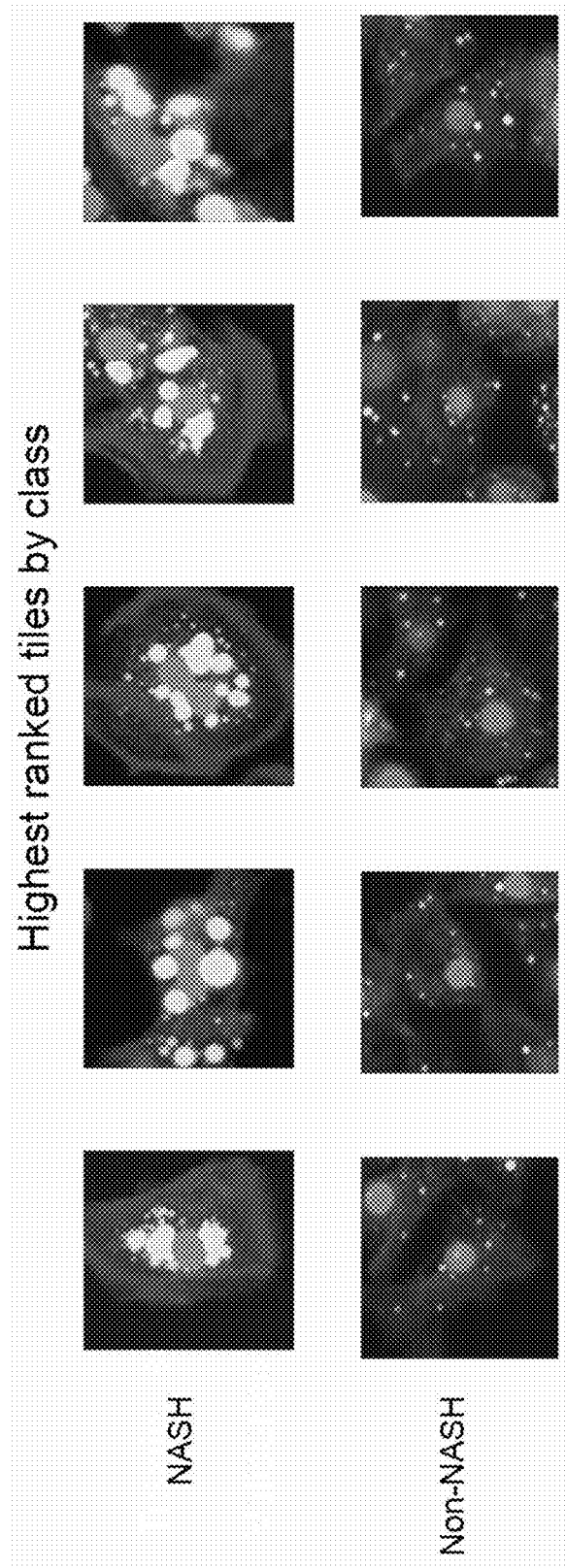
FIGS. 9E-9F depict tiles in which features of the tiles garnered the "attention" of machine learning models, which enables the identification of therapeutic targets.

FIG. 9E depicts the five highest ranked tiles classified in each of the NASH and non-NASH categories by the machine learning model. Notably, at high resolution, there are evident phenotypic differences between the top ranked tiles in the NASH category in comparison to the top ranked tiles in the non-NASH category. This indicates the utility of the machine learning model, which not only can differentiate between NASH and non-NASH phenotypic traces, but can further reveal those phenotypic traces through the highest ranked tiles.

Figure 9F:
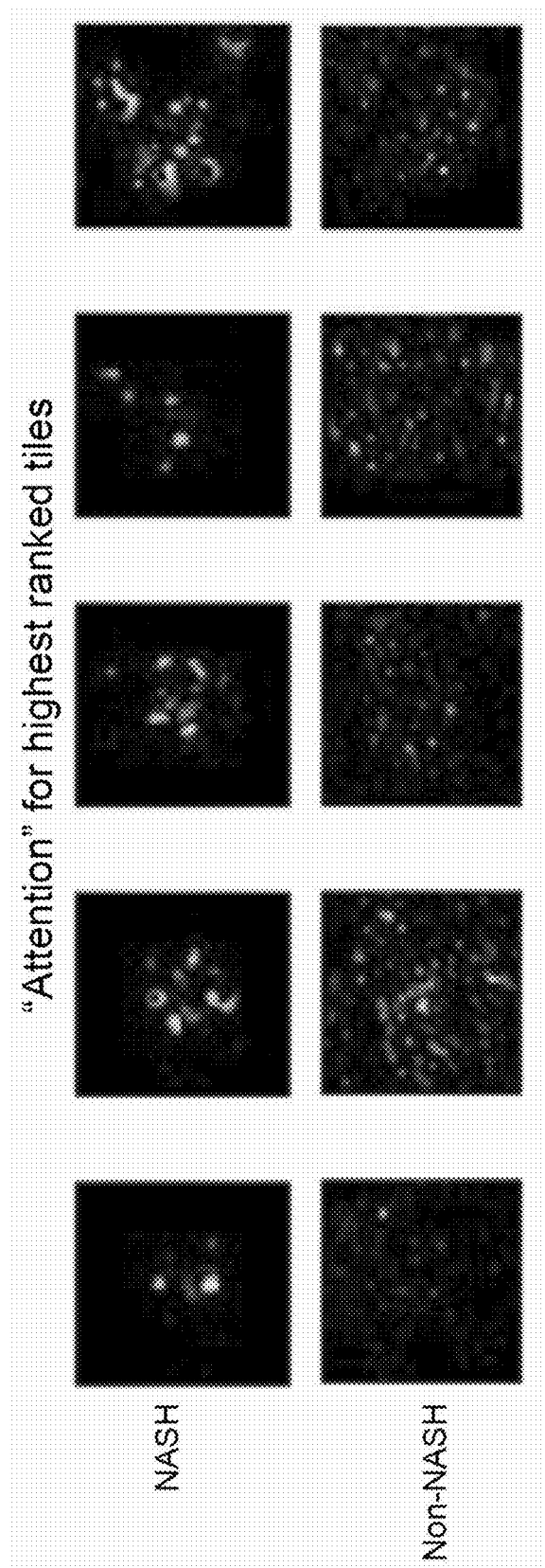

FIG. 9F depicts the highest ranked tiles with only fluorescently labeled cell nuclei and fluorescently labeled lipid droplets. Here, the highest ranked tiles for each category are analyzed to determine the phenotypic traces that the machine learning model focused its "attention" in distinguishing between NASH and non-NASH tissue slices. Specifically, in the context of NASH, the machine learning model differentiates NASH and non-NASH cells based on the presence of lipid droplets proximal to the cell nucleus. Specifically, NASH cells are characterized by a higher concentration of lipid droplets located in proximity to the cell nucleus whereas non-NASH cells are characterized by low or diffuse concentrations of lipid droplets located further from cell nuclei. The "attention" of the machine learning model is informative for identifying biological targets. For NASH, these lipid droplets located proximal to the nucleus can be targeted such that their elimination would revert the diseased NASH phenotype back to a healthier non-NASH phenotype.

Figure 10A:
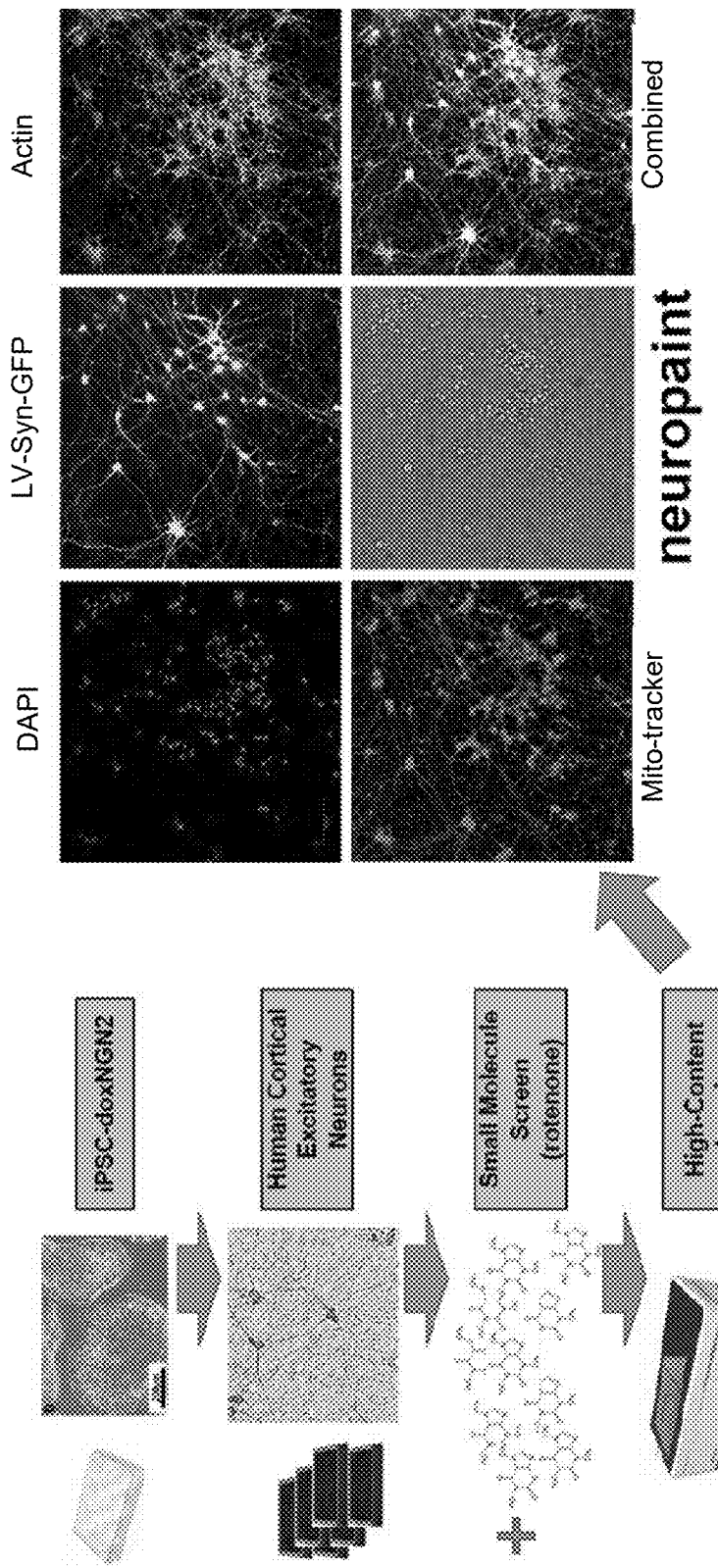
FIGS. 10A-10D depict the generation and implementation of embeddings that distinguish cellular phenotypes of neurons that have been treated with different compounds.

Example 7: Example Machine Learning Model that Differentiates Neurons Treated with Different Small Molecule Compounds FIG. 10A depicts the process of capturing phenotypic assay data (e.g., fluorescent images) of neurons exposed to different small molecule compounds. DoxNGN2 iPSCs were plated at two different seeding densities (1k and 6k cells) and further differentiated into human cortical excitatory neurons. Different populations of neurons were exposed to 3 different concentrations of small molecules including rotenone, everolimus, loxapine, phorbol 12-myristate 13-acetate (PMA), staurosporine, rapamycin, BIO, and blebbistatin. Neurons were also treated with controls including phosphate buffered saline and dimethyl sulfoxide (DMSO). Following treatment, phenotypic assay data was captured from the treated neurons by performing high-content imaging (e.g., Neuropaint). As shown in FIG. 10A, neurons were stained using DAPI (cell nuclei), LV-Syn-GFP (neuron), Actin, and Mito-tracker (mitochondria).

Figure 10B:
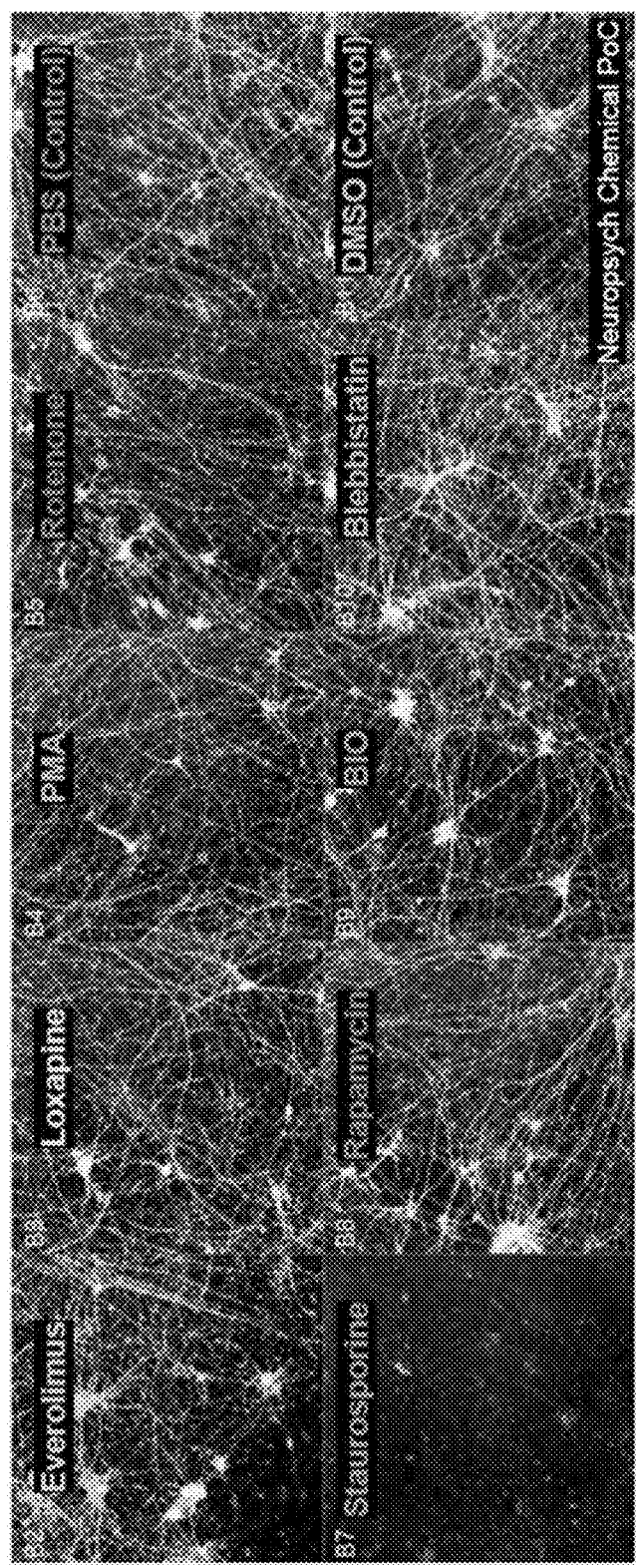

FIG. 10B depicts the fluorescent images of neurons that have been exposed to respective small molecule compounds. Generally, to the naked eye, it may be difficult to distinguish between neurons that have been treated from different compounds and even the PBS/DMSO controls (aside from neurons treated with Staurosporine).

Figure 10C:
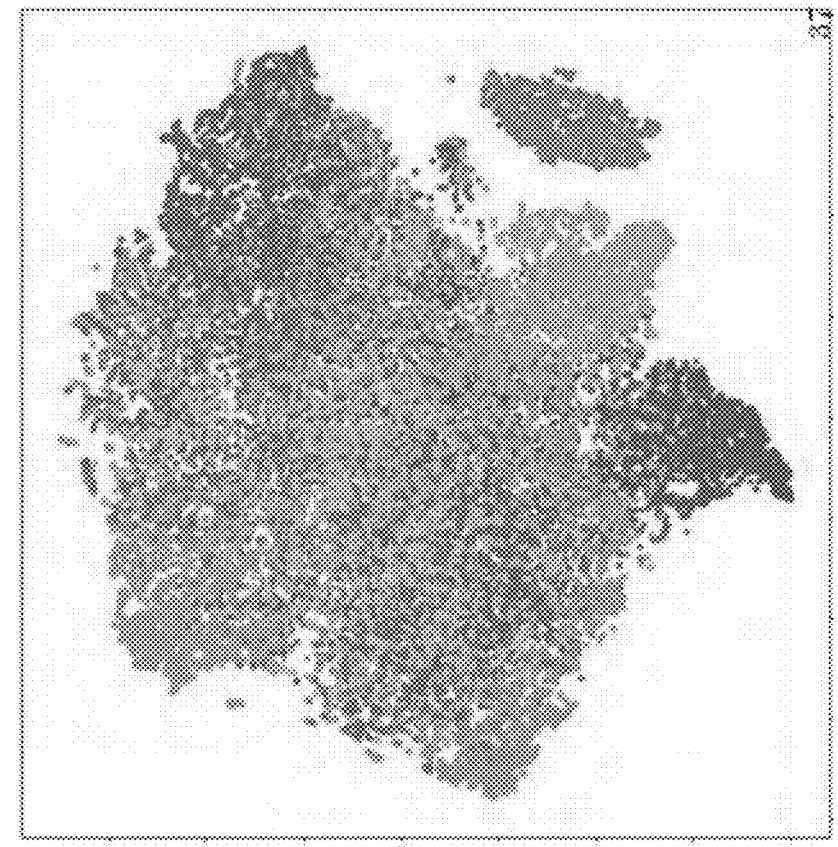

FIG. 10C depicts embeddings that distinguish neurons treated with differing small molecule compounds. Neurons treated with a common small molecule compound are clustered together. Of note, neurons treated with staurosporine are located separate from neurons treated with other small compounds, which aligns with the significant phenotypic differences between neurons treat with staurosporine and other neurons as observed in FIG. 10B.

Figure 10D:
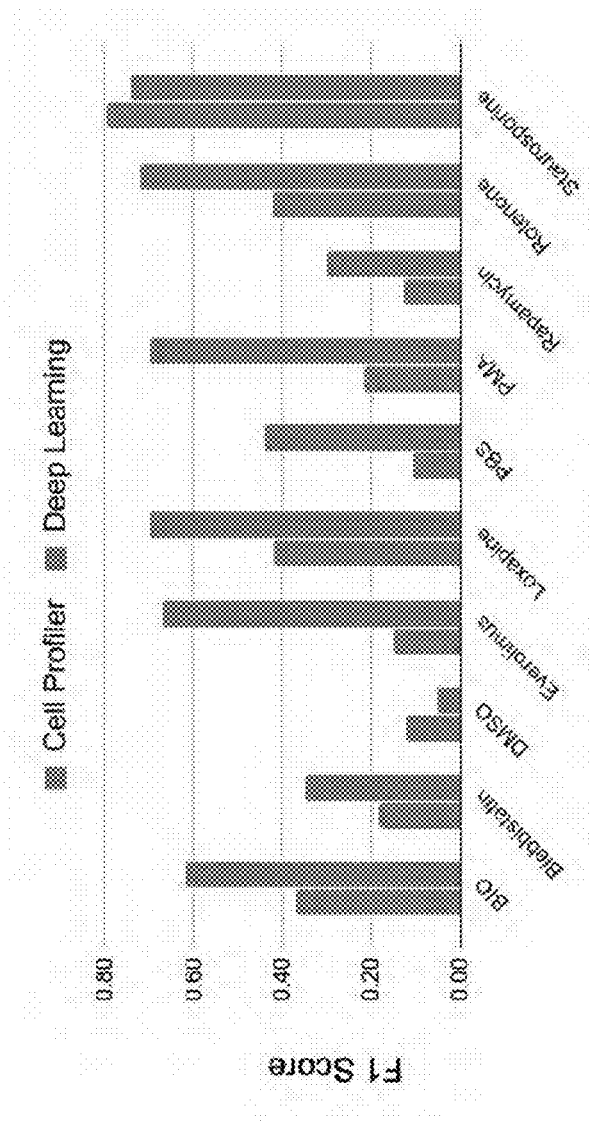

FIG. 10D depicts the comparison between predictions of deep learning machine learning model in comparison to the CellProfiler™ cell image analysis software. The deep learning machine learning model was able to more accurately predict neural phenotypes in response to treatment with a small molecule compound in comparison to the CellProfiler.

Example 8: Example Machine Learning Model that Differentiates In Vitro Neurons Engineered with Different Genetic Knockouts This example (Example 8) differs from Example 6 above in that Example 6 describes machine learning models that distinguish between phenotypes of liver tissue obtained from liver biopsies whereas Example 8 describes machine learning models that distinguish between phenotypes of in vitro cultures of neurons with different genetic knockouts (KO). Example 6 and Example 8 involve the training of a machine learning model e.g., a convolutional neural network, using their respective sources of phenotypic assay data, such that the machine learning model can be useful when deploying the cellular disease model for performing screens.

Figure 11A:
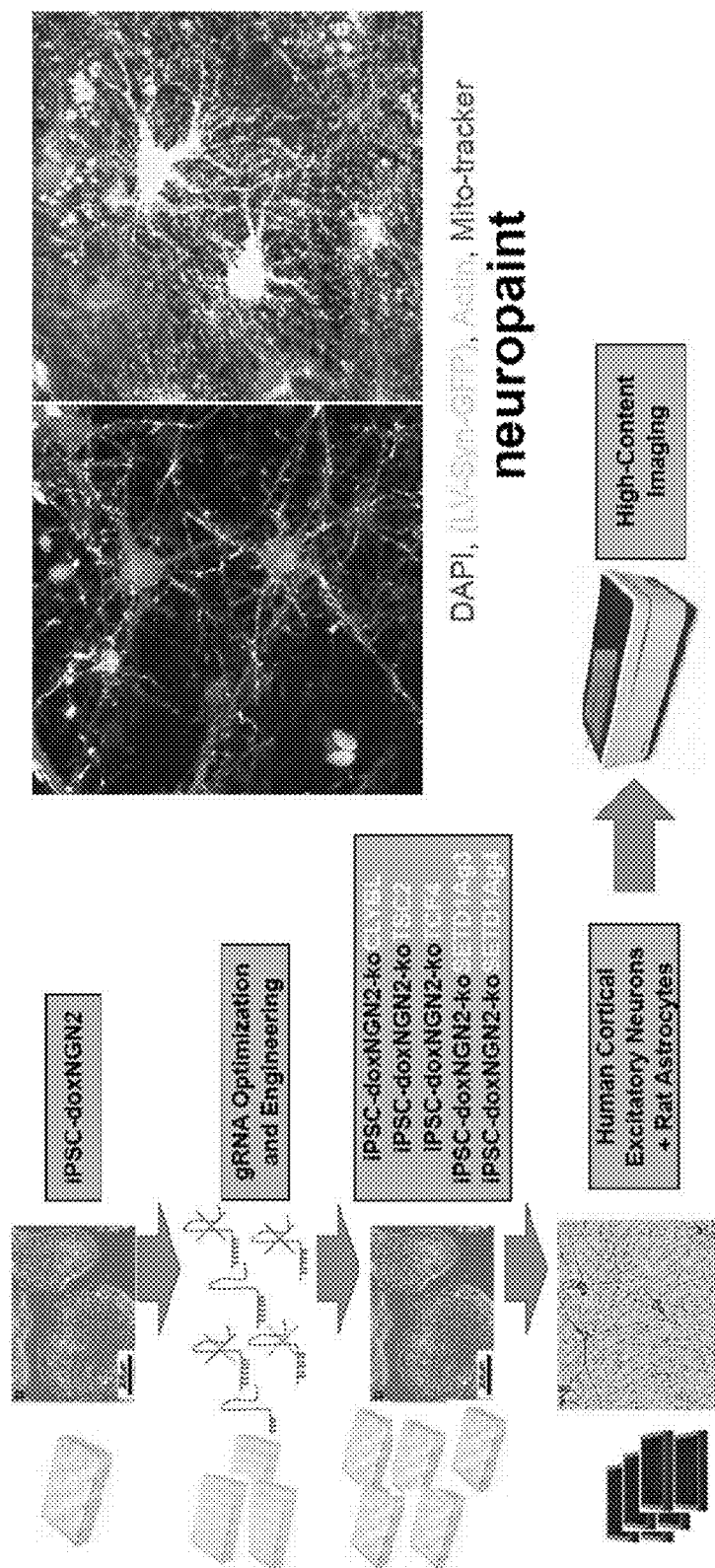
FIGS. 11A-11E depict the generation of embeddings that distinguish cellular phenotypes of neurons engineered with different genes knocked out.
Figure 11B:
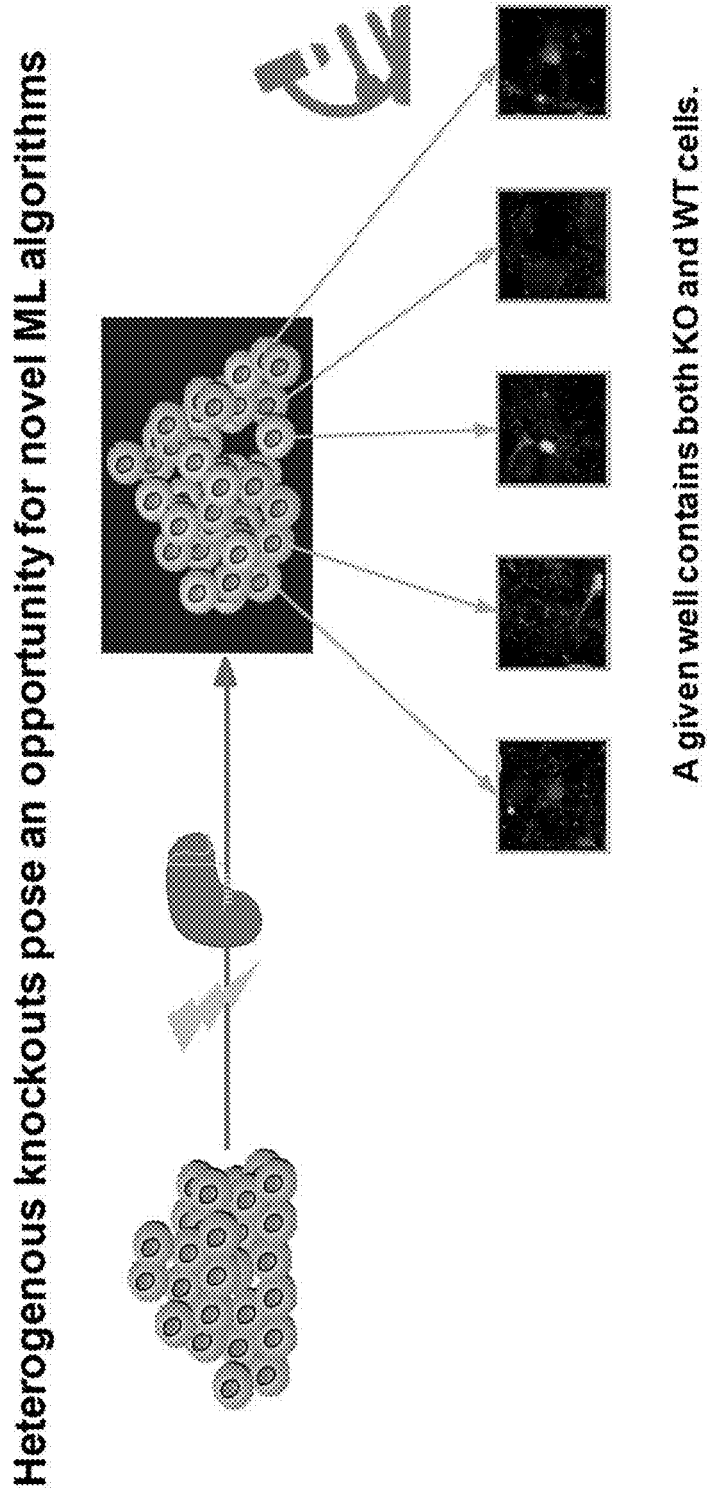

FIG. 11A depicts the overall process of capturing phenotypic assay data (e.g., fluorescent images) of neurons with different genetic KO. DoxNGN2 iPSCs (in vitro iPSC derived excitatory neurons) were plated and treated with a gene editing tool (e.g., CRISPR-Cas9 with optimized guide RNA) for knocking out one of the following genes: CLYBL (negative control), TSC2 (positive control-known to be involved in tuberous sclerosis), TCF4 (involved in Pitt-Hopkins/autism spectrum disorder), SETD1Ag3 (involved in schizophrenia), and SETD1Ag4 (involved in schizophrenia). As shown in FIG. 11B, the in vitro cell populations include heterogenous knockouts. Namely, a given in vitro well contains both knockouts as well as wild-type cells.

IPSCs, with their respective genetic makeup, were differentiated into human cortical excitatory neurons and phenotypic assay data was captured by performing high-content imaging (e.g., Neuropaint). As shown in FIG. 11A, neurons were stained using DAPI (cell nuclei), LV-Syn-GFP (neuron), Actin, and Mito-tracker (mitochondria). Notably, there is no marker to show that a genetic edit has been made in any given cell. Thus, using a machine learning model, the goal was to understand which phenotypic changes arise from this genetic perturbation via high-content microscopy and to distinguish the difference between the phenotypes of cells with KOs of different genes. Furthermore, this enables the identification of cells which are showing the strongest phenotype in the respective KO population.

Figure 11C:
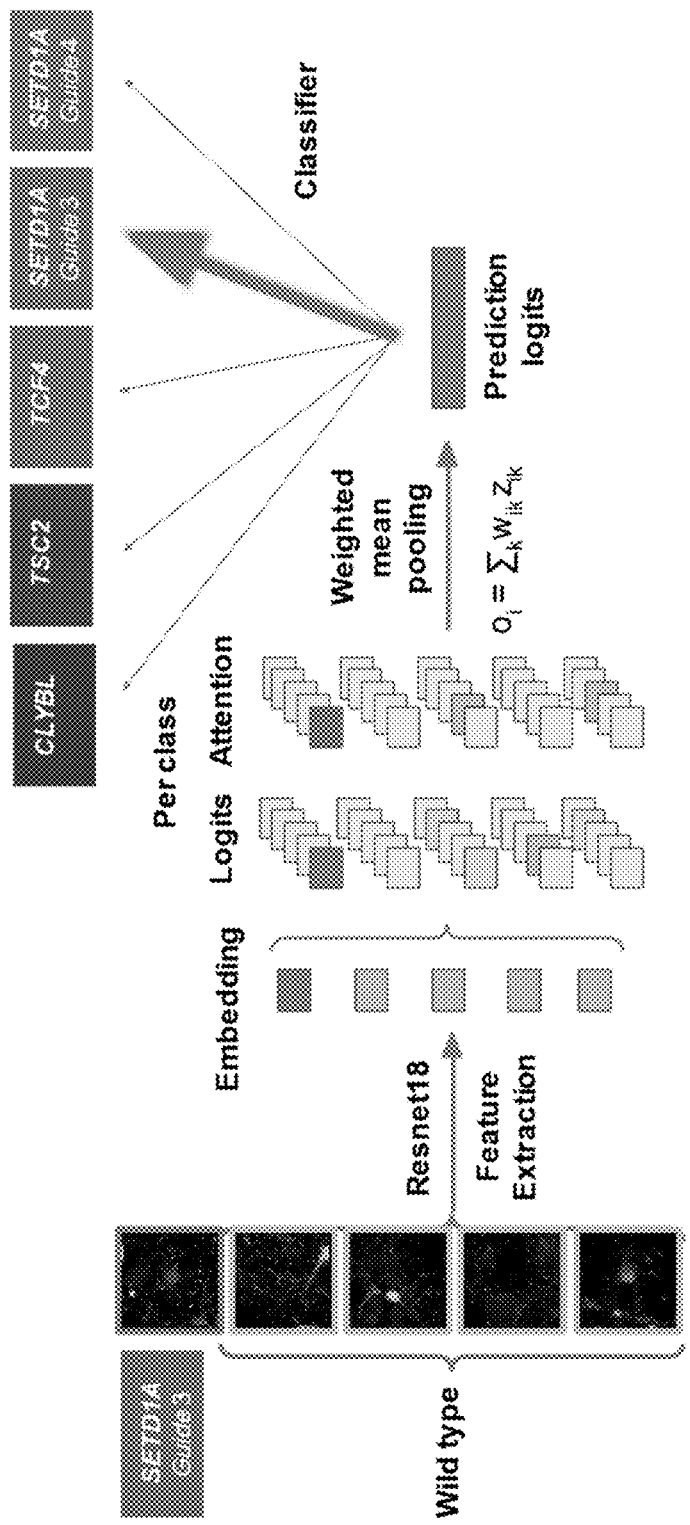

To train a model e.g., a deep convolutional neural network, the high-content microscopy images captured from the in vitro cells were used to train the model by applying attention-based multiple instance learning. FIG. 11C provides a diagrammatic overview of the training process. Here, collections of images of cells from the same KO group are aggregated together into what is hereafter referred to as a "bag". The collections of images of cells includes both KO cells (shown in FIG. 11C as SETD1A Guide 3) as well as wild type cells. Assuming that at least one of the cells in the bag has received a genetic edit and is showing some phenotype, the collection of images are passed through the convolutional neural network, to generate a vectorized representation of each cell. A linear transformation is then applied to this embedding vector with learned weights, generating both an attention and logit vector for each cell, respectively.

The dimensionality of both the attention and logit vector is equal to the number of different genetic KOs to be predicted. The logit is a representation of the predicted KO identity of a given cell, while the attention vector is used to reweight the importance of the respective logit on predicting the KO identity of the selected bag. In one instantiation, the logit vector can be constrained to be positive, further aiding downstream interpretability.

The attention vector is then normalized over all the cells in the bag for each respective KO class such that they sum to one. The normalized attention vector for each cell is then elementwise multiplied by the respective logit of that cell generating an importance vector. This collection of importance vectors is summed across all items in the bag, generating a probability of the identity of the KO of the bag. The model is trained end-to-end with stochastic gradient descent. The importance vector can be used to interpret which cells are most strongly showing a given phenotype. First, importance vectors are generated for each cell in a given population. The cells are then ranked by the importance vector value for each class. Cells represented by large, positive values in a given class can be interpreted as showing the strongest phenotype.

Figure 11D:
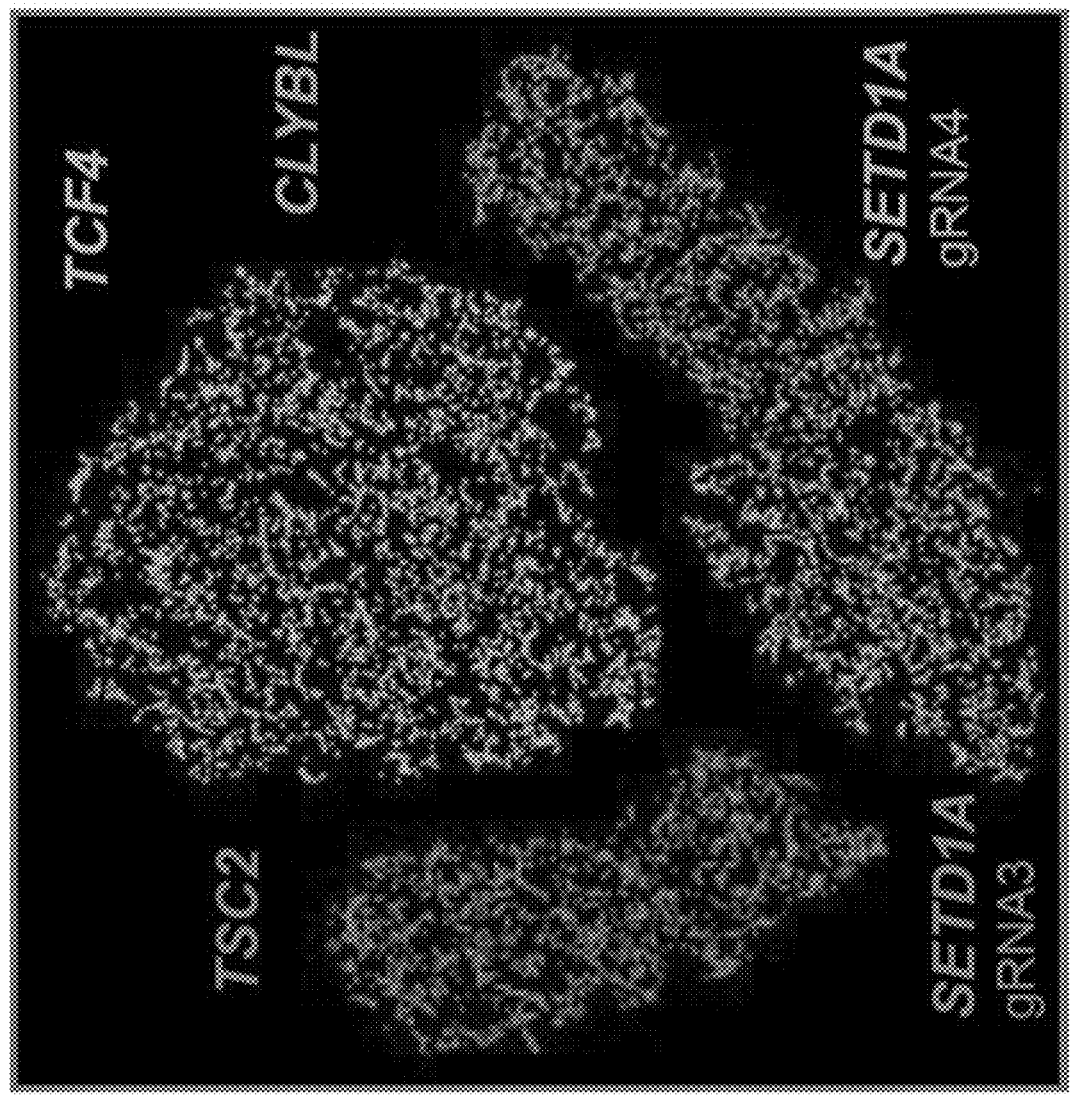
Figure 11E:
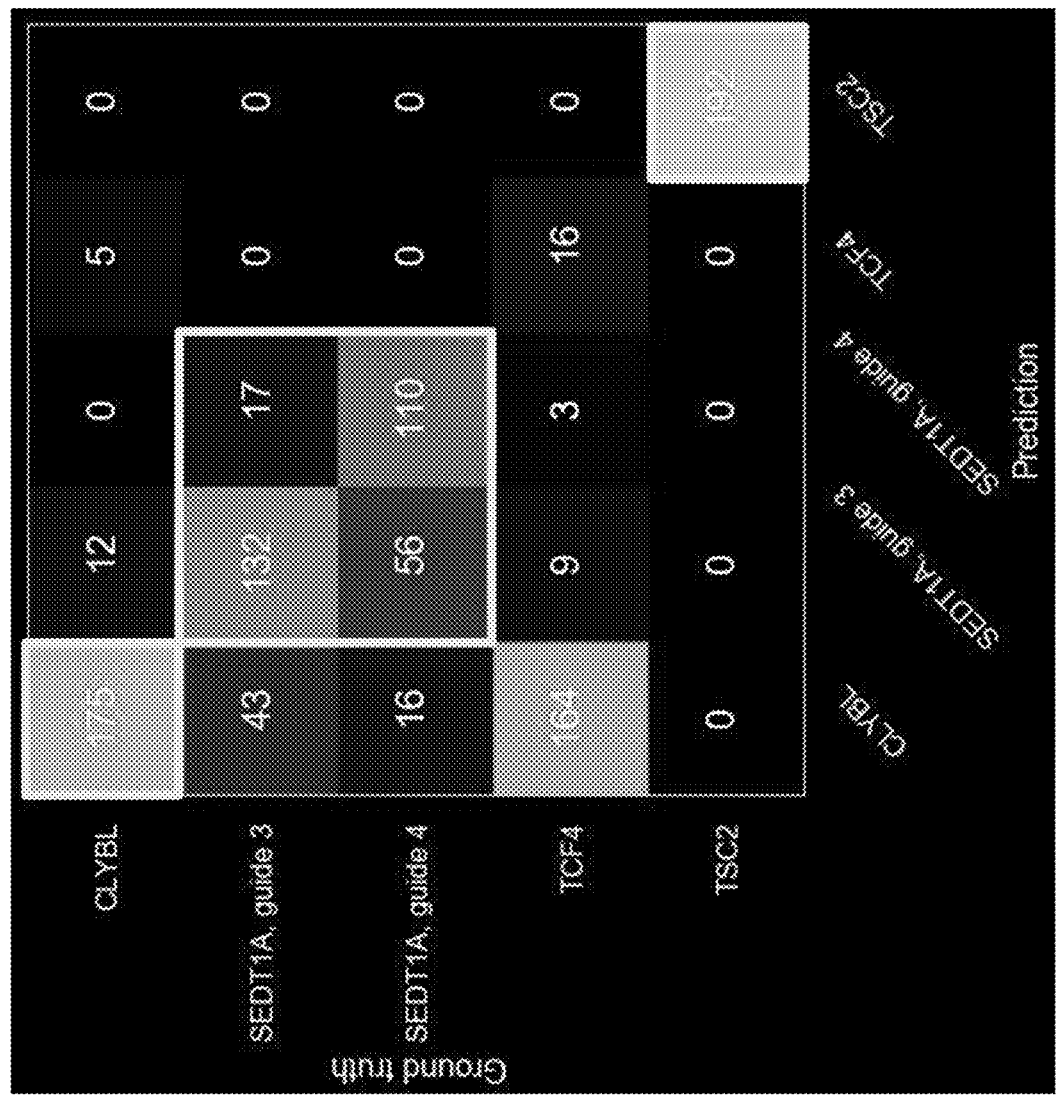

FIG. 11D depicts how neurons with differing genetic backgrounds are distinguished and organized on a manifold according to phenotypic features detected during analysis of image assays. Specifically, the machine learning model discovered similarities in neurons with either SETD1Ag3 knock-out or SETD1AG4 knock-out and therefore, they are located in proximity to one another. Here, the grouping of the SETD1A clones, and separation from the others, suggests a new ML-identified schizophrenia phenotype. Furthermore, TCF4 knock-out and CLYBL knock-out neurons exhibited similar phenotypes and are also located in proximity to one another. Here, the CLYBL knockout is a negative control. Therefore, the overlap of TCF4 (which is known to lead to Pitt-Hopkins) with the negative control group suggests that TCF4 likely plays a developmental role in Pitt-Hopkins. Additionally, TSC2 knockout neurons exhibited a strong neuronal phenotype that is distinguishable from the other neurons and therefore, are located separately on the manifold. FIG. 11E depicts the performance of the trained neural network for predicting the different subtypes of genetically modified neurons based on high-content microscopy images. Notably, the neural network was able to perfectly predict TSC2 mutant neurons (192 out of 192). Altogether, these results indicate that Multiple Instance Learning ML models enable classification of mixed knockout cultures (e.g., in vitro cultures with both knockout and wildtype cells).

Figure 12:
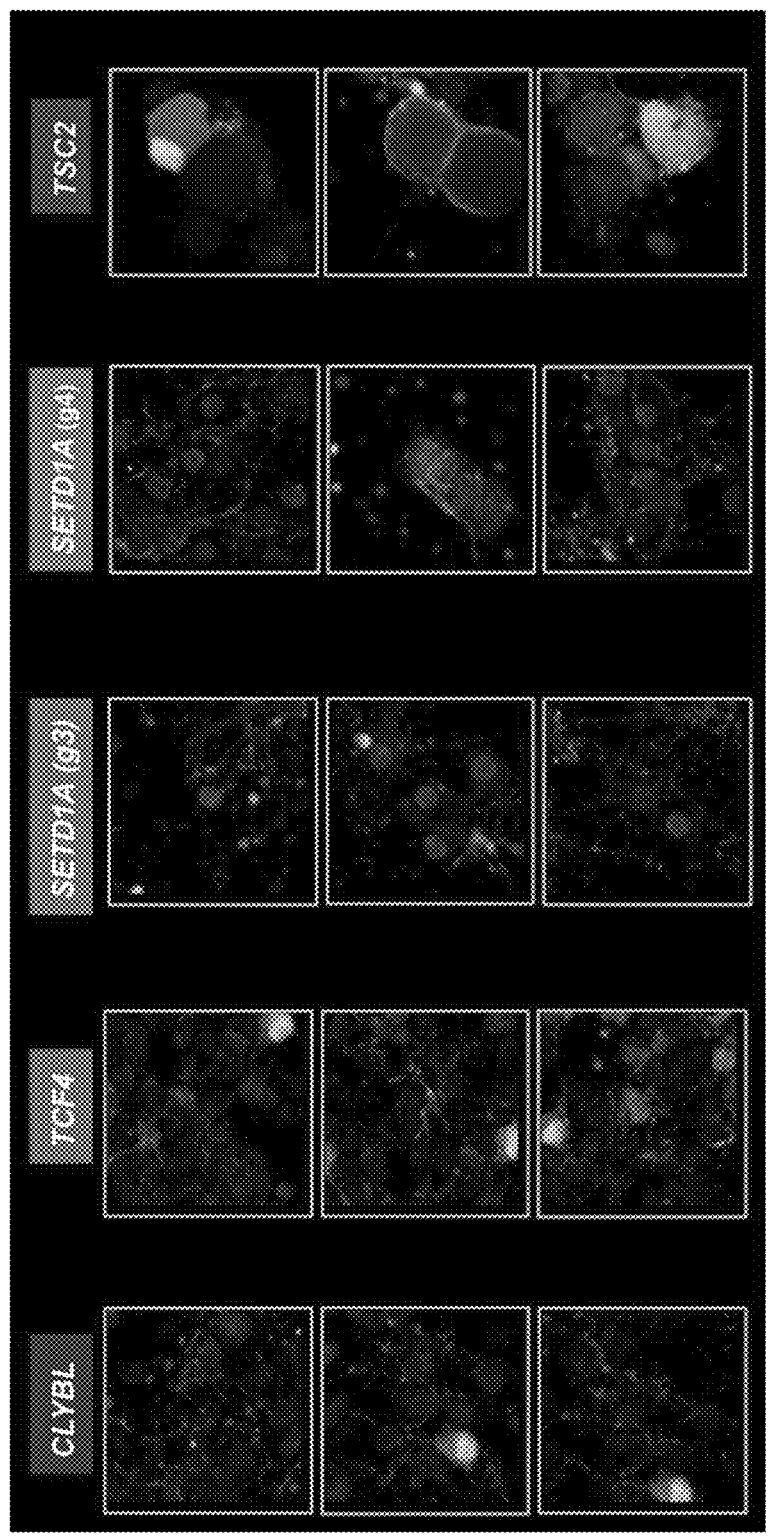
FIG. 12 depicts the tiles that garnered the attention of the machine learning model, which enables the differentiation of the different neuron cell phenotypes.

FIG. 12 depicts the three most highly ranked tiles for each neuron class (e.g., neuron knockout). Investigating the highly ranked tiles can reveal what/where in the image the machine learning model focused its attention in classifying the image in a particular class. This can reveal additional information, such as biological bases, behind a particular disease.

Figure 13:
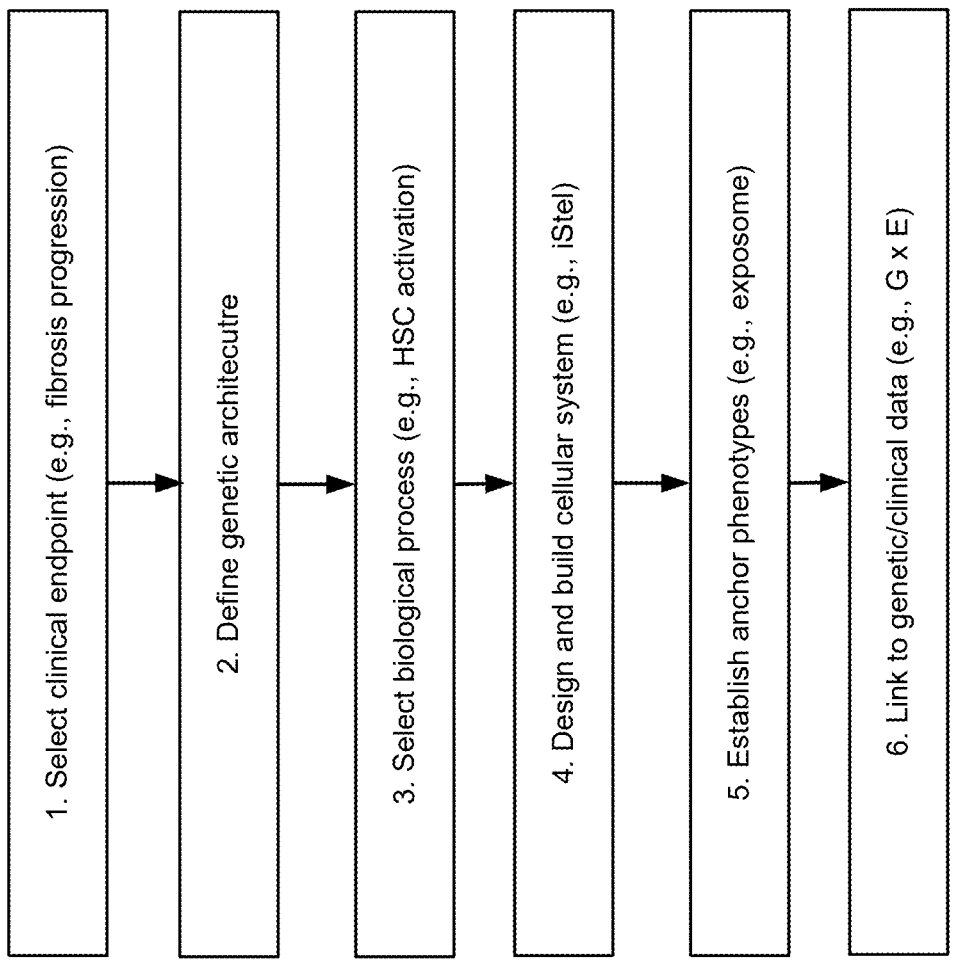
FIG. 13 depicts an overview of steps for generating training data for building a machine learning model.

Example 9: Example Methods for Generating Training Data for a Machine Learning Model FIG. 13 depicts an overview of steps for generating training data for building a machine learning model. Step 1 involves selecting a clinical endpoint of interest. An example clinical endpoint is fibrosis progression. Step 2 involves defining the genetic architecture of the clinical endpoint. Steps 3 and 4 involve selecting the biological process for the clinical endpoint of interest and then designing and building cellular systems for modeling the biological process. Here, an example biological process for fibrosis progression is hepatic stellate cell (HSC) activation. Therefore, iStels are the chosen cellular system for modeling HSC activation. Step 5 involves establishing anchor phenotypes using the cellular system. This includes performing an exposome, which involves perturbing cells using various perturbagens. This can further involve genetically modifying (e.g., knocking in/out certain genes of interest) the cells to model combinatorial effects of perturbagens and genetic modifications. Step 5 involves performing phenotypic assays on the cells including, for example, single cell RNA-seq and/or imaging of cells to capture morphological features of the cells. Step 6 involves linking the genetic and clinical data. Altogether, the steps 1 through 6 shown in FIG. 13 are valuable for defining and validating exposure response phenotypes (ERP) which serve as proxy labels of health and disease in an in vitro model of the clinical endpoint of interest (e.g., NASH fibrosis progression). Such data generated from the steps of 1-6 (e.g., data resulting from the exposome or images captured of the cells) are used to train a machine learning model.

Figure 14A:
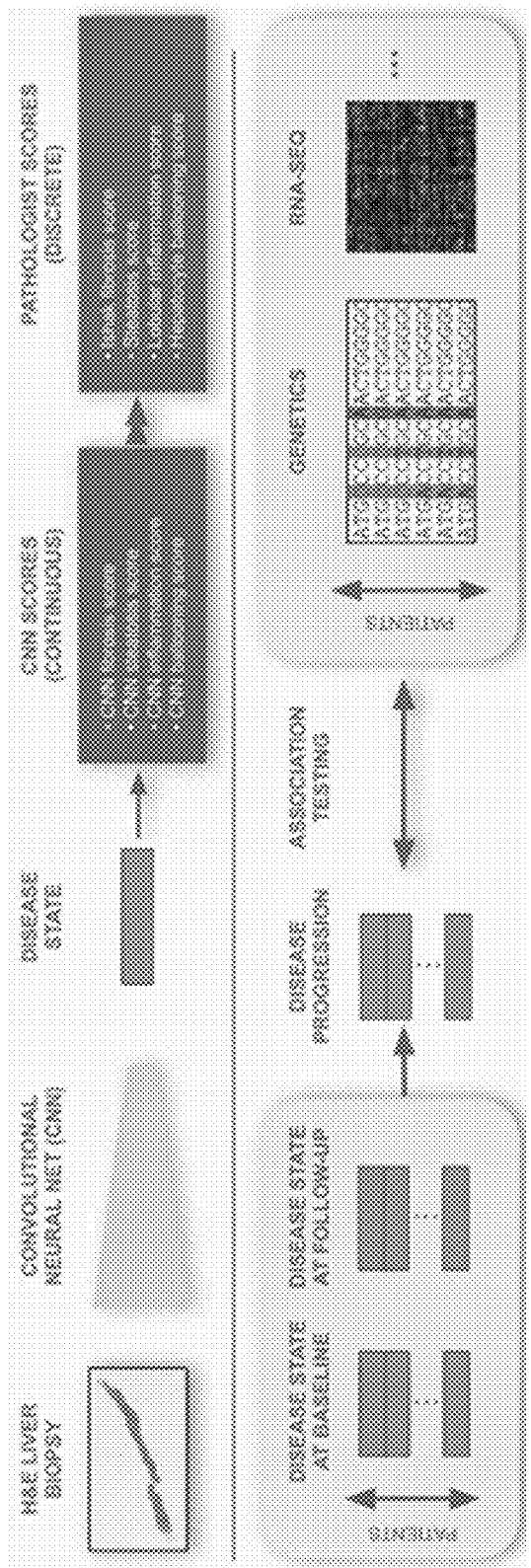
FIG. 14A depicts an example of a process for determining genetic architecture using association testing between GWAS analysis and a model that differentiates between phenotypic measures of cellular disease.

FIG. 14A depicts an example of a process for determining genetic architecture using association testing between GWAS analysis and a model that differentiates between phenotypic measures of cellular disease. Generally, the process involves an association testing between GWAS identified variants and predicted states of disease progression to identify the genetic variants that are likely novel genetic drivers of the clinical endpoint (e.g., fibrosis progression). As shown in the top panel, phenotypic assay data (e.g., H&E liver biopsy image) is analyzed using a machine learning model, such as a convolutional neural net to predict disease state. Here, the performance of the convolutional neural net was previously verified against pathological scores, as was described above in FIG. 8C. Here, the convolutional neural net is applied to different images to predict disease state at different timepoints (e.g., at baseline and at follow-up), thereby enabling a characterization of disease progression across the timepoints. As association testing is performed between the characterization of disease progression and GWAS identified variants. Here, variants that are highly associated with disease progression are identified and selected for inclusion in the genetic architecture of the disease. Thus, such variants are genetically engineered in cellular systems to enable testing and modeling of the genetic variants.

Figure 14B:
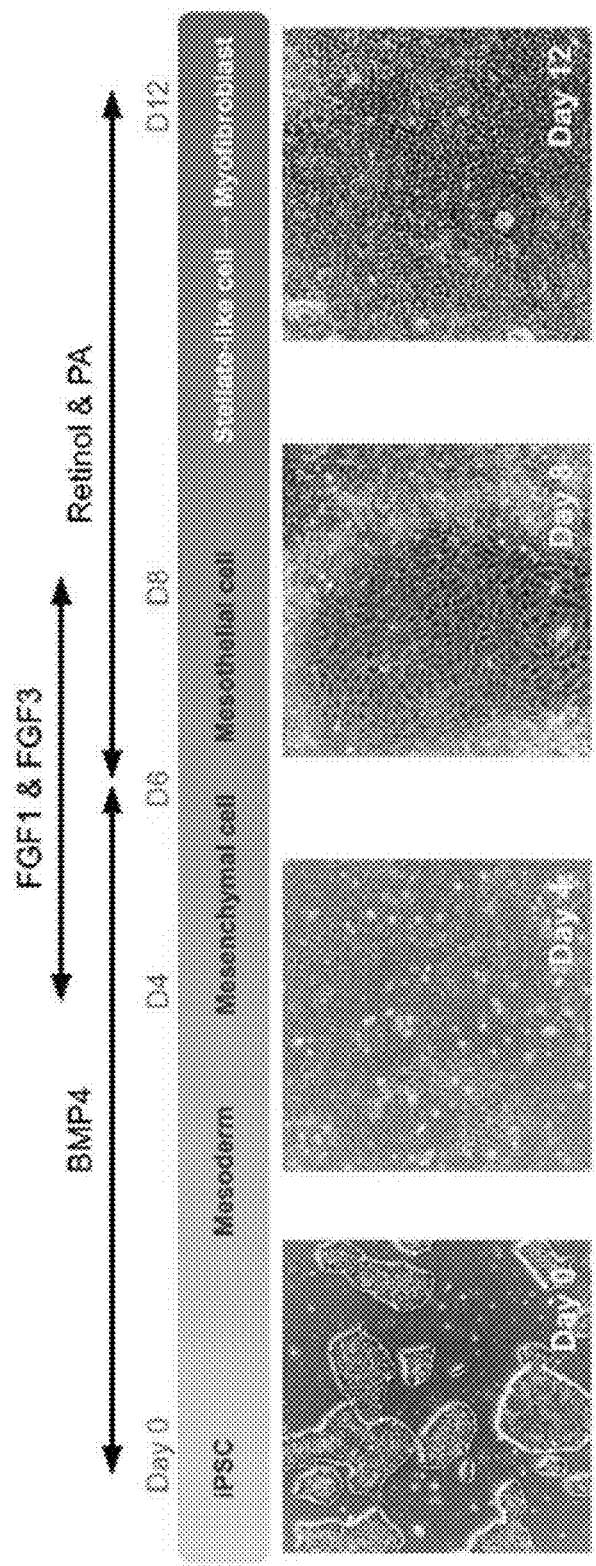
FIG. 14B depicts an example of selecting a biological process (e.g., HSC activation) and building a cellular system of iStels.

FIG. 14B depicts an example of selecting a biological process (e.g., HSC activation) and building a cellular system of iStels. Specifically, FIG. 14B shows an iStel differentiation protocol. iPSCs were differentiated to generate a renewable source of stellate-like cells (iSTELs) using a cocktail of growth and differentiation factors, applied in a time-specific manner. The differentiations at various time points were observed and imaged, with qualitative assessment of well-level confluence, cell health, and morphology; cultures were harvested and banked at day 12. With few exceptions, the iPSCs consistently displayed good morphology throughout multiple differentiations. In FIG. 14B, the top panel shows a timeline of the iSTEL development from iPSC with time specific addition of growth factors. Growth factors include bone morphogenetic protein 4 (BMP4), fibroblast growth factor (FGF); retinol, and palmitic acid (PA). The bottom panel in FIG. 14B shows representative images of ISTEL differentiation from iPSC from day 0 through 12 (D12).

Figure 14C:
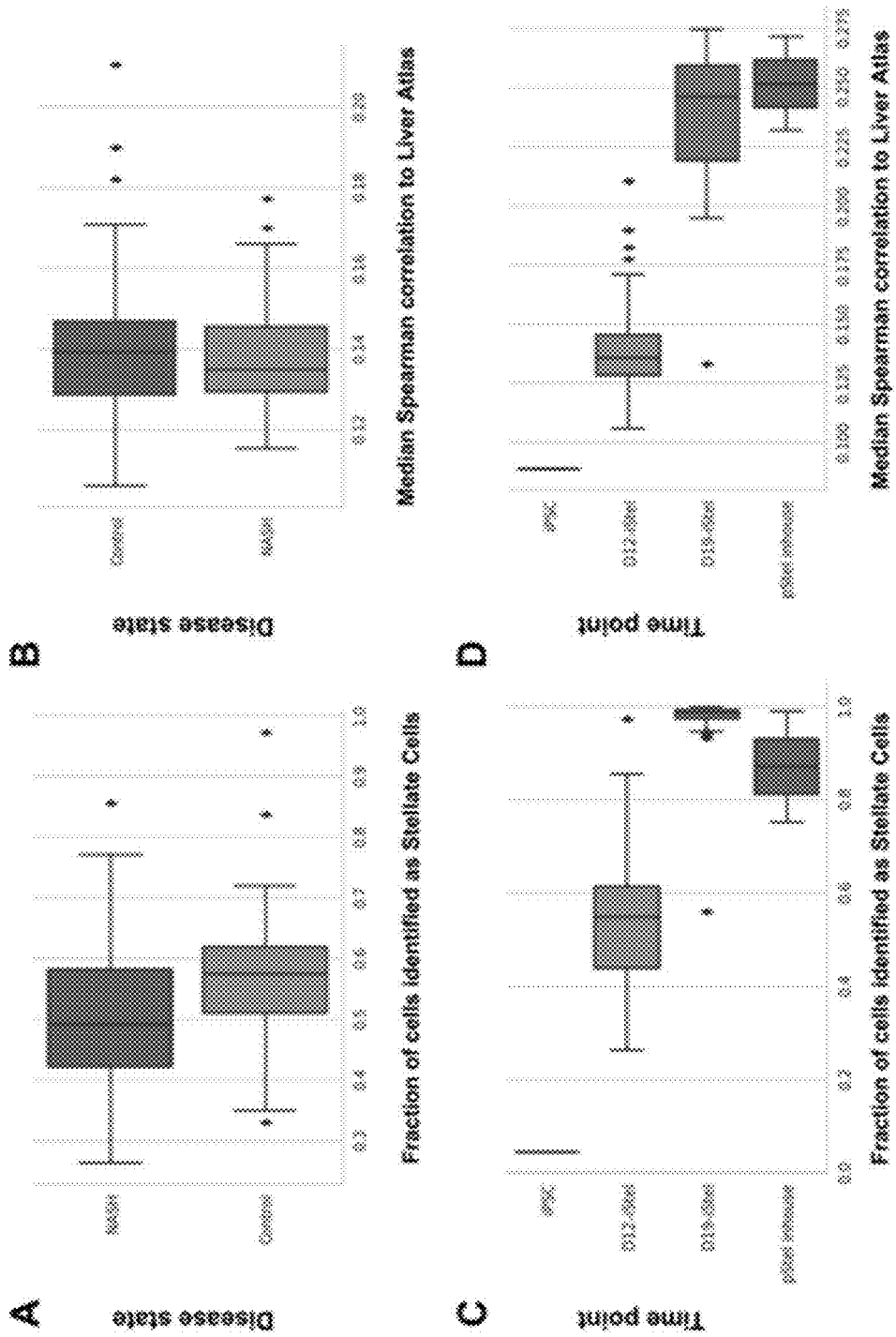
FIG. 14C shows a quality control check on iStel lines using scRNA seq data across multiple timepoints (e.g., 12 days or 19 days post-differentiation).

FIG. 14C shows a quality control check on iStel lines using scRNA seq data across multiple timepoints (e.g., 12 days or 19 days post-differentiation). Specifically, Panel (A) in FIG. 14C shows the fraction of cells identified as stellate cells. Panel (B) shows the median Spearman correlation to stellate cells from Liver Atlas of day 12 iSTELs, which indicates that line variability is not associated with disease status. Panel (C) shows the fraction of cells identified as stellate cells. Panel (D) shows median Spearman correlation to stellate cells from Liver Atlas, thereby indicating that day 19 iSTELs are similar to pSTELs.

Specifically, iSTEL identity was evaluated using scRNA-seq, followed by quantifying the similarity in gene expression between day 12 iSTELs and different cell types from the Liver Atlas using Spearman correlation. Despite differences in genetic background, batch and passage number, high consistency was observed across all iSTEL lines in terms of the fraction of cells identified as stellate-like cells (i.e., cells that are most similar to in vivo stellate cells than other liver cell types, (Panel A of FIG. 14C), and the median expression correlation to in vivo stellate cells (Panel B of FIG. 14C). Comparing NASH and non-NASH lines, only a minor difference was observed in the fraction of stellate cells (difference in median=0.08, Mann Whitney U test, p value=0.007), and no differences in the median expression correlation to in vivo stellate cells (Mann Whitney U test p=0.25).

Next, genes were identified that explained the most transcriptomic variance in each iSTEL differentiation. Despite differences in experimental covariates, certain axes of variances may be shared across different iSTEL differentiations. Eighty-eight day 12 iSTEL differentiations were examined, some of which were differentiated from the same lines in our 53-line pool. For each differentiation, PCA was performed on the scRNA-seq data to identify the top PCs in transcriptional expression. Common axes of transcriptional variance along the lines were characterized. These analyses did not identify any concerning axis of transcriptional variability.

In addition, day 19 iSTELs (both control and TGFβ-treated) were evaluated using the same identity metrics as computed for day 12 iSTELs. Compared to day 12, day 19 iSTELs showed a significantly higher fraction of stellate cells (Panel C of FIG. 14C) and an improved correlation to in vivo stellate cells (Panel D of FIG. 14D), with values approaching that of pSTELs. These data suggest that additional culture time and/or extended exposure to substrate resulted in further maturation of the iSTELs. Overall, these results provided an understanding of the intrinsic variance for individual lines within a well-characterized cohort of NASH patient and non-NASH donor-derived iSTELs. This cohort will be a valuable tool to explore the natural genetic variation in our disease models.

Figure 14D:
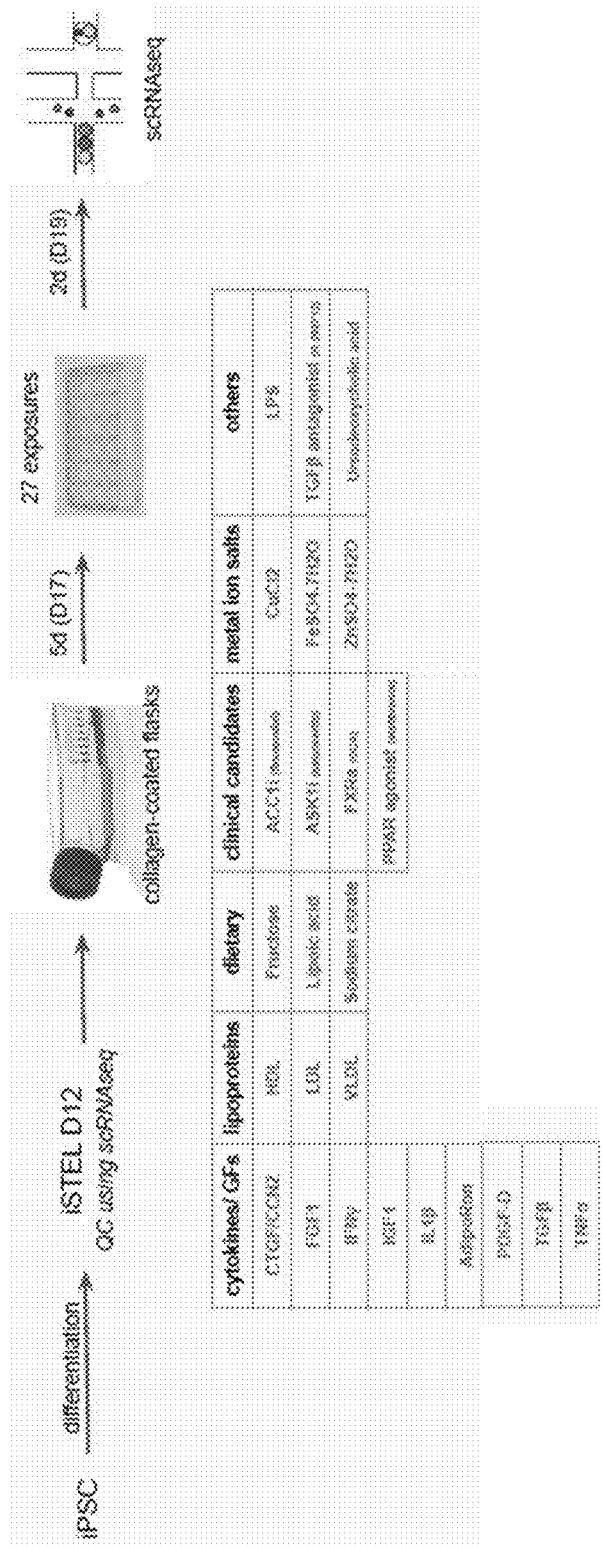
FIG. 14D depicts an example setup of an exposome for establishing anchor phenotypes.

FIG. 14D depicts an example setup of an exposome for establishing anchor phenotypes. iPSCs underwent differentiation to generate iStels at Day 12. Quality control check using scRNA-seq was performed on Day 12. iStels were cultured until Day 17 after which cells were exposed different perturbagens including cytokines, lipoproteins, dietary perturbagens, clinical candidates, metal ion salts, and others. As shown in FIG. 14D, the perturbagens include CTGF/CCN2, FGF1, IFGY, IGF1, IL1β, AdipoRon, PDGF-D, TGFβ, TNFα, HLD, LDL, VLDL, fructose, lipoic acid, sodium citrate, ACCli (Firsocostat), ASKli (Selonsertib), FXRa (obeticholic acid), PPAR agonist (elafibranor), $CuCl_2$, $FeSO_4$ $7H_2O$, $ZnSO_4$ $7H_2O$, LPS, TGFβ antagonist, and ursodeoxycholic acid. After exposing cells to perturbagens for 2 days, scRNA-seq is performed to characterize the transcriptional profiles of the cells.

Figure 14E:
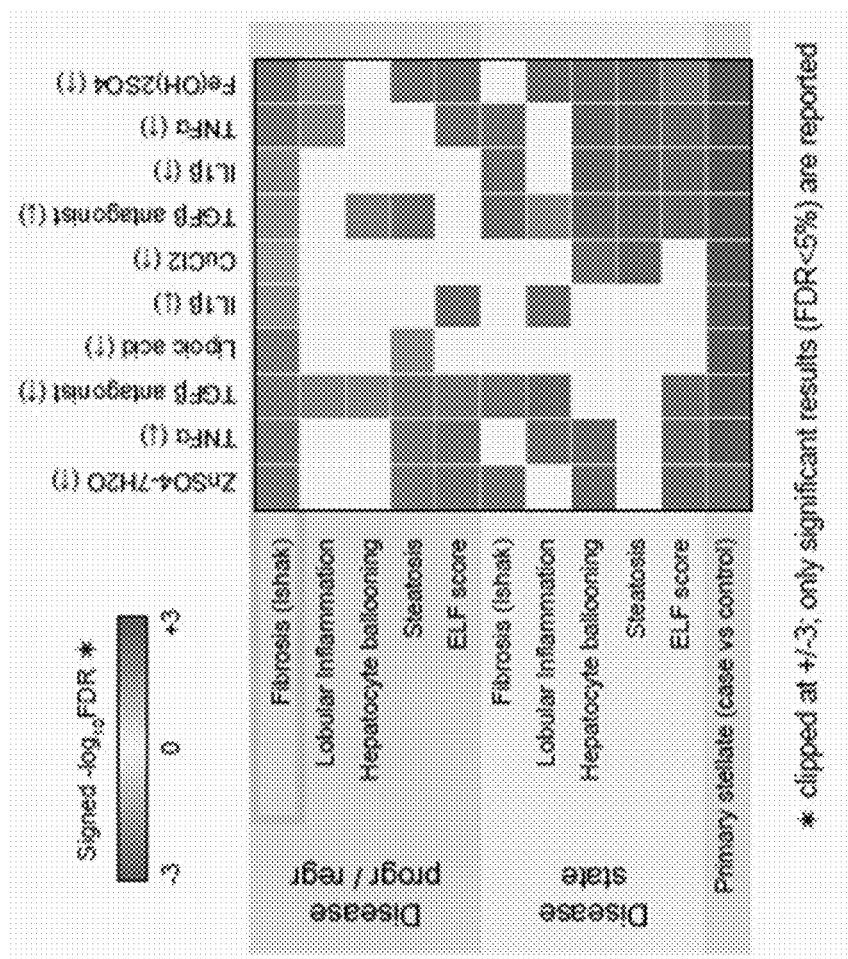

FIGS. 14E and 14F depict results of an exposome analysis and the identification of 5 candidate exposures. Here, 5 candidate exposures were selected that appear to perturb biological processes that are relevant to fibrosis progression/regression in the context of the STELLAR clinical trials. This involved 3 steps: 1) identification of a transcriptional exposure response phenotype (ERP), 2) testing for enrichment of exposure response phenotypes in genes associated with clinical endpoints, and 3) comparison of ERP similarity across exposures.

Enrichment of in-vitro exposure up- and down-regulated gene sets in clinical endpoint differentially expressed genes were tested using GSEA. The left panel in FIG. 14E shows ERPs with significant enrichment for each endpoint (FDR 5%) along with the direction of enrichment. Exposures with ERPs enriched in fibrosis progression/regression associated genes are considered for further analysis.

To avoid redundancy in the selection of fibrosis progression relevant exposures, exposures are identified whose fibrosis progression/regression enrichment is driven by similar genes. Specifically, pairwise enrichment of the GSEA fibrosis progression/regression leading edge genes is tested using Fisher's exact test for exposures that are significantly enriched in fibrosis progression/regression genes. Exposures are marked as "similar" if these leading edge genes are significantly enriched at FDR 5%.

Example 10: Example Cellular Disease Model for Identifying Candidate Targets

Figure 15A:
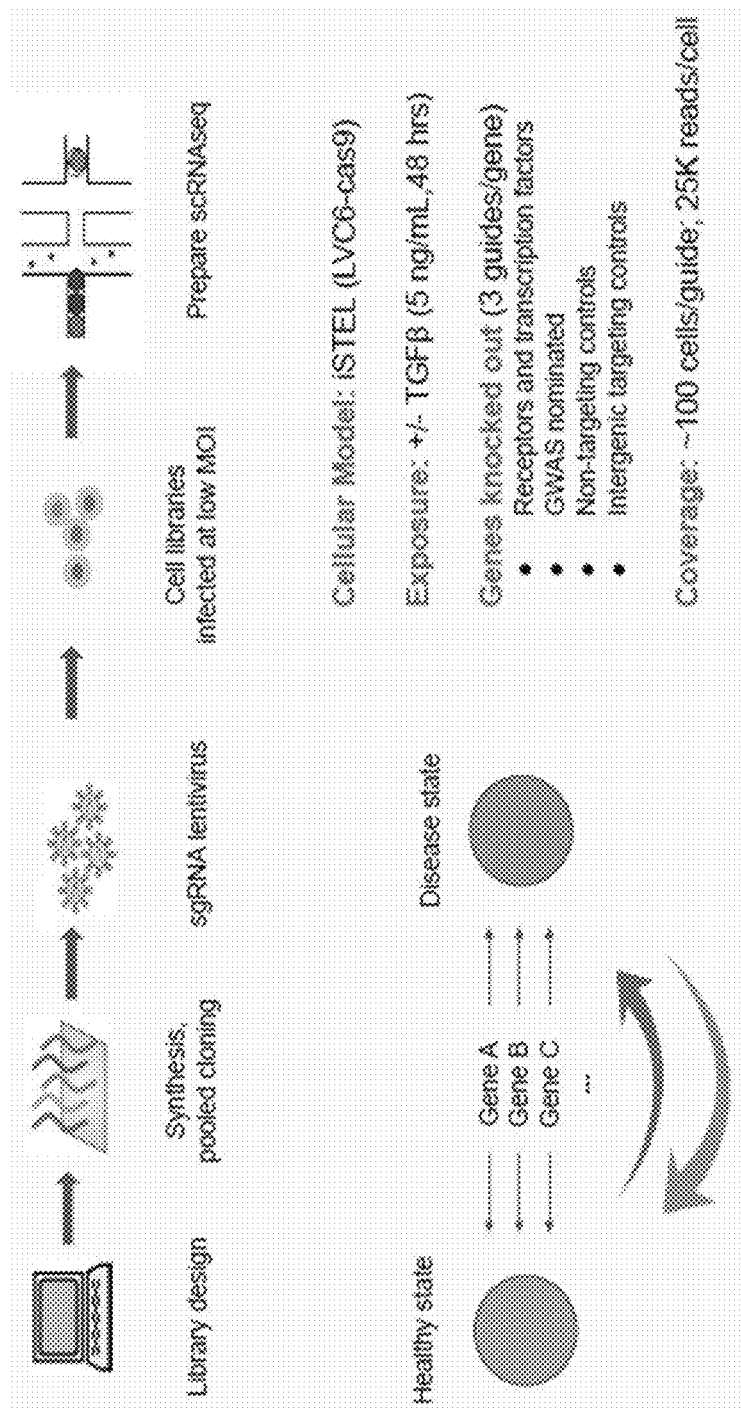
FIG. 15A depicts a methodology for performing Perturb-seq across a wide spectrum of exposures (including TGFβ) and CRISPR edited genes.

FIG. 15A depicts a methodology for performing Perturb-seq across a wide spectrum of exposures (including TGFβ) and CRISPR edited genes. Perturb seq experiments (CRISPR knockout of genes coupled with scRNAseq) were performed by (1) identifying a panel of genes of interest to perturb (through GWAS, literature, alternative screens) (2) identifying multiple guides (at least 3) for each gene of interest. (3) A curated CRISPR guide library was synthesized with flanking ligation adapters. (4) Enriched sgRNA libraries were cloned into the CROPseq backbone and quality control experiments confirmed representation of sgRNA sequences by next generation sequencing (NGS). (5) Lentivirus was produced by reverse transfection of HEK293T with pMD2.G, PAX2, and the sgRNA guide libraries. Viral supernatant was harvested after 3 days, filtered, and stored at −80° C. until use. (6) iSTEL LVC6-Cas9 cells were transduced at day 12 with pooled sgRNA-expressing lentiviruses (MOI 0.15-0.3) followed by 6 days of puromycin (1 μg/mL) selection from day 14 to day 20 and an additional 2 days of recovery. (7) At day 22, cells were dissociated and seeded on 6 well collagen coated plates ($2×10^5$ cells per well) followed by treatment with selected exposure or DMSO. (8) Cells were harvested 48 hours after treatment. scRNA-seq was performed following the Chromium Next GEM Single Cell 3' Protocol (10X Genomics).

Figure 15B:
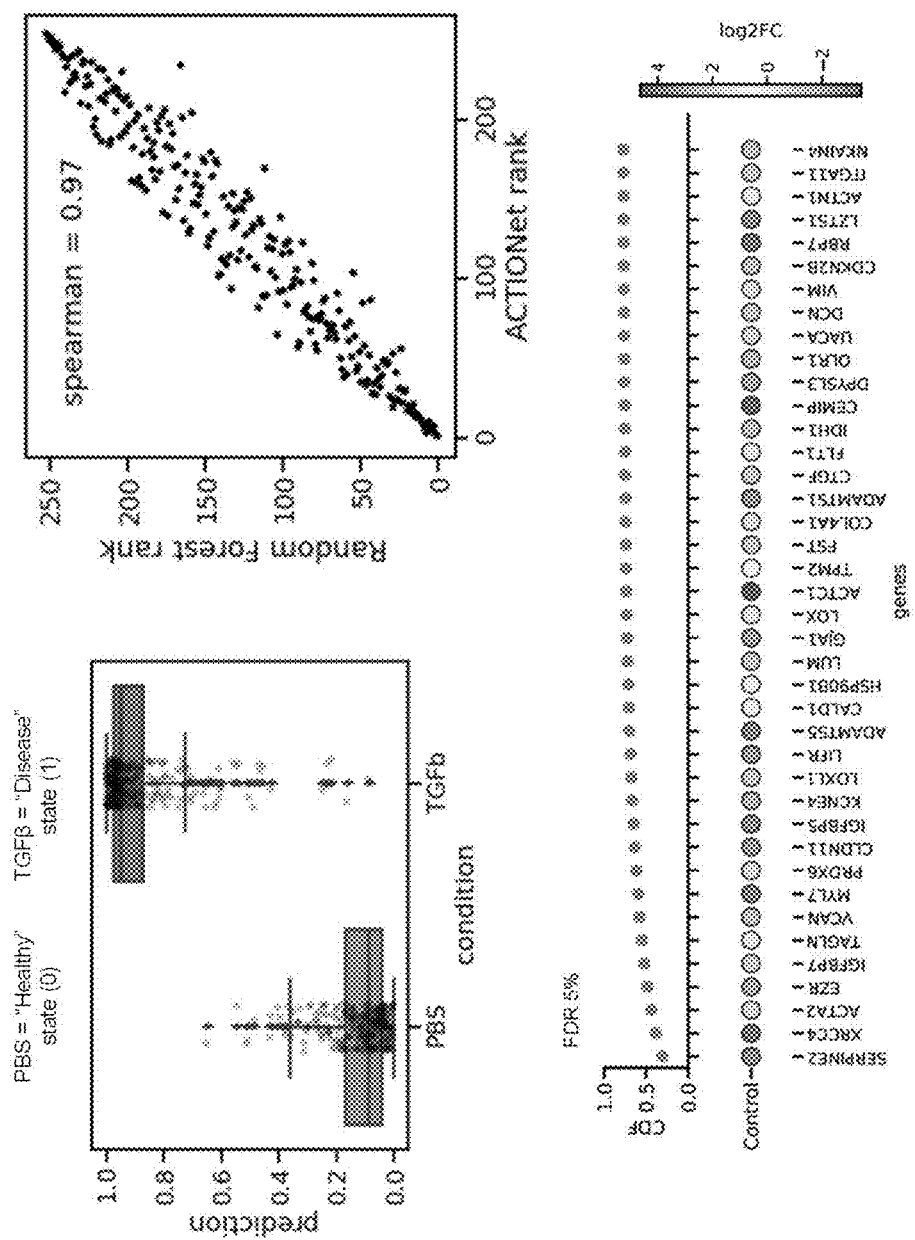
FIG. 15B depicts performance of two example machine learned models (e.g., random forest and ACTIONet) that successfully differentiates between treated and non-treated cells according to Perturb-seq transcriptional state.

Two different machine learning models were trained on scRNA-seq data derived from treated (e.g., treated with TGFβ) and non-treated cells. The machine learning models were able to successfully distinguish between cells treated with TGFβ and those that were non-treated. FIG. 15B depicts the performance of two example machine learned models (e.g., random forest and ACTIONet) that successfully differentiates between treated (e.g., treated with TGFβ) and non-treated cells according to Perturb-seq transcriptional state.

The top left panel of FIG. 15B shows the performance of a random forest regression model. The top right panel of FIG. 15B shows the correlation between ranked genes derived from the random forest regression model and the ranked genes from an ACTIONet model. Here, the random forest regression model predicts cell state (1—TGFβ vs. 0—control), based on transcriptional state. The model is implemented to identify a rank ordered list of genes. The effect of gene knockout on TGFβ response was quantified through both the random forest regression and ACTIONet. In comparing the two, the ranking of gene knockout effects are highly consistent (spearman coefficient=0.97).

Specifically, the random forest regression model is trained on cells expressing non-targeting guides (no expected DNA damage or gene knockout effects) and cells that have been treated with either exposure or DMSO. (2) Single cell expression counts are median normalized for sequencing depth. (3) Z score gene expression relative to all non-targeting controls and remove genes that are lowly expressed (for example mean UMI <0.1) (4) Train model with 5 fold cross validation to predict exposure condition based on expression data. The importance of each gene is determined for exposure prediction (bottom panel of FIG. 15B).

To establish whether machine learning models can achieve improved performance, the pSTEL morphological phenotype was evaluated by generating embeddings using unsupervised models. Covariate-correction was performed on the original embeddings to generate residual embeddings of 90,596 segmented pSTELs. The residual embeddings were used as the dataset for exposure prediction. The evaluation focused on an out-of-line validation protocol; in other words, the testing of each model was performed on held-out data that was not present in the dataset used to train the model. Given the limited set of pSTEL lines, cell lines were held out one at a time and the receiver operating characteristic (ROC) curves along with the calculated area under the curve (AUC) were reported. The label of interest in this instance was exposure or non-exposure to TGFβ.

Figure 15C:
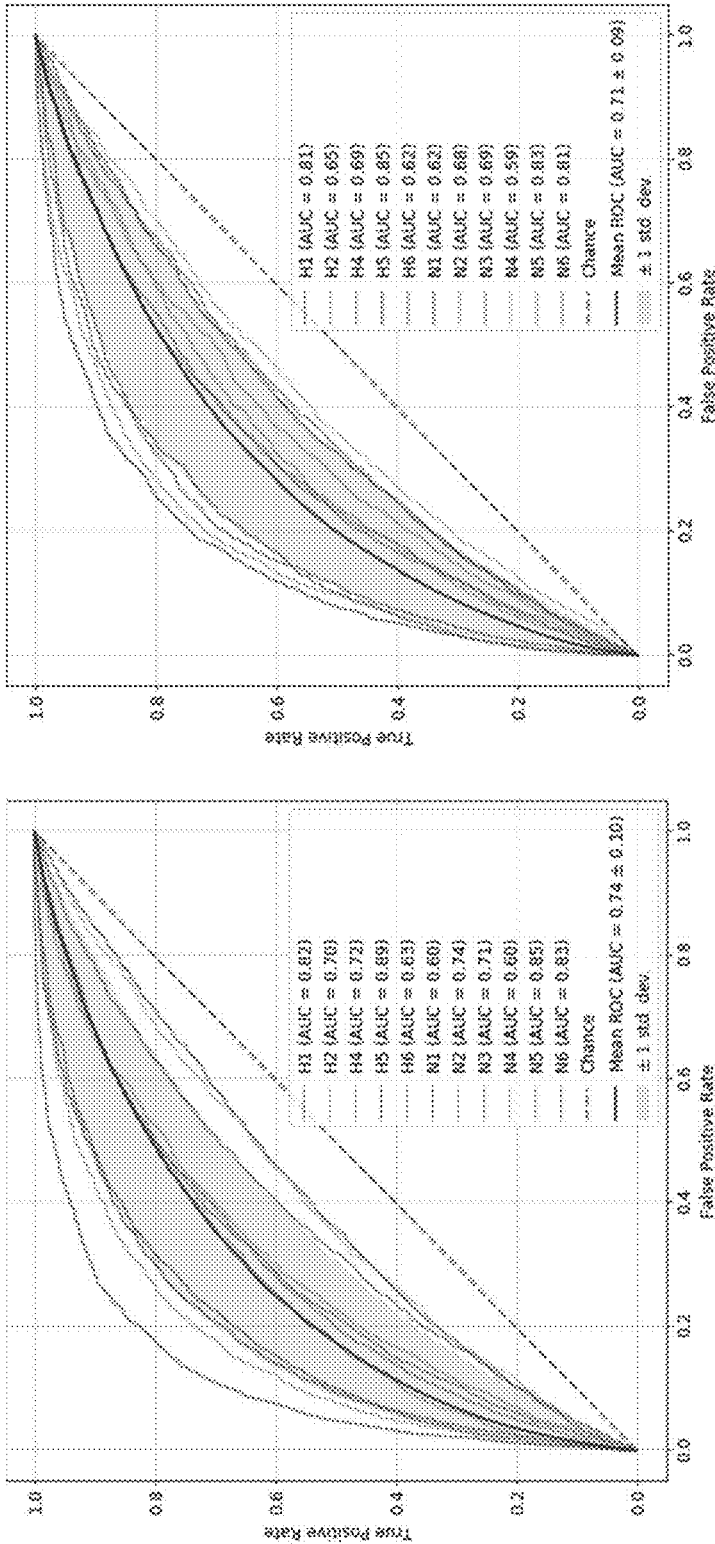
FIG. 15C depicts improved performance of a trained machine learning model that differentiate between 0.1 ng/mL TGFβ treated and untreated cells according to morphological differences.
Figure 15D:
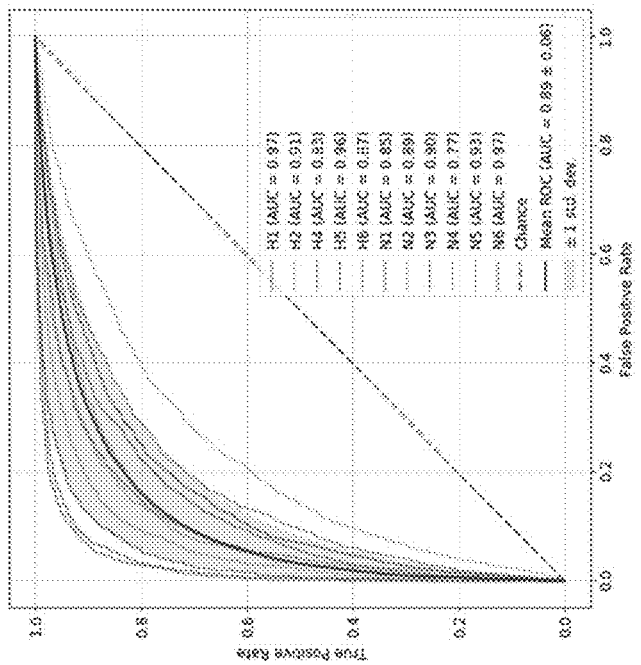
FIG. 15D depicts improved performance of a trained machine learning model that differentiate between 5 ng/mL TGFβ treated and untreated cells according to morphological differences.
Figure 15D:
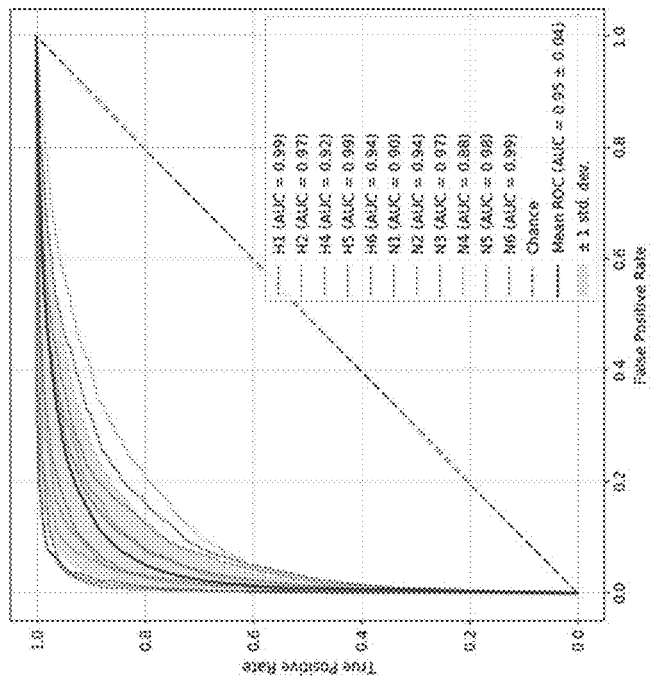

For each held-out line, a regression model was trained on top of residual embeddings minus the held-out cell line. The out-of-line validation framework was used to compare both low and high TGFβ concentrations to control conditions (i.e., PBS treatment). In addition to running multiple out-of-line variations, we also performed an even stricter evaluation of the TGFβ phenotype by testing the performance in an out-of-acquisition setup (i.e., testing on a biological replicate/distinct donor cells run on a different day). Specifically, FIG. 15C depicts improved performance of a trained machine learning model that differentiates between 0.1 ng/mL TGFβ treated and untreated cells according to morphological differences. FIG. 15D depicts improved performance of a trained machine learning model that differentiate between 5 ng/mL TGFβ treated and untreated cells according to morphological differences. The left panel in each of FIGS. 15C and 15D shows a robust morphological TGFβ-induced phenotype that demonstrated attributes of dose responsiveness (mean AUC of 0.74/0.78 for low dose and 0.95/0.93 for high dose in out-of-line/out-of-acquisition, respectively). For each cell line, the Insitro model outperforms the conventional model (e.g., increased AUC values). The conventional model uses a list of classic features:
  1. Localized intensity statistics: Attributes (e.g., distribution percentiles and cross channel correlations) of the signal localized in the nucleus, cytoplasm and perinuclear areas.
  2. Shape characterization: Attributes describing the size and shape characteristics (e.g., Hu moments, cell width, cell height).
  3. Texture characterization: Attributes summarizing textures structures of the different channels (e.g., Gabor filters and region covariance descriptors)

Conventional models incorporating classic image features achieved mean AUC of 0.71 for low dose and 0.89 for high dose in out-of-line validation. These results support the benefit of utilizing deep learning methods for identifying and characterizing morphological phenotypes.

Having characterized the effects of exposures alone, the effects of exposure was then linked to genetic data (e.g., step 6 shown in FIG. 13). Here, the focus was on identifying genetic perturbations that had a significant effect on transcriptomic responses. This analysis directly assessed whether the NASH GWAS hits have a causal link to the iSTEL ERPs. The analysis approach used PCA followed by computation of Mahalanobis distance between projections, thereby allowing calculation of the distance between cells with a gene knockout plus exposure, and cells with intergenic guides plus exposure.

As an example, projections of TGFβR1 knockout cells on principal components (PCs) of cells treated with TGFβ or DMSO were generated. In these projections, the first two PCs explained nearly 70 percent of the variance, indicating that the sets of genes in loading these PCs are driving the response to this exposure. Projecting the TGFβR1 knockout cells under DMSO treatment onto PC1 and PC2 revealed a slight, but significant shift of cells with respect to the intergenic sgRNA, moving the population further in the direction of a DMSO-like phenotype and further from TGFβ phenotype. These results revealed a minor but specific effect of the TGFβR1 knock out in iSTELs probably due to abrogation of the baseline signaling of natural low TGFβ concentration in the cell culture. As expected, under saturating TGFβ exposure, the majority of TGFβR1 knockout cells did not acquire a TGFβ phenotype when projected onto PC1 and PC2. These results indicated that (i) genetic perturbations with a significant effect on iSTEL response can be identified through quantifying distances in PC space; and (ii) the functional consequences of gene knockouts may be more readily observed under an appropriate environmental context.

Figure 15E:
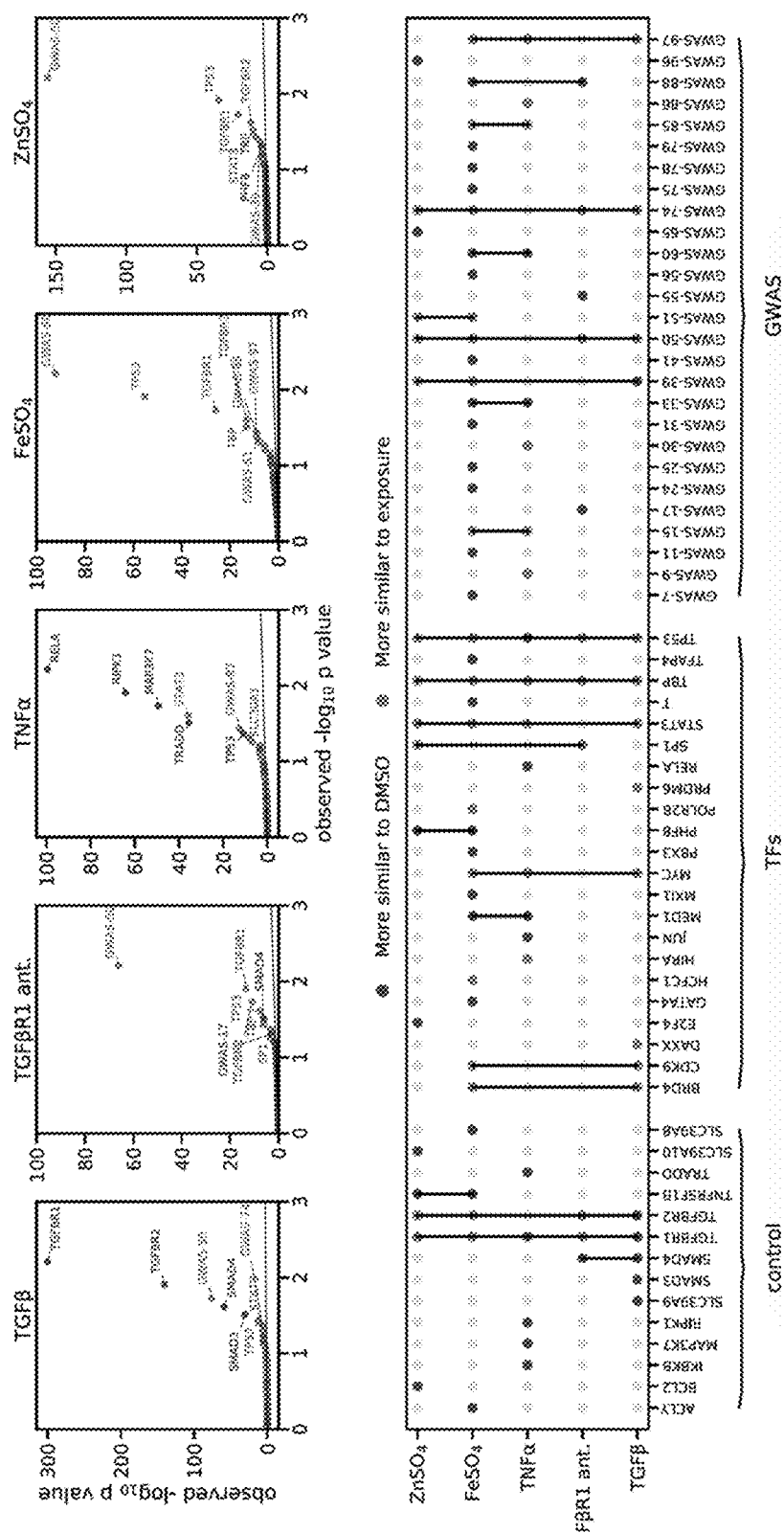
FIG. 15E depicts the identification of druggable targets based on Peturb-seq data in a first cell line (iStel).

This analysis was then extended to all knockout data, collected under all exposures. This approach enabled identification of genetic perturbations that had a significant effect on downstream gene expression (FDR <5%), as well as allowed annotation of a predicted direction of effect for each knockout across the different exposures tested. Specifically, FIG. 15E depicts the identification of druggable targets based on Peturb-seq data in iStels. Gene knockouts reveal significant exposure-specific phenotypes. The top row of FIG. 15E shows QQ plots showing p values for the difference between cells containing gene-targeting guides and intergenic control guides. Each panel shows a different exposure and each data point is a gene knockout. PCA was performed on across genes important in classifying exposure treatment. The bottom panel of FIG. 15E shows Control, TF, and GWAS hits which indicate that the perturbed genes that showed a statistically significant impact on the respective exposure scores (colored dots, FDR <0.05). Connections in the upset plot highlights overlap of genetic knockouts across multiple exposure conditions. Blue indicates knockouts that are more similar to the respective DMSO controls, red indicates knockouts that are more similar to exposure treatment.

Across the controls, transcription factors and GWAS hits perturbed, observed were 14, 22 and 27 significant genetic perturbations across the five exposures tested, respectively. From the control set of genes known to act in the respective signaling pathways, modulation of TGFβ response was confirmed using knockouts of TGFβR1, TGFβR2, SMAD3, SMAD4 for TGFβ and TGFβR1 antagonist exposures and by knockouts of RIPK1, TRADD, MAP3K7 and IKBKB for the TNFα response. For $FeSO_4$ and $ZnSO_4$ exposures, we confirmed knockouts of metal ion transporter genes as having a significant effect (SLC39A8 and SLC39A10, respectively). Overall, these analyses demonstrated the ability to faithfully model, at scale, the interactions between genetic perturbation and exposures. Characterizing the disease model with genetic perturbations under multiple environmental conditions allowed a better understanding and prediction of iSTEL response to exposures. From this analysis, example candidate targets are identified. For example, the right bottom panel of FIG. 15E shows different GWAS targets that serve as candidate targets for modulating fibrosis progression. If the goal is to push cells towards an activated state (e.g., a state following one of the treatments on the y-axis), then certain GWAS variants can be targeted (e.g., GWAS-9, GWAS-15, GWAS-30, GWAS-50, GWAS-51, GWAS-74, GWAS-85, GWAS-86, GWAS-97) whereas if the goal is to push cells towards a non-activated state (e.g., DMSO treated state), then other GWAS variants are targeted (e.g., GWAS-7, GWAS-11, GWAS-17, GWAS-24, GWAS-25, GWAS-31, GWAS-33, GWAS-41, GWAS-55, GWAS-56, GWAS-60, GWAS-65, GWAS-75, GWAS-78, GWAS-79, GWAS-88, and GWAS-96).

Next, candidate markers were analyzed for their alignment with various clinical endpoints (e.g., fibrosis progression, steatosis, hepatocyte ballooning, or lobular inflammation). The majority of the candidate marker genes had strong associations with NASH disease states (e.g., bottom panel of FIG. 15F). Progression is a much more stringent criterion that showed weaker associations with only a few potential markers. In comparison, the phenotypic anchors (ACTA2, FN1, and COL1A1) showed similar characteristics in that the association of the anchors with fibrosis state was higher than their association with fibrosis progression. These results support the ability to identify candidate genetic markers for screening that have strong connections to clinical traits of interest. Taken together, this G~E approach enables the development of a data driven strategy for dissecting ERPs with the purpose of developing marker based screens targeting candidate screening hypotheses.

Figure 15F:
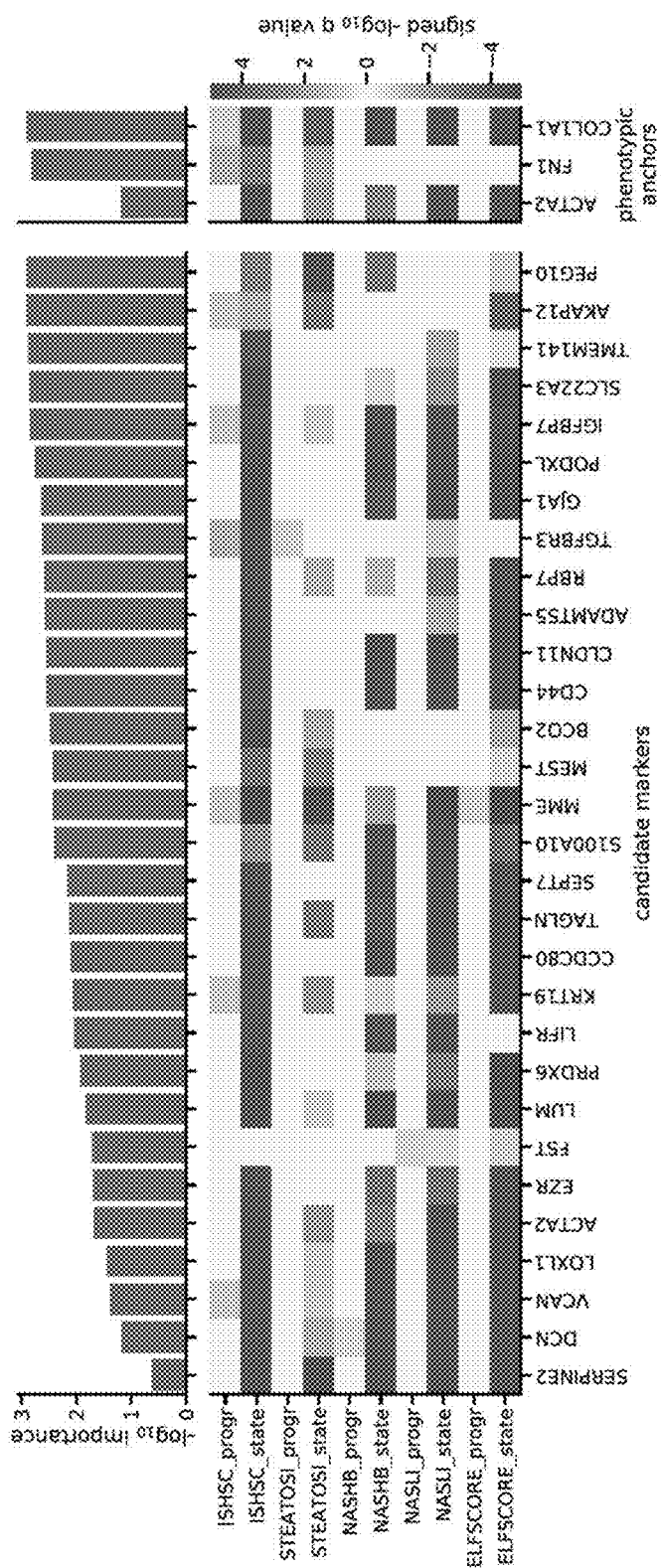
FIG. 15F depicts a comparison of GWAS hits to machine learned predicted scores.

Specifically, FIG. 15F depicts a comparison of GWAS hits to machine learned predicted scores. TGFβ marker selection from random forest model and association with NASH clinical endpoints. The top panel of FIG. 15F shows candidate marker genes of TGFβ exposure, ranked by their importance in classifying the ERP. From left to right, genes of highest importance to those of least importance. Bottom panel of FIG. 15F shows association of candidate marker genes of TGFβ exposure with clinical labels in Stellar trials. Shown are signed −log10q values from the association test (obtained from P values applying the Benjamini-Hochberg procedure across the signature genes for each clinical label in isolation), where the signs reflect the directionality of the associations. Only significant associations (FDR <0.20) are shown.

Figure 16A:
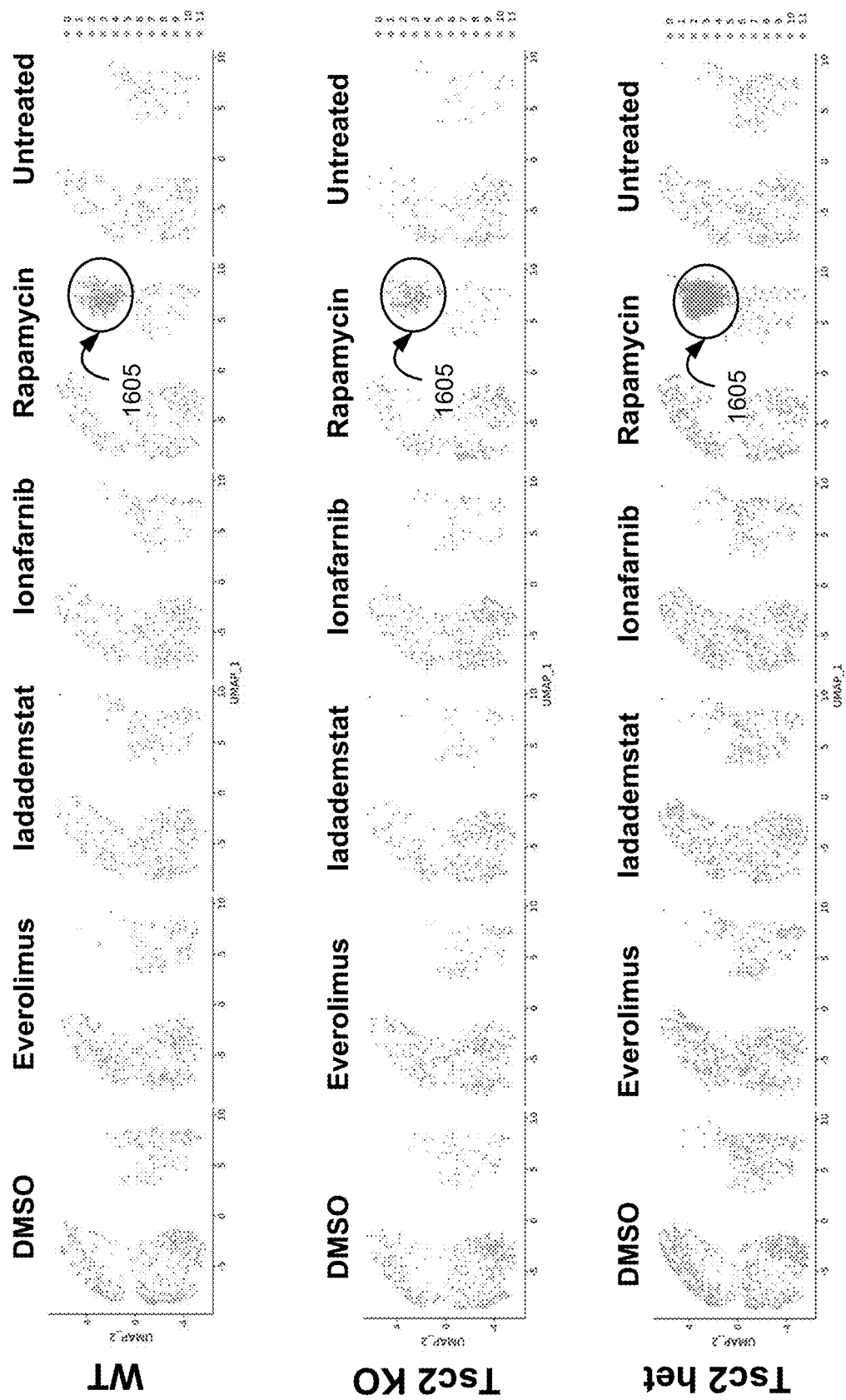
FIGS. 16A and 16B depict example embeddings and their use in selecting a therapeutic.
Figure 16B:
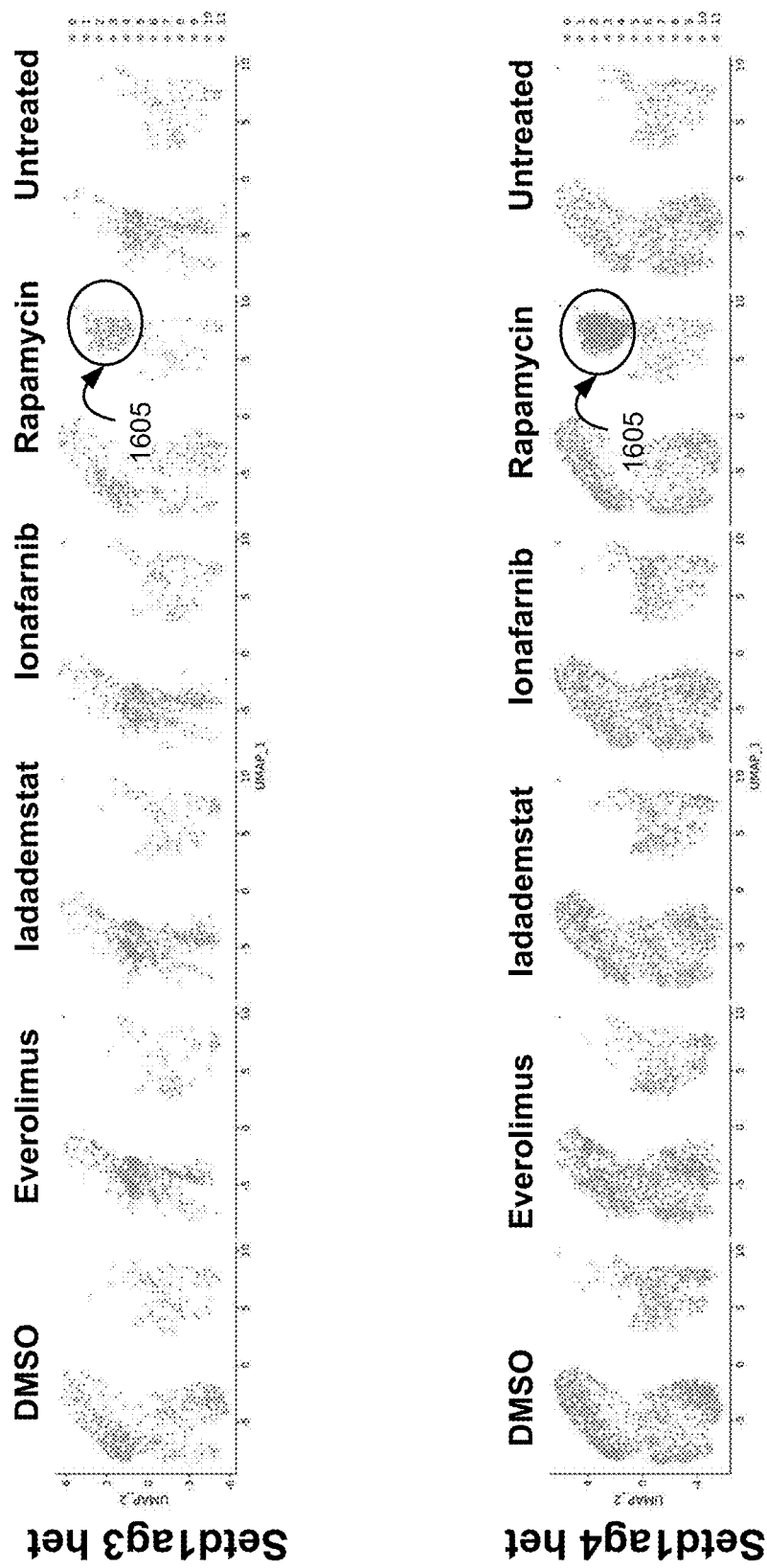

Example 11: Example Cellular Disease Model for Validating an Intervention and Performing SAR Screen FIGS. 16A and 16B depict example embeddings and their use in selecting a therapeutic. Briefly, isogenic mutant human iPSC lines were engineered to enable a chemically-induced overexpression of a transcription factor that leads to rapid differentiation toward a neuronal lineage. The cell line was further engineered to contain no edits (WT), a complete loss (TSC2 KO), or a heterozygous loss (TSC2 het, SETD1ag3 het, SETD1ag4 het) of target genes. Using a genetic labeling technique, the cells were then pooled together and differentiated toward the mentioned neuronal lineage. On day 14 of differentiation, when the cells were in an immature neuron state, the cells were treated with DMSO, rapamycin (100 nM), everolimus (100 nM), lonafarmib (100 nM), iadademstat (100 nM), or left untreated. Cells were treated with a second dose of the same at day 16. On day 17, cells were dissociated via accutase, filtered, counted, washed, and run through a single cell RNAseq pipeline that was modified to include the genetic cell labeling. Each treatment condition was individually indexed, and demultiplexing of the data allowed the individual treatments and genotypes to be separated.

Standard scRNAseq pipeline was conducted in R using Seurat. To summarize, cells expressing high % mitochondria were filtered out, transcript read data was log normalized, highly variable genes were identified and utilized for principal component analysis (dimension reduction). Graph-based clustering and UMAP embedding was conducted on the processed data, showing that the TSC2ko neurons expressed a distinctive disease signature, while all cells treated with rapamycin, including the TSC2ko population, moved to a distinctive transcriptional state (as indicated by cluster 1605 in FIGS. 16A and 16B). Thus, FIGS. 16A and 16B stand for the proposition that the embeddings generated by the machine learning model can be used to identify a possible intervention (e.g., rapamycin) that would cause the cells to change its cellular phenotype (e.g., as evidenced by the change in transcriptional state).

Figure 16C:
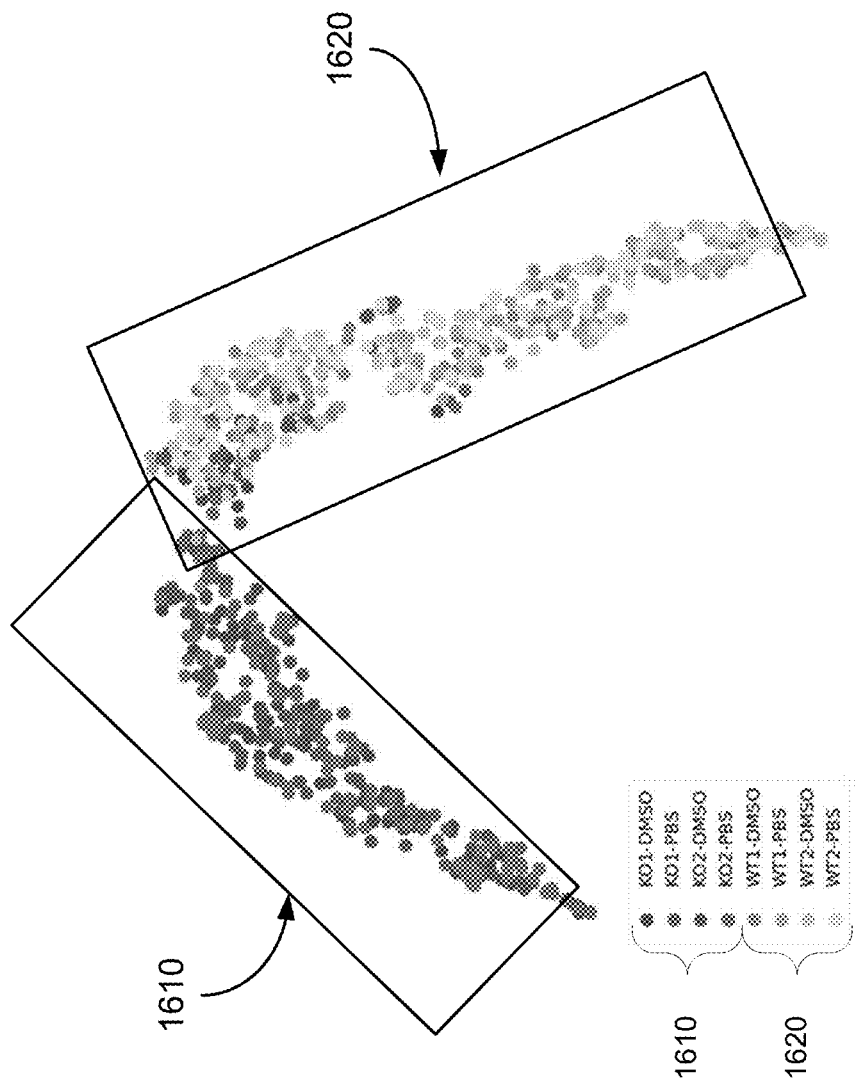
FIG. 16C depicts an example embedding showing phenotypic distinction between wild type and knockout cells.

FIG. 16C depicts an example embedding showing phenotypic distinction between wild type and knockout cells. FIG. 16C was generated by projecting embeddings extracted from a deep neural network down to two dimensions using UMAP. The neural network model was trained in a supervised manner to discriminate between sick/healthy based on labels for WT and KO lines respectively. Each point in the figure corresponds to a tile of the original microscopy image. The points represented here are only for the WT and KO groups without treatment. Specifically, the WT groups are indicated in FIG. 16C as 1620 whereas the KO groups are indicated in FIG. 16C as 1610.

Figure 16D:
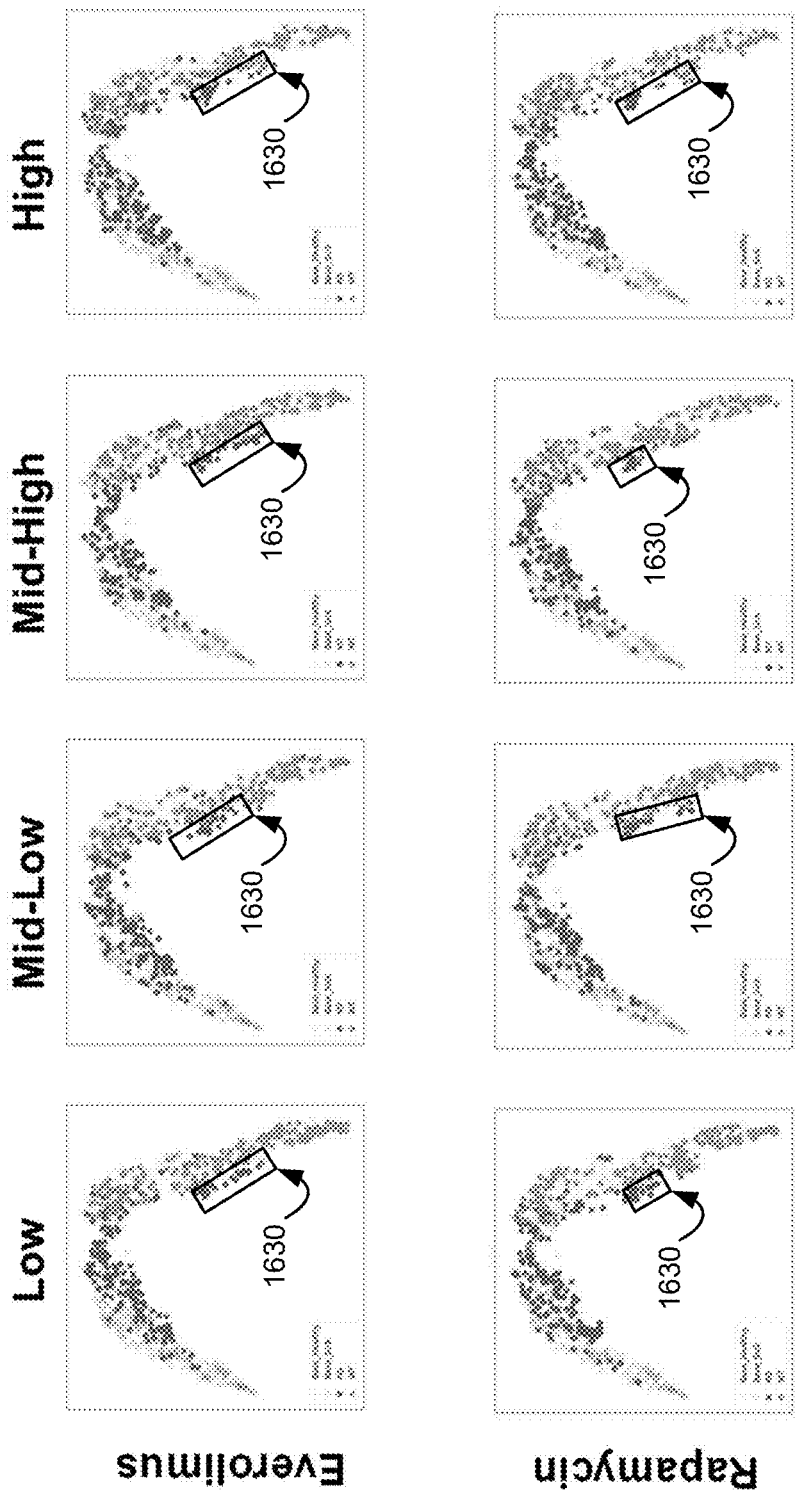
FIG. 16D depicts the use of embeddings for validating known effects of treatments (e.g., rapamycin and everolimus).

FIG. 16D depicts the use of embeddings for validating known effects of treatments (e.g., rapamycin and everolimus). The following figure uses the same UMAP projector calculated on tile embeddings of WT/KO with no treatment to project the embeddings representing treatment groups into the same space. Importantly, there is a set of knockout treated cells (shown in box 1630 in FIG. 16D) that have shifted or reverted towards healthy cells in the embedding, demonstrating that everolimus and rapamycin induces knockout treated cells to revert back towards a healthy phenotype.

Figure 16E:
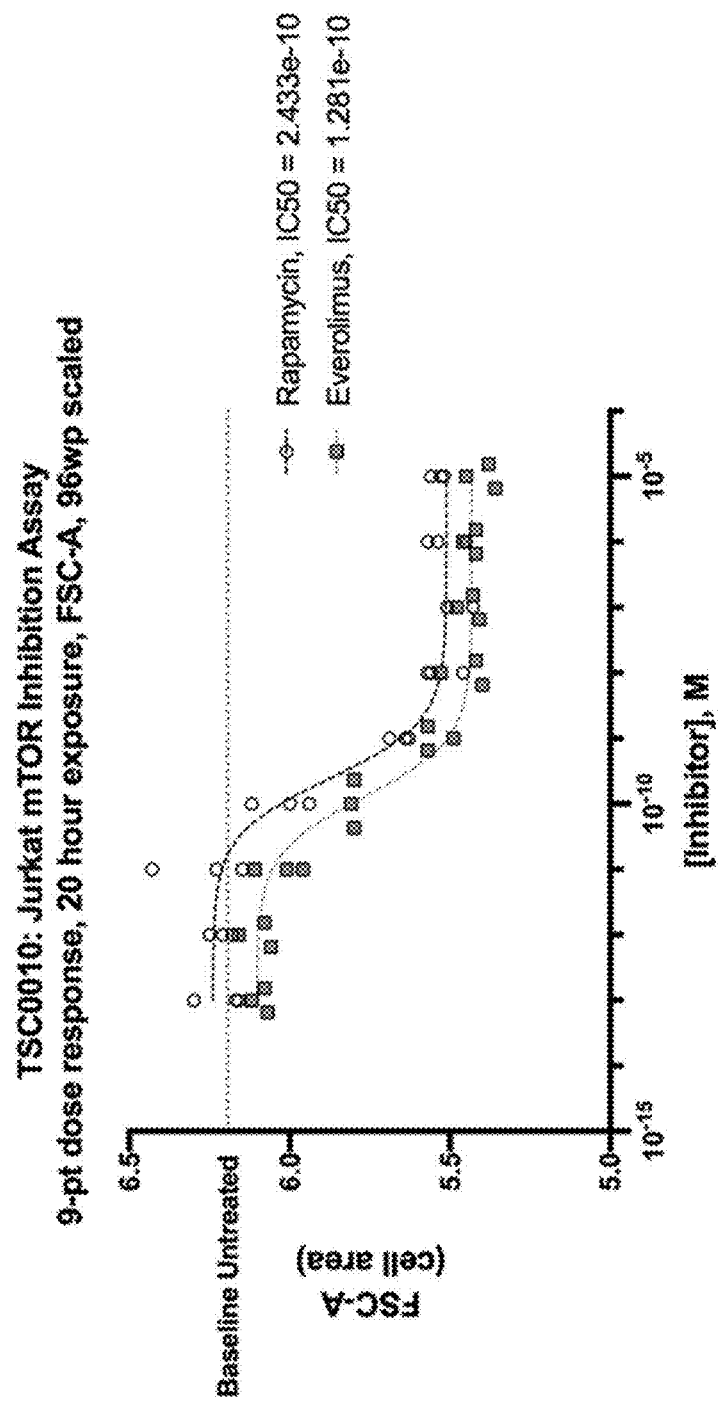
FIG. 16E depicts in vitro testing to validate the treatments of rapamycin and everolimus.

FIG. 16E depicts in vitro testing to validate the treatments of rapamycin and everolimus. Jurkat cells (ATCC, TIB-152, Lot 70029114) were cultured in suspension in RPMI 1640 medium+10% fetal bovine serum (FBS). For the assay, cells were seeded into ultra-low attachment (ULA) U-bottom 96-well plate at 20k cells per well. Suspension cultures were immediately treated with titrated doses of rapamycin (SelleckChem, AY-22989), everolimus (SelleckChem, RAD001), or DMSO control. Doses ranged from 10 µM at 10-fold dilutions down to 1 pM. Cells were cultured for 20 hours at 37 C with 5% CO2, then directly examined via flow cytometry using Beckman Coulter CytoFLEX. Morphology measurements based on average forward scatter (FSC) and side scatter (SSC) were used to examine dose response of cells to mTOR inhibitors. Here, the data shows Jurkat cells treated with two well-established mTOR inhibitors including rapamycin and everolimus. The IC50 values of rapamycin and everolimus are shown based on forward scatter (FSC) with increasing dose. Thus, this demonstrates that drugs predicted by the machine learning model (e.g., using embeddings shown in FIG. 16C) are successfully validated through in vitro testing.

Figure 16F:
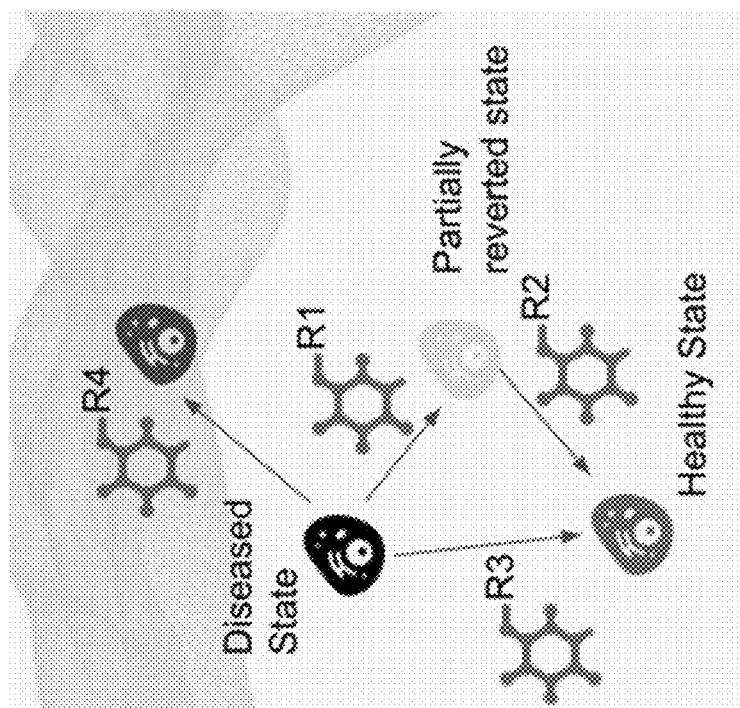
FIG. 16F depicts an example screening process involving one or more molecules.

FIG. 16F depicts an example screening process involving one or more molecules. Here, molecules are referred to as R1, R2, R3, or R4. Once a phenotypic-disease and the corresponding imaging+machine learning based readout have been established, the experiment and model can be used for efficient molecular design. Beginning with a disease state, it can be directly reverted to the healthy state in one shot via screening a R3 molecule. Alternatively, a disease state can be reverted to the healthy state through multiple steps by measuring progress along the healthy-disease axis as shown through the addition of R1 and R2 molecules to the underlying molecular scaffold. Along the way, molecule R4 is avoided as it would lead to an undesirable region of phenotypic space. Such a system when implemented creates phenotypic SAR responses for each starting molecular scaffold, thereby enabling efficient molecular design.

Figure 16G:
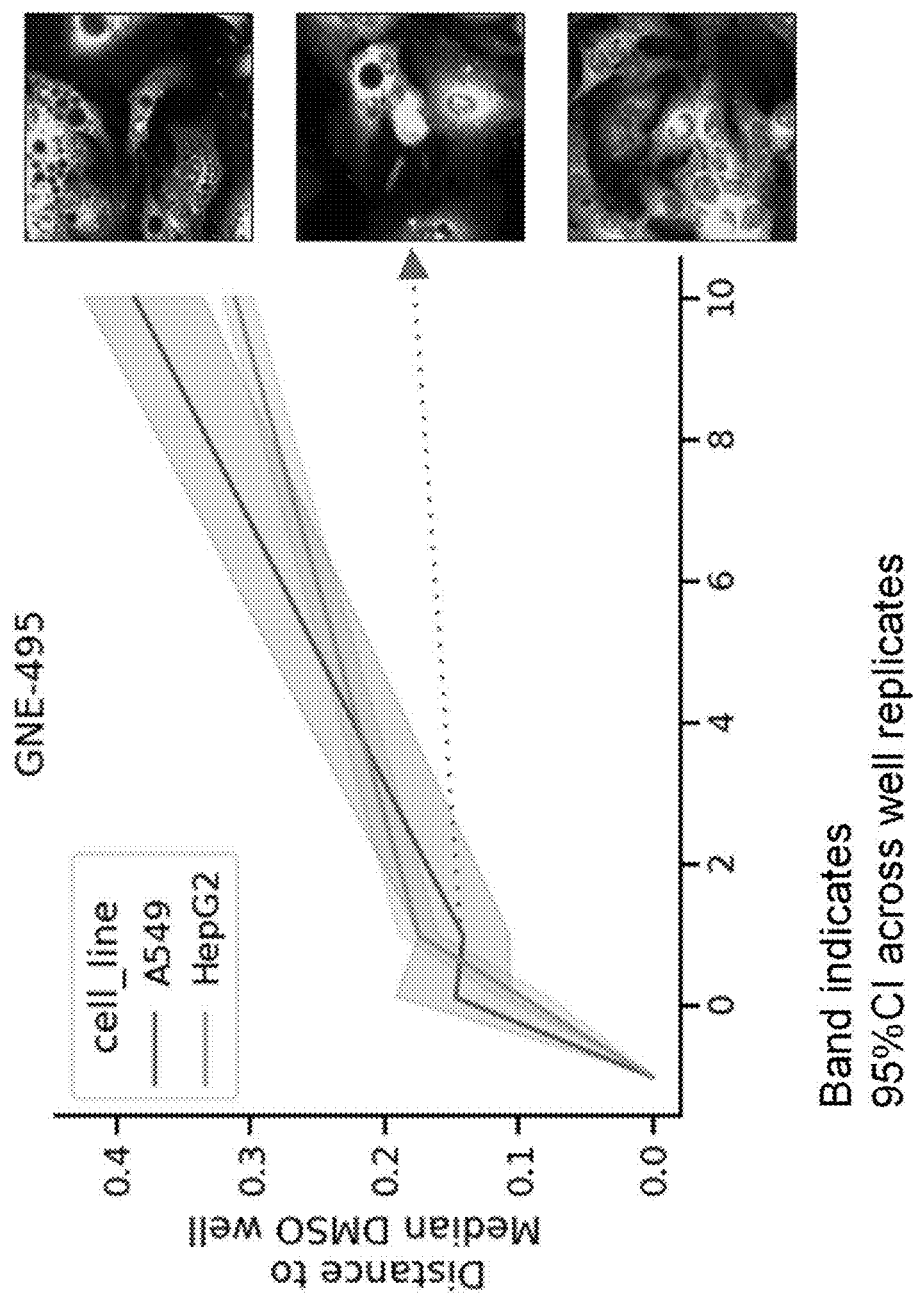
FIG. 16G depicts a dose response curve developed according to phenotypic morphologic differences of cells.

FIG. 16G depicts a dose response curve developed according to phenotypic morphologic differences of cells. Specifically, FIG. 16G stands for the proposition that the machine learning model differentiates between cellular phenotypes resulting from different doses of a treatment. Thus, if the cells are provided a therapeutic that reverses the cellular phenotype towards an untreated state, the machine learning model can capture such therapeutic impact through a reduction in the distance to the median DMSO well as shown in FIG. 16G.

Figure 16H:
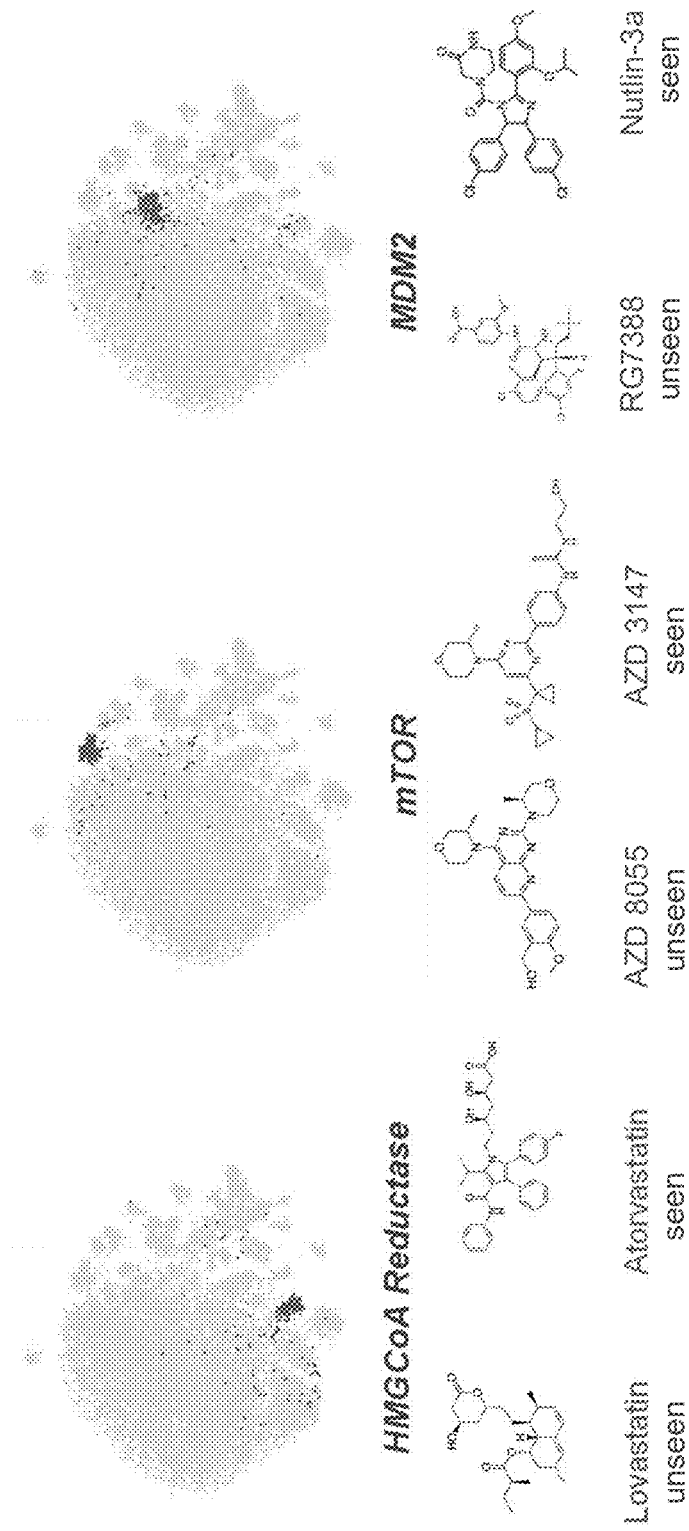
FIG. 16H depicts example manifolds where clustered drugs share similar structures and/or mechanisms of action.

Given a drug that is validated as reverting the cellular phenotype towards a different state (e.g., towards a healthy state), the cellular disease model is used to identify additional candidate therapeutics which exhibit the same or similar phenotype, and therefore share the same mechanism of action. FIG. 16H depicts example manifolds where clustered drugs share similar structures and/or mechanisms of action. Here, the drugs are clustered in close proximity according to the similarity of their phenotypic effect. For example, drugs of the same mechanistic class exhibit similar phenotypes. This further enables the identification of previously unseen drugs (e.g., lovastatin, AZD 8055, and RG7388 shown in FIG. 16H) based on their clustered proximity to previously seen drugs (e.g., atorvastatin, AZD 3147, and Nutlin-3a). In turn, additional associations between similar or common structural features of drugs in clustered proximity based on their phenotypic effects can be determined and used to generate a SAR mapping.

Example 12: Example Cellular Disease Model for Patient Segmentation

Figure 17A:
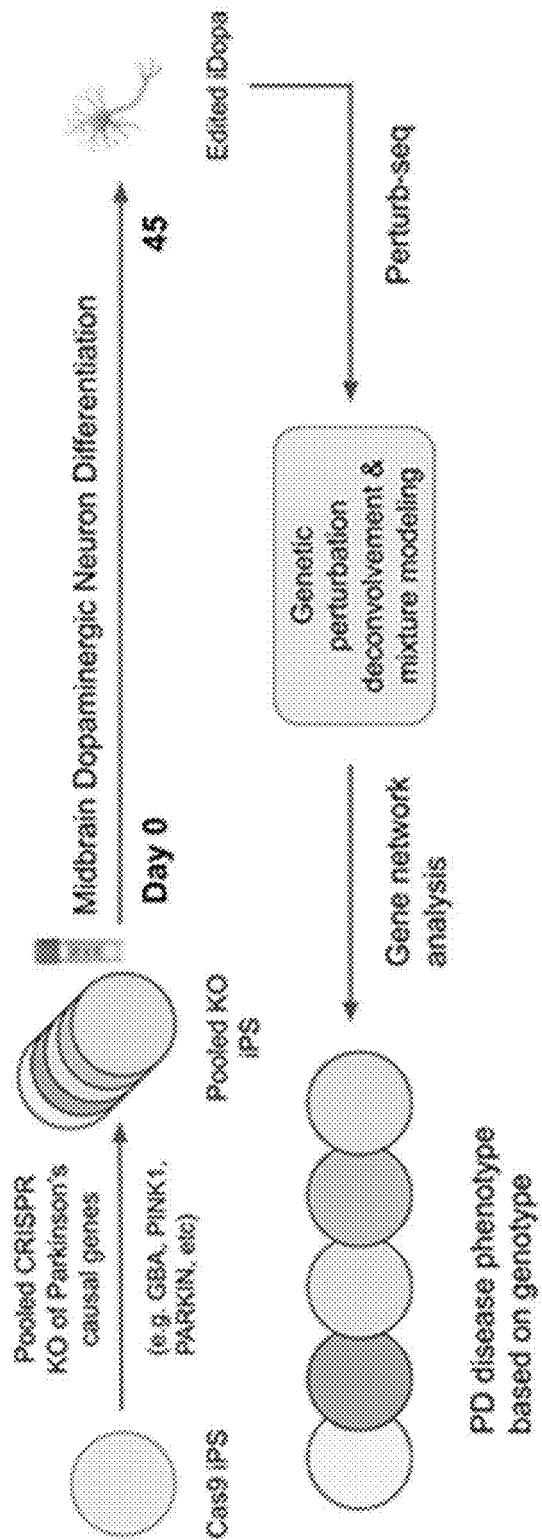
FIG. 17A depicts example cellular avatars in the context of Parkinson's Disease.

FIG. 17A depicts example cellular avatars in the context of Parkinson's Disease. 12 Loss-of-Function (LOF) genes that cause Mendelian forms of Parkinson's disease are selected, and single guide RNAs (sgRNAs) against those genes are designed, and ordered as a pool from Twist Biosciences. The oligos are cloned into a CROP-seq guide expression lenti-vector and pooled lentivirus is produced in 293T cells and titered. Stable Cas9 line is infected with pooled lenti-guide virus and selected for stable integrants by puromycin for 5 days. Edited KO iPSC pools are then differentiated into day 45 iDopa by published protocol described in Kriks, S. et al. Dopamine neurons derived from human ES cells efficiently engraft in animal models of Parkinson's disease. Nature 480, 547-551 (2011), which is hereby incorporated by reference in its entirety. iDopa are harvested on day 45 for 10× scRNAseq. The processed data are de-convolved into edited genotypes, de-noised from mixed differentiation cell types and perturbation status, and gene modules that best predict each genotype are then nominated as disease phenotypes for further validation and screening efforts. Here, individual "PD disease phenotypes" as shown in FIG. 17A serve as cellular avatars. Thus, in accordance with the methodology of Example 11 (e.g., FIGS. 16A-16D) described above, using embeddings/predictions generated for the PD disease phenotypes, a therapeutic is selected, analyzed to predict its effect (e.g., effect in reverting disease phenotype back to healthy), and further validated in vitro. Thus, a particular cellular avatar (and patients corresponding to that cellular avatar) is deemed to responders to the therapeutic.

Figure 17B:
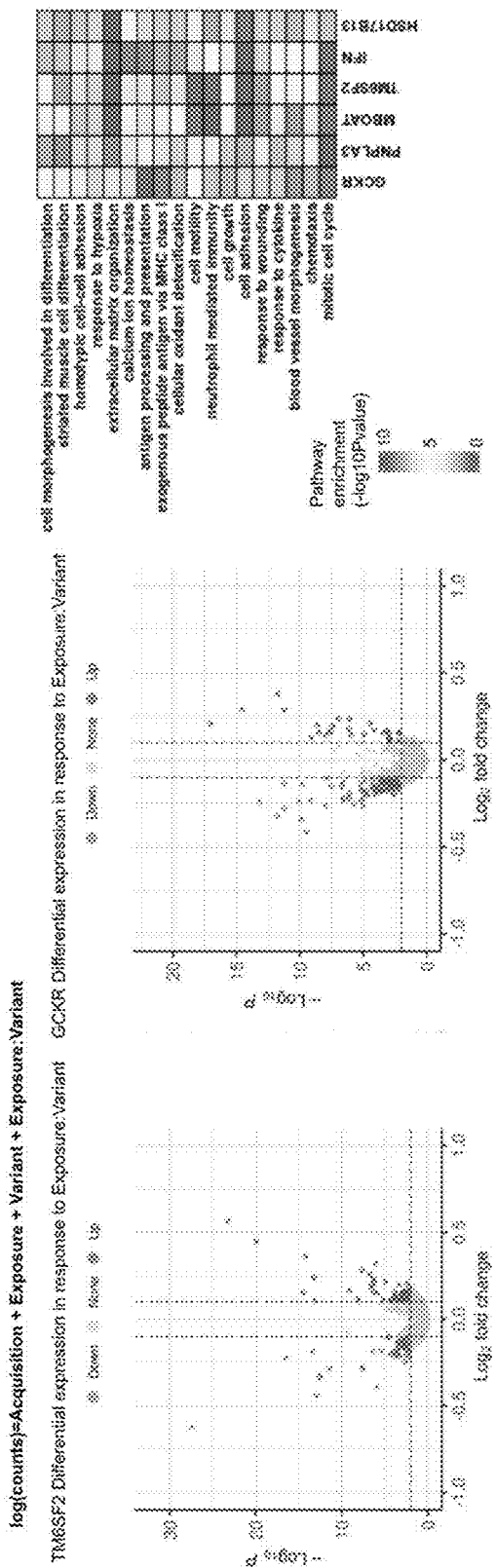
FIG. 17B depicts an example process for identifying likely responders.

FIG. 17B further depicts an example process for identifying likely responders. iStel cells were obtained from human donors. Thus, such cells from a donor can represent a cellular avatar (e.g., a cell with a particular set of genetics). For example, referring again to FIG. 5B, the cells can represent cellular avatars 540 which are further representative of certain subjects 505. Combinations of exposures and genetic variants are introduced to the cells and the differential expression of particular genes as a result of the combinations are investigated. Here, the iStel cell population was genotyped at six loci of interest: TM6SF2, GCKR, PNPLA3, HSD17B13, MBOAT, IFN, and three acquisitions of cells were performed. Partial least regression (PLS) regression analysis with two components was performed on iStel datasets after demultiplexing. Four sets of cells were projected for each variant onto the PLS components 1 and 2: cells in PBS with no variant risk alleles, cells in TGFb with no variant risk alleles, cells in PBS with one or two risk alleles, and cells in TGFb with one or two risk alleles. The Mahalanobis distance between the TGFb/no-risk projections and the PBS/no-risk projections was computed. The Mahalanobis distance between the TGFb/1|2 risk allele projection and the PBS/no-risk projection was computed next. The distributions of Mahalanobis distances for the two cases were assessed for a relative shift between them via the Mann Whitney test, and resulting −log10 (P-values). These results suggest significant shifts in gene expression profiles in response to the presence of the risk alleles at five of the six loci that were assessed. The most significant shifts were observed for the TM6SF2 and GCKR loci, with no significant shifts observed for the IFN locus. Differential gene expression was performed using the limma method for each variant dataset, using the design: log (counts)=Acquisition {1, 2, 3}+Exposure {TGFb, PBS}+Variant {0 risk allele, 1|2 risk allele}+Exposure: Variant. The p-value and log2 fold change for genes in response to the interaction term was assessed, using adjusted p-value threshold 0.01 and log2 fold change threshold of 0.1 to determine genes with significantly differential expression. These are plotted for the TM6SF2 and GCKR variants (shown in left panel and middle panel of FIG. 17B, respectively) (these two variants were selected as they had the most significant p-value). As can be observed in the left and center panels of FIG. 17B, the different combinations of exposures and genetic variants can lead to upregulation or downregulation of TM6SF2 or GCKR. Differential expression for a number of NASH-related genes are observed, including SERPINE2 and CD44. Pathway enrichment analysis was performed from a set of 53 canonical NASH pathways from the matrix of T-statistics derived from the interaction term coefficient in the limma model. The right panel of FIG. 17B shows a matrix indicating specific cellular processes (e.g., processes on the y-axis of the matrix) and the corresponding pathway enrichment for the different genes (e.g., including GCKR and TM6SF2). Specifically, the right panel of FIG. 17B shows changes in macro-level cellular responses, which enables identification of the cellular avatar as a likely responder or non-responder to a therapeutic. For example, for a therapeutic that modulates extracellular matrix organization, the cellular avatar is a responder given that the analysis in FIG. 17B shows pathway enrichment of extracellular matrix organization. In accordance with the methodology of Example 11 (e.g., FIGS. 16A-16D) described above, using embeddings/predictions, such a therapeutic is analyzed to predict its effect (e.g., effect in reverting disease phenotype back to healthy) to determine whether the cellular avatar is truly a responder to the therapeutic. Example 13: Example Cellular Disease Model for Identifying Candidate Intervention from Validated Intervention Immortalized cancer cell lines A549 and HepG2 were cultured in T150 flasks and harvested above 60% confluency. The cells were counted on a cell counter (Countess by ThermoFisher) the cell suspension was adjusted to 2000 cells per 50 µL well of a 384 well PDL coated Cell Carrier Ultra (Perkin Elmer) plates. The cells were incubated overnight in a 37 C 5% $CO_2$ incubator and then dosed with our compound collection (at multiple concentrations in log space) in DMSO with a Labcyte Echo from Echo qualified PP2.0 plates. After dosing the cells were incubated for 48 hours in a 37 C 5% $CO_2$ incubator. After the incubation period the plates were stained with Mito-tracker by removing the cell media, washing with PBS on a EL406 plate washer (Biotek), then adding diluted 1 mM stock concentration mitotracker dye in cell culture media to each well with a PRIME liquid handler (HighRes Biosciences). The plates were incubated for 30 minutes and then washed 1× with PBS. Formaldehyde was added to each well of each plate to fix the cells and incubated for 20 minutes and then washed 5× with PBS. 0.1% Triton in PBS was added to the plates and incubated for 15 minutes then washed 2× with PBS and a stain mixture was added to all wells of the plates. The stain mixture included 5 µg/mL Hoechst, 100 µg/mL Concanavalin Alexa Fluor 488 conjugate, 3 uM SYTO 14 green fluorescent nucleic acid stain, 5 uL/mL Phalloidin/Alexa Fluor 568 conjugate, and 1.5 µg/mL Wheat Germ Agglutinin Alexa Fluor 555 conjugate in HBSS with BSA. The plates were incubated for 30 minutes with the stain solution and then washed 4× with PBS. The plates were then imaged in a Perkin Elmer Opera Phenix microscope with 16 images taken per well for all stain wavelengths.

This is a classification task where the goal is to identify which compound was used to perturb the cells in a single well. A single well is split into 16 different fields of views (FOV) which are captured by the microscope. The raw FOV images were preprocessed by correcting the illumination. The FOV images were further cropped into smaller squares so that we can fit into memory during the training of deep convolutional neural network (CNN) models. The Hoechst channel was used to detect the nucleus and then make a square around the detected nucleus.

Figure 18A:
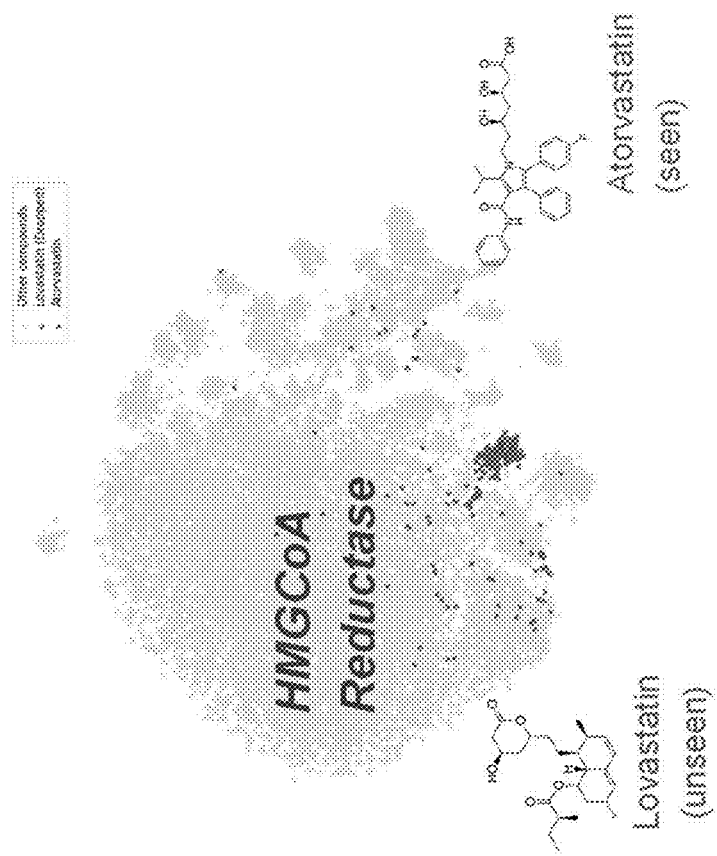
FIG. 18A depicts example embeddings with similar drugs clustered more closely together.
Figure 18B:
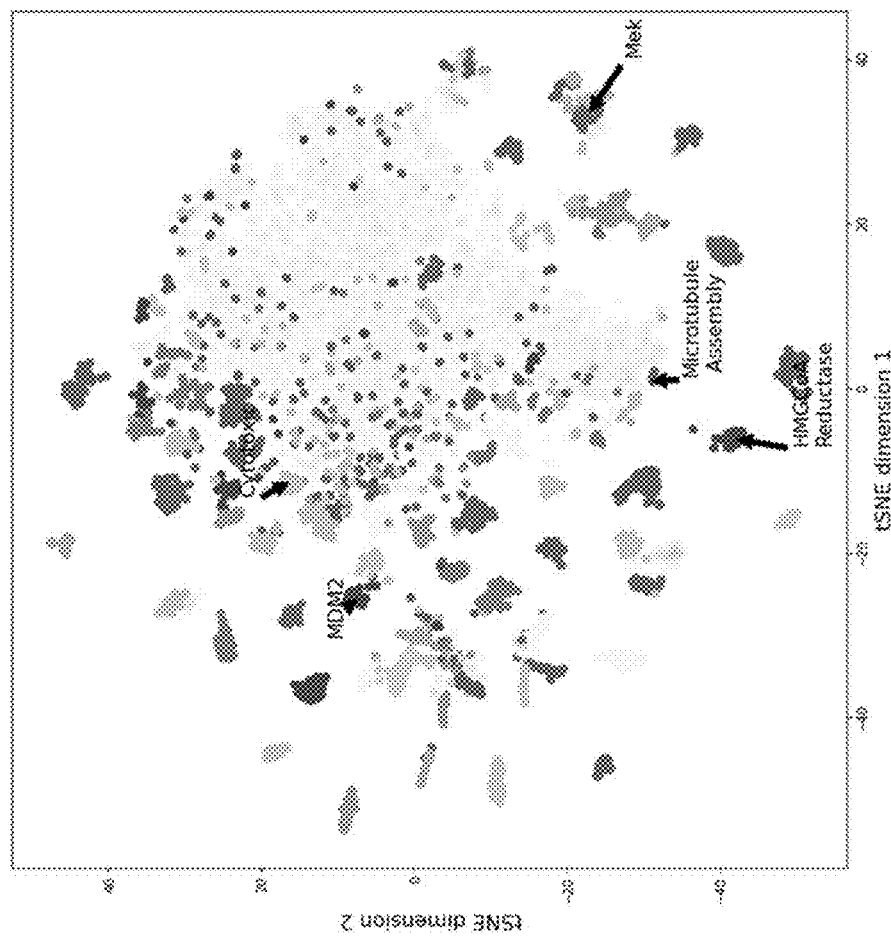
FIG. 18B depicts an example manifold that clusters similar drugs according to their mechanism of action.

A deep convolutional neural network was implemented to model the classification task. It was a 150-way classification task. The residual networks (ResNets) was used as the base feature extractor network with a fully connected linear network on top to perform the classification. Standard augmentations were implemented which improved the performance and removed experimental biases. For example, intensity based augmentations like gamma contrast are helpful in removing experimental biases (batch effects). For the mechanism of action identification, some compounds were omitted (~30 compounds out of 150) during training. During inference, the unseen compounds were embedded closer to the expected mechanism of action cluster along with the seen compounds. FIG. 18A depicts example embeddings with similar drugs clustered more closely together. Here, lovastatin is a held out, unseen drug whereas atorvastatin is a drug used for training. The drugs are clustered close together, indicating their similarity. FIG. 18B depicts an example manifold that clusters similar drugs according to their mechanism of action. Different molecules induce distinct morphological phenotypes within HepG2 and A549 cell lines. Deep learning captures these morphologies to create a morphological manifold Within the manifold, compounds inducing similar phenotypes cluster close to one another. Compounds not showing distinct phenotypes cluster with negative control. Thus, these results show that drugs can be effectively clustered near other similar drugs, and represent candidate therapeutics for further testing. In accordance with the methodology of Example 11 (e.g., FIGS. 16A-16D) described above, using embeddings/predictions, the candidate therapy is analyzed to predict its effect (e.g., effect in reverting disease phenotype back to healthy), and further validated in vitro.

The invention claimed is:

1. A system comprising:
a processor; and
a storage memory storing a plurality of microscopy images of cells from one or more exposure response phenotypes (ERPs), wherein cells from an ERP of the one or more ERPs are aligned with a genetic architecture of disease and exposed to a perturbagen to promote a diseased cellular state, the storage memory further comprising instructions that, when executed by the processor, cause the processor to:
access the plurality of microscopy images of the cells from the one or more exposure response phenotypes;
encode the plurality of microscopy images from one or more exposure response phenotypes into numerical representations; and
train a plurality of parameters of a machine learning model using the numerical representations.

2. The system of claim 1, wherein the trained machine learning model is configured to receive as input a plurality of test microscopy images of test cells and provide as output predictions of exposures of the test cells that cause the one or more exposure response phenotypes.

3. The system of claim 1, wherein the cells from one or more exposure response phenotypes were previously exposed to one or more perturbagens.

4. The system of claim 3, wherein the cells from one or more exposure response phenotypes were previously exposed to different concentrations of the one or more perturbagens.

5. The system of claim 3, wherein the cells from one or more exposure response phenotypes comprise a plurality of genetic backgrounds.

6. The system of claim 1, wherein the trained machine learning model distinguishes between microscopy images captured from healthy and diseased samples.

7. The system of claim 1, wherein the storage memory further comprises instructions that, when executed by the processor, cause the processor to:
deploy the machine learning model to analyze one or more microscopy images of treated cells exposed to an intervention; and
validate the intervention.

8. The system of claim 7, wherein the machine learning model generates a prediction comprising a machine-learned embedding.

9. The system of claim 1, wherein the instructions that cause the processor to train a plurality of parameters of a machine learning model comprises instructions that, when executed by a processor, cause the processor to train the plurality of parameters using a combination of weak supervision and partial supervision approaches.

10. The system of claim 1, wherein the machine learning model is a neural network.

11. The system of claim 1, wherein the plurality of microscopy images are captured using any of confocal microscopy, super-high-resolution microscopy, in vivo two photon microscopy, electron microscopy (e.g., scanning electron microscopy or transmission electron microscopy), atomic force microscopy, bright field microscopy, or phase contrast microscopy.

12. A non-transitory computer readable medium comprising instructions that, when executed by a processor, cause the processor to:
access a plurality of images captured using microscopy of the cells from one or more exposure response phenotypes (ERPs), wherein cells from an ERP of the one or more ERPs are aligned with a genetic architecture of disease and were exposed to a perturbagen to promote a diseased cellular state;

encode the plurality of images of the cells from one or more exposure response phenotypes into numerical representations; and train a plurality of parameters of a machine learning model by analyzing the numerical representations.

13. The non-transitory computer readable medium of claim 12, wherein the cells from one or more exposure response phenotypes were previously exposed to one or more perturbagens.

14. The non-transitory computer readable medium of claim 13, wherein the cells from one or more exposure response phenotypes comprise a plurality of genetic backgrounds.

15. The non-transitory computer readable medium of claim 13, wherein the cells from one or more exposure response phenotypes were previously exposed to different concentrations of the one or more perturbagens.

16. The non-transitory computer readable medium of claim 12, wherein the trained machine learning model distinguishes between microscopy images captured from healthy and diseased samples.

17. The non-transitory computer readable medium of claim 12, further comprising instructions that, when executed by the processor, cause the processor to:

deploy the machine learning model to analyze one or more microscopy images of treated cells exposed to an intervention; and validate the intervention.

18. The non-transitory computer readable medium of claim 17, wherein the machine learning model generates a prediction comprising a machine-learned embedding.

19. The non-transitory computer readable medium of claim 12, wherein the instructions that cause the processor to train a plurality of parameters of a machine learning model comprises instructions that, when executed by a processor, cause the processor to train the plurality of parameters using a combination of weak supervision and partial supervision approaches.

20. The non-transitory computer readable medium of claim 12, wherein the machine learning model is a neural network.

21. The non-transitory computer readable medium of claim 12, wherein the plurality of microscopy images are captured using any of confocal microscopy, super-high-resolution microscopy, in vivo two photon microscopy, electron microscopy (e.g., scanning electron microscopy or transmission electron microscopy), atomic force microscopy, bright field microscopy, or phase contrast microscopy.

* * * * *